US008401902B1

(12) United States Patent
Stone et al.

(10) Patent No.: US 8,401,902 B1
(45) Date of Patent: *Mar. 19, 2013

(54) METHOD FOR USING COMPUTERS TO FACILITATE AND CONTROL THE CREATING OF A PLURALITY OF FUNCTIONS

(76) Inventors: Lucinda Stone, Tyler, TX (US);
Michael A. Dean, Tyler, TX (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/821,672

(22) Filed: Jun. 25, 2007

Related U.S. Application Data

(63) Continuation of application No. 10/954,820, filed on Sep. 30, 2004, now Pat. No. 7,240,025, which is a continuation of application No. 10/165,091, filed on Jun. 7, 2002, now Pat. No. 6,829,587, which is a continuation of application No. 09/480,303, filed on Jan. 10, 2000, now Pat. No. 6,446,045.

(51) Int. Cl.
*G06Q 30/00* (2012.01)
(52) U.S. Cl. ............... 705/14.72; 705/14.4; 705/14.73; 705/20; 705/26.1; 705/27.2
(58) Field of Classification Search ............... 705/14.4, 705/14.72, 14.73, 20, 26, 27, 28
See application file for complete search history.

(56) References Cited

U.S. PATENT DOCUMENTS

| 4,788,643 A | 11/1988 | Trippe et al. |
| 5,193,056 A | 3/1993 | Boes |
| 5,214,793 A | 5/1993 | Conway et al. |
| 5,233,423 A | 8/1993 | Jernigan et al. |
| 5,255,184 A | 10/1993 | Hornick et al. |
| 5,283,731 A | 2/1994 | Lalonde et al. |
| 5,347,632 A | 9/1994 | Filepp |
| 5,404,291 A | 4/1995 | Kerr et al. |
| 5,412,416 A | 5/1995 | Nemirofsky |
| 5,448,625 A | 9/1995 | Lederman |
| 5,504,321 A | 4/1996 | Sheldon |
| 5,543,856 A | 8/1996 | Rosser et al. |
| 5,581,461 A | 12/1996 | Coll et al. |
| 5,613,012 A | 3/1997 | Hoffman et al. |
| 5,615,277 A | 3/1997 | Hoffman |
| 5,684,918 A | 11/1997 | Abecassis |

(Continued)

FOREIGN PATENT DOCUMENTS

| JP | 8249326 A | 9/1996 |
| WO | 95/17733 A2 | 6/1995 |

(Continued)

OTHER PUBLICATIONS

Matt Hamblen, "Shell Protects Brand via net, Global System used to Guard Image Standards" Computerworld, Jan. 10, 2000.*

(Continued)

*Primary Examiner* — Raquel Alvarez
(74) *Attorney, Agent, or Firm* — Conley Rose, P.C.; Grant Rodolph

(57) ABSTRACT

An electronic advertising system that provides self-serve control for the centralized automated creation and publication of customized advertising presentations to multiple electronic media venues. The customized advertising presentations are automatically created by the central controller from raw advertising information to comply with the criteria of each selected multiple electronic media venue. Self-serve interfaces are provided for sellers to input raw advertising information and information to select electronic media venues, and for media venues to input criteria for each electronic media venue. The criteria may include style, content, editorial, and design criteria. Information such as distribution factors, media venue layout, and price charged for publication may be used by the central controller. The system also includes programs to manage conflicting advertising information data input, to provide presentation file format conversion, an operator review interface program, an advertising presentation screening program, an operator owned content server, and internet capability.

404 Claims, 35 Drawing Sheets

U.S. PATENT DOCUMENTS

| | | | |
|---|---|---|---|
| 5,710,884 A | 1/1998 | Dedrick | |
| 5,710,887 A | 1/1998 | Chelliah et al. | |
| 5,721,827 A | 2/1998 | Logan et al. | |
| 5,724,520 A | 3/1998 | Goheen | |
| 5,724,521 A | 3/1998 | Dedrick | |
| 5,732,398 A | 3/1998 | Tagawa | |
| 5,740,549 A | 4/1998 | Reilly et al. | |
| 5,787,186 A | 7/1998 | Schroeder | |
| 5,794,207 A | 8/1998 | Walker et al. | |
| 5,797,126 A | 8/1998 | Helbling et al. | |
| 5,819,092 A | 10/1998 | Ferguson et al. | |
| 5,845,261 A * | 12/1998 | McAbian | 705/26 |
| 5,848,396 A | 12/1998 | Gerace | |
| 5,848,397 A | 12/1998 | Marsh et al. | |
| 5,855,088 A | 1/1999 | Lee | |
| 5,864,818 A | 1/1999 | Feldman | |
| 5,870,723 A | 2/1999 | Pare, Jr. et al. | |
| 5,878,139 A | 3/1999 | Rosen | |
| 5,878,141 A | 3/1999 | Daly et al. | |
| 5,884,277 A | 3/1999 | Khosla | |
| 5,893,076 A | 4/1999 | Hafner et al. | |
| 5,918,014 A | 6/1999 | Robinson | |
| 5,933,811 A * | 8/1999 | Angles et al. | 705/14.56 |
| 5,937,392 A | 8/1999 | Alberts | |
| 5,946,646 A | 8/1999 | Schena et al. | |
| 5,948,061 A | 9/1999 | Merriman et al. | |
| 5,953,705 A | 9/1999 | Oneda | |
| 5,974,451 A | 10/1999 | Simmons | |
| 5,991,735 A | 11/1999 | Gerace | |
| 5,999,912 A | 12/1999 | Wodarz et al. | |
| 6,014,638 A | 1/2000 | Burge et al. | |
| 6,014,698 A | 1/2000 | Griffiths | |
| 6,023,658 A * | 2/2000 | Jeffryes | 702/16 |
| 6,023,685 A | 2/2000 | Brett et al. | |
| 6,026,368 A * | 2/2000 | Brown et al. | 705/14.56 |
| 6,026,369 A | 2/2000 | Capek | |
| 6,026,371 A | 2/2000 | Beck et al. | |
| 6,038,545 A | 3/2000 | Mandeberg et al. | |
| 6,041,305 A | 3/2000 | Sakurai | |
| 6,044,353 A | 3/2000 | Pugliese, III | |
| 6,044,376 A | 3/2000 | Kurtzman, II | |
| 6,047,310 A | 4/2000 | Kamakura et al. | |
| 6,064,967 A | 5/2000 | Speicher | |
| 6,073,105 A | 6/2000 | Sutcliffe et al. | |
| 6,078,914 A | 6/2000 | Redfern | |
| 6,079,863 A | 6/2000 | Furukawa et al. | |
| 6,094,640 A | 7/2000 | Goheen | |
| 6,101,477 A | 8/2000 | Hohle et al. | |
| 6,112,192 A | 8/2000 | Capek | |
| 6,119,096 A | 9/2000 | Mann et al. | |
| 6,119,101 A * | 9/2000 | Peckover | 705/26 |
| 6,128,663 A | 10/2000 | Thomas | |
| 6,134,532 A | 10/2000 | Lazarus et al. | |
| 6,138,142 A | 10/2000 | Linsk | |
| 6,144,944 A | 11/2000 | Kurtzman et al. | |
| 6,161,137 A | 12/2000 | Ogdon et al. | |
| 6,167,382 A * | 12/2000 | Sparks et al. | 705/26 |
| 6,182,050 B1 | 1/2001 | Ballard | |
| 6,188,396 B1 | 2/2001 | Boezeman et al. | |
| 6,188,398 B1 | 2/2001 | Collins-Rector et al. | |
| 6,188,989 B1 | 2/2001 | Kennedy | |
| 6,191,780 B1 | 2/2001 | Martin et al. | |
| 6,205,432 B1 | 3/2001 | Gabbard et al. | |
| 6,216,112 B1 | 4/2001 | Fuller et al. | |
| 6,219,653 B1 | 4/2001 | O'Neill et al. | |
| 6,223,166 B1 | 4/2001 | Kay | |
| 6,233,565 B1 | 5/2001 | Lewis et al. | |
| 6,240,396 B1 | 5/2001 | Walker et al. | |
| 6,263,317 B1 * | 7/2001 | Sharp et al. | 705/26 |
| 6,269,316 B1 | 7/2001 | Hubbard et al. | |
| 6,269,348 B1 | 7/2001 | Pare, Jr. et al. | |
| 6,285,987 B1 | 9/2001 | Roth et al. | |
| 6,286,045 B1 | 9/2001 | Griffiths et al. | |
| 6,308,202 B1 | 10/2001 | Cohn et al. | |
| 6,324,519 B1 | 11/2001 | Eldering | |
| 6,343,273 B1 | 1/2002 | Nahan et al. | |
| 6,356,874 B1 | 3/2002 | Øhrn | |
| 6,360,215 B1 | 3/2002 | Judd et al. | |
| 6,366,682 B1 * | 4/2002 | Hoffman et al. | 382/115 |
| 6,377,932 B1 | 4/2002 | DeMarcken | |
| 6,385,592 B1 | 5/2002 | Angles et al. | |
| 6,397,246 B1 | 5/2002 | Wolfe | |
| 6,401,075 B1 | 6/2002 | Mason et al. | |
| 6,408,278 B1 | 6/2002 | Carney et al. | |
| 6,408,282 B1 | 6/2002 | Buist | |
| 6,411,897 B1 | 6/2002 | Gaspard, II | |
| 6,415,270 B1 | 7/2002 | Rackson et al. | |
| 6,430,603 B2 | 8/2002 | Hunter | |
| 6,430,605 B2 | 8/2002 | Hunter | |
| 6,442,577 B1 | 8/2002 | Britton et al. | |
| 6,446,045 B1 * | 9/2002 | Stone et al. | 705/26 |
| 6,449,657 B2 | 9/2002 | Stanbach, Jr. et al. | |
| 6,460,036 B1 | 10/2002 | Herz | |
| 6,466,975 B1 | 10/2002 | Sterling | |
| 6,477,503 B1 | 11/2002 | Mankes | |
| 6,487,538 B1 | 11/2002 | Gupta et al. | |
| 6,526,575 B1 | 2/2003 | McCoy et al. | |
| 6,553,178 B2 | 4/2003 | Abecassis | |
| 6,560,578 B2 | 5/2003 | Eldering | |
| 6,567,824 B2 | 5/2003 | Fox | |
| 6,567,854 B1 | 5/2003 | Olshansky et al. | |
| 6,604,087 B1 | 8/2003 | Kolls | |
| 6,633,850 B1 | 10/2003 | Gabbard et al. | |
| 6,654,725 B1 | 11/2003 | Langheinrich et al. | |
| 6,718,551 B1 | 4/2004 | Swix et al. | |
| 6,738,750 B2 | 5/2004 | Stone et al. | |
| 6,785,661 B1 * | 8/2004 | Mandler et al. | 705/39 |
| 6,810,356 B1 | 10/2004 | Garcia-Franco et al. | |
| 6,810,527 B1 | 10/2004 | Conrad et al. | |
| 6,829,587 B2 | 12/2004 | Stone et al. | |
| 6,873,969 B2 | 3/2005 | Stone et al. | |
| 6,889,382 B1 | 5/2005 | Anderson | |
| 6,892,226 B1 | 5/2005 | Tso et al. | |
| 6,907,566 B1 | 6/2005 | McElfresh et al. | |
| 6,931,591 B1 | 8/2005 | Brown et al. | |
| 6,985,882 B1 * | 1/2006 | Del Sesto | 705/37 |
| 7,027,178 B2 | 4/2006 | Satomi et al. | |
| 7,038,637 B1 | 5/2006 | Eller et al. | |
| 7,039,599 B2 | 5/2006 | Merriman et al. | |
| 7,136,875 B2 | 11/2006 | Anderson et al. | |
| 7,184,971 B1 | 2/2007 | Ferber | |
| 7,240,025 B2 | 7/2007 | Stone et al. | |
| 7,249,059 B2 | 7/2007 | Dean et al. | |
| 7,346,606 B2 | 3/2008 | Bharat | |
| 7,428,555 B2 | 9/2008 | Yan | |
| 7,668,832 B2 | 2/2010 | Yeh et al. | |
| 7,680,796 B2 | 3/2010 | Yeh et al. | |
| 7,716,161 B2 | 5/2010 | Dean et al. | |
| 7,734,624 B2 | 6/2010 | Anderson et al. | |
| 7,865,399 B2 | 1/2011 | Crespo et al. | |
| 7,870,605 B2 | 1/2011 | Hagan et al. | |
| 7,903,099 B2 | 3/2011 | Baluja | |
| 7,937,405 B2 | 5/2011 | Anderson et al. | |
| 2001/0011226 A1 | 8/2001 | Greer et al. | |
| 2001/0018660 A1 | 8/2001 | Sehr | |
| 2001/0042002 A1 | 11/2001 | Koopersmith | |
| 2004/0019523 A1 | 1/2004 | Barry et al. | |
| 2004/0167928 A1 | 8/2004 | Anderson et al. | |
| 2005/0055271 A1 | 3/2005 | Axe et al. | |
| 2005/0114198 A1 | 5/2005 | Koningstein et al. | |
| 2005/0131762 A1 | 6/2005 | Bharat et al. | |
| 2005/0165615 A1 | 7/2005 | Minar | |
| 2005/0216335 A1 | 9/2005 | Fikes et al. | |
| 2005/0267799 A1 | 12/2005 | Chan et al. | |
| 2006/0149623 A1 | 7/2006 | Badros et al. | |
| 2006/0224444 A1 | 10/2006 | Koningstein et al. | |
| 2006/0224447 A1 | 10/2006 | Koningstein | |
| 2006/0242013 A1 | 10/2006 | Agarwal et al. | |
| 2007/0016486 A1 | 1/2007 | Stone et al. | |
| 2007/0061196 A1 | 3/2007 | Axe et al. | |

FOREIGN PATENT DOCUMENTS

| | | |
|---|---|---|
| WO | WO9721183 A1 | 6/1997 |
| WO | WO9957660 A1 | 11/1999 |
| WO | WO9962013 A1 | 12/1999 |
| WO | WO0038074 A1 | 6/2000 |
| WO | 01/37119 A2 | 5/2001 |

| | | | |
|---|---|---|---|
| WO | WO/01/37119 | * | 5/2001 |
| WO | WO0144992 A1 | | 6/2001 |
| WO | 01/16801 A1 | | 8/2001 |

OTHER PUBLICATIONS

AdForce, Inc, User Guide: A Complete Guide to AdForce, vesion 2.6, 1998.*
Hamblen, M., "Shell Protects Brand Via Net," Computerword, vol. 34, No. 2, Jan. 10, 2000, 2 pgs.
Rigopulos, K., "In Search of the Electronic Dummy," The Magazine for Magazine Management, vol. 19, No. 11, Nov. 1, 1990, 1 pgs.
Roberts, K., Declaration Document, Feb. 10, 2006, 8 pgs.
Solimeno, B., "Belo and CText Team to Create Sweeping Ad System," Seybold Report on Internet Publishing, Jan. 2000, 2 pgs.
Williamson, D., "Groups Set to Unveil Web Ad Guidelines," Advertising Age, vol. 67, Issue 50, Dec. 9, 1996, 2 pgs.
"ABC Formally Launches Reader Profile Service as NAA Unveils the NICC's Silhouette," Newsinc, vol. 11, No. 1. Aug. 2, 1999.
"Nationwide Newspapers," Retrieved Mar. 27, 2003 from www.nationwideadvertising.com.
Newsbytes News Network, "More on Web-Enabled Manugistics Supply Chain Software," Jan. 15, 1997.
Office Action dated Nov. 8, 2001, 8 pgs, U.S. Appl. No. 09/480,303, filed Jan. 10, 2000.
Notice of Allowance dated Apr. 16, 2002, 8 pgs, U.S. Appl. No. 09/480,303, filed Jan. 10, 2000.
Notice of Inter Partes Reexamination dated Aug. 18, 2008, 1 pg, U.S. Appl. No. 09/480,303, filed Jan. 10, 2000.
Office Action dated Dec. 11, 2002, 7 pgs., U.S. Appl. No. 10/165,078, filed Jun. 7, 2002.
Office Action dated May 16, 2003, 7 pgs., U.S. Appl. No. 10/165,078, filed Jun. 7, 2002.
Office Action dated Aug. 26, 2003, 7 pgs., U.S. Appl. No. 10/165,078, filed Jun. 7, 2002.
Office Action dated Feb. 12, 2004, 6 pgs., U.S. Appl. No. 10/165,078, filed Jun. 7, 2002.
Advisory Action dated May 14, 2004, 3 pgs., U.S. Appl. No. 10/165,078, filed Jun. 7, 2002.
Notice of Allowance dated Nov. 10, 2004, 3 pgs., U.S. Appl. No. 10/165,078, filed Jun. 7, 2002.
Notice of Allowance dated Jul. 19, 2004, 10 pgs, U.S. Appl. No. 10/165,091, filed Jun. 7, 2002.
Office Action dated May 29, 2003, 6 pgs., U.S. Appl. No. 10/165,091, filed Jun. 7, 2002.
Office Action dated Oct. 6, 2005, 10 pgs., U.S. Appl. No. 10/193,465, filed Jul. 11, 2002.
Office Action dated Jul. 3, 2006, 8 pgs., U.S. Appl. No. 10/193,465, filed Jul. 11, 2002.
Office Action dated Dec. 27, 2006, 2 pgs., U.S. Appl. No. 10/193,465, filed Jul. 11, 2002.
Notice of Allowance dated Apr. 13, 2007, 3 pgs., U.S. Appl. No. 10/193,465, filed Jul. 11, 2002.
Office Action dated Jan. 11, 2005, 5 pgs., U.S. Appl. No. 10/954,820, filed Sep. 30, 2004.
Office Action dated Apr. 25, 2005, 2 pgs., U.S. Appl. No. 10/954,820, filed Sep. 30, 2004.
Office Action dated Aug. 12, 2005, 12 pgs., U.S. Appl. No. 10/954,820, filed Sep. 30, 2004.
Notice of Allowance dated Dec. 13, 2006, 3 pgs., U.S. Appl. No. 10/954,820, filed Sep. 30, 2004.
Supplemental Notice of Allowance dated May 4, 2007, 3 pgs., U.S. Appl. No. 10/954,820, filed Sep. 30, 2004.
Office Action dated Mar. 21, 2008, 8 pgs., U.S. Appl. No. 11/451,224, filed Jun. 12, 2006.
Notice of Abandonment dated May 14, 2008, 2 pgs., U.S. Appl. No. 11/451,224, filed Jun. 12, 2006.
Office Action dated Jan. 29, 2009, 8 pgs., U.S. Appl. No. 11/803,659, filed May 15, 2007.
Office Action dated Mar. 11, 2009, 8 pgs., U.S. Appl. No. 11/803,659, filed May 15, 2007.
Notice of Abandonment dated Oct. 8, 2009, 8 pgs., U.S. Appl. No. 11/803,659, filed May 15, 2007.
Office Action dated Dec. 29, 2010, 6 pgs., U.S. Appl. No. 11/803,659, filed May 15, 2007.
Office Action dated Mar. 22, 2010, 7 pgs., U.S. Appl. No. 11/821,672, filed Jun. 15, 2007.
Office Action dated Nov. 17, 2010, 8 pgs., U.S. Appl. No. 11/821,672, filed Jun. 15, 2007.
"ABC Reader Profile Service Makes Notable Progress," Audit Bureau of Circulations, Apr. 3, 2002, 2 pgs.
Notice of Allowance dated Apr. 10, 2002, 8 pgs, U.S. Appl. No. 09/480,303, filed Jan. 10, 2000.
Office Action dated Aug. 1, 2011, 16 pgs., U.S. Appl. No. 11/821,672, filed Jun. 25, 2007.
Business Wire, "Media Metrix Names Moviefone.com One of the Top 15 Fastest Growing Sites on the Web," Business Editors/Multimedia &Entertainment Writers, Dec. 23, 1999, 3 pages.
Soriano, C., "Get Jump on Menace Tickets," USA Today, Apr. 30, 1999, 3 pages.
Business Wire, "MovieFone, Inc. Announces Circuit-Wide Licensing Agreement With united Artists Theatre Circuit," The Dialog Corp., Oct. 13, 1998, 2 pages.
Business Wire, "City Cinemas and MovieFone Launch www.citycinemas.com," The Dialog Corp., Jul. 1, 1998, 2 pages.
Business Wire, "General Cinema, MovieFone Pact for Teleticketing," The Dialog Corp., May 4, 1998, 2 pages.
Google, Inc., Web page re Google Adsense—Help (Miller 22), Mar. 3, 2009, PX0062.PDF, 1 page.
Google, Inc., Google, Inc., Accounting Policy Overview of Revenue . . . , Feb. 13, 2009, PX0127.PDF, 4 pages.
Johnny Chen, E-mail from J.Chen to J. Koplin RE Discussion re AMR encoding . . . , Aug. 6, 2008, PX0313.PDF, 3 pages.
Google, Inc., Licensing Agreement the Board of Trustiees of the Leland Stanford . . . , Mar. 3, 1999, PX0318.PDF, 13 pages.
Google, Inc., Google Web Page re AdWords Help—Can I run ads on my website?Feb. 5, 2009, PX1296.PDF, 2 pages.
Tunguz-Zawislak et al, Tunpuz U.S. Appl. No. 11/939,786, Reply to Action of Apr. 16, 2009, Nov. 14, 2007, PX1632.PDF, 83 pages.
Jonathan Rosenberg, Email from J. Rosenberg re AdSense Business Review, Nov. 18, 2003, PX1696.pdf,36 pages.
Civil Docket No. 2:07-CV-279,*Function Media LLC* vs *Google, Inc.*—Transcript of Jury Trial—(Verdict), Jan. 26, 2010, 12610_Verdict.pdf, 8 pages.
Jeremy Brandon, Function Media LLC's Opeinging Brief Regarding Claim Construction, Jan. 30, 2009, 73-Claim_Construction_Brief.pdf, 61 pages.
Max L. Tribble, RJ., Claim Construction Brief filed by Function Media LLC, Apr. 9, 2009, DOCKET682A.PDF, 632 pages.
Jeremy Brandon, Function Media, L.L.C.'s Opening Brief Regarding Claim Construction . . . , Jan. 30, 2009, DOCKET098.pdf, 61 pages.
Max L. Tribble, Jr et al, Stipulation of Dismissal, May 18, 2009, DOCKET152.PDF, 7 pages.
Jason W. Wolff, Google Inc's Markman Brief Enclosure, May 19, 2009, DOCKET103.PDF, 4 pages.
Max L. Tribble, Jr, Plaintiffs Reply to Defendant Google Inc.'s Markman Brief, Jun. 11, 2009, DOCKET110.PDF, 32 pages.
Charles K. Verhoeven, Notice of Supplemental Authority for Google's Markman Brief, Aug. 10, 2009, DOCKET143.PDF, 31 pages.
Joseph S. Grinstein, Notice of Supplemental Authority for Function media's Markman Briefs, Aug. 17, 2009, DOCKET148.PDF, 20 pages.
*Function Media LLC* vs *Google, Inc*—Markman Hearing Minutes, Aug. 25, 2009, DOCKET159.PDF, 8 pages.
Charles Everingham IV, *Function Media LLC* vs *Google, Inc & Yahoo!, Inc.*—Memorandum Opinion and Order, Oct. 9, 2009, DOCKET218.PDF, 25 pages.
Notice of Filing of Official Transcript of Pre-Trial Hearing held on Dec. 4, 2009, DOCKET319.PDF, 30 pages.
Charles Everingham IV, *Function Media LLC* vs *Google, Inc.*—Order, Dec. 16, 2009, DOCKET324.PDF, 6 pages.
Charles Everingham IV, *Function Media LLC* vs *Google, Inc.*—Order, Dec. 16, 2009, DOCKET325.PDF, 11 pages.
Charles Everingham IV, *Function Media LLC* vs *Google, Inc.*—Order, Dec. 16, 2009, DOCKET326.PDF, 4 pages.

Civil Docket No. 2:07-CV-279-CE *Function Media LLC* vs *Google, Inc.*—Motions Hearing (Jan. 12, 2010, 1:30 p. m.), Jan. 14, 2010, DOCKET376.pdf, 68 pages.
Civil Docket No. 2:07-CV-279-CE, *Function Media LLC* vs *Google, Inc.*—Verdict Form, Jan. 26, 2010, DOCKET413.pdf, 8 pages.
Civil Docket 2:07-CV-279 (CE), *Function Media LLC* vs *Google Inc.*—Motion Hearing Minutes (Aug. 19, 2010), DOCKET481.pdf, 6 pages.
Thomas B. Walsh, et al, Joint Claim Construction and Prehearing Statement, Jan. 30, 2009, DOCKET073.PDF, 35 pages.
Additional Attachments to Document #98, May 15, 2009, Docket_100.pdf, 1 page.
U.S. Patent and Trademark Office—Issue Notification—# 7249059, Jul. 24, 2007, Docket_100-1.pdf, 564 pages.
Sparks, et el, U.S. Patent # 6167382, Dec. 26, 2000, Docket_100-2.pdf, 57 pages.
Peckover, Douglas L, - U.S. Patent # 6119101, Sep. 12, 2000, Docket_100-3.pdf, 75 pages.
U.S. Patent and Trademark Office—Notice of Inter Partes Reexamination # 6446045, May 15, 2009, Docket_100-4.pdf, 342 pages.
Mandeberg, et al, U.S. Patent # 6038545, Mar. 14, 2000, Docket_100-5.pdf, 24 pages.
Additional Attachments to Document #98, May 15, 2009, Docket_101.pdf, 1 page.
Stone, et al, Prosecution History of U.S. Patent #7240025, Jul. 3, 2007, Docket_101-1.pdf, 444 pages.
Rosser, et al, U.S. Patent #5543856, Aug. 6, 1996, Docket_101-2.pdf, 10 pages.
Sustitution of FM's Proposed constructions into Claim 47, May 15, 2009, Docket_101-3.pdf, 1 page.
Aaddzz, Aaddzz Brochure, May 15, 2009, Docket_101-4.pdf, 6 pages.
Aaddzz, Aaddzz Website, May 15, 2009, Docket_101-5.pdf, 42 pages.
Adforce, AdForce User Guide, May 15, 2009, Docket_101-6.pdf, 285 pages.
Del Sesto, U.S. Patent # 6985882, Jan. 10, 2006, Docket_101-7.pdf, 50 pages.
Brown, et al, U.S. Patent #6026368, Feb. 15, 2000, Docket_101-8.pdf, 27 pages.
Juanita R Brooks, Google Inc's Markman Brief, May 15, 2009, Docket_98.pdf, 52 pages.
Attachments to Document #98, May 15, 2009, Docket_98-1.pdf, 1 page.
Summary of Claim Construction Disputes, May 15, 2009, Docket_98-2.pdf, 13 pages.
Jason W. Wolff, Declaration of Jason W. Wolff, May 15, 2009, Docket_98-3.pdf, 4 pages.
Michael F. Heim, Re-examination Control No. 95/001,061—Response to 1st Office Action, Dec. 23, 2008, Docket_98-4.pdf, 88 pages.
Michael F. Heim, Re-examination Control No. 95/001,069—Response to 1st Office Action, Jan. 21, 2009, Docket_987-6.pdf, 97 pages.
Deposition Transcript of Michael Dean, Apr. 16, 2009, Docket_98-7.pdf, 8 pages.
Additional Attachments to Document #98, May 15, 2009, Docket_99.pdf, 1 page.
Deposition Transcript of Lucinda Stone, Apr. 17, 2009, Docket_99-1.pdf, 11 pages.
Roy M Jenevein, Declaration of Roy M. Jenevein, May 15, 2009, Docket_99-2.pdf, 56 pages.
Prosecution History of U.S. Patent # 6829587, Aug. 3, 2006, Docket_99-3.pdf, 400 pages.
U.S. Appl. No. 10/165,091, Jan. 20, 2000, Docket_99-4.pdf, 276 pages.
Mason, et al, U.S. Patent # 6401075, Jun. 4, 2002, Docket_99-5.pdf, 7 pages.
Charles Eric Hunter, U.S. Patent # 6430603, Aug. 6, 2002, Docket_99-6.pdf, 11 pages.
Reexam Appendix A & B—U.S. Patent # 7240025, Jul. 30, 2008, Reexam_Appendix_A_and_B.pdf, 349 pages.
Reexam Appendix C & D Adforce User Guide, Jul. 30, 2008, Reexam_Appendix_C_and_D.pdf, 337 pages.
Reexam Appendix E-1 and E-2 and E-3—Campaign Manager, Jul. 30, 2008, Reexam_Appendix_E1_and_E2_and_E3.pdf, 53 pages.
Reexam Appendix F and G—aaddzz, Jul. 30, 2008, Reexam_Appendix_F_and_G.pdf, 104 pages.
Reexam Appendix H and I—AdManager Pro Administrator's Manual, Jul. 30, 2008, Reexam_Appendix_H_and_I.pdf, 255 pages.
Zeff / Aronson, Reexam Appendix J11—Advertising on the Internet 1998—to Chapter 6, Jul. 30, 2008, Reexam_Appendix_J11.pdf, 150 pages.
Zeff / Aronson, Reexam Appendix J12—Advertising on the Internet 1998—Chapter 7—End, Jul. 30, 2008, Reexam_Appendix_J12.pdf, 151 pages.
Zeff / Aronson, Reexam Appendix J21—Advertising on the Internet 1999—to Chapter 4, Jul. 30, 2008, Reexam_Appendix_J21.pdf, 130 pages.
Zeff / Aronson, Reexam Appendix J22—Advertising on the Internet 1999—Chapter 4-10, Jul. 30, 2008, Reexam_Appendix_J22.pdf, 130 pages.
Zeff / Aronson, Reexam Appendix J23—Advertising on the Internet 1999—Chapter 10—End, Jul. 30, 2008, Reexam_Appendix_J23.pdf, 180 pages.
Reexam Appendix Other A1—U.S. Patent # 7240025, Jul. 30, 2008, Reexam_Appendix_OtherA1.pdf, 115 pages.
Reexam Appendix Other A2—U.S. Patent # 7240025, Jul. 30, 2008, Reexam_Appendix_OtherA2.pdf, 86 pages.
Reexam Appendix Other A3—U.S. Patent # 7240025, Jul. 30, 2008, Reexam_Appendix_OtherA3.pdf, 122 pages.
Reexam Appendix Other A4—U.S. Patent # 7240025, Jul. 30, 2008, Reexam_Appendix_OtherA4.pdf, 106 pages.
Reexam Appendix Other A5—U.S. Patent # 7240025, Jul. 30, 2008, Reexam_Appendix_OtherA5.pdf, 78 pages.
Reexam Appendix Other A6—U.S. Patent # 7240025, Jul. 30, 2008, Reexam_Appendix_OtherA6.pdf, 35 pages.
John C. Phillips, Request for Reexam—U.S. Patent # 7240025, Jul. 30, 2008, Request_For_Reexam_025.pdf, 1612 pages.
John C. Phillips Requestor's Comments Subsequent to Patent Owner's Response—U.S. Patent # 7240025, Jul. 30, 2008, Control_No_95001073_025_Reexam.pdf, 853 pages.
John C. Phillips Request for Inter Partes Reexamination—U.S. Patent # 6446045, Jul. 7, 2008, 045_Re-Exam_Request.pdf, 488 pages.
Reexam Appendix A—U.S. Patent # 6446045, Sep. 3, 2002, App_A-6446045.pdf, 68 pages.
Reexam Appendix B—File History—U.S. Patent #6446045, Jul. 7, 2008, App_B-045_File_History.pdf, 47 pages.
Adforce, Inc., Reexam Appendix C—U.S. Patent # 6446045—AdForce User Guide, Jul. 7, 2008, App_C-AdForce.pdf, 285 pages.
Del Sesto, Reexam Appendix D—U.S. Patent # 6446045—Del Sesto, Jul. 7, 2008, App_D-Del Sesto.pdf, 50 pages.
Adknowledge, Reexam Appendix E1—U.S. Patent # 6446045—Campaign Manager Reviewer Guide Jul. 7, 2008, App_E1-CM-Reviewer_Guide.pdf, 23 pages.
Adknowledge Reexam Appendix E2—U.S. Patent # 6446045—Campaign Manager Reviewer Guide (cont), Jul. 7, 2008, App_E2-MP_Reviewer_Guide.pdf, 26 pages.
Andrew Schulz, Reexam Appendix E3—U.S. Patent # 6446045—Schulz Declaration, Jul. 7, 2008, App_E3-Schulz_Dedaration.pdf, 1 page.
Aaddzz, Reexam Appendix F1—U.S. Patent # 6446045—Aaddzz Brochure, Jul. 7, 2008, App_F1-Aaddzz_Brochure.pdf, 6 pages.
Aaddzz Reexam Appendix F2—U.S. Patent # 6446045—Aaddzz Website, Jul. 7, 2008, App_F2-Aaddzz_website.pdf, 42 pages.
Ad-Star Reexam Appendix G—U.S. Patent # 6446045—About Ad-Star, Jul. 7, 2008, App_G-AdStar.pdf, 43 pages.
Zeff / Aronson, Reexam Appendix H1—U.S. Patent # 6446045—Advertising on the Internet 1997, Jul. 7, 2008, App_H1-Zeff97.pdf, 305 pages.

Zeff / Aronson, Reexam Appendix H2—U.S. Patent # 6446045—Advertising on the Internet 1999, Jul. 7, 2008, App_H2-Zeff99.pdf, 444 pages.
Reexam Appendix Other A—U.S. Patent # 6446045—Patent Owner Infringement Contentions Jul. 7, 2008, OTHER_A-Patent_Owner_Infringement_Contentions.pdf, 77 pages.
Michael F. Heim, Reexam—U.S. Patent #6446045—Response, Jul. 7, 2008, Re-Exam_Response.pdf, 88 pages.
Michael F. Heim, Reexam—U.S. Patent #6446045, Feb. 13, 2009, Control_No_95001061_045_Reexam.pdf, 1166 pages.
Reexam Appendix A—U.S. Patent # 7249059, Jul. 21, 2008, Reexam Appendix A-U.S. Patent #6446045, 103 pages.
Reexam Appendix B—U.S. Patent # 7249059—File History, Jul. 21, 2008, AppendixB.pdf, 108 pages.
Reexam Appendix C—U.S. Patent # 7249059—Mason, Jun. 4, 2002, 2008-07-21_AppendixC.pdf, 7 pages.
Adforce, Inc, Reexam Appendix D—U.S. Patent # 7249059—AdForce User Guide, Jul. 21, 2008, AppendixD.pdf, 285 pages.
Aaddzz, Reexam Appendix E—U.S. Patent # 7249059—aaddzz Brochure, Jul. 21, 2008, AppendixE.pdf, 6 pages.
Reexam Appendix F—U.S. Patent # 7249059—Brown, Feb. 15, 2000, 2008-07-21-AppendixF.pdf, 27 pages.
Global Network, Inc, Reexam Appendix G—U.S. Patent # 7249059—Global Network Press Release, Oct. 4, 1999, 2008-07-23_AppendixG.pdf, 2 pages.
Admanager, Reexam Appendix H—U.S. Patent # 7249059—AdManager Pro Administrator's Manual, Jul. 21, 2008, AppendixH.pdf, 226 pages.
Zeff / Aronson, Reexam Appendix I11—U.S. Patent # 7249059—Advertising on the Internet 1999—to Chapter 4, Jul. 21, 2008, AppendixI11.pdf, 130 pages.
Zeff / Aronson, Reexam Appendix I12—U.S. Patent # 7249059—Advertising on the Internet 1999—Chapter 4-10, Jul. 21, 2008, AppendixI12.pdf, 130 pages.
Zeff / Aronson, Reexam Appendix I12—U.S. Patent # 7249059—AdvertiSing on the Internet 1999—Chapter 10—end, Jul. 21, 2008, AppendixI13.pdf, 180 pages.
Reexam Appendix Other A—U.S. Patent # 7249059, Jul. 21, 2008, AppendixOtherA1.pdf, 85 pages.
Reexam Appendix Other A2—U.S. Patent # 7249059, Jul. 21, 2008, AppendixOtherA2.pdf, 51 pages.
John C. Phillips, Request for Reexam—U.S. Patent # 7249059, Jul. 21, 2008, RequestForReexam.pdf, 715 pages.
Michael F. Heim, Reexam Response—U.S. Patent # 7249059, Jul. 21, 2008, 2009-01-21_059_Re-Exam_Response.pdf, 97 pages.
John C. Phillips, Reexam Response—U.S. Patent # 7249059—Requestor Comments, Feb. 19, 2009, 2009-02-20_059_Requestor_Comments.pdf, 45 pages.
Reexam Response—U.S. Patent # 7249059—File History, Feb. 13, 2009, Control_No_95001069_059_Reexam.pdf, 1350 pages.
John C. Phillips, Request for Inter Partes Reexamination, Jul. 30, 2008, 1612 pages 20080730 '025 Request for Reexam.pdf.
USPTO, Inter Partes Reexamination Communication, Oct. 24, 2008, 27 pages 20081024 Reexam Ordered.pdf.
USPTO, Nov. 21, 2008 Reexam—Non-final Action, 512 pages, 20081121 Office Action for '025.pdf.
Michael F. Heim, Fee Transmittal Form / Information Plaintiff's Preliminary Claim Construction / Defendant's Preliminary Claim Construction / Joint Claim Construction, Feb. 13, 2009 106 Pages, 20090213 '025 IDS.pdf.
Jeremy J. Brandon, Joint Claim Construction and Pre hearing Statement, Jan. 30, 2009, 4 pages, 20090213 IDS PACER 73 Jt Claim Construction & Prehearing Statement (LR 4-3).pdf.
Exhibit A Parties' Agreed Constructions, Jan. 30, 2009, 3 pages, 20090213 IDS PACER 73 Jt Claim Construction & Prehearing Statement (LR 4-3)-Ex 1.pdf.
Exhibit B, Jan. 30, 2009, 26 pages, 20090213 IDS PACER 73 Jt Claim Construction & Prehearing Statement (LR 4-3)-Ex 2.pdf.
Michael F. Heim, 025 Office Action Response, Feb. 23, 2009, 99 pages, 20090223 '025 Office Action Response.pdf.
Requester's Comments Subsequent to Patent Owner's Repsonse, Feb. 23, 2009, 5 pages, 20090223 Exhibit 1—OAR.pdf.
Exhibit 2, Feb. 23, 2009, 1 page, 20090223 Exhibit 2—Oar.pdf.

John C. Phillips, Requestor's Comments Subsequent to Patent Owner's Response, Mar. 25, 2009, 48 pages, 20090325 Requestor's Comments on PO Response.pdf.
Carrie J Anderson, Certificate of Service, Aug. 14, 2009, 1 page, 20090814 IDS Certificate of Service.pdf.
Jeremy J. Brandon, Plaintiff's Reply to Defendant Google Inc.'s Markman Brief, Jun. 11, 2009, 32 pages, 20090814 IDS PACER 110 FM's Reply to Google's Markman Brief.pdf.
Jeremy J. Brandon, Plaintiff's Opening Claim Construction Brief, Apr. 9, 2009, 50 pages, 20090814 IDS PACER 82 FM's Opening Claim Construction Brief.pdf.
Juanita R. Brooks, Google Inc's Markman Brief, May 15, 2009, 52 Pages, 20090814 IDS PACER 98 Google's Markman Brief.pdf.
Function Media Presentation, Aug. 25, 2009, 151 pages, 20090917 Supplemental IDS Function Media CCH presentation4 5.pdf.
Claim Construction Presentation of Defendant Google Inc., Aug. 25, 2009, 95 pages, 20090917 Supplemental IDS Google's CCH presentation.pdf.
Roy M Jenevein, Ph.D., Declaration of Roy M. Jenevein, Ph.D. Regarding Claim Construction, Feb. 27, 2009, 21 pages, 20090917 Supplemental IDS Jenevein Dec.pdf.
Roy M Jenevein, Ph.D, Exhibit A, Feb. 27, 2009, 11 pages, 20090917 Supplemental IDS Jenevein Exhibit A—CV.pdf.
Exhibit B Parties' Proposed Constructions and Support, Feb. 27, 2009, 24 pages, 20090917 Supplemental IDS Jenevein Exhibit B—CC.pdf.
Gene Kincaid, Expert Report of Gene Kincaid Regarding Claim Construction, Feb. 27, 2009, 75 pages, 20090917 Supplemental IDS Kincaid Expert Report (Yahoo).pdf.
Gene Kincaid, Exhibit A, Feb. 27, 2009, 3 pages, 20090917 Supplemental IDS Kincaid Expert Report (Yahoo)-Ex A.pdf.
Exhibit B, Feb. 27, 2009, 2 pages, 20090917 Supplemental IDS Kincaid Expert Report (Yahoo)-Ex B.pdf.
V. Thomas Rhyne, Ph.D., Declaration of V. Thomas Rhyne in Support of Function Media's Claim Construction, Feb. 27, 2009, 49 pages, 20090917 Supplemental IDS Rhyne Dec ISO FM's Claim Construction.pdf.
Michael F. Heim, Supplemental Information Disclosure Statement, Sep. 17, 2009, 4 pages, 20090917 Supplemental IDS.pdf.
USPTO, Transmittal of Communication to Third Party Requester Inter Partes Reexamination, Feb. 17, 2010, 533 pages, 20100224 Office Action-Action Closing Prosecution.pdf.
Michael F. Heim, Comments, Apr. 26, 2010, 84 pages, 20100426 Comments to ACP.pdf.
USPTO, Decision Granting Petition for Extension of Time, Mar. 15, 2010, 4 pages, 20100426 Comments to ACP-Ex A GrantPetofExtTimeandClarification.pdf.
Charles Everingham IV, Memorandum Opinion and Order, Oct. 9, 2009, 23 pages, 20100426 Comments to ACP-Ex B-ClaimConstructionOrder.pdf.
Verdict Form, Jan. 26, 2010, 8 pages, 20100426 Comments to ACP-Ex C-FMvGoogleVerdictForm.pdf.
Exhibit D, Apr. 26, 2010, 1 page, 20100426 Comments to ACP-Ex D-BrownChart.pdf.
V. Thomas Rhyne, Ph.D., Declaration of V. Thomas Rhyne in Support of Function Media's Claim Construction, Feb. 27, 2009, 49 pages, 20100426 Comments to ACP-Ex E-Rhyne Dec 2-27-09.pdf.
Amber L. Branum, Certificate of Service, Apr. 26, 2010, 1 page, 20100426 COSCommentsACP.pdf.
John C. Phillips, Requester's Responsive Comments Under 37 C.F.R., May 26, 2010, 49 pages, 20100526 Requester's Responsive Comments.pdf.
USPTO, Transmittal of Communication to Third Party Requester Inter Partes Reexamination, Aug. 20, 2010, 543 pages, 20100820 RAN 95001073 for '025.pdf.
Michael F. Heim, Notice of Appeal, Sep. 20, 2010, 1 page, 20100920 Notice of Appeal 025.pdf.
Amber L. Branum, Certificate of Service, Sep. 20, 2010, 1 page, 20100920 Notice of Appeal COS 025.pdf.
Michael F. Heim, Patent Owner's Appeal Brief U.S. Patent No. 7,240,025, Nov. 19, 2010, 63 pages, 20101119AppealBrief025.pdf.
Amber L. Branum, Certificate of Service, Nov. 19, 2010, 1 page, 20101119COSAppealBrief025.pdf.

Michael F. Heim, Electronic Acknowledgement Receipt, Nov. 19, 2010, 2 pages, efilingAck8881146.pdf.
Appendix A and B (file wrapper), Sep. 30, 2004, 349 pages, AppendixAandB.pdf.
Appendix C and D—(User Guide c.1998) and (Patent dated Jan. 10, 2006), 337 pages, AppendixCandD.pdf.
Andrew Schulz, Appendix E-1, E-2, and E-3, Jul. 3, 2008, 53 pages, AppendixE1andE2andE3.pdf.
Aaddzz / Nagvi, Appendix F and G—(aaddzz brochure) and (foreign patent dated Dec. 6, 1996, Jun. 12, 1997, 104 pages, AppendixFandG.pdf.
Appendix H and I—(AdManager Manual) and (Patent dated Feb. 15, 2000), 255 pages, AppendixHandI.pdf.
Civil Docket No. 2:07-CV-279, *Function Media LLC* vs *Google, Inc.*—Transcript of Jury Trial—(Jan. 19, 2010—Afternoon Session) Jan. 19, 2010, Afternoon_Session.pdf, 171 pages.
Civil Docket No. 2:07-CV-279, *Function Media LLC* vs *Google, Inc.*—Transcript of Jury Trial—(Jan. 19, 2010—Morning Session) Jan. 19, 2010, Morning_Session.pdf, 140 pages.
Civil Docket No. 2:07-CV-279, *Function Media LLC* vs *Google, Inc.*—Transcript of Jury Trial—(Jan. 20, 2010—Afternoon Session) Jan. 20, 2010, Afternoon_Session-PUBLIC_Use.pdf, 170 pages.
Civil Docket No. 2:07-CV-279, *Function Media LLC* vs *Google, Inc.*—Transcript of Jury Trial—(Jan. 20, 2010—Morning Session) Jan. 20, 2010, Morning_Session_PUBLIC_USE.pdf, 177 page.
Civil Docket No. 2:07-CV-279, *Function Media LLC* vs *Google, Inc.*—Transcript of Jury Trial—(Jan. 21, 2010—Afternoon Session) Jan. 21, 2010, Afternoon_Session_PUBLIC_USE.pdf, 186 pages.
Civil Docket No. 2:07-CV-279, *Function Media LLC* vs *Google, Inc.*—Transcript of Jury Trial—(Jan. 21, 2010—Morning Session) Jan. 21, 2010, Morning_Session_PUBLIC_USE.pdf, 175 pages.
Civil Docket No. 2:07-CV-279, *Function Media LLC* vs *Google, Inc.*—Transcript of Jury Trial—(Jan. 22, 2010—Afternoon Session) Jan. 22, 2010, Afternoon_Session.pdf, 112 pages.
Civil Docket No. 2:07-CV-279, *Function Media LLC* vs *Google, Inc.*—Transcript of Jury Trial—(Jan. 22, 2010—Morning Session) Jan. 22, 2010, Morning_Session_PUBLIC_USE.pdf, 161 pages.
Civil Docket No. 2:07-CV-279, *Function Media LLC* vs *Google, Inc.*—Transcript of Jury Trial—(Jan. 25, 2010—Afternoon Session) Jan. 25, 2010, Afternoon_Session_PUBLIC_USE.pdf, 220 pages.
Civil Docket No. 2:07-CV-279, *Function Media LLC* vs *Google, Inc.*—Transcript of Jury Trial—(Jan. 25, 2010—Morning Session) Jan. 25, 2010, Morning_Session.pdf, 166 pages.
Civil Docket No. 2:07-CV-279, *Function Media LLC* vs *Google, Inc.*—Transcript of Jury Trial—(Jan. 26, 2010—Morning Session) Jan. 26, 2010, Morning_Session_PUBLIC Use.pdf, 183 pages.
Not Authored, Function Media LLC, Complaint for Patent Infringement, Jul. 3, 2007, DOCKET001-1.PDF, 230 pages.
Not Authored, Dean/Google, Pleadings #1—Complaint for Patent Infringement, Jul. 3, 2007, Docket001.PDF, 1 page.
Not Authored, Report on the Filing or Determination of an Action Regarding a Patent or Trademark, Jul. 3, 2007, DOCKET002.PDF, 2 pages.
Franklin Jones, Jr, Notice of Appearance of Franklin Jones Jr. For Plaintiff Function Media LLC, Jul. 12, 2007, DOCKET003.PDF, 1 page.
Robert Christopher Bunt, Notice of Appearance of Robert Christopher Bunt for Plaintiff Function Media LLC, Jul. 12, 2007 DOCKET004.PDF, 1 page.
Charles Ainsworth, Notice of Appearance of Charles Ainsworth for Plaintiff Function Media LLC, Jul. 12, 2007 Docket005.PDF, 2 pages.
Elizabeth L. De Rieux, Notice of Appearance of Elizabeth L. DeRieux for Plaintiff Function Media LLC, Jul. 17, 2007 DOCKET008.PDF, 3 pages.
S. Calvin Capshaw, Notice of Appearance of S. Calvin Capshaw for Plaintiff Function Media LLC, Jul. 17, 2007, DOCKET009.PDF, 4 pages.
Andrew W Spangler, Notice of Appearance of Andrew W. Spangler for Plaintiff Function Media LLC, Jul. 17, 2007, Docket010.PDF, 5 pages.
Elizabeth L. De Rieux, Unopposed Motion for Extension of Time for Defendants Google Inc. and Yahoo!, Inc to Answer. . . , Jul. 20, 2007, DOCKET011.PDF, 7 pages.
Elizabeth L. De Rieux, *Function Media LLC* vs *Google, Inc & Yahoo!, Inc.*—First Amended Complaint for Patent Infringement, Jul. 24, 2007, DOCKET012-1.PDF, 9 pages.
Not Authored, *Function Media LLC* vs *Google, Inc & Yahoo!, Inc.*—Exhibit A—U.S. Patent 6446045, Jul. 24, 2007, DOCKET012-2.PDF, 69 pages.
Charles Everingham IV, Order on Unopposed Motion for Entry of Order Regarding Conduct of Expert Depositions, Dec. 29, 2009, Docket_342.pdf, 2 pages.
Charles Everingham IV, Order to expedite consideration (DKT. No. 334) of motion to preclude admission of untimely evidence, Dec. 30, 2009, Docket_343.pdf, 2 pages.
Not Authored, *Function Media LLC* vs *Google, Inc & Yahoo!, Inc.*—Exhibit B—U.S. Patent 7240025, Jul. 24, 2007, DOCKET012-3.PDF, 38 pages.
Not Authored, *Function Media LLC* vs *Google, Inc & Yahoo!, Inc.*—Exhibit B—U.S. Patent 7240025, Jul. 24, 2007, DOCKET012-4.PDF, 44 pages.
Not Authored, *Function Media LLC* vs *Google, Inc & Yahoo!, Inc.*—Exhibit B—U.S. Patent 6829587, Jul. 24, 2007, DOCKET012-5.PDF, 71 pages.
Not Authored, *Function Media LLC* vs *Google, Inc & Yahoo!, Inc.*—Exhibit B—U.S. Patent 7249059, Jul. 24, 2007, DOCKET012-6.PDF, 58 pages.
Not Authored, *Function Media LLC* vs *Google, Inc & Yahoo!, Inc.*—Exhibit B—U.S. Patent 7249059, Jul. 24, 2007, DOCKET012-7.PDF, 46 pages.
Not Authored, *Function Media LLC* vs *Google, Inc & Yahoo!, Inc.*—Exhibit B—U.S. Patent 7240025, Jul. 24, 2007, DOCKET012-8.PDF, 37 pages.
Not Authored, *Function Media LLC* vs *Google, Inc & Yahoo!, Inc.*—Exhibit B—U.S. Patent 7240025, Jul. 24, 2007, DOCKET012-9.PDF, 44 pages.
Not Authored Dean/Google, Pleadings #1—Amended Complaint with Exhibit Attachments, Jul. 24, 2007, DOCKET012.PDF, 1 page.
Not Authored, Report on the Filing or Determination of an Action Regarding a Patent or Trademark, Jul. 24, 2007, DOCKET013.PDF, 4 pages.
T. John Ward, Unopposed Motion for Extension of Time for Defendants Google Inc. and Yahoo!, Inc to Answer. . . , Jul. 28, 2007, DOCKET014.PDF, 2 pages.
T. John Ward, Unopposed Motion for Extension of Time for Defendants Google Inc. and Yahoo!, Inc to Answer. . . , Jul. 26, 2007, DOCKET014A.PDF, 4 pages.
Elizabeth L. De Rieux, Stipulation Extending Time for Defendants Google, Inc. and Yahoo!, Inc. To Respond, Jul. 26, 2007, DOCKET015.PDF, 5 pages.
Thomas B Walsh IV, Google's Answer, Defenses and Counterclaims in Response to Plaintiff's First Amended Complaint, Sep. 25, 2007, DOCKET018.PDF, 19 pages.
Thomas B Walsh IV, Google's Inc.'s Corporate Disclosure Statement Pursuant to Fed R. Civ. P.7.1, Sep. 25, 2007, DOCKET019.PDF, 9 pages.
David J Healey, Yahoo!, Inc.'s Motion to Dismiss and Strike Function Media's Willfulness Claims . . . , Sep. 24, 2007, DOCKET020.PDF, 36 pages.
David J Healey, Defendant Yahoo!'s Answer, Affirmation Defenses and Counterclaims to Function Media's First Amended Complaint, Sep. 24, 2007, DOCKET021.PDF, 18 pages.
David J Healey, Yahoo!, Inc.'s Corporate Disclosure Statement, Sep. 24, 2007, DOCKET022.PDF, 5 pages.
Douglas E. Lumish, Application to Appear Douglas E. Lumish for Defendant Yahoo!, Inc., Oct. 3, 2007, DOCKET023.PDF, 5 pages.
Michael Lane, Application to Appear of Michael Lane for Defendant Yahoo!, Inc., Oct. 2, 2007, DOCKET024.PDF, 5 pages.
Matthew Douglas, Powers Application to Appear of Matthew Douglas Power for Defendant Yahoo!, Inc., Oct. 2, 2007, DOCKET025.PDF, 5 pages.
Jeffrey G. Homrig, Application to Appear of Jeffrey G. Homrig for Defendant Yahoo!, Inc., Oct. 2, 2007, DOCKET026.PDF, 5 pages.

Juanita R BROOKS, Application to Appear of Juanita R. Brooks for Defendant Google, Inc., Oct. 1, 2007, DOCKET027.PDF, 6 pages.
Jason W Wolff, Application to Appear Pro Hac Vice of Jason W. Wolff for Defendant Google, Inc., Oct. 1, 2007, DOCKET028.PDF, 7 pages.
Jason W Wolff, Application to Appear Pro Hac Vice of Jason W. Wolff for Defendant Google, Inc., Sep. 9, 2007, Docket028A.PDF, 3 pages.
Jason W Wolff, Notice of Appearance of Jason W. Wolff for Defendant Google, Inc., Oct. 4, 2007, DOCKET029.PDF, 6 pages.
Juanita R Brooks, Notice of Appearance of Juanita R. Brooks for Defendant Google, Inc., Oct. 4, 2007, DOCKET030.PDF, 6 pages.
S. Calvin Capshaw, Function Media LLc's Unopposed Motion for Withdrawal of Counsel, Oct. 9, 2007, DOCKET031.PDF, 7 pages.
S. Calvin Capshaw, Plaintiff's Opposition to Yahoo's Motion to Dismiss and/or Strike Plaintiff's Claims for Willful Infringement, Oct. 10, 2007, DOCKET032.PDF, 113 pages.
T. John Ward, Order Granting Function Media, LLC's Unopposed Motion for Withdrawal of Counsel, Oct. 11, 2007, DOCKET033.PDF, 4 pages.
S. Calvin Capshaw, Plaintiff's Answer to Goggle's Counterclaims, Oct. 15, 2007, DOCKET034.PDF, 7 pages.
S. Calvin Capshaw, Plaintiff's Answer to Yahoo's Counterclaims for Declaratory Judgment, Oct. 15, 2007, DOCKET035.PDF, 10 pages.
Jeffrey G. Homrig, Yahoo!, Inc.'s Reply in Support of its Motion to Dismiss, Oct. 17, 2007, DOCKET036.PDF, 10 pages.
T. John Ward, *Function Media LLC* vs *Google, Inc & Yahoo!, Inc.*—Order, Dec. 11, 2007, DOCKET037.PDF, 2 pages.
Not Authored, Consent to Proceed Before United States Magistrate Judge, Jan. 8, 2008, Docket038.PDF, 2 pages.
T. John Ward, *Function Media LLC* vs *Google, Inc.*—Order of Reference, Jan. 8, 2008, DOCKET039.PDF, 2 pages.
Not Authored, *Function Media LLC* vs *Google, Inc & Yahoo!, Inc.*—Notice of Status Conference, Jan. 9, 2008, DOCKET040.PDF, 3 pages.
Charles Everingham IV, *Function Media LLC* vs *Google, Inc & Yahoo!, Inc.*—Order, Jan. 9, 2008, DOCKET041.PDF, 4 pages.
Not Authored, *Function Media LLC* vs *Google, Inc & Yahoo!, Inc.*—Docket Control Order, Jan. 22, 2008, DOCKET042-2.PDF, 4 pages.
Not Authored, *Function Media LLC* vs *Google, Inc & Yahoo!, Inc.*—Discovery Order, Jan. 22, 2008, DOCKET042-3.PDF, 7 pages.
Elizabeth L. De Rieux, Joint Motion to Adopt Proposed Docket Control Order and Proposed Discovery Order, Jan. 22, 2008, DOCKET042.PDF, 12 pages.
Joseph S. Grinstein, Notice of Appearance of Joseph S. Grinstein for Plaintiff Function Media LLC, Jan. 23, 2008, DOCKET043.PDF, 5 pages
Charles Everingham IV, *Function Media LLC* vs *Google, Inc & Yahoo!, Inc.*—Discovery Order, Jan. 24, 2008, DOCKET044.PDF, 8 pages.
Not Authored, *Function Media LLC* vs *Google, Inc & Yahoo!, Inc.*—Docket Control Order, Jan. 24, 2008, DOCKET045.PDF, 8 pages.
Joseph S. Grinstein, et al, Joint Motion to Furthur Extend Deadline to Submit Protective Order, Mar. 5, 2008, DOCKET048.PDF, 9 pages.
Charles Everingham IV, Order Granting Joint Motion to Furthur Extend Deadline to Submit Protective Order, Mar. 7, 2008, DOCKET049.PDF, 4 pages.
Joseph S. Grinstein, et al, Joint Motion to Enter Protective Order, Mar. 14, 2008, DOCKET050.PDF, 34 pages.
Richard Killworth, Attachment a to the Agreed Protective Order—Confidentiality Agreement, Mar. 20, 2008, DOCKET031.PDF, 6 pages.
Mark Crouella, Attachment A to the Agreed Protective Order—Confidentiality Agreement, Mar. 20, 2008, DOCKET051A.PDF, 27 pages.
Charles Everingham IV, Agreed Protective Order, Mar. 20, 2008, DOCKET051B.PDF, 28 pages.
Walter Bratic, Attachment A to the Agreed Protective Order—Confidentiality Agreement, Mar. 20, 2008, DOCKET051C.PDF, 23 pages.
V. Thomas Rhyne, Attachment A to the Agreed Protective Order—Confidentiality Agreement, Mar. 20, 2008, DOCKET051D.PDF, 15 pages.
Vinay Hooloomann, Attachment A to the Agreed Protective Order—Confidentiality Agreement, Mar. 20, 2008, DOCKET0511E.PDF, 6 pages.
S. Calvin Capshaw, Notice of Change of Firm Name and Electronic Addresses, Apr. 9, 2008, DOCKET052.PDF, 5 pages.
Harry L. Gillam, Notice of Appearance of Councel for Defendant Google, Inc., Apr. 14, 2008, DOCKET053.PDF, 5 pages.
Douglas E. Lumish, Defendant Yahoo!, Inc.'s Privilege Log, Jul. 30, 2008, DOCKET054.PDF, 13 pages.
Thomas B Walsh IV, Notice of Compliance, May 1, 2008, DOCKET055.PDF, 9 pages.
Thomas B Walsh IV, Defendant's Unopposed Motion for Leave to Supplement P.R. 3-3 and 3-4 Disclosures, Jun. 12, 2008 DOCKET056.PDF, 8 pages.
Charles Everingham IV, Order Granting Defendants' Unopposed Motion for Leave to Supplement P.R. 3-3 and 3-4 Disclosures, Jun. 13, 2008, DOCKET057.PDF, 18 pages.
Thomas B Walsh IV, Unopposed Motion to Extend Privilege Log Deadlines and Document Production Deadlines, Jun. 27, 2008, DOCKET058.PDF, 9 pages.
Charles Everingham IV, Order Granting Unopposed Motion to Extend Privilege Log Deadlines and Document Production Deadlines, Jun. 30, 2008, DOCKET059.PDF, 3 pages.
Charles Everingham IV, Order denies the Motion to Dismiss and the Motion for More Definite Statement, Sep. 18, 2008, DOCKET060.PDF, 5 pages.
Douglas E. Lumish, Unopposed Motion to Withdraw David J. Healey as Attorney of Record for Defendant Yahoo!, Inc., Sep. 24, 2008, DOCKET062.PDF, 5 pages.
Charles Everingham IV, Order Granting Motion to Withdraw David J. Healey as Attorney of Record for Defendant Yahoo!, Inc., Sep. 25, 2008 DOCKET063.PDF, 4 pages.
Douglas E. Lumish, Unopposed Motion to Extend Privilege Log Deadline, Sep. 26, 2008, DOCKET064.PDF, 7 pages.
Charles Everingham IV, Order Granting Defendant's Unopposed Motion to Extend Privilege Log Deadline, Sep. 30, 2008, DOCKET065.PDF, 4 pages.
Thomas B Walsh IV, Google Inc. and Yahoo!, Inc.'s Joint Motion for Leave to Further Supplement Their P.R. 3-3 and 3-4 Disclosures, Oct. 31, 2008, DOCKET066.PDF, 27 pages.
Not Authored, Dean/Google—2nd Discovery #1, Oct. 31, 2008, DOCKET066A.PDF, 1 page.
Max L. Tribble, Jr, Plaintiff's Opposition to Defendants' Joint Motion for Leave to Further Supplement Their P.R. 3-3 and 3-4 Disclosures, Nov. 13, 2008, DOCKET067.PDF, 23 pages.
Jason W. Wolff, et al, Joint Motion to Further Extend Privilege Log Deadline, Nov. 17, 2008, DOCKET068.PDF, 7 pages.
Charles Everingham IV, Order Granting Joint Motion to Further Extend Privilege Log Deadline, Nov. 18, 2008, DOCKET069.PDF, 4 pages.
Jason W. Wolff, Google inc. and Yahoo!, Inc.'s Reply in Support of Their Joint Motion for Leave to Futher Suppliment . . . , Nov. 24, 2008, DOCKET070.PDF, 14 pages.
Jason W. Wolff, et al, Joint Notice Regarding Potential Privilege Disputes, Dec. 1, 2008, DOCKET071.PDF, 7 pages.
Jason W. Wolff, et al, Agreed Motion for Partial Dismissal, Jan. 30, 2009, DOCKET072.PDF, 43 pages.
Charles Everingham IV, Order Granting Agreed Motion for Partial Dismissal, Feb. 3, 2009, DOCKET074.PDF, 5 pages.
Max L. Tribble, Jr, Plaintiff's Unopposed Motion for Extension of Deadline to Exchange Expert Declarations Regarding Claim Construction Issues, Feb. 19, 2009, DOCKET075.PDF, 6 pages.
Max L. Tribble, Jr, Plaintiff's Unopposed Motion for Extension of Deadline to Exchange Expert Declarations Regarding Claim Construction Issues, Feb. 19, 2009, DOCKET075A.PDF, 7 pages.
Charles Everingham IV, Order Granting Plaintiff's Unopposed Motion for Extension of Deadline to Exchange Expert Declarations, Feb. 20, 2009, DOCKET076.PDF, 4 pages.
Douglas E. Lumish, Defendant's Unopposed Motion for Extension of Deadline to Exchange Expert Declarations Regarding Claim Construction Issues . . . , Feb. 23, 2009, DOCKET077.PDF, 8 pages.

Charles Everingham IV, Order Granting Defendant's Unopposed Motion for Extension of Deadline to Exchange Expert Declarations Regarding Claim Construction Issues, Feb. 24, 2009, DOCKET078.PDF, 4 pages.

Douglas E. Lumish, Yahoo!, Inc.'s Motion for a Protective Order Barring Discovery intto Non-Accused Technology, Apr. 1, 2009, DOCKET079.PDF, 16 pages.

Max L. Tribble, Jr, Plaintiff's Unopposed Motion for an Extension of the Page Limitations Applicable to Its Opening Claim-Construction Brief, Apr. 6, 2009, DOCKET080.PDF, 6 pages.

Charles Everingham IV, Order Granting Plaintiff's Unopposed Motion for an Extension of the Page Limitations Applicable to Its Opening Claim-Construction Brief, Apr. 9, 2009, DOCKET081.PDF, 3 pages.

Not Authored, Dean/Google—Pleadings #2, Apr. 9, 2009, DOCKET082.PDF, 1 page.

Joesph S. Grinsteim, Plaintiff Function Media LLC's Motion to Compel Discovery from Defendant Yahoo!, Inc., Apr. 13, 2009, DOCKET083.PDF, 70 pages.

Max L. Tribble, Jr., Plaintiff Function Media LLC's Response in Opposition to Defendant Yahoo!, Inc.'s Motion for a Protective Order, Apr. 13, 2009, DOCKET084.PDF, 6 pages.

Douglas E. Lumish, Yahoo!, Inc.'s Reply to Plaintiff's Opposition to Yahoo!'s Motion Barring Discovery into Non-Accused Technology, Apr. 24, 2009, DOCKET085.PDF, 17 pages.

N. Claire Abernathy, Notice of Appearance of N. Claire Abernathy for Plaintiff Function Media LLC, Apr. 27, 2009, DOCKET086.PDF, 4 pages.

D. Jeffrey Rambin, Notice of Appearance of D. Jeffrey Rambin for Plaintiff Function Media LLC, Apr. 27, 2009, DOCKET087.PDF, 4 pages.

Charles Everingham IV, Order Granting Google Inc. and Yahoo!, Inc.'s Joint Motion for Leave to Further Supplement . . . , Apr. 27, 2009, DOCKET088.PDF, 4 pages.

Jason W. Wolf, et al, Joint Motion for Modification to the Case Schedule, Apr. 28, 2009, DOCKET089.PDF, 7 pages.

Charles Everingham IV, Order Granting Joint Motion for Modification to the Case Schedule, Apr. 29, 2009, DOCKET090.PDF, 4 pages.

Justin A. Nelson, Notice of Appearance of Justin A. Nelson for Plaintiff Function Media LLC, May 1, 2009, DOCKET092.PDF, 5 pages.

Max L. Tribble, Jr, Notice of Withdrawal of Yahoo!, Inc's, Motion for a Protective Order and Function Media's Motion to Compel, May 11, 2009, DOCKET093.PDF, 6 pages.

Jason W. Wolff, Google's Unopposed Motion for Extension of the Page Limits for its Responsive Claim Construction Brief, May 12, 2009, DOCKET094.PDF, 6 pages.

Jason W. Wolff, Google's Unopposed Motion for Extension of the Page Brief, May 12, 2009, DOCKET096.pdf, 3 pages.

Charles Everingham IV, Order Granting Google's Unopposed Motion for Extension of the Page Limits for its Responsive Claim Construction Brief, May 12, 2009, DOCKET096A.pdf, 1 page.

Charles Everingham IV, Order Granting Google's Unopposed Motion for Extension of the Page Limits for its Responsive Claim Construction Brief, May 15, 2009, DOCKET097.PDF, 3 pages.

Joseph S. Grinstein / Amy H. Candido, Joint Motion for Entry of Order Regarding AdForce Software Files, Jan. 4, 2010, Docket_347.pdf, 5 pages.

Otis Carroll, Notice of Appearance of Otis Carroll for Defendant Google, Inc., May 20, 2009, DOCKET104.PDF, 4 pages.

Collin Maloney, Notice of Appearance of Collin Maloney for Plaintiff Function Media LLC, May 20, 2009, DOCKET105.PDF, 7 pages.

Charles Everingham IV, Order Recognizing Stipulation of Dismissal filed by Plaintiff Function Media LLC and Defendant Yahoo!, May 20, 2009, DOCKET106.PDF, 5 pages.

Max L. Tribble, Jr, Plaintiffs Unopposed Motion for an Extension of the Page Limitations Applicable to its Markman Reply Brief, Jun. 3, 2009, DOCKET107.PDF, 5 pages.

Charles Everingham IV, Order Granting Plaintiff's Unopposed Motion for an Extension of the Page Limitations Applicable to its Markman Reply Brief, Jun. 5, 2009, DOCKET108.PDF, 4 pages.

Max L. Tribble, Jr, Plaintiff's Unopposed Motion for an Extension of the Page Limitations Applicable to its Markman Reply Brief, Jun. 11, 2009, DOCKET109.PDF, 6 pages.

Charles Everingham IV, (Proposed) Order Granting Plaintiff's Unopposed Motion for an Extension of the Page Limitations Applicable to Its Markman Reply Brief, Jun. 15, 2009, DOCKET111.pdf, 1 page.

Carl G Anderson, Notice to Appear Pro Hac Vice of Carl G. Anderson for Defendant Google, Inc., Jun. 19, 2009, DOCKET112.PDF, 6 pages.

Lexie G. White, Notice to Appearance of Lexie G. White for Plaintiff Function Media LLC, Jun. 26, 2009, DOCKET115.PDF, 5 pages.

Elizabeth L. De Rieux, Unopposed Motion for Withdrawal of Counsel N. Claire Abernathy, Jul. 10, 2009, DOCKET116.PDF, 7 pages.

Charles Everingham IV, Order Granting Unopposed Motion for Withdrawal of Counsel, Jul. 13, 2009, DOCKET117.PDF, 3 pages.

Carl G Anderson, et al, Google Inc.'s Unopposed Motion for Extension of Time to Submit Technical Tutorials on DVD, Jul. 23, 2009, DOCKET118.PDF, 7 pages.

Amy H. Candido, Google's Unopposed Motion for Extension of Time of Eighteen Minutes to File Google's Opposition to . . . , Jan. 8, 2010, Docket_362.pdf, 4 pages.

Charles Everingham IV, Order Granting Google Inc.'s Unopposed Motion for Extension of Time to Submit Technical Tutorials on DDV, Jul. 24, 2009, DOCKET119.PDF, 4 pages.

Carl G Anderson, et al, Google Inc.'s Motion for a Protective Order to Preclude Depositions of Three Top-Level Executives, Jul. 24, 2009, DOCKET120.PDF, 167 pages.

Not Authored, Dean/Google—2nd Discovery #3, Jul. 24, 2009, DOCKET120A.PDF, 1 page.

Justin A. Nelson, Motion to Expedite Consideration of Motion to Compel, Jul. 28, 2009, DOCKET121.PDF, 8 pages.

Amy H. Candido, Notice to Appear Pro Hac Vice of Amy H. Candido for Defendant Google, Inc., Jul. 27, 2009, DOCKET126.PDF, 5 pages.

David A. Perlson, Notice to Appear Pro Hac Vice of David A Perlson for Defendant Google, Inc., Jul. 27, 2009, DOCKET127.PDF, 5 pages.

Charles K. Verhoeven, Notice to Appear Pro Hac Vice Charles K. Verhoeven for Defendant Google, Inc., Jul. 27, 2009, DOCKET128.PDF, 5 pages.

David J Maland, *Function Media LLC* vs *Google, Inc*—Markman Hearing, Jul. 30, 2009, DOCKET137.PDF, 6 pages.

Jeremy J. Brandon, et al, Joint Motion for Extension of Time to Submit P.R. 4-5(d) Chart and Technical Tutorials on DVD, Jul. 30, 2009, DOCKET138.PDF, 6 pages.

Charles Everingham IV, *Function Media LLC* vs *Google, Inc* & *Yahoo!, Inc.*—Order, Jul. 31, 2009, DOCKET139.PDF, 4 pages.

Charles Everingham IV, Order Granting Joint Motion for Extension of Time to Submit P.R. 4-5(d) Chart and Technical Tutorials on DVD, Jul. 31, 2009, DOCKET140.PDF, 3 pages.

Sandeep Seth, Notice to Appearance of Sandeep Seth for Plaintiff Function Media LLC, Aug. 6, 2009, DOCKET141.PDF, 5 pages.

Charles K. Verhoeven, Notice of Substitution of Lead Trial Counsel, Aug. 11, 2009, DOCKET144.PDF, 6 pages.

Joseph S. Grinstein, Function Media's Motion for Judgement on the Pleading Regarding Google's Inequitable Conduct Allegations, Aug. 17, 2009, DOCKET146.PDF, 60 pages.

Max L. Tribble, Jr., Function Media, L.L.C., Inc.'s Unopposed Motion for Leave to Exceed Page Limit in its Response to . . . , Jan. 17, 2010, Docket_389.pdf, 5 pages.

Justin A. Nelson, Unopposed Motion to Expedite Second Motion to Compel, Aug. 19, 2009, DOCKET130.PDF, 7 pages.

Edward J. Defranco, Notice to Appear Pro Hac Vice of Edward J. DeFranco for Defendant Google, Inc., Aug. 18, 2009, DOCKET151.PDF, 5 pages.

James M. Glass, Notice to Appear Pro Hac Vice of James M. Glass for Defendant Google, Inc., Aug. 18, 2009, DOCKET152.PDF, 5 pages.

Justin A. Nelson, *Function Media LLC* vs *Google, Inc* & *Yahoo!, Inc.*—2nd Expedited Motion to Compel, Aug. 19, 2009, DOCKET153.PDF, 65 pages.

Justin A. Nelson, Emergency Motion to Set Deadline for Google to Complete Production and Relief from Meet and Confer, Aug. 27, 2009, DOCKET160.PDF, 43 pages.

Not Authored, Dean/Google—2nd Discovery #5, Aug. 27, 2009, DOCKET160A.PDF, 1 page.
Justin A. Nelson, Emergency Motion to Set Deadline for Google to Complete Production and Relief from Meet and Confer, Aug. 27, 2009, DOCKET160B.PDF, 90 pages.
Justin A. Nelson, Motion to Expidite Emergency Motion to Set Deadline for Google to Complete Production and Relief Meet and Confer, Aug. 27, 2009, DOCKET162.PDF, 5 pages.
Billie D. Salinas, Notice to Appear Pro Hac Vice of Billie D. Salinas for Defendant Google, Inc., Aug. 28, 2009, DOCKET163.PDF, 5 pages.
Charles K. Verhoeven, Notice of Supplemental Authority for Google's Motion for a Protective Order to Preclude Depositions of Three Top-Level Executives, Aug. 28, 2009, DOCKET164.PDF, 12 pages.
Justin A. Nelson, Response to Supplemental Authority on Protective Order, Aug. 28, 2009, DOCKET165.PDF, 6 pages.
Justin A. Nelson, Unopposed Motion to Withdrawal Emergency Motion to Set Deadline for Google to Complete Production and Relief from Meet and Confer, Aug. 31, 2009, DOCKET167.PDF, 6 pages.
Not Authored, Function Media, L.L.C. v. Google, Inc. et al Status Conference, Jan. 9, 2008, DOCKET040A.PDF, 3 pages.
Jeffrey Homrig, Defendants' Unopposed Motion for Extension of Deadline to Exchange Expert Declaration . . . , Feb. 23, 2009, DOCKET077A.PDF, 8 pages.
Deborah Race, Notice of Appearance of Deborah Race for Plaintiff Function Media LLC, Aug. 31, 2009, DOCKET168.PDF, 5 pages.
Charles Everingham IV, Order Granting Plaintiff's Unopposed Motion to Withdraw Emergency Motion, Aug. 31, 2009, DOCKET169.PDF, 4 pages.
Charles K. Verhoeven, Response to Function Media's Response to Notice of Supplemental Authority for Google's Motion for a Protective Order, Aug. 31, 2009, DOCKET170.PDF, 8 pages.
Harry L. Gillam, Unopposed Motion for Extension of Time, Sep. 3, 2009, DOCKET171.PDF, 7 pages.
Charles Everingham IV, Order Granting Unopposed Motion for Extension of Time, Sep. 8, 2009, DOCKET172.PDF, 4 pages.
Harry L. Gillam, Unopposed Motion for Extension of Time, Sep. 11, 2009, DOCKET173.PDF, 6 pages.
Harry L. Gillam, Google's Opposition to Function Media's Motion for Judgment on the Pleading Regarding Google's . . . Inequitable Conduct, Sep. 15, 2009, DOCKET174.PDF, 74 pages.
Charles Everingham IV, Order Granting Unopposed Motion for Extension of Time, Sep. 15, 2009, DOCKET174A.PDF, 4 pages.
Justin A. Nelson, Plaintiff's Notice of Disclosure, Sep. 18, 2009, DOCKET177.PDF, 7 pages.
Justin A. Nelson, et al, Joint Motion to Extend Discovery Deadline, Sep. 18, 2009, DOCKET178.PDF, 9 pages.
Charles Everingham IV, Order Regarding Joint Motion to Extend Discovery Deadline, Sep. 22, 2009, DOCKET182.PDF, 3 pages.
Patrick Curran, Notice to Appear Pro Hac Vice of Patrick Curran for Defendant Google, Inc., Oct. 1, 2009, DOCKET187.PDF, 7 pages.
Amy H. Candido, Google's Motion to Seal Documents and Close the Courtroom During Presentation of Confidential Material at Trial, Oct. 2, 2009, DOCKET190.PDF, 11 pages.
James M Glass, Google Inc.'s Notice Pursuant to 35 U.S.C.& 282, Oct. 2, 2009, DOCKET191.PDF, 24 pages.
Amy H. Candido, Google's Motion to Limit the Number of Asserted Claims, Oct. 2, 2009, DOCKET192.PDF, 19 pages.
Joseph S. Grinstein, Plaintiff's Notice of Trial Transcript, Oct. 2, 2009, DOCKET208.PDF, 6 pages.
Max L. Tribble, Jr, Function Media. L.L.C.'s Motions in Limine, Oct. 2, 2009, DOCKET258A.PDF, 34 pages.
Amy H. Candido, Google Inc.'s Notice of Trial Transcripts, Oct. 3, 2009, DOCKET211.PDF, 6 pages.
Max L. Tribble, Jr, Plaintiff's Unopposed Motion for Leave to Exceed Page Limitation Applicable to Docket No. 188 , Oct. 5, 2009, DOCKET213.PDF, 6 pages.
Charles Everingham IV, Order Granting Plaintiff's Unopposed Motion for Leave to Exceed Page Limitation Applicable to Docket No. 188, Oct. 6, 2009, DOCKET214.PDF, 4 pages.

Not Authored, Notice of Filing of Offical Transcript, Oct. 7, 2009, DOCKET216.PDF, 3 pages.
Charles Everingham IV, Function Media LLC vs Google, Inc & Yahoo!, Inc.—Order, Oct. 9, 2009, DOCKET219.PDF, 4 pages.
Warren T. Burns, Notice of Appearance of Warren T. Burns for Plaintiff Function Media LLC, Oct. 13, 2009, DOCKET220.PDF, 5 pages.
Max L. Tribble, Jr., Plaintiff Function Media, LLC.'s Objections to Defendant Google, Inc.'s Trial Exhibits, Oct. 16, 2009, DOCKET221.PDF, 26 pages.
Amy H. Candido, Google Inc.'s Response and Objections to Plaintiffs Pre-Trial Disclosures, Oct. 16, 2009, DOCKET223.PDF, 117 pages.
Joseph S Grinstein, Function Media, L.L.C.'s Response to Google's Motion to Limit the Number of Asserted Claims, Oct. 19, 2009, DOCKET224.PDF, 22 pages.
Warren T. Burns, Function Media, L.L.C.'s Response to Google's Motion to Seal Documents and Close the Courtroom Confidential Information, Oct. 19, 2009, DOCKET225.PDF, 13 pages.
Amy H. Candido, Google Inc.'s Notice of Potential Scheduling Conflict, Oct. 22, 2009, DOCKET226.PDF, 10 pages.
Joseph S Grinstein, et al, Joint Motion for Leave to Extend the Deadline for Joint Pretrial Order, Oct. 22, 2009, DOCKET227.PDF, 7 pages.
Not Authored, Function Media LLC vs Google, Inc & Yahoo!, Inc.—Trial Schedule, Oct. 23, 2009, DOCKET228.PDF, 7 pages.
Not Authored, Function Media LLC vs Google, Inc & Yahoo!, Inc.—Trial Schedule, Oct. 23, 2009, DOCKET228A.PDF, 6 pages.
Charles Everingham IV, (Proposed) Order Granting Plaintiff's Unopposed Motion from an Extension of the Page Limitations . . . , Jun. 15, 2009, DOCKET111A.pdf, 1 page.
Charles Everingham IV, Order Granting Joint Motion for Leave to Extend the Deadline for Joint Pretrial Order, Oct. 23, 2009, DOCKET229.PDF, 4 pages.
Amy H. Candido, et al, Joint Motion to Extend Pretrial Deadlines, Oct. 23, 2009, DOCKET235.PDF, 8 pages.
Charles Everingham IV, Order Regarding Joint Motion to Extend Pre-Trial Deadlines, Oct. 26, 2009, DOCKET231.PDF, 5 pages.
Billie D. Salinas, Reply in Support of Google's Motion to Limit the Number of Asserted Claims, Oct. 29, 2009, DOCKET232.PDF, 27 pages.
Amy H. Candido, Google Inc.'s Unopposed Motion for Leave to Exceed Page Limitation Applicable to Its Brief in Opposition to Plaintiff's Motions in Limine, Nov. 3, 2009, DOCKET238.PDF, 8 pages.
Joseph S. Grinstein, Plaintiff's Response to Google's Motion in Limine No. Nine: Motion to Preclude Argument That Google Hindered Function Media, Nov. 3, 2009, DOCKET239.PDF, 6 pages.
Joseph S. Grinstein, Plaintiff's Response to Google's Motion in Limine No. One: Motion to Preclude Evidence and Argument Relating to the Parties' Conduct . . . , Nov. 3, 2009, DOCKET245.PDF, 9 pages.
Joseph S. Grinstein, Plaintiff's Response to Google's Motion in Limine No. Five: Motion to Admit Evidence Regarding Reexamination of the Patents-In-Suit, Nov. 3, 2009, DOCKET246.PDF, 11 pages.
Charles Everingham IV, Order Granting Google Inc.'s Unopposed Motion for Leave to Exceed Page Limitaion Application to Its Brief in Opposition to Plaintiff's Motion . . . , Nov. 4, 2009, DOCKET252.PDF, 4 pages.
Billie D. Salinas, Unopposed Motion to Reschedule the Final Pretrial Conference and Retrial Deadlines, Nov. 4, 2009, DOCKET253.PDF, 8 pages.
Billie D. Salinas, Joint Motion to Extend Deadline for Rebuttal Expert Witness Designations and Reports, Nov. 4, 2009, DOCKET254.PDF, 7 pages.
Joseph S. Grinstein, Plaintiff's Sur-Reply to Google's Reply in Support of Their Motion to Limit the Number of Asserted Claims, Nov. 5, 2009, DOCKET255.PDF, 8 pages.
Carl G. Anderson, Google's Unopposed Motion to Extend Time for Reply on it Motion to Seal Documents and Close the Courtroom . . . , Nov. 5, 2009, DOCKET258.PDF, 7 pages.

Charles Everingham IV, Order Granting Unopposed Motion to Reschedule the Final Pretrial Conference and Retrial Deadlines, Nov. 6, 2009, DOCKET259.PDF, 5 pages.

Charles Everingham IV, Order Granting Joint Motion to Extend Deadline for Rebuttal Expert Witness Designations and Reports, Nov. 6, 2009, DOCKET260.PDF, 4 pages.

Charles Everingham IV, Order Granting Google's Unopposed Motion to Extend Time for Reply on it Motion to Seal Documents and Close the Courtroom, Nov. 6, 2009, DOCKET261.PDF, 4 pages.

Joseph S. Grinstein, et al, Joint Motion to Extend Deadline for Replies on Summary Judgment Motions and Motions in Limine, Nov. 13, 2009, DOCKET265.PDF, 7 pages.

Charles Everingham IV, Order Granting Google Inc.'s Unopposed Motion for Leave to Exceed Page Limit in it Reply in Support of Its Motion to Seal Documents . . . , Nov. 18, 2009, DOCKET269.PDF, 4 pages.

Joseph S. Grinstein, et al, Joint Motion to Extend Deadlines for Reply Briefs in Support of Dispositive Motions and Motions in Limine, Nov. 18, 2009, DOCKET270.PDF, 8 pages.

Charles Everingham IV, Order Granting Joint Motion to Extend Deadlines for Reply Briefs in Support of Dispositive Motions and Motions in Limine, Nov. 19, 2009, DOCKET273.PDF, 5 pages.

Charles Everingham IV, Order on Motion to Expedite, Nov. 19, 2009, DOCKET274.PDF, 4 pages.

Juanita R. Brooks, Unopposed Motion by for Leave of Court to Withdrawl Appearance of Counsel Jason Wolff Juanita Brooks, Thomas Walsh IV and Fish Richardson, Nov. 23, 2009, DOCKET281.PDF, 7 pages.

Joseph S. Grinstein, et al, Joint Motion to Extend Deadlines for Reply Briefs in Support of Motions in Limine, Centrain Dispositive Motion Reply Briefs and . . . , Nov. 23, 2009, DOCKET282.PDF, 8 pages.

Charles Everingham IV, Order Granting Joint Motion to Extend Deadlines for Reply Briefs in Support of Motions in Limine, Centrain Dispositive Motion Reply Briefs . . . , Nov. 24, 2009, DOCKET283.PDF, 5 pages.

Max L. Tribble, Jr., Reply to Motion to Strike the Deposition Errata Sheet of Mireya Bravomalo, Jan. 12, 2010, DOCKET373.PDF, 7 pages.

Civil Docket No. 2:07-CV-279 (CE), *Function Media LLC* vs *Google, Inc.*—Motions Hearing, (Jan. 12, 2010, 1:30 p.m.), Jan. 12, 2010, DOCKET375.PDF, 5 pages.

Max L. Tribble, Jr., Function Media's Indentification of Documents Falling Outside Google's Objection to Acquisitions Related Documents, Jan. 14, 2010, DOCKET377.PDF, 19 pages.

Amy H. Candido, et al, Joint Submission of Objections to the Admission of Disignated Deposition Testimony, Jan. 14, 2010, DOCKET378.PDF, 21 pages.

Charles Everingham IV, *Function Media LLC* vs *Google, Inc.*—Order, Jan. 15, 2010, DOCKET380.pdf, 1 page.

Charles Everingham IV, *Function Media LLC* vs *Google, Inc.*—Memorandum Opinion and Order, Jan. 15, 2010, DOCKET381.pdf, 9 pages.

Charles Everingham IV, *Function Media LLC* vs *Google, Inc.*—Memorandum Opinion and Order, Jan. 15, 2010, DOCKET382.pdf, 8 pages.

Charles Everingham IV, *Function Media LLC* vs *Google, Inc.*—Memorandum Opinion and Order, Jan. 15, 2010, DOCKET383.pdf, 8 pages.

Charles Everingham IV, *Function Media LLC* vs *Google, Inc.*—Order, Jan. 15, 2010, DOCKET384.pdf, 1 page.

Charles Everingham IV, *Function Media LLC* vs *Google, Inc.*—Order, Jan. 15, 2010, DOCKET3855.pdf, 1 page.

Max L. Tribble, Jr, Function Media LLC's Unopposed Motion for Leave to Exceed Page Limit in it Response to Emergency Motion of Google for . . . , Jan. 17, 2010, DOCKET389.pdf, 4 pages.

Charles Everingham IV, *Function Media LLC* vs *Google, Inc.*—Order, Jan. 19, 2010, DOCKET398.pdf, 1 pages.

Charles K. Verhoeven, Notice of Supplemental Authority for Google's Motion for a Protective Order to Preclude Depositions . . . , Aug. 28, 2009, DOCKET164A.pdf, 12 pages.

Charles Everingham IV, Order Granting Function Media's Response to Emergency Motion of Google for Sanctions Based on Function Media's . . . , Jan. 19, 2010, DOCKET399.pdf, 1 page.

Max L. Tribble, Jr, Motion to Enforce Opinion Regarding Google's Expert Michael Wagner, Jan. 18, 2010, DOCKET400.pdf, 5 pages.

Charles Everingham IV, *Function Media LLC* vs *Google, Inc.*—(Proposed) Order, Jan. 23, 2010, DOCKET400A.pdf, 1 page.

Civil Docket No. 2:07-CV-279-CE, *Function Media LLC* vs *Google, Inc.*—Plaintiff's Exhibit List (1-480), Jan. 27, 2010, DOCKET414.pdf, 38 pages.

Civil Docket No. 2:07-CV-279-CE, *Function Media LLC* vs *Google, Inc.*—Plaintiff's Exhibit List (999-1700), Jan. 27, 2010, DOCKET414-2.pdf, 57 pages.

Civil Docket No. 2:07-CV-279-CE, *Function Media LLC* vs *Google, Inc.*—Plaintiff's Exhibit List (481-998), Jan. 27, 2010, DOCKET414A.pdf, 45 pages.

Civil Docket No. 2:07-CV-279-CE, *Function Media LLC* vs *Google, Inc.*—Defendant's Pre-Admitted Trial Exhibit List (DX0002-DX0945), Jan. 27, 2010, DOCKET415.pdf, 28 pages.

Charles Everingham IV, *Function Media LLC* vs *Google, Inc.*—Order, Jan. 26, 2010, DOCKET416.pdf, 1 page.

Amy H Candido, Google's Request for a Jury Instruction on Georgia-Pacific Factors, Jan. 26, 2010, DOCKET417.pdf, 3 pages.

Civil Docket No. 2:07-CV-279-CE, *Function Media LLC* vs *Google, Inc.*—Jury Trial Day One—Minutes (Jan. 19, 2010), Jan. 19, 2010, DOCKET419.pdf, 4 pages.

Civil Docket No. 2:07-CV-279-CE, *Function Media LLC* vs *Google, Inc.*—Jury Trial Day Two—Minutes (Jan. 20, 2010), Jan. 20, 2010, DOCKET420.pdf, 4 pages.

Civil Docket No. 2:07-CV-279-CE, *Function Media LLC* vs *Google, Inc.*—Jury Trial Day Three—Minutes (Jan. 21, 2010), Jan. 21, 2010, DOCKET421.pdf , 4 pages.

Civil Docket No. 2:07-CV-279-CE, *Function Media LLC* vs *Google, Inc.*—Jury Trial Day Four—Minutes (Jan. 22, 2010), Jan. 22, 2010, DOCKET422.pdf, 4 pages.

Civil Docket No. 2:07-CV-279-CE, *Function Media LLC* vs *Google, Inc.*—Jury Trial Day Five—Minutes (Jan. 25, 2010), Jan. 25, 2010, DOCKET423.pdf, 5 pages.

Civil Docket No. 2:07-CV-279-CE, *Function Media LLC* vs *Google, Inc.*—Jury Trial Day Six—Minutes (Jan. 26, 2010), Jan. 26, 2010—DOCKET424.pdf, 3 pages.

Civil Docket No. 2:07-CV-279-CE, *Function Media LLC* vs *Google, Inc.*—Transcript of Voir Dire Proceedings (Jan. 4, 2010), Feb. 2, 2010, DOCKET426.pdf, 102 pages.

Civil Docket No. 2:07-CV-279-CE, *Function Media LLC* vs *Google, Inc.*—Transcript of Jury Trail (Jan. 26, 2010—Tuesday Afternoon), Feb. 2, 2010, DOCKET438.pdf, 8 pages.

Max L. Tribble, Jr., Function Media's Response to Google's Motion for Judgement as a Matter of Law Regarding Damages, Feb. 9, 2010, DOCKET440.PDF, 8 pages.

Max L. Tribble, Jr., Function Media's Response to Google's Motion for Judgement as a Matter of Law Regarding Invalidity, Feb. 9, 2010, DOCKET441.PDF, 8 pages.

Amy H. Candido, Notice of Intent to Request Redaction, Feb. 9, 2010, DOCKET442.PDF, 6 pages.

Edward J. De Franco, Unopposed Motion to Extend the Deadline for Google's Opposition to Function Media's Motion for Judgement . . . , Feb. 11, 2010, DOCKET443.PDF, 5 pages.

Joseph S. Grinstein, Function Media, LLC's Unopposed Motion for Extension of Time to File Reply to Google Inc.'s Response, Feb. 18, 2010, DOCKET443A.pdf, 4 pages.

Charles Everingham IV, Order Granting Function Media, LLC's Unopposed Motion for Extension of Time to File Reply to . . . , Feb. 12, 2010, DOCKET444.pdf, 1 page.

Joseph S. Grinstein, Function Media, LLC's Unopposed Motion for Extension of Time to File Reply to Google Inc's Response, Feb. 18, 2010, DOCKET446.PDF, 20 pages.

Edward J. De Franco, Google's Reply in Support of Its Motion for Judgment as a Matter of Law Regarding Invalidity, Feb. 19, 2010, DOCKET447.PDF, 7 pages.

Edward J. De Franco, Google's Reply in Support of Its Motion for Judgment as a Matter of Law Regarding Damages, Feb. 19, 2010, DOCKET448.PDF, 10 pages.

Charles Everingham IV, Order Granting Function Media, LLC's Unopposed Motion for Extension of Time to File Reply to Google Inc's Response . . . , Feb. 22, 2010, DOCKET449.PDF, 4 pages.

Amy H. Candido, Corrected Notice of Intent to Request Redaction, Feb. 22, 2010, DOCKET450.pdf, 3 pages.
Charles Everingham IV, *Function Media LLC* vs *Google, Inc.*—Order, Feb. 26, 2010, DOCKET451.PDF, 4 pages.
Amy H. Candido, Google's Unopposed Motion to Redact Trial Transcripts, Feb. 26, 2010, DOCKET452.PDF, 14 pages.
Charles Everingham IV, Order Granting Unopposed Motion for Leave of Court to Withdraw Appearance of Counsel, Nov. 24, 2009, DOCKET284.PDF, 4 pages.
Joseph S. Grinstein, Plaintiff's Unopposed Motion for Leave to Exceed Page Limitations, Nov. 25, 2009, DOCKET285.PDF, 6 pages.
Warren T. Burns, Function Media LLC's Unopposed Motion for Extension of Time to File Surreply to Google, Inc.'s Motion to Seal Documents and Close . . . , Nov. 25, 2009, DOCKET286.PDF, 8 pages.
Warren T. Burns, Function Media LLC's Unopposed Motion for Leave to Exceed Page Limit in Its Surreply to Google, Inc's Motion to Seal documents . . . , Nov. 30, 2009, DOCKET301.PDF, 9 pages.
Charles Everingham IV, (Proposed) Order Granting Function Media LLC's Unopposed Motion for Leave to Exceed Page Limit in Its Surreply to Google Inc's Motion . . . , Dec. 1, 2009, DOCKET303.PDF, 5 pages.
Charles Everingham IV, Order Granting Unopposed Motion for Extension of Time to File Surreply to Google Inc.'s Motion to Seal Documents and Close Courtroom . . . , Dec. 1, 2009, DOCKET304.PDF, 5 pages.
Charles Everingham IV, Order Granting Plaintiff's Unopposed Motion for Leave to Exceed Page Limitation, Dec. 1, 2009, DOCKET305.PDF, 5 pages.
Warren T. Burns, Function Media, LLC's Surreply to Google's Motion to Seal documents and Close the Courtroom During Presentation of Confidential Material at Trial . . . , Dec. 1, 2009, DOCKET306.PDF, 13 pages.
David J Maland, Hearing on Pre-Admission of Exhibits and Depo Designations, Dec. 4, 2009, DOCKET309.PDF, 5 pages.
Not Authored, *function Media, LLC* vs *Google, Inc.*—Pretrial Conference, Dec. 4, 2009, 9:30 a.m., Dec. 4, 2009, DOCKET310.PDF, 6 pages.
Charles Everingham IV, Order Granting Google's Unopposed Motion to Redact Trial Transcripts, Mar. 1, 2010, DOCKET453.PDF, 6 pages.
Joseph S. Grinstein, Function Media, LLC's Unopposed Motion for Leave to Exceed Page Limit in Its Reply in Support of . . . , Mar. 3, 2010, DOCKET454.PDF, 8 pages.
Max L. Tribble, Function Media, LLC's Unopposed Motion for Leave to Exceed Page Limit in Its Motion for a New Trial, Mar. 3, 2010, DOCKET456.PDF, 8 pages.
Charles Everingham IV, Order Granting Function Media's LLC's Unopposed Motion for Leave to Exceed Page Limit on Its Reply . . . , Mar. 4, 2010, DOCKET459.PDF, 4 pages.
Charles Everingham IV, Order Granting Function Media, LLC's Unopposed Motion for Leave to Exceed Page Limit in Its Motion for a New Trial, Mar. 4, 2010, DOCKET460.PDF, 4 pages.
Edward J. De Franco, Unopposed Motion to Extend the Deadline for (1) Google's Sur-Reply to Function Media's Motion for Judgement, Mar. 5, 2010, DOCKET461.PDF, 7 pages.
Charles Everingham IV, Order Granting Unopposed Motion to Extend the Deadline for (1) Google's Sur-Reply to Function Media's Motion for Judgment . . . , Mar. 9, 2010, DOCKET462.PDF, 4 pages.
Edward J. De Franco, Agreed Motion to Extend the Deadlines for Briefing on Function Media's Motion for a New Trial, Mar. 26, 2010, DOCKET464.PDF, 7 pages.
Charles Everingham IV, Order Granting Agreed Motion to Extend the Deadlines for Briefing on Function Media's Motion for a New Trial, Mar. 29, 2010, DOCKET465.PDF, 4 pages.
Edward J. De Franco, Google's Unopposed Motion for Leave to Exceed Page Limit in Its Opposition to Function Media's Motion for a New Trial, Apr. 8, 2010, DOCKET466.PDF, 8 pages.
Charles Everingham IV, *Function Media LLC* vs *Google, Inc.*—Order Apr. 9, 2010, DOCKET468.PDF, 4 pages.
Charles Everingham IV, *Function Media LLC* vs *Google, Inc.*—Order, Apr. 12, 2010, DOCKET469.PDf, 4 pages.

Elizabeth L. De Rieux, Unopposed Motion for Withdrawl of Counsel Jessica L. Hannah for Plaintiff, Apr. 12, 2010, DOCKET470.PDF, 7 pages.
Charles Everingham IV, Order Granting Unopposed Motion for Withdrawl of Counsel Jessica L. Hannah for Plaintiff, Apr. 13, 2010, DOCKET471.PDF, 4 pages.
Max L. Tribble, Jr, Agreed Motion for Leave to Exceed Page Limits, Apr. 20, 2010, DOCKET472.PDF, 8 pages.
Charles Everingham IV, (Proposed) Order Granting Agreed Motion for Leave to Exceed Page Limits, Apr. 21, 2010, DOCKET473.pdf, 1 page.
Charles Everingham IV, *Function Media LLC* vs *Google, Inc.*—Order, Apr. 28, 2010, DOCKET476.PDF, 3 pages.
Amy H. Candido, Google's Unopposed Amended Motion to Seal and Redact Portions of Trial Transcripts, Apr. 28, 2010, DOCKET477.PDF, 13 pages.
Civil Docket 2:07-CV-279 (CE), Notice of Hearing on all Pending Post-Trial Motions, Jul. 9, 2010, DOCKET479.pdf, 4 pages.
Civil Docket 2:07-CV-279 (CE), Notice of Hearing on all Pending Post-Trial Motions, Jul. 16, 2010, DOCKET480.pdf, 5 pages.
Charles Everingham IV, *Function Media LLC* vs *Google Inc.*—Order, Sep. 3, 2010, DOCKET482.pdf, 3 pages.
Charles Everingham IV, Order Granting Google's Unopposed Amended Motion to Redact Portions of Trial Transcripts, Oct. 25, 2010, DOCKET484.pdf, 2 pages.
Charles Everingham IV, Order Granting Plaintiff's Expedited Supplemental Motion to Compel Deposition of Google Excutives, Dec. 4, 2009, 4 pages.
Charles Everingham IV, Order Granting Unopposed Motion to Extend Deadline for Google's Opposition to Function Media's Motion to Compel Previously Taken . . . , Dec. 7, 2009, DOCKET313.PDF, 5 pages.
Charles Everingham IV, Order Granting Defendant Google, Inc's Motion to Limit the Number of Asserted Claims Dec. 7, 2009 DOCKET3T4.PDF, 5 pages.
Jessica L. Hannah, Notice of Appearance of Jessica L. Hannah for Plaintiff Function Media LLC, Dec. 9, 2009, DOCKET318.PDF, 6 pages.
Charles Everingham IV, *Function Media LLC* vs *Google, Inc*—Order, Dec. 11, 2009, DOCKET320.PDF, 5 pages.
Joseph S. Grinstein, Opposition to Motion to Expedite, Dec. 14, 2009, DOCKET322.PDF, 31 pages.
Charles Everingham IV, Order on Motion to Compel Previously-Taken Deposition Testimony of Google Executives, Dec. 22, 2009, DOCKET330.pdf, 1 page.
Charles Everingham IV, Motion to Expedite Consideration of Motion to Preclude Admission of Untimely Evidence, Dec. 23, 2009, DOCKET334.pdf, 5 pages.
Joseph S. Grinstein, Unopposed Motion for Entry of Order Regarding Conduct of Expert Depositions, Dec. 28, 2009, DOCKET338.pdf, 6 pages.
Amy H. Candido, Google's Opposition to Function Media's Motion to Expedite Consideration of Motion to Preclude Addmission of Untimely Evidence . . . , Dec. 28, 2009, DOCKET339.pdf, 5 pages.
Robert M. Parker, Notice of Appearance of Robert M. Parker for Plaintiff Function Media LLC, Dec. 29, 2009, DOCKET340.pdf, 2 pages.
Joseph S. Grinstein, Function Media's Reply to Google's Response to Function Media's Motion to Expedite Consideration of Motion to Preclude Admission. . . , Jan. 5, 2010, DOCKET341.pdf, 4 pages.
Joseph S. Grinstein Function Media's Reply to Google's Response to Function Media's Motion to Expedite Consideration of Motion to Preclude Admission . . . , Jan. 15, 2010, DOCKET341A.pdf, 4 pages.
Max L. Tribble Jr., Motion to Expedite action for Adverse Inference Instruction Regarding Google's Destruction of Documents, Jan. 14, 2010, DOCKET342.pdf, 5 pages.
Amy H. Candido, Google's Motion to Seal Documents and Close the Courtroom During Presentation of Confidential Material at Trial, Oct. 2, 2009, DOCKET190A.pdf , 11 pages.
Billie D. Salinas, Joint Motion to Extend Deadline for Rebuttal Expert Witness Designations and Reports, Nov. 5, 2009, DOCKET256.PDF, 7 pages.

Joseph S. Grinstein, et al, Joint Motion for Entry of Order Regarding AdFoce Software Files, Jan. 4, 2010, DOCKET347.pdf, 4 pages.
Charles Everingham IV, Order on Joint Motion for Entry of Order Regarding AdFoce Software Files, Jan. 4, 2010 DOCKET347A.pdf, 1 page.
Charles Everingham IV, Order on Joint Motion for Entry of Order Regarding AdFoce Software Files, Jan. 5, 2010, DOCKET350.pdf, 2 pages.
Susan Simmons, CSR, *Function Media LLC* vs *Google, Inc.*—Jury Selection Minutes, Jan. 4, 2010, DOCKET352.pdf, 2 pages.
Shelly Holmes, CSR, *Function Media LLC* vs *Google, Inc.*—Exhibit/Evidentiary Hearing Minutes, Jan. 5, 2010, DOCKET353.pdf, 2 pages.
Not Authored, *Function Media LLC* vs *Google, Inc.*—Exhibit Hearing, Jan. 5, 2010, DOCKET353A.pdf, 1 page.
Charles Everingham IV, *Function Media LLC* vs *Google, Inc.*—Order, Jan. 7, 2010, DOCKET355.pdf, 1 page.
Amy H. Candido, Google's Response to Function Media's Motion to Consolidate Argument on Google's and Function Media's Motions to Exclude Expert Opinions, Jan. 8, 2010, DOCKET357.PDF, 7 pages.
Amy H. Candido, Google's Unopposed Motion for Extension of Time of Eighteen Minutes to File Google's Opposition to Function Media's Motion to Exclude . . . , Jan. 8, 2010, DOCKET362.pdf, 3 pages.
Charles Everingham IV, (Proposed) Order Granting Google's Unopposed Motion for Extension of Time of Eighteen Minutes to File Google's Opposition to . . . , Jan. 8, 2010, DOCKET362A.pdf, 1 page.
Max L. Tribble, Jr., Joint Motion to Expedite Hearing, Jan. 8, 2010, DOCKET363.pdf, 5 pages.
Max L. Tribble, Jr., Motion to Expedite Motion for Adverse Inference Instruction Regarding Google's Destruction of Documents, Jan. 14, 2010, DOCKET365.PDF, 7 pages.
Charles Everingham IV, Order Granting Google's Inopposed Motion for Extension of Time of Eighteen Minutes to File Google's Opposition to . . . , Jan. 11, 2010, DOCKET368.pdf, 1 page.
Max L. Tribble, Jr., Reply to Motion to Strike the Deposition Errata Sheet of Mireya Bravomalo, Jan. 12, 2010, DOCKET372.PDF, 7 pages.
Joseph S. Grinstein, Unopposed Motion for Entry of Order Regarding Conduct of Expert Depositions, Dec. 28, 2009, DOCKET338A.PDF, 6 pages.
Amy H. Candido, Google's Opposition to Function Media's Motion to Expedite Consideration of Motion to Expidite Consideration of Motion to Preclude Admission, Dec. 28, 2009, DOCKET339A.PDF, 5 pages.
Robert M. Parker, Notice of Appearance of Robert M. Parker, Dec. 29, 2009, DOCKET340A.PDF, 2 pages.
Jan Lockhart, *Function Media LLC* v. *Google, Inc, et al*—Jury Trial Day Six minutes, Jan. 26, 2010, DOCKET424A.PDF, 3 pages.
Susan Simmons, CSR, *Function Media LLC* v. *Google, Inc.*—Transcript of Voir Dire Proceedings, Jan. 4, 2010, FUNCTION_MEDIA_VD.pdf, 102 pages.
John C. Phillips, Request for Inter Partes Reexamination, Jul. 7, 2008, 488 pages, 20080707 Request for Reexam—045.pdf.
USPTO, Inter Partes Reexamination Communication, Sep. 25, 2008, 218 pages, 20080925 95-001061 ('045) Office Action.pdf.
Michael F. Heim, Office Action Response, Dec. 23, 2008, 57 pages, 20081223 Office Action Response.pdf.
John C. Phillips, Requestor's Comments Subsequent to Patent Owner's Response, Jan. 22, 2009, 49 pages. 20090122 Third Party Requestor's Comments re FM OAR.pdf.
Michael F. Heim, Joint Claim Construction & Prehearing Statement, Feb. 13, 2009, 37 pages, 20090213 '045 IDS (1-30-09 Jt CC & Prehearing Stmt).pdf.
Jason W. Wolff, Defendants Google and Yahoo's Joint Preliminary Claim Construction and Preliminary Identification of Extrinsic Evidence, Dec. 19, 2008, 21 pages, 20090213 IDS Defs' Prelim Claim Construction-Evidence per PR 4-2.pdf.

Max L. Tribble, Jr, Plaintiff's Preliminary Claim Construction and Preliminary Identification of Extrinsic Evidence, Dec. 19, 2008, 48 pages, 20090213 IDS FM Prelim Claim Constructions-Evidence per PR 4-2.pdf.
Thomas B. Walsh & Max L. Tribble, Jr, Joint Claim Construction and Prehearing Statement, Jan. 30, 2009, 4 pages, 20090213 IDS PACER 73 Jt Claim Construction & Prehearing Statement (LR 4-3).pdfs.
Exhibit A Parties' Agreed Construction, Jan. 30, 2009, 3 pages, 20090213 IDS Pacer 73 Jt Claim Construction & Prehearing Statement (LR 4-3)-Ex 1.pdf.
Exhibit B Parties' Proposed Constructions & Support, Jan. 30, 2009, 26 pages, 20090213 IDS PACER 73 Jt Claim Construction & Prehearing Statement (LR 4-3)-Ex 2.pdf.
Max L. Tribble, Jr., Plaintiff's Reply to Defendant Google Inc's, Markman Brief, Jun. 11, 2009, 32 pages, 20090814 IDS PACER 110 FM's Reply to Google's Markman Brief.pdf.
Max L. Tribble, Jr., Plaintiff's Opening Claim Construction Brief, Apr. 9, 2009, 50 pages, 20090814 IDS PACER 82 FM's Opening Claim Construction Brief.pdf.
Michael F. Heim, Supplemental Information Disclosure Statement, Sep. 17, 2009, 4 pages, 20090917 '045 Supplemental IDS.pdf.
Function Media Claim Construction Presentation, Aug. 25, 2009, 151 pages, 20090917 Supplemental IDS Function Media CCH presentation4 5.pdf.
Roy M Jenevein, Ph.D., Declaration of Roy M Jenevein, Ph.D. Regarding Claim Construction, Feb. 27, 2009, 21 pages, 20090917 Supplemental IDS Jenevein Dec.pdf.
Roy M Jenevein, Ph.D., Exhibit A, Feb. 27, 2009, 11 pages, 20090917 Supplemental IDS Jenevein Exhibit A—CV.pdf.
Exhibit B Parties' Proposed Construction and Support, Sep. 17, 2009, 24 pages, 20090917 Supplemental IDS Jenevein Exhibit B—CC.pdf.
Gene Kincaid, Expert Report of Gene Kinkaid Regarding Claim Construction, Feb. 27, 2009, 75 pages, 20090917 Supplemental IDS Kincaid Expert Report (Yahoo).pdf.
Gene Kincaid, Exhibit B, Feb. 27, 2009, 2 pages, 20090917 Supplemental IDS Kincaid Expert Report (Yahoo)-Ex B.pdf.
John C. Phillips, Notice of Concurrent Proceeding Under 37 CFR 1.565 (MPEP 2282), Oct. 25, 2009, 25 pages, 20091015 Requestor's Ntc of Concurrent Proceedings.pdf.
USPTO, Transmittal of Communication to Third Party Requester Inter Partes Reexamination, Nov. 6, 2009, 211 pages, 20091106 Office Action.pdf.
Michael F. Heim, Response, Jan. 14, 2010, 80 pages, 20100114 '045 Office Action Response & Ex A.pdf.
Michael F. Heim, Petition for Revival of Reexamination Prosecution Under 37 C.F.R., Jan. 20, 2010, 9 pages, 20100120 Petition to Revive, Statement and Cert of Service.pdf.
USPTO, Transmittal of Communication to Third Party Requester Inter Partes Reexamination, Jun. 11, 2010, 211 pages, 20100611 RAN.pdf.
John C. Phillips, Certificate of Service, Jul. 12, 2010, 1 page, 20100712 NoticeofAppeal COS.pdf.
Michael F. Heim, Notice of Appeal from the Primary Examiner to the Board of Appeals, Jul. 12, 2010, 1 page, 20100712 NoticeofAppeal.pdf.
Patent Owner's Appeal Brief, Sep. 13, 2010, 66 pages, 20100913 045 Appeal_Brief.pdf.
Natasha Baudoin, Certificate of Service, Sep. 13, 2010, 1 page, 20100913 045 Appeal_Brief_COS.pdf.
John C. Phillips, Requester's Respondent Brief, Oct. 13, 2010, 27 pages, 20101013 Requesters Respondent Brief.pdf.
045 File History, Sep. 3, 2002, 47 pages, App B—045 File History.pdf.
Andrew Schulz, Declaration of Andrew Schulz, Jul. 3, 2008, 1 page, App E3—Schulz Declaration.pdf.
USPTO, Examiner's Answer to Appeal Brief, Jan. 31, 2011, pp. 3 20110131_Examiners_Answer_045.pdf.
USPTO, Examiner's Answer to Appeal Brief, Apr. 12, 2011, pp.-3 20110412_Examiners_Answer_045.pdf.
John C. Phillips, Request for Inter Partes Reexamination, Jul. 21, 2008, 715 pages, 20080721 Request for Reexam for '059.pdf.
USPTO, Inter Partes Reexamination Communication, Oct. 17, 2008, 286 pages, 20081017 Reexam Ordered & Office Action—'059.pdf.

Michael F. Heim, Remarks, Jan. 21, 2009, 61 pages, 20090121 '059 OAR.pdf.
Henry Croskell, Request for Reconsideration, Sep. 5, 2006, 25 pages, 20090121 '059 OAR-Ex 1.pdf.
USPTO, Notice of Allowance and Fee(s) Due, Jul. 13, 2007, 10 pages, 20090121 '059 OAR-Ex 2.pdf.
Exhibit 3, Jan. 21, 2009, 1 page, 20090121 '059 OAR-Ex 3.pdf.
Michael F. Heim, Information Disclosure Statements by Applicant, Feb. 13, 2009, 106 pages, 059 IDS.pdf.
Jason W. Wolff, Defendants Google and Yahoo!'s Joint Preliminary Claim Construction and Identification of Extrincis Evidence, Dec. 19, 2008, 21 pages, 20090213 IDS Defs' Prelim Claim Construction-Evidence per PR 4-2.pdf.
Max L. Tribble, Jr, Plaintiff's Preliminary Claim Constructions and Preliminary Identification of Extrinsic Evidence, Dec. 19, 2008, 48 pages, 20090213 IDS FM Prelim Claim Constructions-Evidence per PR 4-2.pdf.
Thomas B. Walsh & Max L. Tribble, Jr, Joint Claim Construction and Prehearing Statement, Jan. 30, 2009, 4 pages, 20090213 IDS PACER 73 Jt Claim Construction & Prehearing Statement (LR 4-3).pdf.
John C. Phillips, Requestor's Comments Subsequent to Patent Owner's Response, Feb. 19, 2009, 45 pages, 20090220 Requestor's Comments on the '059 Reexam.pdf.
Michael F. Heim, Information Disclosure Statement by Applicant, Aug. 14, 2009, 5 pages, 20090814 IDS (claim construction briefs).pdf.
Carrie J. Anderson, Certificate of Service, Aug. 14, 2009, 1 page, 20090814 IDS Certificate of Service.pdf.
Max L. Tribble, Jr, Plaintiff's Reply to Google, Inc.'s Markman Brief, Jun. 11, 2009, 32 pages, 20090814 IDS PACER 110 FM's Reply to Google's Markman Brief.pdf.
Max L. Tribble, Jr, Plaintiff's Opening Claim Construction Brief, Apr. 9, 2009, 50 pages, 20090814 IDS PACER 82 FM's Opening Claim Construction Brief.pdf.
Juanita R. Brooks, Google Inc.'s Markman Brief, May 15, 2009, 52 pages, 20090814 IDS PACER 98 Google's Markman Brief.pdf.
Roy M. Jenevein, Ph.D., Declaration of Roy M. Jenevein, Ph.D. Regarding Claim Construction, Feb. 27, 2009, 21 pages, 20090917 Supplemental IDS Jenevein Dec.pdf.
Roy M. Jenevein, Ph.D., Exhibit A, Feb. 27, 2009, 11 pages, 20090917 Supplemental IDS Jenevein Exhibit A—CV.pdf.
USPTO, Transmittal of Communication to Third Party Requester Inter Partes Reexamination, Mar. 18, 2010, 285 pages, 20100318 95-001069 non-final OA.pdf.
Amber L Branum, Certificate of Service, Jun. 18, 2010, 1 page, 20100618 Response to 2nd OA COS.pdf.
Michael F. Heim, Response, Jun. 18, 2010, 56 pages, 20100618 Response to 2nd OA.pdf.
John C. Phillips, Requester's Comments Under 37 C.F.R.1.947, Jul. 19, 2010, 41 pages, 20100719 Requester's Comments for 95001069.pdf.
USPTO, Transmittal of Communication to Third Party Requester Inter Partes Reexamination, Oct. 15, 2010, 190 pages, 20101015 Action Closing Prosecution.pdf.
Michael F. Heim, Remarks, Nov. 23, 2010, 40 pages, 20101112 Patent Owners Comments After Closing Prosecution.pdf.
File History for U.S. Appl. No. 10/193,465 (059), Apr. 13, 2007, 108 pages, AppendixB.pdf.
James C. Mason, Business Wire Press Release, Oct. 4, 1999, 2 pages, AppendixG.pdf.
AdManagerPro Administrator's Manual—(dated Jun. 1998), Jun. 30, 1998, 226 pages, AppendixH.pdf.
USPTO, Right of Appeal Notice, Dec. 22, 2010, pp. 195 20101222_Right_of_Appeal_Notice_059.pdf.
Michael F. Heim, Notice of Appeal Notice, Jan. 21, 2011, pp. 4 20110121_Notice_of_Appeal_059.pdf.
Michael F. Heim, Patent Owner's Appeal Brief, Mar. 18, 2011, pp. 75 20110318_APPEAL_BRIEF_059.pdf.
John C. Phillips, Requester's Respondent Brief, Apr. 18, 2011, pp. 27 20110418_Requesters_Response_Brief_059.pdf.
USPTO, Examiner's Answer to Appeal Brief, Apr. 26, 2011, pp. 3 20110426_Examiners_Answer_059.pdf.
John C. Phillips, Requester's Respondent Brief Under 37 CFR 41.68, Dec. 20, 2010, pp. 23 20101220_Requesters_Respondent_Brief_to _Appeal_Brief_025.pdf.
USPTO, Examiner's Answer to Appeal Brief, Jan. 31, 2011, pp. 3 20110131_Examiners_Answer_025.pdf.
USPTO, Examiner's Answer to Appeal Brief, Apr. 13, 2011, pp. 3 20110413_Examiners_Answer_025.pdf.
Civil Docket No. 2:07-CV-279, *Function Media LLC* vs *Google, Inc.*—Transcript of Jury Trial—(Verdict), Jan. 26, 2010, 12610_Verdict.pdf, 8 pages.
Max L. Tribble, RJ., Claim Construction Brief filed by Function Media LLC, Apr. 9, 2009, DOCKET082A.PDF, 632 pages.
Max L. Tribble, Jr et al, Stipulation of Dismissal, May 18, 2009, DOCKET102.PDF, 7 pages.
Max L. Tribble, Jr, Plaintiff's Reply to Defendant Google Inc.'s Markman Brief, Jun. 11, 2009, DOCKET110.PDF, 32 pages.
Charles K. Verhoeven Notice of Supplemental Authority for Google's Markman Brief, Aug. 10, 2009, DOCKET143.PDF, 31 pages.
Charles Everingham IV, *Function Media LLC* vs *Google, Inc & Yahoo!, Inc.*—Memorandum Opinion and Order Oct. 9, 2009, DOCKET218.PDF, 25 pages.
Civil Docket No. 2:07-CV-279-CE, *Function Media LLC* vs *Google, Inc.*—Motions Hearing (Jan. 12, 2010, 1:30 p.m.), Jan. 14, 2010, DOCKET376.pdf, 68 pages.
Civil Docket 2:07-CV-279 (CE), *Function Media LLC* vs *Google Inc.*—Motion Hearing Minutes (Aug. 19, 2010), Aug. 19, 2010, DOCKET481.pdf, 6 pages.
Peckover, Douglas L, U.S. Patent # 6119101, Sep. 12, 2000, Docket_100-3.pdf, 75 pages.
Brown, et al, U.S. Patent # 6026368, Feb. 15, 2000, Docket_101-8.pdf, 27 pages.
Michael F. Heim, U.S. Appl. No. 95/001,061—Response to 1st Office Action, Dec. 23, 2008, Docket_98-4.pdf, 88 pages.
Michael F. Heim, U.S. Appl. No. 95/001,069—Response to 1st Office Action, Jan. 21, 2009, Docket_98-6.pdf, 97 pages.
Additional Attachments to Document #98, May 15, 2009, Docket_99.pdf, 1 page.
Mason, et al, U.S. Patent #6401075, Jun. 4, 2002, Docket_99-5.pdf, 7 pages.
Reexam Appendix A & B—U.S. Patent # 7240025, Jul. 30, 2008, 2008-07-30-Reexam_Appendix_A_and_B.pdf, 349 pages.
Reexam Appendix C & D Adforce User Guide, Jul. 30, 2008, 2008-07-30_Reexam_Appendix_C_and_D.pdf, 337 pages.
Reexam Appendix E-1 and E-2 and E-3—Campaign Manager, Jul. 30, 2008, 2008-07-30-Reexam_Appendix_E1_and_E2_and_E3.pdf, 53 pages.
Reexam Appendix F and G—aaddzz, Jul. 30, 2008, 2008-07-3_Reexam_Appendix_F_and_G.pdf, 104 pages.
Reexam Appendix H and I—AdManager Pro Administrator's Manual, Jul. 30, 2008, 2008-07-30_Reexam_Appendix_H_and_I.pdf, 255 pages.
Zeff / Aronson, Reexam Appendix J11—Advertising on the Internet 1998—to Chapter 6, Jul. 30, 2008, 2008-07-30_Reexam_Appendix_J11.pdf, 150 pages.
Zeff / Aronson, Reexam Appendix J12—Advertising on the Internet 1998—Chapter 7—End, Jul. 30, 2008, 2008-07-30_Reexam_Appendix_J12.pdf, 151 pages.
Zeff / Aronson, Reexam Appendix J21—Advertising on the Internet 1999—to Chapter 4, 2008-07-30_Reexam_Appendix_J21.pdf, 130 pages.
Zeff / Aronson, Reexam Appendix J22—Advertising on the Internet 1999—Chapter 4-10, 2008-07-30_Reexam_Appendix_J22.pdf, 130 pages.
Zeff / Aronson, Reexam Appendix J23—Advertising on the Internet 1999—Chapter 10—End, 2008-07-30_Reexam_Appendix_J23.pdf, 180 pages.
Reexam Appendix Other A1—U.S. Patent # 7,240,025, Jul. 30, 2008, 2008-07-30_Reexam_Appendix_OtherA1.pdf, 115 pages.
Reexam Appendix Other A2—U.S. Patent # 7,240,025, 2008-07-30_Reexam_Appendix_OtherA2.pdf, 86 pages.
Reexam Appendix Other A3—U.S. Patent # 7,240,025, 2008-07-30_Reexam_Appendix_OtherA3.pdf, 122 pages.

Reexam Appendix Other A4—U.S. Patent # 7,240,025, 2008-07-30_Reexam_Appendix_OtherA4.pdf, 106 pages.
Reexam Appendix Other A5—U.S. Patent # 7,240,025, 2008-07-30_Reexam_Appendix_OtherA5.pdf, 78 pages.
Reexam Appendix Other A6—U.S. Patent # 7,240,025, 2008-07-30_Reexam_Appendix_OtherA6.pdf, 35 pages.
John C. Phillips, Request for Reexam—U.S. Patent # 7,240,025, 2008-07-30_Request_For_Reexam_025.pdf, 1612 pages.
John C. Phillips, Requestor's Comments Subsequent to Patent Owner's Response—U.S. Patent # 7,240,025, Jul. 30, 2008, Control_No_95001073_025_Reexam.pdf, 853 pages.
John C. Phillips, Request for Inter Partes Reexamination—U.S. Patent # 6,446,045, 2008-07-67_045_Re-Exam_Request.pdf, 488 pages.
Reexam Appendix A—U.S. Patent # 6,446,045, Sep. 3, 2002, 2008-07-07_App_A-6446045.pdf, 68 pages.
Reexam Appendix B—File History—U.S. Patent #6,446,045, 2008-07-07_App_B-045_File_History.pdf, 47 pages.
Adforce, Inc. Reexam Appendix C—U.S. Patent # 6,446,045—AdForce User Guide, 2008-07-07_App_C-AdForce.pdf, 285 pages.
Del Sesto, Reexam Appendix D—U.S. Patent # 6,446,045—Del Sesto, 2008-07-07_App_D-Del Sesto.pdf, 50 pages.
Adknowledge, Reexam Appendix E1—U.S. Patent # 6,446,045—Campaign Manager Reviewer Guide, 2008-07-07_App_E1-CM-Reviewer_Guide.pdf, 23 pages.
Adknowledge, Reexam Appendix E2—U.S. Patent # 6,446,045—Campaign Manager Reviewer Guide (cont), 2008-07-07_App_E2-MP_Reviewer_Guide.pdf, 26 pages.
Andrew Schulz, Reexam Appendix E3—U.S. Patent # 6,446,045—Schulz Declaration, 2008-07-07_App_E3-Schulz_Declaration.pdf, 1 page.
Aaddzz, Reexam Appendix F1—U.S. Patent # 6,446,045—Aaddzz Brochure, 2008-07-67_App_F1-Aaddzz_Brochure.pdf, 6 pages.
Aaddzz, Reexam Appendix F2—U.S. Patent # 6,446,045—Aaddzz Website, 2008-07-07_App_F2-Aaddzz_website.pdf, 42 pages.
Ad-Star, Reexam Appendix G—U.S. Patent # 6,446,045—About Ad-Star, 2008-07-07_App_G-AdStar.pdf, 43 pages.
Zeff / Aronson, Reexam Appendix H1—U.S. Patent # 6,446,045—Advertising on the Internet 1997, 2008-07-07_App_H1-Zeff97.pdf, 305 pages.
Zeff / Aronson, Reexam Appendix H2—U.S. Patent # 6,446,045—Advertising on the Internet 1999, 2008-07-07_App_H2-Zeff99.pdf, 444 pages.
Reexam Appendix Other A—U.S. Patent # 6,446,045—Patent Owner Infringement Contentions, 2008-07-07_OTHER_A-Patent_Owner_Infringement_Contentions.pdf, 77 pages.
Michael F. Heim, Reexam—U.S. Patent #6,446,045—Response, Jul. 7, 2008, 2008-12-12_045_Re-Exam_Response.pdf, 88 pages.
Michael F. Heim, Reexam—U.S. Patent #6,446,045, Feb. 13, 2009, Control_No_95001061_045_Reexam.pdf, 1166 pages.
Reexam Appendix A—U.S. Patent # 7,249,059, Jul. 21, 2008, Reexam_Appendix_A-U.S._Patent_#6446045, 103 pages.
Reexam Appendix B—U.S. Patent # 7,249,059—File History, 2008-07-21_AppendixB.pdf, 108 pages.
Reexam Appendix C—U.S. Patent # 7,249,059—Mason, Jun. 4, 2002, 2008-07-21_AppendixC.pdf, 7 pages.
Adforce, Inc, Reexam Appendix D—U.S. Patent # 7,249,059—AdForce User Guide, 2008-07-21_AppendixD.pdf, 285 pages.
Aaddzz, Reexam Appendix E—U.S. Patent # 7,249,059—aaddzz Brochure, 2008-07-21_AppendixE.pdf, 6 pages.
Reexam Appendix F—U.S. Patent # 7,249,059—Brown, Feb. 15, 2000, 2008-07-21-AppendixF.pdf, 27 pages.
Global Network, Inc, Reexam Appendix G—U.S. Patent # 7,249,059—Global Network Press Release, Oct. 4, 1999, 2008-07-21_AppendixG.pdf, 2 pages.
Admanager, Reexam Appendix H—U.S. Patent # 7,249,059—AdManager Pro Administrator's Manual, 2008-07-21-AppendixH.pdf, 226 pages.
Zeff / Aronson, Reexam Appendix I11—U.S. Patent # 7,249,059—Advertising on the Internet 1999—to Chapter 4, 2008-07-21_AppendixI11.pdf, 130 pages.
Zeff / Aronson, Reexam Appendix I12—U.S. Patent # 7,249,059—Advertising on the Internet 1999—Chapter 4-10, 2008-07-21_AppendixI12.pdf, 130 pages.
Zeff / Aronson, Reexam Appendix I12—U.S. Patent # 7,249,059—Advertising on the Internet 1999—Chapter 10—end, 2008-07-21_AppendixI13.pdf, 180 pages.
Reexam Appendix Other A—U.S. Patent # 7,249,059, 2008-07-21_AppendixOtherA1.pdf, 85 pages.
Reexam Appendix Other A2—U.S. Patent # 7,249,059, 2008-07-21_AppendixOtherA2.pdf, 51 pages.
John C. Phillips, Request for Reexam—U.S. Patent # 7,249,059, 2008-07-21_RequestForReexam.pdf, 715 pages.
Michael F. Heim, Reexam Response—U.S. Patent # 7,249,059, Jul. 21, 2008, 2009-01-21_059_Re-Exam_Response.pdf, 97 pages.
John C. Phillips, Reexam Response—U.S. Patent # 7,249,059—Requestor Comments, Feb. 19, 2009, 2009-02-20_059_Requestor_Comments.pdf, 45 pages.
Reexam Response—U.S. Patent # 7,249,059—File History, Feb. 13, 2009, Control_No_95001069_059_Reexam.pdf, 1350 pages.
Max L. Tribble, Jr, Plaintiff's Reply to Defendant Google Inc.'s Markman Brief, Jun. 11, 2009, DOCKET110.PDF, 32 pages.
Civil Docket No. 2:07-CV-279-CE, *Function Media LLC* vs *Google, Inc.*—Motions Hearing, (Jan. 12, 2010, 1:30 p.m.), Jan. 14, 2010, DOCKET376.pdf, 68 pages.
Civil Docket 2:07-CV-279 (CE), *Function Media LLC* vs *Google Inc.*—Motion Hearing Minutes, Aug. 19, 2010, DOCKET481.pdf, 6 pages.
U.S. Patent and Trademark Office—Issue Notification—# 7,249,059, Jul. 24, 2007, Docket_100-1.pdf, 564 pages.
Sparks, et el, U.S. Patent # 6,167,382, Dec. 26, 2000, Docket_100-2.pdf, 57 pages.
Peckover, Douglas L, U.S. Patent # 6,119,101, Sep. 12, 2000, Docket_100-3.pdf, 75 pages.
U.S. Patent and Trademark Office—Notice of Inter Partes Reexamination # 6,446,045, May 15, 2009, Docket_166-4.pdf, 342 pages.
Mandeberg, et al, U.S. Patent # 6,038,545, Mar. 14, 2000, Docket_100-5.pdf, 24 pages.
Stone, et al, Prosecution History of U.S. Patent #7,240,025, Jul. 3, 2007, Docket_101-1.pdf, 444 pages.
Rosser, et al, U.S. Patent #5,543,856, Aug. 6, 1996, Docket_101-2.pdf, 10 pages.
Del Sesto, U.S. Patent # 6,985,882, Jan. 10, 2006, Docket_101-7.pdf, 50 pages.
Brown, et al, U.S. Patent # 6,026,368, Feb. 15, 2000, Docket_101-8.pdf, 27 pages.
Michael F. Heim, Re-examination Control No. 95/001,069—Response to 1st Office Action, Jan. 21, 2009, Docket_98-6.pdf, 97 pages.
Deposition Transcript of Michael Dean, Apr. 16, 2009, Docket_98-.7.pdf, 8 pages.
Prosecution History of U.S. Patent # 6,829,587, Aug. 3, 2006, Docket_99-3.pdf, 400 pages.
Mason, et al, U.S. Patent # 6,401,075, Jun. 4, 2002, Docket_99-5.pdf, 7 pages.
Charles Eric Hunter, U.S. Patent # 6,430,603, Aug. 6, 2002, Docket_99-6.pdf, 11 pages.
Reexam Appendix A & B—U.S. Patent # 7,240,025, 2008-07-30-Reexam_Appendix_A_and_B.pdf, 349 pages.
Reexam Appendix C & D Adforce User Guide, 2008-07-30_Reexam_Appendix_C_and_D.pdf, 337 pages.
Reexam Appendix E-1 and E-2 and E-3—Campaign Manager, 2008-07-30-Reexam_Appendix_E1_and_E2_and_E3.pdf, 53 pages.
Reexam Appendix F and G—aaddzz, 2008-07-30_Reexam_Appendix_F_and_G.pdf, 104 pages.
Reexam Appendix H and I—AdManager Pro Administrator's Manual, 2008-07-30_Reexam_Appendix_H_and_I.pdf, 255 pages.
Zeff / Aronson, Reexam Appendix J11—Advertising on the Internet 1998—to Chapter 6, 2008-07-30_Reexam_Appendix_J11.pdf, 150 pages.
Zeff / Aronson, Reexam Appendix J12—Advertising on the Internet 1998—Chapter 7—End, 2008-07-30_Reexam_Appendix_J12.pdf, 151 pages.

Zeff / Aronson. Reexam Appendix J23—Advertising on the Internet 1999—Chapter 10—End, 2008-07-30_Reexam_Appendix_J23.pd, 180 pages.
Reexam Appendix Other A1—U.S. Patent # 7240025, 2008-07-30_Reexam_Appendix_OtherA1.pdf, 115 pages.
Reexam Appendix Other A2—U.S. Patent # 7240025, 2008-07-30_Reexam_Appendix_OtherA2.pdf, 86 pages.
Reexam Appendix Other A3—U.S. Patent # 7240025, 2008-07-30_Reexam_Appendix_OtherA3.pdf, 122 pages.
Reexam Appendix Other A4—U.S. Patent # 7240025, 2008-07-30_Reexam_Appendix_OtherA4.pdf, 106 pages.
Reexam Appendix Other A5—U.S. Patent # 7240025, 2008-07-30_Reexam_Appendix_OtherA5.pdf, 78 pages.
Reexam Appendix Other A6—U.S. Patent # 7240025, 2008-07-30_Reexam_Appendix_OtherA6.pdf, 35 pages.
John C. Phillips, Request for Reexam—U.S. Patent # 7240025, 2008-07-30_Request_For_Reexam_025.pdf, 1612 pages.
John C. Phillips, Requestor's Comments Subsequent to Patent Owner's Response—U.S. Patent # 7240025, Jul. 30, 2008, Control_No_95001073_025_Reexam.pdf, 853 pages.
John C. Phillips, Request for Inter Partes Reexamination—U.S. Patent # 6,446,045, 2008-07-07_045_Re-Exam_Request.pdf, 488 pages.
Reexam Apperax B—File History—U.S. Patent #6,446,045, 2008-07-07_App_B-045_File_History.pdf, 47 pages.
Adknowledge Reexam Appendix E2—U.S. Patent # 6,446,045—Campaign Manager Reviewer Guide (cont), 2008-07-07_App_E2-MP_Reviewer_Guide.pdf, 26 pages.
Aaddzz, Reexam Appendix F1—U.S. Patent # 6,446,045—Aaddzz Brochure, 2008-07-07_App_F1-Aaddzz_Brochure.pdf, 6 pages.
Reexam Appendix, Other A—U.S. Patent # 6,446,045—Patent Owner Infringement Contentions, 2008-07-07_OTHER_A-Patent_Owner_Infringement_Contentions.pdf, 77 pages.
Reexam Appendix A—U.S. Patent # 7,249,059, Jul. 21, 2008, Reexam_Appendix_A-U.S._Patent#6446045, 103 pages.
Zeff / Aronson, Reexam Appendix 112—U.S. Patent # 7,249,059—Advertising on the Internet 1999—Chapter 10—end, 2008-07-21_AppendixI13.pdf, 180 pages.
Function Media LLC, Patent Owner's Appeal Brief, Jun. 7, 2011, 44 Pages.
Google, Inc, Requester's Respondent Brief, Jul. 7, 2011, 28 Pages.
Michael F. Heim, Notice of Court Judgment in Concurrent Proceedings Under 37 CFR 1.985 (6,829,587), Sep. 15, 2011, 6 Pages.
Decision on Appeal 2011-010719, Examiner Affirmed-587, USPTO, Jan. 27, 2012, pp. 34.
"Guidelines for Creating and Submitting Creatives," TechDoc, Defendant's Exhibit 405 2:007-CV-279(CE), G008119, Jan. 8, 1999, 15 pages.
AdForce, GeoCities and AdForce Counting—A Case Study—5922, Jan. 4, 1999, pp. 16.
AdForce, How to Deliver Multiple Ads Per Page, Jan. 12, 1999, pp. 3.
AdForce, Multiple Ads Per Page TechDoc, Jan. 12, 1999, pp. 1.
AdForce, How AdForce Counts—5982, Dec. 29, 1998, pp. 8
AdForce, Data Export, Feb. 10, 1999, pp. 5.
AdForce, Data Export TechDoc—6016, Feb. 9, 1999, pp. 1.
AdForce, How AdForce Counts—6053, Feb. 6, 1999, pp. 9.
AdForce, How AdForce Counts TechDoc, Feb. 5, 1999, pp. 1.
AdForce / Mark Scheele, Chapter 2: Accounting, May 12, 1998, pp. 4.
AdForce /Joe Manna, Chapter 10: SCS System, May 12, 1998, pp. 11.
AdForce, Chapter 13: Troubleshooting, May 12, 1998, pp. 3.
AdForce, Chapter 4: Ad Secure, May 12, 1998, pp. 4.
AdForce / Mark Scheele, Chapter 7: Event Services, May 12, 1998, pp. 5.
AdForce / Roy Lu, Chapter 5: Client, May 12, 1998, pp. 4.
AdForce, Chapter 6: Databases, May 12, 1998, pp. 4.
AdForce / Greg Meinke, Chapter 8: IMS, May 12, 1998, pp. 19.
AdForce, Chapter 3: Ad Delivery, May 12, 1998, pp. 31.
AdForce, Chapter 12: Shared Libraries/Utilities/Miscellaneous, May 12, 1998, pp. 18.
AdForce / Martin Trieu, Chapter 11: DQS, May 12, 1998, pp. 11.
AdForce, Section Contents 9.0 Reporting, May 12, 1998, pp. 14.

AdForce, Cookie Push Prevention, Sep. 14, 1998, pp. 2.
AdForce, Cookie Push Prevention TechDoc, May 11, 1998, pp. 1.
AdForce, Guidelines for Creating and Submitting Creatives TechDoc—6197, Sep. 14, 1998, pp. 1.
AdForce, Client/AdForce Network Connectivity Specifications TechDoc—6198, Sep. 15, 1998, pp. 5.
AdForce, Client/AdForce Network Connectivity Specifications TechDoc—6203, Sep. 15, 1998, pp. 1.
AdForce, Client/AdForce Network Connectivity Specifications—6204, Sep. 17, 1998, pp. 4.
AdForce, Client/AdForce Network Connectivity Specifications TechDoc—6212, Sep. 11, 1998, pp. 1.
AdForce, Guidelines for Creating and Submitting Creatives TechDoc—6213, Oct. 30, 1998, pp. 1.
AdForce, Guidelines for Creating and Submitting Creatives—6214, Nov. 3, 1998, pp. 7.
AdForce, Inc, How to Download and Install AdForce, Nov. 20, 1998, pp. 3.
AdForce, Browsers and AdForce Web Tags TechDoc, Nov. 4, 1998, pp. 1.
AdForce, AdForce Web Tags and Browsers—6227, Dec. 16, 1998, pp. 5.
AdForce, Cache Prevention Techniques, Dec. 28, 1998, pp. 8.
AdForce / David Kopp, Replication Wizard Upgrade (A023), Sep. 12, 1998, pp. 2.
AdForce / David Kopp, Banner Rotation by Weight (A011), Sep. 8, 1998, pp. 4.
AdForce / David Kopp, Multiple Link URLs per Banner for Agency Buys (A012), Sep. 10, 1998, pp. 3.
AdForce / David Kopp, Changing Default Banners through the Client (A013), Sep. 10, 1998, pp. 4.
AdForce / David Kopp, Replication Process Checking (A015), Sep. 12, 1998, pp. 2.
AdForce / David Kopp, Client Login Tracking Enhancements—Loading of Errlogs (A017), Sep. 12, 1998, pp. 2.
AdForce / David Kopp, Default Alert Tool (A019), Sep. 10, 1998, pp. 4.
IMGIS, DataForce (D001-001), May 27, 2008, pp. 6.
AdForce / David Kopp, JavaScript Ad Request API (A016)—6271, Oct. 6, 1998, pp. 6.
AdForce / David Kopp, Redirecting to Ourselves (A037), Oct. 12, 1998, pp. 5.
AdForce, Guidelines for Creating and Submitting Creatives—6313, Sep. 17, 1998, pp. 8.
AdForce, Campaign Summary Report for Phil's Games, Feb. 4, 1999, pp. 1.
AdForce, Campaign Summary for Clangin' Keyboards!—6535, Oct. 6, 1998, pp. 1.
AdForce, Section Contents Welcome to AdForce!, Aug. 4, 1998, pp. 8.
AdForce, AdForce User Guide, Version 2.6, Oct. 12, 1998, pp. 1.
AdForce, AdForce 3.0 issues from Documentation, Feb. 12, 1999, pp. 7.
AdForce, AdForce 3.0 issues from Documentation . . . Log In/Login vs. Log On/Logon, Feb. 25, 1999, pp. 2.
Kinko's FTP Job Ticket, Oct. 16, 1998, pp. 1.
Kinko's FTP Job Ticket, Jul. 6, 1998, pp. 1.
AdForce, AdForce User Guide, Version 2.6—6616, Oct. 12, 1998, pp. 1.
AdForce, AdForce makes no statements or warranties . . . , Oct. 15, 1998, pp. 2.
AdForce, AdForce User Guide, Version 2.—7431, Oct. 17, 1998, pp. 282.
Kinko's FTP Job Ticket, Oct. 17, 1998, pp. 1.
AdForce, Section Contents Backup Procedures, Aug. 27, 1998, pp. 5.
AdForce, Customer Care Package—8023, Aug. 4, 1998, pp. 13.
Request for Custom Report, Aug. 24, 1998, pp. 1.
AdForce, New Hire Package, Sep. 11, 1998, pp. 9.
Customer Care Package—Section Contents—8050, Sep. 11, 1998, pp. 14.
Customer Care Package—Section Contents—8064, Sep. 11, 1998, pp. 13.

AdForce, Guidelines for Creating and Submitting Creatives TechDoc—8100, Jan. 8, 1999, pp. 16.
AdForce, Guidelines for Creating and Submitting Creatives—8119, Jan. 8, 1999, pp. 15.
AdForce, Client Services Tools—8142, Sep. 18, 1999, pp. 3.
AdForce, HTTP Interface Guidelines, Mar. 13, 1998, pp. 3.
AdForce/Ryan Steelberg, AdForce Beacons—Site Tracking, Mar. 24, 1998, pp. 8.
AdForce / Florian Kahlert, Advanced Buy Types, Nov. 18, 1997, pp. 4.
IMGIS Engineering Operations, 0.0 Backup Procedures, Feb. 26, 1998, pp. 4.
AdForce / Chad Steelberg, Campaign Delivery Prioritization Functional Requirements, Feb. 7, 1998, pp. 4.
AdForce/ Ryan Steelberg, Campaign Management Functional Requirements, Feb. 5, 1998, pp. 3.
AdForce / Florian Kahlert, Campaign Review Functional Requirements, Aug. 27, 1997, pp. 4.
AdForce / Florian Kahlert, Campaign Information Separation Functional Requirements, Dec. 8, 1997, pp. 4.
AdForce / David Kopp, Client GUI Organization, Feb. 27, 1998, pp. 15.
Configuration Management, Jan. 26, 1998, pp. 11.
AdForce / David Kopp, Consumer Cookie Control Functional Requirements, Aug. 19, 1997, pp. 6.
Daemon Initialization Script, Feb. 9, 1998, pp. 4.
AdForce, Repercussions of Declining Advertisements,Jun. 4, 1997, pp. 3.
AdForce / David Kopp, Domain Name Targeting Functional Requirements, Sep. 2, 1997, pp. 4.
AdForce / Ryan Steelberg, Dynamic Content Units Functional Requirements, Apr. 21, 1998, pp. 5.
AdForce, Client/IMGIS Network Connectivity Specifications—8305, Dec. 1, 1997, pp. 3.
IMGIS, Inc. / David Glassman, IMGIS QA Department Strategy, Jun. 20, 1997, pp. 3.
AdForce / David Kopp, Keyword Targeting Functional Requirements, Sep. 2, 1997, pp. 6.
AdForce / Ryan Steelberg, Campaign Wizard Update: AdForce Advertiser Clients, Apr. 2, 1998, pp. 7.
AdForce / David Kopp & Florian Kahlert, Passwords Functional Requirements, Sep. 8, 1997, pp. 2.
AdForce / Ryan Steelberg, Browser Plug-In Targeting & Tracking Functional Requirements, Mar. 24, 1998, pp. 2.
AdForce / David Kopp, Promotional Buys Functional Requirements, Sep. 8, 1997, pp. 3.
AdForce / Ryan Steelberg, Redirect Mapping, Mar. 24, 1998, pp. 4.
AdForce / Ryan Steelberg, Push Throughs, Campaign Replications, Content Unit Replications and Exclusive Buys Feb. 5, 1998, pp. 4.
AdForce / Ryan Steelberg, Reporting Enhancements to User Interface Functional Requirements, Feb. 5, 1998, pp. 2.
AdForce / Florian Kahlert, Report Layout Enhancements Functional Requirements, Mar. 24, 1998, pp. 6.
AdForce / David Kopp, Site Data Targeting Functional Requirements, Sep. 8, 1997, pp. 8.
AdForce / Florian Kahlert, Toggle for End of Campaign, Oct. 21, 1997, pp. 3.
AdForce / Ryan Steelberg, Transactional Tracking Functional Requirements, Feb. 25, 1998, pp. 4.
AdForce / Florian Kahlert, User Permissioning Functional Requirements, Sep. 2, 1997, pp. 10.
AdForce / Ryan Steelberg, User Permissioning (AdForce 2.2), Functional Requirements, Feb. 27, 1998, pp. 5.
AdForce / David Kopp, Changing Default Banners Through the Client GUS (A013), Sep. 10, 1998, pp. 4.
AdForce / David Kopp, AdSelector Metrics Alert Tool (A022), Sep. 12, 1998, pp. 2.
AdForce / David Kopp, JavaScript Ad Request API (A016)—8428, Oct. 6, 1998, pp. 6.
AdForce / Florian Kahlert, Advanced Buy Types Functional Requirements, Nov. 18, 1997, pp. 4.
AdForce / David Kopp, Archiving Functional Requirements, Jan. 27, 1998, pp. 4.
AdForce / David Kopp, Changing Default Banners through the Client GUI (A013), Sep. 10, 1998, pp. 4.
AdForce / David Kopp, AdID Codes Revision, Jul. 17, 1998, pp. 3.
AdForce, Data Export Tech Doc—9305, Feb. 8, 1999, pp. 1.
AdForce / David Kopp, DataForce (D001)—9354, Aug. 17, 1998, pp. 44.
AdForce / David Kopp, DataForce (D001)—9398, Aug. 17, 1998, pp. 44.
AdForce / Gustavo Zambrana, Tags and Ads, Jul. 20, 1998, pp. 46.
AdForce, Data Export TechDoc—9489, Feb. 8, 1999, pp. 6.
AdForce, AdForce Fax—9544, Jan. 27, 1999, pp. 1.
AdForce, Guidelines for Creating and Submitting Creatives TechDoc—9546, Sep. 9, 1998, pp. 1.
AdForce, AdForce Fax—9549, Sep. 18, 1998, pp. 1.
AdForce, User Guide Review, Jul. 10, 1998, pp. 1.
AdForce, AdForce User Guide, v2.6, Oct. 9, 1998, pp. 1.
AdForce, Documentation Weekly Project Schedule—9555, Oct. 30, 1998, pp. 2.
AdForce, Request for Time Off—9562, Dec. 21, 1998, pp. 1.
ADForce, Technical Publications Status Report, Feb. 26, 1999, pp. 1.
AdForce, A Case Study of GeoCities and AdForce Counting, Jan. 4, 1999, pp. 15.
Space cannot be added in the Link URL, May 11, 1998, pp. 1.
AdForce, Turn-Key Advertising Management Overview, Jan. 14, 1999, pp. 15.
Section Contents 7.0 Event Services, May 12, 1998, pp. 4.
Section Contents 13.0 Troubleshooting, May 12, 1998, pp. 2.
Section Contents 2.0 Accounting, May 12, 1998, pp. 3.
Section Contents 4.0 Ad Secure (Not Yet Available), May 12, 1998, pp. 3.
Section Contents 5.0 Client, May 15, 1998, pp. 3.
Section Contents 6.0 Databases, May 12, 1998, pp. 3.
Section Contents 10.0 Statistics Gathering System, May 12, 1998, pp. 10.
AdForce / Ryan Steelberg, AdForce Beacons—Site Tracking Functional Requirements, Mar. 24, 1998, pp. 8.
AdForce / David Kopp, Client GUI Organization Functional Requirements, Feb. 27, 1998, pp. 15.
AdForce / Ryan Steelberg, Campaign Wizard Update: AdForce Advertiser Clients Functional Requirements, Apr. 2, 1998, pp. 7.
AdForce / Ryan Steelberg, Browser Plug-In Targeting & Tracking, Mar. 24, 1998, pp. 2.
AdForce / Chad Steelberg, Campaign Delivery Prioritization, Feb. 7, 1998, pp. 4.
AdForce / Ryan Steelberg, User Permissioning (AdForce 2.2) Functional Requirements, Feb. 27, 1998, pp. 5.
Section Contents 13.0 Troubleshooting (Not Yet Available), Mar. 16, 1998, pp. 2.
Section Contents 3.0 Ad Delivery, May 4, 1998, pp. 13.
Section Contents 4.0 Ad Secure (Not Yet Available), Mar. 16, 1998, pp. 2.
Section Contents 5.0 Client, Mar. 16, 1998, pp. 3.
Section Contents 6.0 Databases (Not Yet Available), Mar. 16, 1998, pp. 2.
Section Contents 11.0 Runtime Demographics Query Server (DOS), May 12, 1998, pp. 10.
Section Contents 7.0 Event Services, Mar. 16, 1998, pp. 3.
Section Contents 8.0 Inventory Management System, May 5, 1998, pp. 17.
Section Contents 1.0 AdForce Service, Mar. 16, 1998, pp. 3.
Section Contents 9.0 Reporting, May 4, 1998, pp. 10.
Section Contents 10.0 Statistics Gathering System, Mar. 16, 1998, pp. 8.
Section Contents 12.0 Shared Libraries/Utilities, May 5, 1998, pp.7.
IMGIS, Inc., AdForce 2.1 Engineering Specifications, Mar. 16, 1998, pp. 3.
AdForce, Passing and Using Multiple Parameters in AdForce Tags TechDoc, Nov. 18, 1998, pp. 1.
Kinko's FTP, Job Ticket, Jul. 7, 1998, pp. 1.
AdForce, Inc, No Title—11344-11345, Oct. 15, 1998, pp. 2.
AdForce, Contents (AdForce User Guide, Version 2.6), Oct. 17, 1998, pp. 282.
Kinko's FTP Job Ticket, Jul. 17, 1998, pp. 1.

AdForce, Inc, Contents (AdForce User Guide, Version 2.5), Jul. 17, 1998, pp. 268.
AdForce, Inc, AdForce User Guide, Version 2.6—13022, Oct. 9, 1998, pp.290.
Guidelines for Creating and Submitting Creatives TechDoc—13349, Sep. 9, 1998, pp. 1.
AdForce, Inc., Background Information About Firewalls, Sep. 17, 1998, pp. 1.
AdForce, Inc., Guidelines for Creating and Submitting Creatives—13361, Sep. 17, 1998, pp. 1.
Miscellaneous—What is a Cookie?, Aug. 19, 1998, pp. 1.
Section Contents 10.0 Statistics Gathering System, May 12, 1998, pp. 1.
10.0 Statistics Gathering System (Draft Version A), May 12, 1998, pp. 1.
Documentation Weekly Project Schedule—13365, Oct. 30, 1998, pp. 1.
Kinko's FTP Job Ticket, Jul. 7, 1998, pp. 1.
AdForce, Inc., AdForce Web Tags and Browsers—13441, Sep. 22, 1998, pp. 5.
AdForce, Inc. / Mark Scheele, Chapter 2: Accounting (Version 2.3), May 12, 1998, pp. 4.
AdForce, Inc. / Joe Manna, Chapter 10: SGS System (Version 2.3), May 12, 1998, pp. 11.
AdForce, Inc., Chapter 13: Troubleshooting (Version 2.3), May 12, 1998, pp. 3.
AdForce, Inc., Chapter 4: Ad Secure (Version 2.3), May 12, 1998, pp. 4.
AdForce, Inc. / Mark Scheele, Chapter 7: Event Services (Version 2.3), May 12, 1998, pp. 5.
AdForce, Inc. / Roy Lu, Chapter 5: Client (Version 2.3), May 12, 1998, pp. 4.
AdForce, Inc., Chapter 6: Databases (Version 2.3), May 12, 1998, pp. 4.
AdForce, Inc. / Greg Meinke, Chapter 8: IMS (Version 2.3), May 12, 1998, pp. 19.
AdForce, Inc., Chapter 3: Ad Delivery (Version 2.3), May 12, 1998, pp. 31.
AdForce, Inc., Chapter 12: Shared Libraries/Utilities/Miscellaneous (Version 2.3), May 12, 1998, pp. 18.
AdForce, Inc. / Jos Bergmans, Chapter 9: Reporting (Version 2.3), Nov. 30, 1998, pp. 18.
AdForce, Inc. / Alan L Pope, The Requirements of Requirements Version 1.1, Jan. 12, 1999, pp. 24.
Operations daily summary report, Jun. 22, 1998, pp. 1.
AdForce, Inc. / David Kopp, Frequency and Sequence on Agency Buys (A010), Sep. 1, 1998, pp. 3.
AdForce, Inc., WD Style Sheet, Mar. 5, 1998, pp. 1.
Creating and Submitting Rich Media Creatives, May 27, 2008, pp. 5.
AdForce, Inc. / Gustavo Zambrana, Tags and Ads, Jul. 20, 1998, pp. 52.
AdForce, Inc., Clients/AdForce Network Connectivity Specifications, Sep. 17, 1998, pp. 4.
AdForce, Inc., AdForce Web Tags and Browsers—14027, Dec. 16, 1998, pp. 5.
AdForce, Inc., Passing and Using multiple Parameters in AdForce Tags, Nov. 20, 1998, pp. 7.
AdForce, Inc., How AdForce Counts—14065, Feb. 16, 1999, pp. 9.
Campaign Summary for Clangin' Keyboards!—14311, Oct. 6, 1998, pp. 1.
Campaign Summary for Clangin' Keyboards!—14493, Oct. 6, 1998, pp. 1.
AdForce, Section Contents 3.0 Ad Delivery, May 12, 1998, pp. 31.
AdForce, Section Contents 12.0 Shared Libraries/Utilities/ Miscellaneous, May 12, 1998, pp. 17.
AdForce, Section Contents 11.0 Runtime Demographics Query Server (DQS), May 12, 1998, pp. 11.
AdForce, Section Contents 8.0 Inventory Management System, May 12, 1998, pp. 18.
Advertising Age, Advertising Age, Jun. 8, 1998, pp. 3.
Advertising Age, Advertising Age, Oct. 26, 1998, pp. 3.
Advertising Age, Advertising Age, Jun. 14, 1999, pp. 3.
Advertising Age, Advertising Age, Jan. 26, 1998, pp. 3.
Edgar Online, Inc., Adknowledge Inc., Aug. 27, 1999, pp. 8.
Eclipse Services, Training Outline, Aug. 8, 1995, pp. 16.
TraVidia, TraVidia. Feb. 1, 2008, pp. 2.
Warren Publishing, Inc., Communication Daily, Jan. 12, 1995, pp. 1.
Economist.com, Make Progress, Oct. 7, 1999, pp. 3.
Advertising Age / Patricia Riedman, DoubleClick joins 'huge' e-mail ad realm . . . , Oct. 29, 1999, pp. 1.
Advertising Age, Advertising Age, Mar. 8, 1999, pp. 5.
Advertising Age, Advertising Age, Jun. 11, 2001, pp. 3.
Advertising Age, Advertising Age, Nov. 29, 1999, pp. 3.
Advertising Age, Advertising Age, May 24, 1999, pp. 4.
Advertising Age, Advertising Age, Mar. 1, 1999, pp. 5.
Advertising Age, Advertising Age, Jul. 19, 1999, pp. 3.
Media Week, Media Week, Jul. 10, 2000, pp. 3.
Imgis Becomes Ad Force, Aug. 10, 1989, pp. 1.
Advertising Age, Advertising Age, Oct. 4, 1999, pp. 3.
Advertising Age, Advertising Age, Apr. 19, 1999, pp. 3.
AdWeek, AdWeek, Apr. 19, 1999, pp. 3.
Newspaperes & Technology / Hays Goodman, Engage Offers content management and electronic tearsheet solutions, Jan. 1, 2002, pp. 3.
Inso Corp. Announces Technology and Marketing Partnerships . . . , Sep. 1, 1998, pp. 3.
Media Week, MediaWeek, Apr. 19, 1999, pp. 3.
Flycast Reels in European Web Advertisers . . . , Oct. 18, 1999, pp. 2.
S.F. Business Times, Flycast lands patent at it lures Internet ad clients, Sep. 25, 1998, pp. 2.
S.F. Chronicle / Carol Emert, 2 Web firms Decide to Marry, Nov. 17, 1997, pp. 1.
CMGI, CMGI Reports First Quarter Earnings of $1.67 per Share Revenues . . . , Dec. 15, 1998, pp. 4.
BusinessWeek, Jun. 20, 1994, pp. 4.
Data Communications, Apr. 1, 1997, pp. 10.
Economist.com, Netymology, Oct. 7, 1999, pp. 1.
ABC Reader Profile Service Makes Notable Progress, Apr. 3, 2002, pp. 2.
Webweek.com, Sites Dip Into Cookies to Track User Info, Jun. 3, 1996, pp. 2.
IBM, IBM and NetGravity form Strategic Technology, Aug. 11, 1998, pp. 2.
AdServer 3 for On-line Marketing, Sep. 1, 1998, pp. 1.
Advertising Age, Advertising Age, Dec. 1, 1997, pp. 3.
Cyber Times, Start-Ups Plot to Make the Web Comfortable for Advertisers, Feb. 13, 1996, pp. 4.
NetGravity, NetGravity: NetGravity launches AdServer 3.5 for targeted, mission-critical online marketing, Sep. 8, 1998, pp. 1.
NetGravity, NetGravity Announces AdServer 2.0, Oct. 14, 1996, pp. 3.
NetGravity, NetGravity Launches AdServer 3.5 with Beefed Up Targeting, Sep. 10, 1998, pp. 1.
Press Wire, NetGravity Launches AdServer 3.5 for targeted, mission-critical marketing, Sep. 8, 1998, pp. 2.
NetDriven Solutions Inc.—NTI Newspaper Technologies Inc. Negotiating New International Contract, Jun. 12, 2000, pp. 2.
Mike Tartar, NTI continues growth, Sep. 1, 1997, pp. 2.
CHI, Interactive Advertising: Patterns of Use and Effectiveness, Apr. 18, 1998, pp. 6.
ABQ Journal.com, Jul. 28, 1999, pp. 9.
Standard View / Katy Dickinson, keeping an Electronic Commerce Shop, Sep. 3, 1998, pp. 4.
Computer Networks and ISDN Systems, Ubiquitous advertising on the WWW: merging advertisement on the browser, May 1, 1996, pp. 20.
M. McCandless, Web Advertising, May 30, 1998, pp. 4.
Web Sites sell ad space through auctions, Jul. 31, 1995, pp. 2.
Jupiter Strategic Planning Services, Ad Management Debunking the Turnkey Myth—17767, Jul. 1, 1998, pp. 31.
Tomalak's Realm, Google's Text-Only Banner Ads, Jan. 19, 2000, pp. 2.
Gallegher & Parsons, A framework for targeting banner advertising on the Internet—24674, Jan. 7, 1997, pp. 12.
AdForce, AdForce Introduces AdForce Everywhere . . . —24705, Mar. 27, 2000, pp. 3.
Business Week, Where to Invest, Jun. 20, 1994, pp. 4.

Fortanet, Palmer, Posteguilla, Jaume, Netvertising: content based subgeneric variations in a digital genre, Jan. 6, 1998, pp. 12.
Angie Jabine, Aggregating Hits, Jul. 26, 1996, pp. 7.
MANSI, Amnsi Places Targeting Internet Advertising Campaign; Chooses Real Media, Jul. 30, 1996, pp. 2.
Melinda Gipson, Sizing Up Online Ads, Nov. 20, 1996, pp. 2.
Real Media, Swiss-Based Advertising Services Company Invests in Internet Advertising Technology Firm, Nov. 12, 1996, pp. 2.
Real Media, Newspaper-Focused Web Ad Network Launches, Feb. 14, 1996, pp. 2.
Real Media, Real Sample Measurement Report, Jul. 1, 1996, pp. 5.
Joel B. Cohen, Publicitas Invests in Real Media, Dec. 4, 1996, pp. 1.
ClickZ Network, Netscape Selects Real Media's Open AdStream, Jan. 13, 1998, pp. 1.
ClickZ Network, Real Media Signs More Media Companies, Dec. 30, 1998, pp. 1.
Steve Outing, Real Media Aims to Bring Newspapers More Online Ads, Feb. 21, 1996, pp. 4.
Google, Trax, May 5, 2007, pp. 19.
Virtual Cities, Inc., Articles of Incorporation of Virtual Cities, Inc., May 27, 1994, pp. 2.
Edgar Online, Excerpt from S-1 SEC filing by Adnowledge Inc., Aug. 27, 1999, pp. 8.
Cole's Newswire, "Cole's Newswire vol. 2, No. 8", Feb. 21, 1996, pp. 4.
Baseview, Welcome to Baseview, Jan. 16, 1997, pp. 18.
E Consultancy, Flycast Reels in European Web Advertisers With Introductory Two for One Pricing Offer, Oct. 18, 1999, pp. 2.
Internetnews.com, Flycast Launches Rich Media Program, Sep. 21, 1998, pp. 2.
Business Wire Inc., "Global Network, Inc. Enters Into Agreement in Principle With Major Advertising Agency", Oct. 4, 1999, pp. 2.
Martin Wesley, CLMS West War, Sep. 17, 1999, pp. 5.
Martin Wesley, CLMS West War, Sep. 19, 1999, pp. 5.
"NK Account Status As of Sep. 17, 1999", Sep. 19, 1999, pp. 2.
John Black, DataBank Launch (email)—30188, Jan. 21, 2000, pp. 3.
John Black, DataBank Launch (email)—30191, Jan. 21, 2000, pp. 3.
DoubleClick, Databank Reports, Jan. 20, 2000, pp. 58.
DoubleClick, Databank Reports Index, Jan. 20, 2000, pp. 1.
John Black, DoubleClick/Accrue/Hyperion partnership press releases—30257, Oct. 19, 1999, pp. 2.
John Black, DoubleClick/Accrue/Hyperion partnership press releases—30259, Oct. 19, 1999, pp. 2.
Alyce Menton, Accrue and DoubleClick Partner to Increase eBusiness Marketing Effectiveness, Oct. 20, 1999, pp. 4.
Jay Kulkarni, Fresh From AdKnowledge—30267, Jan. 6, 2000, pp. 2.
Jay Kulkarni, Fresh From AdKnowledge—30269, Jan. 6, 2000, pp. 2.
Martin Wesley, "Sabela Media Volume—(Sounds like Dr. Evil, 1 Million dollars.)", Dec. 17, 1999, pp. 3.
John Black, Sabela Media—30277, Aug. 17, 1999, pp. 1.
John Black, Sabela Media—30278, Aug. 17, 1999, pp. 1.
Sabela Media, Sabela Media Info from website, Aug. 17, 1999, pp. 2.
J. Scotte Barkan, Spotlight Processes—Updated Documentation, Nov. 4, 1999, pp. 2.
J. Scotte Barkan, Spot Process, Sep. 1, 1998, pp. 26.
J. Scotte Barkan, SpotGroup Process, Sep. 4, 1998, pp. 6.
J. Scotte Barkan, SpotImpressions Process, Jan. 11, 1999, pp. 7.
J. Scotte Barkan, Databank Configurations—30330, Jun. 15, 1999, pp. 9.
J. Scotte Barkan, Post-Derive Process Configuration, Jan. 11, 1999, pp. 4.
Cheuk Ma, DeriveKeyword Operation and User Documentation, Apr. 2, 1998, pp. 7.
Distributing the System, Apr. 15, 1997, pp. 7.
Log Manager, May 8, 1998, pp. 5.
New Creatibe Handling & Reporting Design, Aug. 1, 1998, pp. 5.
DoubleClick, NXP Overview, Jul. 18, 2000, pp. 2.
DoubleClick, Ad Counter Server Functional Specifications, Jul. 18, 2000, pp. 15.
Static Page Management for Untrackable Domains, Feb. 4, 1996, pp. 2.
DoubleClick, UIS Client Interface, Aug. 26, 1998, pp. 8.
DoubleClick, UNIX Ad Server, Jul. 18, 2000, pp. 14.

Felix Lung, PusherSync Functional Specification, Jul. 18, 2000, pp. 8.
Felix Lung, PusherSync Manual, Jul. 18, 2000, pp. 20.
DoubleClick, DART Biling Data Transfer, Apr. 16, 1997, pp. 4.
DoubleClick, DoubleClick Direct Response Network, Apr. 14, 1997, pp. 3.
DoubleClick, Non-Targeted Key-Value Back-End Process—30677, Jan. 20, 2000, pp. 8.
DoubleClick, NTKV Implementaion Plan, Jul. 18, 2000, pp. 2.
DoubleClick, ORDERFREQ, Jul. 18, 2000, pp. 6.
DoubleClick, PDF Report Generator System, Jul. 18, 2000, pp. 2.
DoubleClick, Q Reports Generation System (QRGS), Jul. 18, 2000, pp. 8.
Software Requirements, for XMLServer / ManageNG, Nov. 16, 1999, pp. 4.
DoubleClick, XML Reports Gateway Installation Instructions, Jul. 18, 2000, pp. 4.
Actuals Reports in the New Trafficking Interface, Feb. 8, 2000, pp. 36.
What's New in Ad Manage, Feb. 10, 2000, pp. 4.
Relationship/Parent/Child, Apr. 19, 1998, pp. 2.
Table Name/Column Name, Apr. 19, 1998, pp. 32.
Table/Physical Properties, Apr. 19, 1998, pp. 31.
DoubleClick, Frequently Asked Questions for Database Targeting, Jul. 18, 2000, pp. 7.
DoubleClick, Glossary of Terms, Jul. 18, 2000, pp. 2.
Doubleclick, Inc., Job Creator Test Program, Jul. 18, 2000, pp. 15.
Doubleclick, Inc., Job Scheduler, Jul. 18, 2000, pp. 4.
Doubleclick, Inc., Database Targeting—PopulateExpo Process Draft, Jul. 10, 1998, pp. 47.
Doubleclick, Inc. / Philip Grieshaber, PopulateExpo version 1.1 64 bit User ID support, Nov. 4, 1998, pp. 3.
PopulateExpo, PopulateExpo, Jul. 18, 2000, pp. 7.
DoubleClick, Inc., Registry Settings Tor PopulateExpo Version 1.0a, Aug. 19, 1998, pp. 5.
DoubleClick / Oleg Beregovich, DT User Lists Management—30998, Mar. 5, 1999, pp. 3.
DoubleClick / Oleg Beregovich, DT User Lists Management—31001, Mar. 5, 1999, pp. 5.
DT User Lists Management—31010, Mar. 4, 1999, pp. 3.
No Title—31063-31070, Apr. 22, 1999, pp. 10.
Oleg Beregovich, No Title—31071-31080, Jan. 19, 1999, pp. 10.
No Title—31114-31116, Dec. 15, 1998, pp. 3.
Leon Pozen, Release Notes for Derive 6.05 and DeriveCounters 1.00, May 26, 1998, pp. 2.
Derive counter overview Draft Version 1.0, Jan. 6, 1999, pp. 2.
J. Scott Barkan, Database Configurations, Jan. 26, 2000, pp. 10.
J. Scotte Barkan, Spot Process, Feb. 11, 2000, pp. 27.
Aleksandr Voskoboynik, et al, Spot Process, Mar. 9, 2000, pp. 7.
J. Scotte Barkan, SpotImpressions Process, Feb. 11, 2000, pp. 11.
J. Scott Barkan, Spotlight Processing—DELL, Oct. 10, 1998, pp. 2.
J. Scott Barkan, Spotlight Processing, Nov. 10, 1998, pp. 4.
J. Scotte Brakan, AqlUpdate Process, Nov. 10, 1998, pp. 5.
JSB, Using QASpot.pl, Mar. 22, 1999, pp. 5.
J. Scotte Barkan, Databank Configurations—31273, Jan. 26, 2000, pp. 10.
Aleksandr Voskoboynik, et, al, SpotGroup Process, Mar. 9, 2000, pp. 7.
J. Scott Barkan, Spotlight Processing—DELL, Nov. 10, 1998, pp. 2.
J. Scotte Barkan, Spotlight Reprocessing, Nov. 10, 1998, pp. 4.
Doubleclick, Inc., DFA Ad Placement Actuals, Jul. 18, 2000, pp. 5.
Doubleclick, Inc., DFA Advertiser Actuals, Jul. 18, 2000, pp. 6.
Doubleclick, Inc, DFA Buy Actuals, Jul. 18, 2000, pp. 10.
Doubleclick, Inc., Ad Placement Actuals—31387, Nov. 25, 1999, pp. 1.
Doubleclick, Inc., Buy Actuals, Nov. 25, 1999, pp. 2.
Doubleclick, Inc., Advertiser Actuals—31394, Nov. 25, 1999, pp. 1.
Doubleclick, Inc., Advertiser Actuals—31395, Nov. 25, 1999, pp. 1.
Doubleclick, Inc., Buy Actuals, Nov. 24, 1999, pp. 2.
Doubleclick, Inc., Ad Placement Actuals—31401, Nov. 24, 1999, pp. 1.
Doubleclick, Inc., DART for Agencies Testing—31426, Aug. 13, 1998, pp. 15.

DART for Agencies Testing—31441, Aug. 13, 1998, pp. 19.
DoubleClick, Inc., Ad/Site Aggregation Spec, Dec. 22, 1999, pp. 25.
DoubleClick, Inc., Loader Spec, Dec. 22, 1999, pp. 4.
DoubleClick, Inc., Sequencer Spec, Dec. 22, 1999, pp. 9.
DoubleClick, Inc., AdServer Log File Specification Draft v1.1, Jul. 18, 2000, pp. 19.
DoubleClick, Inc., Software Functional Specification, Sep. 1, 1999, pp. 11.
DoubleClick, Inc., Software Functional Specification, Oct. 22, 1999, pp. 7.
NG Report—memo—Ad Placement Actuals, May 6, 1999, pp. 4.
Rajesh Velliyan, Functional Requirements for AdServer Test Components of ATH System, Oct. 22, 1998, pp. 4.
J. Heider, Functional Repuirements for An Automated Test Harness System, Oct. 19, 1998, pp. 4.
F. Lung, Functional Requirements for Pusher Component, Oct. 21, 1998, pp. 9.
DoubleClick, Inc., Log Manager 3.0 Application Overview, Jul. 18, 2000, pp. 35.
DoubleClikc, Inc., Ad Manager Breakout, Jun. 3, 1998, pp. 11.
DoubleClick, Inc., Ad Manager Security, Apr. 29, 1998, pp. 6.
Adding Requests to the Ad Management System, Sep. 14, 1998, pp. 5.
DoubleClick, Inc. / Andre' Glenn, Installation Guide for Perl-based Email Queuing, Aug. 13, 1999, pp. 3.
DoubleClick, Inc. / Andre' Glenn, Installation Guide for Perl-based Email Queuing (Alternate Version), Sep. 20, 1999, pp. 3.
DoubleClick, Inc. / Andre' Glenn, How to use the MachineLoadAdsType Registry Setting, Sep. 23, 1999, pp. 2.
DoubleClick, Inc., Manage Technical Summary of the doubleclick.net Management server, Jun. 17, 1996, pp. 15.
DoubleClick, Inc., Manage Localization Logic, Jun. 10, 1999, pp. 7.
DoubleClick, Inc. / Andre' Glenn, Registry Settings for Manage, Apr. 16, 1999, pp. 39.
DoubleClick, Inc. / Andre' Glenn, Review Ads Logic Manage, May 13, 1999, pp. 6.
DoubleClick, Inc, Scheduled Billing, May 8, 1998, pp. 5.
DoubleClick, Inc, Session Manager, Aug. 14, 1998, pp. 13.
DoubleClick, Inc, Top Keywords Report, Dec. 30, 1998, pp. 10.
J. Scotte Barkan, DART for Agencies Enhancements, Jun. 24, 1998, pp. 1.
J. Scotte Barkan, Problem Tracking System Enchanced Requirements, Apr. 29, 1998, pp. 12.
J. Scotte Barkan, Problem Tracking System Requirements, Dec. 1, 1997, pp. 7.
J. Scotte Barkan, Setup for Problem Tracking System on Lotus Notes Domnio Server, May 12, 1998, pp. 2.
J. Scotte Barkan, Ad-Manage Report Warehousing Using the RPC Report Server, Apr. 3, 1998, pp. 1.
J. Scotte Barkan, RPC Report Server, May 29, 1998, pp. 9.
RPC Report QA Testing, Jun. 16, 1998, pp. 1.
Template Types and Syntax, Jul. 18, 2000, pp. 22.
Manage NG Common XML Data Objects—32102, May 1, 2000, pp. 9.
J. Scotte Barkan, <TableList> XML Standardized Tab, Content-Tab & Menu Frame Layouts, May 10, 2000, pp. 7.
Manage NG Common XML Data Objects—32248, May 1, 2000, pp. 9.
Stephen Rupp, Ora69 Operation with the Database class, Jan. 14, 1999, pp. 2.
Raman Vulchi, Orderfreq Operation Document, Mar. 31, 2000, pp. 5.
J. Scotte Barkan, PERL Documentation Script, Apr. 28, 1998, pp. 4.
Steve Rupp, Proposed Bug Tracking Setup, Feb. 25, 1999, pp. 3.
Steve Rupp, Source Control Labeling, Sep. 24, 1999, pp. 21.
Steve Rupp, REPM 2.0 Organization, Sep. 1, 1999, pp. 3.
REPM Changes to Support DART for Agencies, Aug. 31, 1998, pp. 2.
Steve Rupp, REPM Design, Nov. 23, 1998, pp. 14.
REPM Flowchart, Dec. 6, 1998, pp. 4.
Steve Rupp, Report Operation Document, Nov. 30, 1998, pp. 7.
DoubleClick, Inc./ Stephen Rupp, REPM Functional Requirements, Oct. 29, 1999, pp. 28.
DoubleClick, Inc., REPM Dot Tables (Ad ID 44306), Jul. 21, 1999, pp. 1.
DoubleClick, Inc., REPM Key Value Tables, Aug. 24, 1999, pp. 3.
DoubleClick, Inc., REPM New Frequency Tables, Oct. 12, 1999, pp. 1.
DoubleClick, Inc., REPM NG Manage Tables, Jul. 21, 1999, pp. 1.
DoubleClick, Inc., REPM Referrer Tables, Sep. 22, 1999, pp. 1.
DoubleClick, Inc, Online Report Generator Systems Functional Specification, Jun. 28, 1998, pp. 13.
DoubleClick, Inc, GDI PDF Report Generator High-Level Design, Jan. 25, 1999, pp. 14.
DoubleClick, Inc, GDI PDF Report Generator Low-Level Design, Mar. 23, 1999, pp. 75.
RGS Migration Document (Site & SiteComp), Feb. 17, 1999, pp. 1.
DoubleClick, Inc., Software Tracker Project, Sep. 7, 1999, pp. 9.
DoubleClick, Inc., Engineering Tracker Setup, Aug. 10, 1999, pp. 6.
DoubleClick, Inc., Cookie Cutter User Documentation, Jul. 18, 2000, pp. 9.
DoubleClick, Inc., EXPO Server changes to support PopulateExpo Version 1.0a, Jun. 10, 2008, pp. 6.
Proposal for Third Party Boomerang, Jul. 18, 2000, pp. 3.
User Information Server Redesign, Jul. 18, 2000, pp. 6.
DoubleClick, Inc., Provider Categories Bit Flag Processing System Overview, Jul. 18, 2000, pp. 16.
DoubleClick, Inc., Real-time Provider Categories Bit Flag Processing System Overview, Jul. 18, 2000, pp. 9.
DoubleClick, Inc. / Philip Grieshaber, Real-time Boomerang Overview of UIS Changes, Jul. 18, 2000, pp. 8.
DoubleClick, Inc. / Philip Grieshaber, User Information Server version 4.20 64 bit User ID support, Mar. 1, 1999, pp. 7.
DoubleClick, Inc., UIS 4.20 Unit Test Cases, Mar. 23, 1999, pp. 44.
DoubleClick, Inc., UIS Commander Version 1.0 (Compatible with UIS 4.40), Jul. 18, 2000, pp. 12.
DoubleClick, Inc., UIS Console Version 1.0 (Compatible with UIS Version 4.30), Jul. 18, 2000, pp. 33.
DoubleClick, Inc. / Philip Grieshaber, User Information Server (Version 4.10) Ad Server Interface Documentation, Jan. 4, 1999, pp. 16.
Userinformation Server—Revised Threading Model, Jul. 18, 2000, pp. 6.
Userinformation Server—Update to Distributed Design, Jul. 18, 2000, pp. 2.
Watchdog Monitoring and Paging Reference, Aug. 21, 1998, pp. 8.
DoubleClick, Inc. / Adam Benjamin, Engineering/Operations Bulletin, Oct. 9, 1998, pp. 2.
Stephanie Casella, QA Processes and Procedures, Feb. 28, 1999, pp. 3.
Stephanie Casella, AdManage QA Group Processes and Procedures—32827, Mar. 31, 1999, pp. 2.
Stephanie Casella, QA Processes and Procedures—Mar. 1999, Feb. 28, 1999, pp. 2.
Stephanie Casella, AdManage QA Group Processes and Prcedures—32831, Mar. 31, 1999, pp. 2.
DoubleClick, Inc. / Stephanie Casella, Training Manual for Processes and Procedures of the Doubleclick Quality assurance Dept . . . , Apr. 30, 1999, pp. 4.
Stephanie Casella, Training Manual for New Hire, Jan. 31, 1999, pp. 2.
Operations Request Form, Jun. 10, 2008, pp. 1.
Production Build Notification Adserver 9.65b, Jul. 18, 2000, pp. 3.
Production Build Notification Adserver 9.65x, Jul. 18, 2000, pp. 3.
Production Build Notification Adserver 9.66, Jul. 18, 2000, pp. 3.
Production Build Notification Adserver 9.66x, Jul. 18, 2000, pp. 3.
Production Build Notification Adserver 9.7, Jul. 18, 2000, pp. 4.
Production Build Notification Adserver 9.71x and 9.71 (NT3.51 only), Jul. 18, 2000, pp. 3.
Production Build Notification Adserver 9.72x, Jul. 18, 2000, pp. 2.
Production Build Notification Adserver 9.73x, Jul. 18, 2000, pp. 2.
Production Build Notification Adserver 9.74x and 9.74 (NT3.51 only), Jul. 18, 2000, pp. 3.
Production Build Notification Adserver 9.75x, Jul. 18, 2000, pp. 3.
Production Build Notification Adserver 9.76x, Jul. 18, 2000, pp. 3.
Production Build Notification Adserver 9.77x, Jul. 18, 2000, pp. 3.
Production Build Notification Adserver 9.78x, Jul. 18, 2000, pp. 3.
Production Build Notification Adserver 9.792, Jul. 18, 2000, pp. 3.
Production Build Notification Adserver 9.793, Jul. 18, 2000, pp. 3.

Production Build Notification Adserver 9.79x, Jul. 18, 2000, pp. 3.
Production Build Notification Adserver 9.7M, Jul. 18, 2000, pp. 3.
Production Build Notification Adserver 9.7M2, Jul. 18, 2000, pp. 2.
Production Build Notification Adserver 9.7x, Jul. 18, 2000, pp. 3.
Production Build Notification Adserver 9.8, Jul. 18, 2000, pp. 4.
Production Build Notification Adserver 9.81, Jul. 18, 2000, pp. 4.
Test Plan For UIS Regression Testing: (Adverser), Dec. 8, 1998, pp. 11.
DoubleClick, Inc., Test Plan for <Derive>, Oct. 22, 1998, pp. 28.
Derive / RepM quick and dirty test guide, Jun. 21, 1999, pp. 3.
TechSolutions for Advertisers, Jul. 18, 2000, pp. 27.
DoubleClick, Inc. / Jared Howe, Media Planner User's Guide, May 9, 2000, pp. 46.
DoubleClick. Inc. / Carla Dunlap, TechSolutions for Advertisers Media Planning Market Requirements Document, Mar. 31, 2000, pp. 23.
DoubleClick Inc., TechSolutions for Advertisers Media Planner QA . . . , Jul. 18, 2000, pp. 21.
DoubleClick, Inc. / Jay Kulkami, RFP Specs, Jul. 18, 2000, pp. 3.
DoubleClick, Inc. / Jay Kulkarni, Search Site Profiles, Jul. 18, 2000, pp. 1.
DoubleClick, Inc. / Jay Kulkarni, Site Profile Spec, Jul. 18, 2000, pp. 3.
DoubleClick, Inc. / Jay Kulkarni, Site RFP Spec, Jul. 18, 2000, pp. 2.
Software Requirements for XMLServer / ManageNG, Nov. 16, 1999, pp. 2.
Irahim Sheikh, Software Requirements for XMLServer / ManageNG, Jan. 20, 2000, pp. 4.
DFA Media Planner—Status Screen, Oct. 27, 1999, pp. 21.
DoubleClick, Inc., Rollout Procedures and Record for DART for Advertisers, Nov. 2, 1998, pp. 8.
DoubleClick, Inc., Test Case ID Standard and Map for DART for Agencies, Dec. 15, 1998, pp. 10.
DoubleClick, Inc., Test Plan for DART for Agencies, Oct. 19, 1998, pp. 28.
Production Build Notification Manage for DFA 1.04, Nov. 24, 1998, pp. 3.
Production Build Notification Manage for DFA 1.05, Dec. 10, 1998, pp. 3.
Production Build Notification Manage for DFA 1.06, Dec. 16, 1998, pp. 3.
Froduction Build Notification Manage for DFA 1.07, Dec. 17, 1998, pp. 4.
Production Build Notification Manage for DFA 1.08, Dec. 23, 1998, pp. 4.
Production Build Notification Manage for DFA 1.09, Jan. 6, 1999, pp. 4.
Production Build Notification Manage for DFA 1.11, Jun. 11, 2008, pp. 5.
Production Build Notification Manage for DFA 1.12, Jul. 18, 2000, pp. 4.
Production Build Notification Manage for DFA 1.13, Jul. 18, 2000, pp. 4.
Production Build Notification Manage for DFA 1.14, Jul. 18, 2000, pp. 4.
Production Build Notification Dart for Advertisers (DFA) 1.15, Jul. 18, 2000, pp. 4.
Production Build Notification Dart for Advertisers (DFA) 1.16, Jul. 18, 2000, pp. 4.
Production Build Notification Dart for Advertisers (DFA) 1.17, Jul. 18, 2000, pp. 4.
Production Build Notification Dart for Advertisers (DFA) 1.18, Jul. 18, 2000, pp. 5.
Production Build Notification Dart for Advertisers (DFA) 1.19, Jul. 18, 2000, pp. 4.
Production Build Notification Dart for Advertisers (DFA) 1.20, Jul. 18, 2000, pp. 4.
Production Build Notification Dart for Advertisers (DFA) 1.21, Jul. 18, 2000, pp. 4.
Production Build Notification Dart for Advertisers (DFA) 1.22, Jul. 18, 2000, pp. 4.
Production Build Notification Dart for Advertisers (DFA) 1.23.08, Jul. 18, 2000, pp. 3.
Production Build Notification Dart for Advertisers (DFA) 1.23, Jul. 18, 2000, pp. 4.
DoubleClick, Inc. / J. Scotte Barkan, Spot Process, Nov. 10, 1998, pp. 9.
J. Scotte Barkan, SpotGroup Process, Jan. 11, 1999, pp. 6.
J. Scotte Barkan, SpotImpressions Process, Jan. 11, 1999, pp. 6.
DoubleClick, Inc., DFA—NG Test Plan, Jul. 18, 2000, pp. 50.
DoubleClick, Inc., Test Plan for 3rd Party Report Generation Software Evaluation, Feb. 2, 1999, pp. 14.
DoubleClick, Inc. / G. Rustic, FXQuotes, Oct. 26, 1999, pp. 2.
Wenfang Cheng, CHGControl—34875, Feb. 22, 1999, pp. 2.
Flags, Feb. 28, 1999, pp. 5.
Things for Frequency Cap targeting with ShowAvail 1.60.13, May 4, 1999, pp. 1.
Order Approval Criteria, Feb. 5, 1999, pp. 2.
RPC Report Server, Mar. 31, 1998, pp. 9.
Network Trafficking Process documentation, Feb. 25, 1999, pp. 8.
Timings for Loading Global Ads on Manage 10.52.08, Sep. 29, 1999, pp. 1.
Wenfang Cheng, CHGControl—36096, Nov. 5, 1998, pp. 2.
Wenfang Cheng, FW: Manage patches, Feb. 22, 1999, pp.2.
Wenfang Chen, CHGControl—36413, Jan. 14, 1999, pp. 2.
Ad Manage Network Management, Jul. 18, 2000, pp. 8.
Wenfang Cheng, CHGControl—36541, Feb. 3, 1999, pp. 2.
Wenfang Cheng, CHGControl—36775, Jan. 19, 1999, pp. 277.
Production Build Notification, Nov. 13, 1998, pp. 3.
Production Build Notification, Nov. 4, 1998, pp. 5.
Froduction Build Notification, Nov. 16, 1998, pp. 3.
Production Build Notification, Jan. 29, 1999, pp. 3.
Production Build Notification, Feb. 28, 1999, pp. 3.
Production Build Notification, Feb. 19, 1999, pp. 4.
Production Build Notification, Feb. 26, 1999, pp. 3.
Production Build Notification, Mar. 3, 1999, pp. 4.
Production Build Notification, Mar. 5, 1999, pp. 4.
Production Build Notification, Mar. 16, 1999, pp. 3.
Production Build Notification, Mar. 19, 1999, pp. 3.
Production Build Notification, Jul. 18, 2000, pp. 3.
Production Build Notification, Jul. 18, 2000, pp. 5.
Production Build Notification, Dec. 29, 1998, pp. 5.
Production Build Notification, Jan. 7, 1998, pp. 3.
Production Build Notification, Jan. 20, 1999, pp. 3.
Production Build Notification, Dec. 4, 1998, pp. 3.
Production Build Notification, Jan. 22, 1999, pp. 3.
Production Build Notification, Dec. 30, 1998, pp. 3.
DoubleClick, Test Plan for Ad Manage, Oct. 28, 1998, pp. 17.
Stephanie Casella, Regression Outline for AdManage Testing, Jan. 1, 1999, pp. 3.
Lisa Rhoades Timesheet, Feb. 22, 1999, pp. 1.
Lisa Rhoades Timesheet, Feb. 24, 1999, pp. 1.
Lisa Rhoades Timesheet, Feb. 25, 1999, pp. 1.
Lisa Rhoades Timesheet, Feb. 26, 1999, pp. 1.
Lisa Rhoades Timesheet, Mar. 10, 1999, pp. 1.
Lisa Rhoades Timesheet, Mar. 11, 1999, pp. 1.
Lisa Rhoades Timesheet, Mar. 1, 1999, pp. 1.
Lisa Rhoades Timesheet, Mar. 12, 1999, pp. 1.
Lisa Rhoades Timesheet, Mar. 15, 1999, pp. 1.
Lisa Rhoades Timesheet, Mar. 16, 1999, pp. 1.
Lisa Rhoades Timesheet, Mar. 17, 1999, pp. 1.
Lisa Rhoades Timesheet, Mar. 18, 1999, pp. 1.
Lisa Rhoades Timesheet, Mar. 2, 1999, pp. 1.
Lisa Rhoades Timesheet, Mar. 3, 1999, pp. 1.
Lisa Rhoades Timesheet, Mar. 4, 1999, pp. 1.
Lisa Rhoades Timesheet, Mar. 5, 1999, pp. 1.
Lisa Rhoades Timesheet, Mar. 8, 1999, pp. 1.
Lisa Rhoades Timesheet, Mar. 9, 1999, pp. 1.
Logins created, Feb. 17, 1999, pp. 1.
Logins created, Feb. 18, 1999, pp. 2.
Logins, Feb. 19, 1999, pp. 1.
Diversity Day, Feb. 22, 1999, pp. 1.
No Title—37686, Feb. 23, 1999, pp. 1.
No Title—37687, Feb. 24, 1999, pp. 1.
No Title—37688, Feb. 25, 1999, pp. 1.
No Title—37689, Feb. 26, 1999, pp. 1.

No Title—37690, Mar. 1, 1999, pp. 1.
No Title—37691, Mar. 2, 1999, pp. 1.
No Title—37692, Mar. 3, 1999, pp. 1.
No Title—37693, Mar. 4, 1999, pp. 1.
No Title—37694, Mar. 5, 1999, pp. 1.
No Title—37695, Mar. 8, 1999, pp. 1.
No Title—37696, Mar. 9, 1999, pp. 1.
No Title—37697, Mar. 10, 1999, pp. 1.
No Title—37698, Mar. 11, 1999, pp. 1.
No Title—37699, Mar. 12, 1999, pp. 1.
No Title—37700, Mar. 15, 1999, pp. 1.
No Title—37701, Mar. 16, 1999, pp. 1.
No Title—37702, Mar. 17, 1999, pp. 1.
No Title—37703, Mar. 18, 1999, pp. 1.
No Title—37704, Mar. 19, 1999, pp. 1.
No Title—37705, Mar. 22, 1999, pp. 1.
No Title—37706, Mar. 24, 1999, pp. 1.
No Title—37707, Mar. 25, 1999, pp. 1.
No Title—37708, Mar. 26, 1999, pp. 1.
No Title—37709, Mar. 29, 1999, pp. 1.
No Title—37710, Mar. 30, 1999, pp. 1.
No Title—37711, Mar. 31, 1999, pp. 1.
No Title—37714, Apr. 5, 1999, pp. 1.
No Title—37715, Apr. 7, 1999, pp. 1.
No Title—37716, Apr. 8, 1999, pp. 1.
No Title—37717, Apr. 9, 1999, pp. 1.
No Title—37718, Apr. 12, 1999, pp. 1.
No Title—37719, Apr. 13, 1999, pp. 1.
Test Log, Feb. 18, 1999, pp. 1.
Test Log, Feb. 17, 1999, pp. 1.
Tim Rooney, QA AdManage Reports, Jun. 1, 2008, pp. 23.
DoubleClick, Ad Server System Functional Specification Document, Jul. 18, 2000, pp. 19.
DoubleClick, Module Name & Version Functional Spcification Document, Jul. 18, 2000, pp. 10.
DoubleClick, No Title—37834—37879, Jul. 18, 2000, pp. 46.
DoubleClick Inc., Test Plan for RepM, Jun. 10, 2008, pp. 17.
DoubleClick, Non-Targeted Key-Value Back-End Process—37914, Nov. 16, 1999, pp. 8.
Machine Configuration For Site reports, Jan. 11, 1999, pp. 3.
Gerald Rustic, Double Click, PDF Ad Report Generator Operations Guide, Jul. 18, 2000, pp. 5.
PDF Report Generator Operations Guide, May 18, 1999, pp. 7.
PDF Report Generator Migration, May 18, 1999, pp. 9.
Release Notes PDF Site and Site Configuration Report, May 19, 1999, pp. 1.
Elias Martinez, RPC Reports QA Testing, Jun. 16, 1998, pp. 1.
IEEE, IEEE Recommended Practice for Software Requirement Specifications, Apr. 8, 1994, pp. 40.
Dow Jones Quick Strike Project Fixed Income Transaction Service Product Requirements Document, Jul. 18, 2000, pp. 85.
Dow Jones Quick Strike Project Fixed Income Transactions Service Release Notes QA Release 2.0 . . . , Jul. 18, 2000, pp. 13.
Dow Jones Quick Strike Project Fixed Income Transactions Service Software Requirements Specification, Jul. 18, 2000, pp. 60.
Dow Jones Quick Strike Project Fixed Income Transactions Service System Test Document, Jul. 18, 2000, pp. 24.
Dow Jones Quick Strike Project Fixed Income Transactions Service Product Requirements Document, Jul. 18, 2000, pp. 10.
Lori Mensik, Incident Report #1, Apr. 28, 1997, pp. 131.
Lori Mensik, Incident Report, Jun. 19, 1997, pp. 1.
No Title—Dow Jones Jan. 1998, pp. 1.
No Title—Dow Jones, Jul. 1997, pp. 1.
Quick Strike Project, Dec. 31, 1997, pp. 13.
Dow Jones Quick Strike Project Fixed Income Transaction Service System Design Document, Dec. 31, 1997, pp. 23.
Dow Jones Quick Strike Project Fixed Income Transaction Service System Test Document, Dec. 31, 1997, pp. 24.
Dow Jones Quick Strike Project Fixed Income Transaction Service System Administrations Guide and Cookbook, Dec. 31, 1997, pp. 38.
Dow Jones Quick Strike Project Fixed Income Transaction Service System Test Document, Jul. 1, 1997, pp. 24.
Dow Jones Quick Strike Project Fixed Income Transaction Service Product Requirements Document, Jul. 1, 1997, pp. 85.
Dow Jones Quick Strike Project Fixed Income Transaction Service QA Release 0.1, Real Time for IE, Jul. 1, 1997, pp. 21.
Dow Jones Quick Strike Project Fixed Income Transaction Service System Design Document, Jul. 1, 1997, pp. 25.
Dow Jones Quick Strike Project Fixed Income Transaction Service Software Requirements Specification, Jul. 1, 1997, pp. 60.
Dow Jones Quick Strike Project Fixed Income Transaction Service Product Requirements Document, Addendum, Jul. 1, 1997, pp. 24.
Dow Jones Quick Strike Project Fixed Income Transaction Service Release Notes QA Release 2.0 . . . , Dec. 31, 1997, pp. 13.
Dow Jones Quick Strike Project Fixed Income Transaction Service System Administration Guide, Oct. 23, 1997, pp. 39.
Dow Jones Quick Strike Project Fixed Income Transaction Service System Design Document, Oct. 13, 1997, pp. 25.
Dow Jones Quick Strike Project Fixed Income Transaction Service System Test Document, Oct. 28, 1997, pp. 24.
FITS Development Team, Dow Jones Memo—39520, Jul. 1, 1997, pp. 1.
Dow Jones Quick Strike Project Fixed Income Transaction Service QA . . . , Jul. 1, 1997, pp. 21.
Dow Jones Quick Strike Project Fixed Income Transaction Service Product . . . , Oct. 20, 1997, pp. 24.
IEEE Recommended Practice for Software Requirement Specifications, Apr. 8, 1994, pp. 40.
Dow Jones Quick Strike Prokect Fixed Income Transaction Service Product . . . , Dec. 31, 1997, pp. 10.
Dow Jones, Dow Jones Memo, Jun. 10, 2008, pp. 1.
Dow Jones Quick Strike Project Fixed Income Transaction Service Product Requirements Document, Addendum, Dec. 31, 1997, pp. 24.
Contents—39710, Dec. 31, 1997, pp. 1.
Dow Jones Quick Strike Project Fixed Income Transaction Service Product Requirements Document, Dec. 31, 1997, pp. 85.
Dow Jones Quick Strike Project Fixed Income Transaction Service Software Reuirements Specification, Dec. 31, 1997, pp. 60.
Dow Jones Quick Strike Project Fixed Income Transaction Service QA Release 1.5, Real Time for Netscape . . . , Dec. 31, 1997, pp. 13.
FITS Development Team, Dow Jones Memo—39871, Jul. 1, 1997, pp. 1.
DoubleClick, Test Plan for Userinfoserver, Oct. 22, 1998, pp. 18.
DoubleClick, Test Plan for Userinfoserver, Jan. 25, 1999, pp. 26.
DoubleClick / Joseph Bergmann, Quality Assurance Test Plan, Mar. 16, 2000, pp. 7.
Product Build Notification, Jul. 18, 2000, pp. 3.
UIS Test Set Up, Jul. 27, 1998, pp. 1.
DoubleClick, Test Plan for Userinfoserver, Oct. 22, 1998, pp. 29.
Userinfoserver Check list, Nov. 10, 1998, pp. 3.
Version History of UserinfoServer, Jul. 29, 1999, pp. 6.
Board of Directors' Meeting, Apr. 30, 1999, pp. 113.
Found in Interactive Age Daily, Dec. 6, 1995, pp. 1.
DoubleClick, Compaq Management Review, Aug. 6, 1998, pp. 86.
/AdKnowledge, DoubleClick adn AdKnowledge form Strategic Partnership, Jun. 3, 1998, pp. 2.
DoubleClick, Conversation with Microsoft Expedia, Sep. 8, 1998, pp. 30.
Kevin O'Connor, To: Bruce, Dec. 5, 1995, pp. 1.
Kevin O'Connor DoubleClick Inn. The Global Advertising Solutions Company, Dec. 12, 1997, pp. 15.
Kevin O'Connor, Greg Koemer, Feb. 26, 1996, pp. 1.
Kevin O'Connor, David N. Strohm, Nov. 9, 1995, pp. 2.
J. Reed. Inc, Internet Advertising Network—42617, Nov. 10, 1995, pp. 5.
J. Reed. Inc, Internet Advertising Network—42622, Nov. 10, 1995, pp. 5.
J. Reed. Inc, Internet Advertising Network—42627, Nov. 17, 1995, pp. 5.
J. Reed. Inc, Internet Advertising Network—42632, Dec. 7, 1995, pp. 5.
Internet Advertising Network, Network Solutions, Inc., Dec. 6, 1995, pp. 1.
Kevin O'Connor, John Heider, Feb. 27, 1996, pp. 1.

Engineering Deliverables, Jun. 1, 1998 through Aug. 31, 1998, pp. 14.
DoubleClick, Inc, Confidential Business Plan—42970, May 4, 1996, pp. 15.
DoubleClick, Inc, Confidential Business Plan—42985, May 2, 1996, pp. 24.
Advertiser Performance—DoubleClick Direct Sep. 1-30, 1997—43065, pp. 22.
Advertiser Performance—DoubleClick Direct Sep. 1-30, 1997—43087, pp. 21.
DART v2, Jan. 10, 2000, pp. 1.
DoubleClick, Cross Network Insertion Orders, Jan. 8, 1997, pp. 4.
Codes from IDO 3166—43499, Feb. 10, 1994 , pp. 7.
Kevin O'Connor, Stephanie M. Harwood, APR, Jan. 20, 1996, pp. 1.
Kevin O'Connor, Joan P. Lucciola, Oct. 13, 1996, pp. 2.
Matt Power, List of Internet whois servers, Oct. 12, 1995 (Version 3.90), pp. 7.
List of all LISTSERVlists know to LISTSERV@VMI.NODAK.EDU on Oct. 23, 1995, pp. 381.
Kevin O'Connor, Robert Druckenmiller, Jan. 20, 1996, pp. 1.
Kevin O'Connor, Chris Buckingham, Oct. 30, 1995, pp. 2.
Kevin O'Connor, Scott Leonard, Nov. 11, 1995, pp. 2.
The List We List, Aug. 3, 1995, pp. 5.
Internet Advertising Network (IAN) Invoice, Dec. 29, 1995, pp. 1.
Kevin O'Connor, Keith Geeslin, Nov. 14, 1995, pp. 1.
Internet Advertising Network, Advertising Report for ISS Test Ad, Nov. 12, 1995, pp. 9.
J. Reed, Inc., Internet Advertising Network Corporate Brochure—Draft Copy, Nov. 10, 1995, pp. 5.
J. Reed, Inc., Internet Advertising Network Corporate Brochure—Draft Copy, Nov. 17, 1995, pp. 5.
J. Reed, Inc., Internet Advertising Network Corporate Brochure—Draft Copy, Dec. 7, 1995, pp. 5.
Internet Advertising Network, Veteran Computer Industry Pioneers Announce Internet Advertising Network . . . , Nov. 28, 1995, pp. 2.
Internet Advertising Network, Press Releases, Nov. 28, 1995, pp. 1.
Copithorne & Bellows, Internet Advertising Network—45606, Nov. 28, 1995, pp. 2.
No Title—Robert Davoli, Nov. 30, 1995, pp. 2.
Internet Advertising Network, Internet Advertising Network IAF Press Release Status Report of . . . , Nov. 28, 1995, pp. 2.
No Title—Wade Woodson, Nov. 30, 1995, pp. 2.
Internet Advertising Network, No Title—Dave Gwozdz, Dec. 7, 1995, pp. 2.
Internet Advertising Network, Sales Compensation Plan, Dec. 2, 1995, pp. 1.
Dave Gwozdz, Dec. 2, 1995, pp. 1.
Internet Advertising Network, Site Activity Report, Nov. 30, 1995, pp. 8.
Ian & Popp Tyson Agenda, Dec. 18, 1995, pp. 1.
Internet Advertising Network, No Title—Lawrence A. Thomas, Dec. 12, 1995, pp. 2.
To: Dave, Jan. 2, 1996, pp. 1.
poppe.com—45733—45735, Jan. 3, 1996, pp. 3.
poppe.com—45737—45739, Jan. 3, 1996, pp. 3.
Internet Advertising Network, Dear Grant, Jan. 4, 1996, pp. 1.
Kevin O'Connor, Mr. Tom Hawkins, Jan. 19, 1996, pp. 1.
Paul R. Hages, The Forester Report Smart Personalization, Jul. 30, 1999, pp. 20.
SelectCast for Ad Servers, Jun. 25, 1997, pp. 5.
Martin Wesley, Sabela and AdKnowledge Presentation, Jan. 18, 2000, pp. 1.
Declaration of Dwight Allen Merriman, Oct. 29, 1996, pp. 4.
Restricted Confidential—Source Code, Jan. 11, 1996, pp. 38.
Project Freud, Jan. 6, 2000, pp. 4.
Sabela Media Impressions & Reveneus, Dec. 31, 1999, pp. 3.
NetGravity /John Danner, The Future of Internet Advertising, Jun. 30, 1996, pp. 16.
NetGravity, NetGravity AdCenter, Aug. 11, 1998, pp. 12.
NetGravity, NetGravity AdCenter Frequently Asked Questions, Aug. 18, 1998, pp. 2.
NetGravity, AdCenter fpr Agencies Frequently Asked Questions, Aug. 11, 1999, pp. 8.
NetGravity, AdCenter Advertiser Agency MRD, Jan. 11, 2000, pp. 20.
NetGravity AdCenter 3.5 for Publishers Frequently Asked Questions, Feb. 1, 1999, pp. 2.
DoubleClick v L.90: NetGravity Document Production II, Jan. 20, 2000, pp. 1.
NetGravity, Competitive Analysis 2Q98, Jul. 9, 1998, pp. 22.
Goldman Sachs, U.S. Research DoubleClick, Nov. 7, 1997, pp. 14.
Morgan Stanley, The Internet Advertising Report—28013, Dec. 31, 1996, pp. 148.
Morgan Stanley Dean Witter, Advertising & Media The Advertising Report, Aug. 15, 1997, pp. 144.
Forbes, DoubleClick is watching you, Nov. 4, 1996, pp. 4.
Wall Street Journal, Ad-Placement Software Helps Find the Web's Hot Spots, Oct. 23, 1996, pp. 1.
Advertising Age, Digital Media Masters, Sep. 23, 1996, pp. 1.
DoubleClick, Advertising Report—28393, Aug. 26, 1996, pp. 3.
DoubleClick, DoubleClick Rate Card, Mar. 1, 1997, pp. 2.
DoubleClick, DoubleClick Rate Card, Sep. 1, 1996, pp. 1.
DoubleClick, Advertising Report—28427, Jun. 12, 1996, pp. 20.
Fortune, DoubleClick Internet Advertising, Jul. 8, 1996, pp. 2.
DoubleClick, San Francisco Chronicle, Jun. 21, 1996, pp. 1.
Inside Media, Will It Click in Peoria?, May 29, 1996, pp. 1.
DoubleClick, DoubleClick Tletwork Site List, Sep. 13, 1996, pp. 13.
NetGravity 4,080,000 Shares Common Stock, Mar. 30, 1999, pp. 105.
Eric W. Spivey, Dear NetGravity Shareholders: Sep. 24, 1999, pp. 129.
NetGravitv / Competitive—Q3 1998, Sep. 30, 1998, pp. 2.
NetGravity / Competitive—Clip Analysis—Q1 1999, Apr. 5, 1999, pp. 3.
NetGravity / Competitive—Clip Analysis—Q2 1999, Jul. 15, 1999, pp. 3.
Industry Perceptions of NetGravity, Dec. 1, 1998, pp. 17.
Analyst Report Summary, Dec. 31, 1998, pp. 10.
NetGravity Analyst / Media Audit, Dec. 31, 1998, pp. 19.
NetGravity, NetGravity Announces Record Q2 Revenues, Jul. 13, 1999, pp. 1.
DoubleClick, DoubleClick Inc and NetGravity Inc. to Merge, Jul. 13, 1999, pp. 2.
DoubleClick, DoubleClick Board of Directors Meeting, Oct. 29, 1998, pp. 7.
The View Message System, Apr. 12, 1996, pp. 9.
FocaLink Communications, Advertising Performance Report for (Advertiser) Top Line Summary, Jan. 2, 1996, pp. 1.
FocaLink Communications, Advertising Performance Report for (Advertiser) Comprehensive Report by Site, Jan. 2, 1996, pp. 1.
Online Advertising: On Target, Jan. 12, 2000, pp. 5.
Raymond James & Associates, Inc, Equity Research DoubleClick Inc., Dec. 7, 1999, pp. 22.
Thomas Weisel Partners, DoubleClick-Buy, Aug. 23, 1999, pp. 43.
Lazard Freres & CO. LLC, Internet Ad Networks: Initiating coverage of DCLK, TFSM, FCST, Sep. 30, 1999, pp. 141.
Wired News, Partner's Net Results: Nothing?, Sep. 13, 1999, pp. 1.
Securities and Exchange Commission, Sep. 23, 1999, pp. 58.
Report to the stockholders of NetGravity, Inc., Oct. 15, 1996, pp. 3.
NetGravity, NetGravity Corporate Presentation Sep. 1996, pp. 16.
No Title—Srikonda, Sanjay, Jan. 15, 1999, pp. 102.
DoubleClick, Reporting Essentials, Feb. 17, 1998, pp. 46.
Local Resellers Guide, Feb. 28, 1999, pp. 92.
DoubleClick, Cross Network Functionality, Apr. 11, 1998, pp. 9.
Karen Delfau, May 15, 1998, pp. 1.
Karen Delfau, Feb. 11, 2000, pp. 6.
Karen Delfau, Feb. 5, 2000, pp. 1.
Karen Delfau, Oct. 9, 2000, pp. 4.
Karen Delfau, Dec. 8, 2000, pp. 1.
Karen Delfau, Dec. 9, 2000, pp. 9.
Karen Delfau, Dec. 14, 2000, pp. 6.
Karen Delfau, Dec. 6, 2001, pp. 36.
Advertising Age, Advertising Age, Sep. 8, 1997, pp. 3.
Aaddzz, Aaddzz Service is Closed, Oct. 1, 2004, pp. 2.
AdWeek, AdWeek, Jul. 7, 1997, pp. 3.

Accipiter, Inc, Accipter announces Accipiter AdManager . . . , Sep. 9, 1996, pp. 2.
Accipiter, Inc, Accipiter Now Shipping Newly Upgraded AdManager 1.1, Nov. 26, 1996, pp. 2.
Accipiter, Inc, Accipiter Licenses AdManager Software to CNET, Feb. 18, 1997, pp. 3.
Advertising Age, Advertising Age, Sep. 9, 1996, pp. 3.
Advertising Age, Advertising Age, Feb. 24, 1997, pp. 3.
The Economist, The rise of the infomediary, Jun. 24, 1999, pp. 3.
AdForce Introduces AdForce EveryWhere: . . . —5412, Mar. 27, 2000, pp. 3.
AdForce, Inc., AdForce Streamlines Third-Party Ad Serving, Oct. 26, 1998, pp. 2.
Edgar Online, Inc., Overview, May 6, 1999, pp. 9.
Advertising Age, Advertising Age, Oct. 4. 1999, pp. 4.
Advertising Age, Advertising Age, Mar. 1, 1999, pp. 3.
AdForce, TrackForce TechDoc, Feb. 4, 1999, pp. 1.
AdForce, TrackForce, Beta Version 0.5, Feb. 4, 1999, pp. 8.
AdForce, Passing and Using Multiple Parameters in AdForce Tags TechDoc, Nov. 17, 1998, pp. 8.
Passing and Using Multiple Parameters in AdForce Tags TechDoc, Nov. 18, 1998, pp. 1.
Michael F. Heim, Notice of Court Judgement in Concurrent Proceedings Under 37 CFR 1.985, (6,446,045), Sep. 15, 2011, 12 Pages.
Requirement for Further Briefing-045, USPTO, Jan. 27, 2012, pp. 11.
John C. Phillips, Request for Inter Partes Reexamination Transmittal, Jul. 14, 2008, 527 pages, 20080714 Reexam Request for the '587.pdf.
USPTO, Inter Partes Reexamination Communication, Oct. 9, 2008, 29 pages, 20081009 Reexamination Ordered-'587.pdf.
Michael F. Heim, Information Disclosure Statement by Applicant, Feb. 13, 2009, 106 pages, 20090213 '587 IDS.pdf.
Max L. Tribble, Jr., Plantiff's Preliminary Claim Constructions and Preliminary Identification of Extrinsic Evidence, Dec. 19, 2008, 48 pages, 20090213 IDS FM Prelim Claim Constructions-Evidence per PR 4-2.pdf.
Thomas B. Walsh & Max L. Tribble, Jr., Joint Claim Construction and Prehearing Statement, Jan. 30, 2009, 4 pages, 20090213 IDS PACER 73 Jt Claim Construction & Prehearing Statement (LR 4-3). pdf.
Exhibit B Parties' Construction & Support, Jan. 30, 2009, 26 pages, 20090213 IDS PACER 73 Jt Claim Construction & Prehearing Statement (LR 4-3)-Ex 2.pdf.
Carrie J Anderson, Certificate of Service, Aug. 14, 2009, 1 page, 20090814 '587 IDS Certificate of Service.pdf.
Michael F. Heim, Transmittal Form, Aug. 14, 2009, 1 page, 20090814 '587 IDS Transmittal Form.pdf.
Michael F. Heim, Supplemental Information Disclosure Statement, Sep. 17, 2009, 4 pages, 20090917 '587 Supplemental IDS.pdf.
Gene Kincaid, Expert Report of Gene Kincaid Regarding Claim Construction, Feb. 24, 2009, 75 pages, 20090917 Supplemental IDS Kincaid Expert Report (Yahoo).pdf.
USPTO, Office Action in Inter Partes Reexamination, Jan. 28, 2010, 443 pages, 20100128 Office Action & Refs considered by Examiner. pdf.
Amber L. Branum, Certificate of Service, Mar. 29, 2010, 1 page, 20100329 OAR Certificate of Service.pdf.
Deposition of Eli Rousso, Jul. 22, 2009, 55 pages, 20100329 OAR Exhibit 1a.pdf.
AdStar User's Manual for the Orange County Register (c. 1991-96), Mar. 29, 2010, 28 pages, 20100329 OAR Exhibit 1b.pdf.
David S .Kashman, Provisional Application for Patent Cover Sheet, Jun. 28, 2000, 20 pages, 20100329 OAR Exhibit 1c.pdf.
Michael F. Heim, Response, Mar. 29, 2010, 41 pages, 20100329 OAR.pdf.
John C. Phillips, Requester's Comments Subsequent to Patent Owner's Response, Apr. 27, 2010, 47 pages, 20100427 Requester's Comments.pdf.
USPTO, Transmittal of Communication to Third Party Requester inter Partes Reexamination, Jun. 24, 2010, 378 pages, 20100624 Office Action—Non-Final.pdf.
Natasha M. Baudoin, Certificate of Service, Sep. 24, 2010, 1 page, 20100924 Response to Second OA COS.pdf.

Michael F. Heim, Response, Sep. 24, 2010, 40 pages, 20100924 Response to Second OA.pdf.
USPTO, Transmittal of Communication to Third Party Requester inter Partes Reexamination, Nov. 30, 2010, 359 pages, 20101130 Action Closing Presecution.pdf.
File History for 587, Jun. 7, 2002, 111 pages, App B—587 FH.pdf.
ClassManagerPro, Feb. 1, 1997, 157 pages, App E.pdf.
AdForce, Inc., Appendix F2—AdForce SEC, May 6, 1999, 74 pages, App F2—AdForce SEC.pdf.
Reexam of U.S. Patent # 6,829,587, Comments after ACP, Jan. 28, 2011, 17 pages, 20110128_Comments_to_ACP_587.pdf.
Reexam of U.S. Patent # 6,829,587, Requester's Comments Under 37 CFR 1.95(b), Feb. 28, 2011, 12 pages, 20110228_Requesters_Comments_to_Patent_Owners_Comments_to_ACP_587.pdf.
Reexam of U.S. Patent # 6,829,587, Right of Appeal Notice, Mar. 11, 2011, 361 pages, 20110311_Right_of_Appeal_Notice_587.pdf.
Reexam of U.S. Patent # 6,829,587, Notice of Appeal, Apr. 7, 2011, 4 pages, 20110407_Notice_of_Appeal_587.pdf.
Michael F. Heim, Notice of Court Judgement in Concurrent Proceedings Under 37 CFR 1.985 (7,249,059), Sep. 15, 2011, 15 Pages.
Decision on Appeal 2011-010719, Examiner Affirmed-059, USPTO, Jan. 27, 2012, pp. 34.
Michael F. Heim, Notice of Court Judgment in Concurrent Proceedings Under 37 CFR 1.985 (7,240,025), Sep. 15, 2011, 6 Pages.
Amber L. Branum, Certificate of Service, Dec. 9, 2011, 1 Page.
Michael F. Heim, Electronic Acknowledgement Receipt, Dec. 9, 2011, 4 Pages.
Charles Everingham IV, Order—*Function Media LLC* vs *Google, Inc. and Yahoo!, Inc.*, Dec. 16, 2009, 3 Pages.
Charles Everingham IV, Final Judgment—*Function Media LLC* vs *Google, Inc. and Yahoo!, Inc.*, Sep. 9, 2011, 2 Pages.
Charles Everingham IV, Memorandum Opinion and Order—*Function Media LLC* vs *Google, Inc. and Yahoo!, Inc.*, Sep. 9, 2011, 7 Pages.
Charles Everingham IV, Order—*Function Media LLC* vs *Google, Inc. and Yahoo!, Inc.*, Sep. 30, 2011, 1 Page.
Joseph S. Grinstein, Notice of Appeal—*Function Media LLC* vs *Google, Inc. and Yahoo!, Inc.*, Oct. 5, 2011, 6 Pages.
Case Summary, U.S. Court of Appeals for the Federal Circuit, Oct. 5, 2001, 2 Pages.
Max Lalon Tribble, Jr., Appeal, Consent, Jury, Patent, Protective-Order—*Function Media LLC* vs *Google, Inc. and Yahoo!, Inc.*, Dec. 5, 2011, 4 Pages.
Carl G. Anderson, Letter from Quinn Emanuel, Nov. 21, 2011, 4 Pages.
John C. Phillips, Requester's Opposition Under 37 CFR 1.181 to Patent Owner's Petition to Terminate Inter Partes Reexamination; Dec. 21, 2011, p. 7.
Decision on Appeal 2011-010719, Examiner Affirmed-025, USPTO, Jan. 27, 2012, pp. 27.
Function Media LLC, United States Court of Appeals for the Federal Circuit, 2012-1020, 336 Pages.
Brief for Defendant-Appellee Google Inc., Appeal No. 2012-1020 *Function Media, L.L.C. v. Google, Inc. and Yahoo! Inc.*, Charles Verhoeven, Oct. 24, 2011, 79 Pages.
Reexam of U.S. Patent # 6,829,587, Patent Owner's Appeal Brief, Jan. 26, 2010, pp. 73, 20110607_Appeal_Brief_587.pdf.
Correcting Cite # 72 of IDS 9A, AdForce, AdForce Campaign Summary 5900—May 15, 1998, pp. 1.
Correcting Cite # 75 of IDS 9A, Content Units For: Joe's Guitars 5903—Dec. 1997, pp. 1.
Correcting Cite # 79 of IDS 9A, Agency Campaign—Campaign: Agency 1 Status=Active 5907—Jul. 6, 1998, pp. 1.
Correcting Cite # 83 of IDS 9A, AdForce, AdForce Advertiser Report 5911—May 31, 1998, pp. 1.
Correcting Cite # 86 of IDS 9A, AdForce, ADForce Network Report 5914—Jun. 9, 1998, pp. 1.
Correcting Cite # 88 of IDS 9A, AdForce, AdForce Website Report 5916—May 1998, pp. 1.
Correcting Cite # 92 of IDS 9A, Work Queue Items for IMGIS, Demo Network user:Sandi Mathers 5921—Jun. 4, 1998, pp. 1.
Correcting Cite # of IDS 9A, GeoCities and AdForce Counting—A Case Study 5938—5950, Nov. 19, 1998, pp. 13.

Correcting Cite # 96 of IDS 9A, Distribution of Percentage of Hits seen per Unique IP 5952—Dec. 11, 1998, pp. 1.
Correcting Cite # 107 of IDS 9A, AdForce, AdForce Advertiser Report 6000—Jan. 4, 1999, pp. 1.
Correcting Cite # 109 of IDS 9A, Impressions 6006-6009, Nov. 30, 1998, pp. 4.
Correcting Cite # 110 of IDS 9A, AdForce, AdForce Data Request 6010—Nov. 11, 1998, pp. 1.
Correcting Cite # 113 of IDS 9A, Impressions 6017—Jan. 26, 1999, pp. 1.
Correcting Cite # 114 of IDS 9A, Impressions 6018—Jan. 26, 1999, pp. 1.
Correcting Cite # 115 of IDS 9A, Clicks 6019—Jan. 26, 1999, pp. 1.
Correcting Cite # 116 of IDS 9A, Transactions 6020—Feb. 1, 1999, pp. 1.
Correcting Cite # 144 of IDS 9A, Client/IMGIS Network Connectivity Specifications 6209-6211, Created At Least by Dec. 1999, pp. 3.
Correcting Cite # 167 of IDS 9A, AdForceAdministration 6288—Dec. 1998, pp. 1.
Correcting Cite # 168 of IDS 9A, AdForceAdvertising—Schedule New Campaign 6290-6302, Dec. 1998, pp. 13.
Correcting Cite # 169 of IDS 9A, AdForce, Content—View Active Web Sites 6307—Dec. 1998, pp. 1.
Correcting Cite # 182 of IDS 9A, No Title—Diagram 6358—Created At Least by Dec. 1999, pp. 1.
Correcting Cite # 184 of IDS 9A, AdForce, Index 6360-6365, Dec. 1998, pp. 6.
Correcting Cite # 186 of IDS 9A, AdForce, Notifications 6367-6368, Dec. 1998, pp. 2.
Correcting Cite # 187 of IDS 9A, AdForce, Reports Campaign Reports 6370—Dec. 1998, pp. 1.
Correcting Cite # 189 of IDS 9A, Create a New Report for Phil's Games 6372—Feb. 1, 1999, pp. 1.
Correcting Cite # 217 of IDS 9A, Work Queue 6405—Dec. 14, 1998, pp. 1.
Correcting Cite # 242 of IDS 9A, AdForce Campaign Summary 6437—Feb. 16, 1999, pp. 1.
Correcting Cite # 254 of IDS 9A, Ad Campaigns 6452—Aug. 28, 1998, pp. 1.
Correcting Cite # 255 of IDS 9A, Existing Reports for: Phil's Games 6453—Jan. 17, 1999, pp. 1.
Correcting Cite # 257 of IDS 9A, Create a New Report for Phil's Games 6455—Mar. 31, 1999, pp. 1.
Correcting Cite # 265 of IDS 9A, New Campaign for Advertiser: Phil's Games 6470—Mar. 31, 1999, pp. 1.
Correcting Cite # 266 of IDS 9A, Advertising—IMGIS, Demo network 6471—Mar. 5, 1998, pp. 1.
Correcting Cite # 273 of IDS 9A, New Campaign for Advertiser: Phil's Games 6480—Feb. 22, 1999, pp. 1.
Correcting Cite # 274 of IDS 9A, Russo's Computer Tennis Game 6481—Created At Least by Dec. 1999, pp. 1.
Correcting Cite # 275 of IDS 9A, Content Unit 6482—Created At Least by Dec. 1999, pp. 1.
Correcting Cite # 277 of IDS 9A, Agency Campaign 6485—Jul. 1, 1998, pp. 1.
Correcting Cite # 283 of IDS 9A, Agency Campaign—Campaign: Clangin' Keyboards! Status=Entered User frequency=Off 6495—Oct. 7, 1998, pp. 1.
Correcting Cite # 294 of IDS 9A, Demo Advertiser**Test Campaign 482**Test Campaign 482.,Version 2 6516—May 19, 1998, pp. 1.
Correcting Cite # 297 of IDS 9A, Gustavo's Stock Game 6521—Feb. 2, 1999, pp. 1.
Correcting Cite # 305 of IDS 9A, Advertising—AdForce, Demo Network 6531—Aug. 7, 1998, pp. 1.
Correcting Cite # 311 of IDS 9A, Report List 6538—Feb. 19, 1999, pp. 1.
Correcting Cite # 314 of IDS 9A, Report List 6541—Jan. 28, 1999, pp. 1.
Correcting Cite # 315 of IDS 9A, AdForce, Network Report 6542—Jan. 2, 1999, pp. 1.

Correcting Cite # 334 of IDS 9A, AdForce, No Title 6569—Jan. 28, 1999, pp. 1.
Correcting Cite # 335 of IDS 9A, AdForce, No Title 6570—Jan. 28, 1999, pp. 1.
Correcting Cite # 336 of IDS 9A, AdForce, AdForce Client Version 2.6a 6571—Jan. 27, 1999, pp. 1.
Correcting Cite # 345 of IDS 9A, Campaign Check List 6580-6581, Created At Least By Dec. 1999, pp. 2.
Correcting Cite # 346 of IDS 9A, AdForce, Training Online 6582-6585, Created At Least by Dec. 1999, pp. 4.
Correcting Cite # 358 of IDS 9A, AdForce, AdForce User Guide, Version 2.6 6615—Dec. 1998, pp. 1.
Correcting Cite # 361 of IDS 9A, No Title 6910-7031, Oct. 16, 1998, pp. 122.
Correcting Cite # 362 of IDS 9A, No Title 7032-7148, Oct. 16, 1998, pp. 117.
Correcting Cite # of IDS 9A, AdForce, AdForce User Guide, Version 2—Contents 7149-7430, Dec. 1998, pp. 282.
Correcting Cite # 366 of IDS 9A, AdForce, AdForce User Guide, Version 2. 7714-7998, Dec. 1998, pp. 285.
Correcting Cite # 368 of IDS 9A, Backup Procedures 8004-8008, Jul. 17, 1998, pp. 5.
Correcting Cite # 380 of IDS 9A, Enliven Rich Media Redirect 8134-8341, Created At Least by Dec. 1999, pp. 8.
Correcting Cite # 382 of IDS 9A, Client Services Tools 8145-8148, Created At Least by Dec. 1999, pp. 4.
Correcting Cite # 383 of IDS 9A, pubs 8149-8157, Apr. 30, 1998, pp. 9.
Correcting Cite # 384 of IDS 9A, No Title 8158—Jun. 7, 1998, pp. 1.
Correcting Cite # 385 of IDS 9A, No Title 8159—Jun. 7, 1998, pp. 1.
Correcting Cite # 386 of IDS 9A, No Title 8160—Jun. 7, 1998, pp. 1.
Correcting Cite # 387 of IDS 9A, No Title 8161—Jun. 7, 1998, pp. 1.
Correcting Cite # 395 of IDS 9A, AdForce Functional Specification Administration System 8181-8211, Created At Least by Dec. 1999, pp. 31.
Correcting Cite # 407 of IDS 9A, AdForceCreating and Submitting Rich Media Ad Styles 8273-8276, Jan. 27, 1998, pp. 4.
Correcting Cite # 410 of IDS 9A, IMIS Development Environment 8284—Created At Least by Dec. 1999, pp. 1.
Correcting Cite # 413 of IDS 9A, No Title 8294-8296, Apr. 1, 1998, pp. 3.
Correcting Cite # 416 of IDS 9A, FAQs on the Network 8300-8304, Created at Least by Dec. 1999, pp. 5.
Correcting Cite # 425 of IDS 9A, IMGIS, Production Network Diagram 8343—Created At Least by Dec. 1999, pp. 1.
Correcting Cite # 432 of IDs 9A, AdForce, Reporting Enhancements to GUI 8359-8362, Jan. 1, 1998, pp. 4.
Correcting Cite # of IDS 9A, IMGIS, Development Network Diagram 8844—Created at Least by Dec. 1999, pp. 1.
Correcting Cite # 446 of IDS 9A, Content Group Name 8854-8856, Apr. 1, 1998, pp. 3.
Correcting Cite # 447 of IDS 9A, FAQs on the Network 8860-8864, Created at Least by Dec. 1999, pp. 5.
Correcting Cite # 451 of IDS 9A, AdForce User Guide, Version 2.6 9005-9289, Dec. 1998, pp. 285.
Correcting Cite # 477 of IDS 9A, No Title 9554—Created at Least by Dec. 1999, pp. 1.
Correct Cite # 480 of IDS 9A, AdForce, Document Release/Projects Completed Report 9558-9559, Jul. 7, 1998, pp. 2.
Correcting Cite # 481 of IDS 9A, AdForce, Release Documentation Creation, Distribution, and Storage 9560-9561, Dec. 1998, pp. 2.
Correcting Cite # 485 of IDS 9A, GeoCities and AdForce Counting—A Case Study 9581-9592, Nov. 16, 1998, pp. 12.
Correcting Cite # 491 of IDS 9A, Frequently Asked Questions (FAQs) 9622-9629, Created at Least by Dec. 1999, pp. 8.
Correcting Cite # 493 of IDS 9A, Miscellaneous Information 9631-9637, Dec. 1998, pp. 7.
Correcting Cite # 494 of IDS 9A, Advertising Frequently Asked Questions (FAQs) 9638-9654, Created at Least by Dec. 1999, pp. 17.
Correcting Cite # 495 of IDS 9A, Advance Notice for a Campaign Starting or Stopping 9655-9657, Created at Least by Dec. 1999, pp. 3.

Correcting Cite # 496 of IDS 9A, AdForce, Frequently Asked Questions (FAQs) Reports 9658-9705, May 12, 1998, pp. 48.
Correcting Cite # 498 of IDS 9A, Spaces cannot be added in the Link URL 9712-9763, May 6, 1998, pp. 52.
Correcting Cite # of IDS 9A, AdForce, Frequently Asked Questions (FAQs) Reports 9764-9833, Jun. 2, 1998, pp. 70.
Correcting Cite # 500 of IDS 9A, Rick E Bruner, Cache Counting and Busting 9834-9836, Mar. 2, 1998, pp. 3.
Correcting Cite # of IDS 9A, 2 Reports 2 9839-9934, Jun. 2, 1998, pp. 96.
Correcting Cite # 503 of IDS 9A, Frequently Asked Questions (FAQs) Reports 9935-10005, Jun. 2, 1998, pp. 71.
Correcting Cite # 504 of IDS 9A, Frequently Asked Questions (FAQs) 10006-10100, Jun. 2, 1998, pp. 95.
Correcting Cite # of IDS 9A, IMGIS, Inc, AdForce Information Updates 10101-10104, Created at Least by Dec. 1999, pp. 4.
Correcting Cite # 510 of IDS 9A, Competitive Feature Matrix 10136-10138, Created At Least by Dec. 1999, pp. 3.
Correcting Cite # 511 of IDS 9A, AdForce, User Guide Version 2.6 10139-10423, Dec. 1998, pp. 285.
Correcting Cite # 519 of IDS 9A, Frequently Asked Questions (FAQs) Booking a Keyword Campaign 10458-10466, Created at Least by Dec. 1999, pp. 9.
Correcting Cite # of IDS 9A, Frequently Asked Questions (FAQs) Booking a Guaranteed Inventory Campaign 10467-10474, Created at Least by Dec. 1999, pp. 8.
Correcting Cite # 521 of IDS 9A, Frequently Asked Questions (FAQs) Booking an Open Inventory Campaign 10475-10482, Created at Least by Dec. 1999, pp. 8.
Correcting Cite # 522 of IDS 9A, Frequently Asked Questions (FAQs) Editing a Campaign 10483—Created At Least by Dec. 1999, pp. 1.
Correcting Cite # 523 of IDS 9A, Frequently Asked Questions (FAQs) Copying a Campaign 10484—Created At Least by Dec. 1999, pp. 1.
Correcting Cite # 524 of IDS 9A, Frequently Asked Questions (FAQs) Booking a Site Data Campaign 10485-10493, Created At Least by Dec. 1999, pp. 9.
Correcting Cite # 525 of IDS 9A, Frequently Asked Questions (FAQs) Prioritizing a Campaign 10494—Created at Least by Dec. 1999, pp. 1.
Correcting Cite # 526 of IDS 9A, Frequently Asked Questions (FAQs) Campaign Payment Types 10495—Created At Least by Dec. 1999, pp. 1.
Correcting Cite # 527 of IDS 9A, Frequently Asked Questions (FAQs) the difference between Keyword Buys and Site Date Buys 10496, Created At Least by Dec. 1999, pp. 1.
Correcting Cite # 528 of IDS 9A, Frequently Asked Questions (FAQs) The difference between Guaranteed Buys and Open Inventory Buys 10497—Created at Least by Dec. 1999, pp. 1.
Correcting Cite # 529 of IDS 9A, Frequently Asked Questions (FAQs) Campaign Types 10498—Created at Least by Dec. 1999, pp. 1.
Correcting Cite # 9A, Frequently Asked Questions (FAQs) Connecting to AdForce through a Firewall 10499—Created At Least by Dec. 1999, pp. 1.
Correcting Cite # 531 of IDS 9A, Frequently Asked Questions (FAQs) Firewalls 10500—Created At Least by Dec. 1999, pp. 1.
Correcting Cite # 532 of IDS 9A, Frequently Asked Questions (FAQs) Testing Connectivity using AdForce Ping 10501—Created at Least by Dec. 1999, pp. 1.
Correcting Cite # 533 of IDS 9A, Frequently Asked Questions (FAQs) Traceroute 10502—Created At Least by 12/1999, pp. 1.
Correcting Cite # 535 of IDS 9A, Frequently Asked Questions (FAQs) Work Queue 10504-10505, May 12, 1998, pp. 2.
Correcting Cite # 540 of IDS 9A, Frequently Asked Questions (FAQs) Available AdForce Reports 10512-10513, Created at Least by Dec. 1999, pp. 2.
Correcting Cite # of IDS 9A, Frequently Asked Questions (FAQs) How to Decline a Campaign 10518—Created at Least by Dec. 1999, pp. 1.

Correcting Cite # 544 of IDS 9A, Frequently Asked Questions (FAQs) Runtime Demographis (RIDs) 10519—Created At Least by Dec. 1999, pp. 1.
Correcting Cite # 545 of IDS 9A, Frequently Asked Questions (FAQs) Ad Caps 10520—Created at Least by Dec. 1999, pp. 1.
Correcting Cite # 546 of IDS 9A, Frequently Asked Questions (FAQs) Can JPEGs be Uploaded into AdForce? 10521—Created At Least by Dec. 1999, pp. 1.
Correcting Cite # 547 of IDS 9A, Frequently Asked Questions (FAQs) Adding a New Advertiser 10522—Created at Least by Dec. 1999, pp. 1.
Correcting Cite # 548 of IDS 9A, Frequently Asked Questions (FAQs) Running Avails 10523—Created At Least by Dec. 1999, pp. 1.
Correcting Cite # 549 of IDS 9A, Frequently Asked Questions (FAQs) Avails 10524—Created at Least by Dec. 1999, pp. 1.
Correcting Cite # 550 of IDS 9A, Frequently Asked Questions (FAQs) replication 10525—Created At Least by Dec. 1999, pp. 1.
Correcting Cite # of IDS 9A, Frequently Asked questions (FAQs) A Web Site was not Targeted when a Specific Niche was selected 10527—Created at Least by Dec. 1999, pp. 1.
Correcting Cite # 553 of IDS 9A, Frequently Asked Questions (FAQs) Frequency Cap 10528—Created At Least by Dec. 1999, pp. 1.
Correcting Cite # of IDS 9A, Frequently Asked Questions (FAQs) Measuring Ad Delivery Frequency 10529—Created at Least by Dec. 1999, pp. 1.
Correcting Cite # 555 of IDS 9A, Frequently Asked Questions (FAQs) IMS Error *Under Construction* 10530—Created at Least by Dec. 1999, pp. 1.
Correcting Cite # 556 of IDS 9A, Frequently Asked Questions (FAQs) How IMS Works 10531—Created At Least by Dec. 1999, pp. 1.
Correcting Cite # of IDS 9A, Frequently Asked Questions (FAQs) Calculating Available Inventory 10533—Created at Least by Dec. 1999, pp. 1.
Correcting Cite # 559 of IDS 9A, Frequently Asked Questions (FAQs) How many Keywords and Data Words Can Be . . . 10534—Created at Least by Dec. 1999, pp. 1.
Correcting Cite # 560 of IDS 9A, Frequently Asked Questions (FAQs) Using Alt Text worth both the GIF and JavaScript Tags 10535—Created at Least by Dec. 1999, pp. 1.
Correcting Cite # 561 of IDS 9A, Frequently Asked Questions (FAQs) How to Create and Post a Transaction Tag 10536—Created at Least by Dec. 1999, pp. 1.
Correcting Cite # 562 of IDS 9A, Frequently Asked Questions (FAQs) How Transaction Tags Work 10537—Created at Least by Dec. 1999, pp. 1.
Correcting Cite # 563 of IDS 9A, Frequently Asked Questions (FAQs) Transaction Tags 10538—Created at Least by Dec. 1999, pp. 1.
Correcting Cite # 564 of IDS 9A, Frequently Asked Questions (FAQs) Testing a Redirect Image 10539—Created at Least by Dec. 1999, pp. 1.
Correcting Cite # 565 of IDS 9A, Frequently Asked Questions (FAQs) Uploading Rich Media 10540—Created at Least by Dec. 1999, pp. 1.
Correcting Cite # 566 of IDS 9A, Frequently Asked Questions (FAQs) Uploading Redirects 10541—Created at Least by Dec. 1999, pp. 1.
Correcting Cite # 567 of IDS 9A, Frequently Asked Questions (FAQs) Uploading JavaScript Banners 10542—Created at Least by Dec. 1999, pp. 1.
Correcting Cite # of IDS 9A, Frequently Asked Questions (FAQs) Uploading an HTML Banners 10543—10544, Created at Least by Dec. 1999, pp. 2.
Correcting Cite # 569 of IDS 9A, Frequently Asked Questions (FAQs) Uploading a Java Applet 10545—Created at Least by Dec. 1999, pp. 1.
Correcting Cite # 570 of IDS 9A, Frequently Asked Questions (FAQs) Uploading Banners 10546—Created at Least by Dec. 1999, pp. 1.

Correcting Cite # 571 of IDS 9A, Frequently Asked Questions (FAQs) What is an Ad Banner? 10547—Created At Least by Dec. 1999, pp. 1.
Correcting Cite # 576 of IDS 9A, Frequently Asked Questions (FAQs) Alt Text Limitations 10552—Created at Least by Dec. 1999, pp. 1.
Correcting Cite # 577 of IDS 9A, Frequently Asked Questions (FAQs) What is Alt Text? 10553—Created at Least by Dec. 1999, pp. 1.
Correcting Cite # 578 of IDS 9A, Frequently Asked Questions (FAQs) Why Campaign Delivery did not Occur . . . 10554—Created at Least by Dec. 1999, pp. 1.
Correcting Cite # 579 of IDS 9A, Frequently Asked Questions (FAQs) Why is a Campaign Declined? 10555—Created at Least by Dec. 1999, pp. 1.
Correcting Cite # 580 of IDS 9A, Frequently Asked Questions (FAQs) View Declined by 10556—Created at Least by Dec. 1999, pp. 1.
Correcting Cite # 581 of IDS 9A, Frequently Asked Questions (FAQs) Ending a Campaign 10557—Created at Least by Dec. 1999, pp. 1.
Correcting Cite # 582 of IDS 9A, Frequently Asked Questions (FAQs) How to Prevent a Campaign from Serving 10558—Created at Least by Dec. 1999, pp. 1.
Correcting Cite # 583 of IDS 9A, Frequently Asked Questions (FAQs) Searching for Campaigns 10559—Created at Least by Dec. 1999, pp. 1.
Correcting Cite # 584 of IDS 9A, Frequently Asked Questions (FAQs) Why Campaign Delivery did not Occur . . . 10561—Created at Least by Dec. 1999, pp. 1.
Correcting Cite # 585 of IDS 9A, Frequently Asked Questions (FAQs) AdForce Users 10562—Created at Least by Dec. 1999, pp. 1.
Correcting Cite # 589 of IDS 9A, Frequently Asked Questions (FAQs) AdForce Cookies 10566—Created at Least by Dec. 1999, pp. 1.
Correcting Cite # 590 of IDS 9A, Frequently Asked Questions (FAQs) How Targeting Works 10567—Created at Least by Dec. 1999, pp. 1.
Correcting Cite # 594 of IDS 9A, Frequently Asked Questions (FAQs) How Long Before a Change Goes Live in AdForce? 10571—Created at Least by Dec. 1999, pp. 1.
Correcting Cite # 595 of IDS 9A, Frequently Asked Questions (FAQs) Setting up a Niche 10572—Created at Least by Dec. 1999, pp. 1.
Correcting Cite # 596 of IDS 9A, Frequently Asked Questions (FAQs) Registering a Content Unit in a Niche category 10573—Created at Least by Dec. 1999, pp. 1.
Correcting Cite # 597 of IDS 9A, Frequently Asked Questions (FAQs) Niches 10574—Created at Least by Dec. 1999, pp. 1.
Correcting Cite # 598 of IDS 9A, Frequently Asked Questions (FAQs) How to Prevent Cashing Using AdForce Tags 10575—Created at Least by Dec. 1999, pp. 1.
Correcting Cite # 599 of IDS 9A, Frequently Asked Questions (FAQs) Smart Caching 10576—Created at Least by Dec. 1999, pp. 1.
Correcting Cite # 600 of IDS 9A, Frequently Asked Questions (FAQs) Cache Busting 10577—Created at Least by Dec. 1999, pp. 1.
Correcting Cite # 606 of IDS 9A, Frequently Asked Questions (FAQs) Default Banner 10583—Created at Least by Dec. 1999, pp. 1.
Correcting Cite # 609 of IDS 9A, Frequently Asked Questions (FAQs) Difference between Validated and Ad Ready Pending for . . . 10586—Created At Least by Dec. 1999, pp. 1.
Correcting Cite # 613 of IDS 9A, Frequently Asked Questions (FAQs) Keyword Targetable vs. Site Data Targetable 10590—Created at Least by Dec. 1999, pp. 1.
Correcting Cite # 614 of IDS 9A, Frequently Asked Questions (FAQs) It is Possible to Enter Default Prices per Web Site and/or Content Unit? 10591—Created At Least by Dec. 1999, pp. 1.
Correcting Cite # 616 of IDS 9A, Frequently Asked Questions (FAQs) How to Setup a New Content Unit 10593-10594, Created At Least by Dec. 1999, pp. 2.
Correcting Cite # 620 of IDS 9A, Frequently Asked Questions (FAQs) Using a Single Tag on Multiple Web Pages 10598—Created At Least by Dec. 1999, pp. 1.
Correcting Cite # 621 of IDS 9A, Frequently Asked Questions (FAQs) What is Shockwave? 10599—Created at Least by Dec. 1999, pp. 1.
Correcting Cite # 622 of IDS 9A, Frequently Asked Questions (FAQs) Difference between AdForce's JavaScript Tag and the HTML Tag Issue 10600—Created at Least by Dec. 1999, pp. 1.
Correcting Cite # 623 of IDS 9A, Frequently Asked Questions (FAQs) JavaScript Tag in Tables and ASP Pages 10601—Created At Least by Dec. 1999, pp. 1.
Correcting Cite # 624 of IDS 9A, Frequently Asked Questions (FAQs) Identifying Java-Tagged Site 10602—Created at Least by Dec. 1999, pp. 1.
Correcting Cite # 627 of IDS 9A, Frequently Asked Questions (FAQs) Reaccepting a Campaign after it has been Declined 10605—Created at Least by Dec. 1999, pp. 1.
Correcting Cite #628 of IDS 9A, Frequently Asked Questions (FAQs) AdForce Modules 10606—Created at Least by Dec. 1999, pp. 1.
Correcting Cite # 629 of IDS 9A, Frequently Asked Questions (FAQs) Creating Folders and Adding Content 10607—Created at Least by Dec. 1999, pp. 1.
Correcting Cite # 632 of IDS 9A, Frequently Asked Questions (FAQs) Advertiser and Campaign Trees 10610—Created at Least by Dec. 1999, pp. 1.
Correcting Cite # 633 of IDS 9A, Frequently Asked Questions (FAQs) Sending a Broadcast Message 10611—Created at Least by Dec. 1999, pp. 1.
Correcting Cite # 637 of IDS 9A, Frequently Asked Questions (FAQs) Advance Notice for a Campaign Starting or Stopping 10615—Created at Least by Dec. 1999, pp. 1.
Correcting Cite # 638 of IDS 9A, Frequently Asked Questions (FAQs) What is Guaranteed Inventory Buy? 10616—Created at Least by Dec. 1999, pp. 1.
Correcting Cite # 639 of IDS 9A, Frequently Asked Questions (FAQs) What is a Site Data Buy ? 10617—Created at Least by Dec. 1999, pp. 1.
Correcting Cite # 640 of IDS 9A, Frequently Asked Questions (FAQs) What is an Open Inventory Buy? 10618—Created at Least by Dec. 1999, pp. 1.
Correcting Cite # 641 of IDS 9A, Frequently Asked Questions (FAQs) What is a Keyword Buy? 10619—Created at Least by Dec. 1999, pp. 1.
Correcting Cite # 642 of IDS 9A, Frequently Asked Questions (FAQs) What is an Agency Buy? 10620—Created at Least by Dec. 1999, pp. 1.
Correcting Cite # 643 of IDS 9A, Frequently Asked Questions (FAQs) Scheduling a New Campaign 10621-10629, Created at Least by Dec. 1999, pp. 1.
Correcting Cite # 644 of IDS 9A, Frequently Asked Questions (FAQs) Booking a Transaction Campaign 10630-10638—Created at Least by Dec. 1999, pp. 1.
Correcting Cite # 645 of IDS 9A, Frequently Asked Questions (FAQs) Associate Creative 10639—Created at Least by Dec. 1999, pp. 1.
Correcting Cite # 648 of IDS 9A, Frequently Asked Questions (FAQs) Defined Creatives 10642-10643—Created at Least by Dec. 1999, pp. 1.
Correcting Cite # 649 of IDS 9A, Frequently Asked Questions (FAQs) Apply Runtime Target 10644-10645—Created at Least by Dec. 1999, pp. 1.
Correcting Cite # 650 of IDS 9A, Frequently Asked Questions (FAQs) Apply Rate to Agency Campaign 10646-10647—Created at Least by Dec. 1999, pp. 1.
Correcting Cite # 651 of IDS 9A, Frequently Asked Questions (FAQs) What are Provider Profiles? 10648—Created at Least by Dec. 1999, pp. 1.
Correcting Cite # 652 of IDS 9A, Frequently Asked Questions (FAQs) Apply Content Target 10649—Created at Least by Dec. 1999, pp. 1.
Correcting Cite # 653 of IDS 9A, Frequently Asked Questions (FAQs) Agency Campaign Tree 10650—Created at Least by Dec. 1999, pp. 1.

Correcting Cite # 655 of IDS 9A, Frequently Asked Questions (FAQs) Scheduling an Agency Buy 10652-10655—Created at Least by Dec. 1999, pp. 1.
Correcting Cite # 657 of IDS 9A, Frequently Asked Questions (FAQs) Campaign Status 10658—Created at Least by Dec. 1999, pp. 1.
Correcting Cite # 659 of IDS 9A, Frequently Asked Questions (FAQs) Validating a Campaign 10661—Created at Least by Dec. 1999, pp. 1.
Correcting Cite # 661 of IDS 9A, Frequently Asked Questions (FAQs) Push Campaign Now 10663—Created at Least by Dec. 1999, pp. 1.
Correcting Cite # 667 of IDS 9A, Frequently Asked Questions (FAQs) Send Notifications 10669—Created at Least by Dec. 1999, pp. 1.
Correcting Cite # 670 of IDS 9A, Frequently Asked Questions (FAQs) Edit Keywords 10672—Created at Least by Dec. 1999, pp. 1.
Correcting Cite # 671 of IDS 9A, Frequently Asked Questions (FAQs) Edit Creatives 10673—Created at Least by Dec. 1999, pp. 1.
Correcting Cite # 674 of IDS 9A, Frequently Asked Questions (FAQs) What is a Content Unit? 10676—Created at Least by Dec. 1999, pp. 1.
Correcting Cite # 675 of IDS 9A, Frequently Asked Questions (FAQs) What is a Site Data Content Unit? 10677—Created at Least by Dec. 1999, pp. 1.
Correcting Cite # 676 of IDS 9A, Frequently Asked Questions (FAQs) What is a Keyword Content Unit? 10678—Created at Least by Dec. 1999, pp. 1.
Correcting Cite # 677 of IDS 9A, Frequently Asked Questions (FAQs) Answering Questionnaires 10679—Created at Least by Dec. 1999, pp. 1.
Correcting Cite # 678 of IDS 9A, Frequently Asked Questions (FAQs) Edit Web Site Info 10680—Created at Least by Dec. 1999, pp. 1.
Correcting Cite # 680 of IDS 9A, Frequently Asked Questions (FAQs) Adding a New Web Site Info 10682-10683—Created at Least by Dec. 1999, pp. 1.
Correcting Cite # 681 of IDS 9A, Frequently Asked Questions (FAQs) Viewing a Transaction Tag 10684—Created at Least by Dec. 1999, pp. 1.
Correcting Cite # 682 of IDS 9A, Frequently Asked Questions (FAQs) Edit All Rates 10685—Created at Least by Dec. 1999, pp. 1.
Correcting Cite # 683 of IDS 9A, Frequently Asked Questions (FAQs) Deactivate a Web Site/Content Unit 10686—Created at Least by Dec. 1999, pp. 1.
Correcting Cite # 684 of IDS 9A, Frequently Asked Questions (FAQs) Activate a Web Site/Content Unit 10687—Created at Least by Dec. 1999, pp. 1.
Correcting Cite # 685 of IDS 9A, Frequently Asked Questions (FAQs) Show Tree Expanded Showing All 10688—Created at Least by Dec. 1999, pp. 1.
Correcting Cite # 692 of IDS 9A, Frequently Asked Questions (FAQs) Profile Builder 10695—Created at Least by Dec. 1999, pp. 1.
Correcting Cite # 696 of IDS 9A, Frequently Asked Questions (FAQs) Questionnaire Builder 10700—Created at Least by Dec. 1999, pp. 1.
Correcting Cite # 697 of IDS 9A, Frequently Asked Questions (FAQs) Media Plans 10701—Created At Least by Dec. 1999, pp. 1.
Correcting Cite # 698 of IDS 9A, Frequently Asked Questions (FAQs) Viewing AdForce Web Tags 10702—Created at Least by Dec. 1999, pp. 1.
Correcting Cite # 699 of IDS 9A, Frequently Asked Questions (FAQs) JavaScript Tag 10703—Created at Least by Dec. 1999, pp. 1.
Correcting Cite # 700 of IDS 9A, Frequently Asked Questions (FAQs) IFRAME Tag 10704—Created At Least by Dec. 1999, pp. 1.
Correcting Cite # 701 of IDS 9A, Frequently Asked Questions (FAQs) HTML Tag 10705—Created At Least by 12/1999, pp. 1.
Correcting Cite # 702 of IDS 9A, Frequently Asked Questions (FAQs) Transaction Tags 10706—Created at Least by Dec. 1999, pp. 1.
Correcting Cite # 706 of IDS 9A, Frequently Asked Questions (FAQs) What is a Shockwave Banner? 10710—Created at Least by Dec. 1999, pp. 1.
Correcting Cite # 711 of IDS 9A, AdForce, Content Group Name 10830-10832, Apr. 1, 1998, pp. 3.
Correcting Cite # 731 of IDS 9A, AdForce, No Title 11008—Dec. 1999, pp. 1.
Correcting Cite # 732 of IDS 9A, AdForce, Inc, Agency Training guide Version 2.6.1 11009-11043, Dec. 1999, pp. 35.
Correcting Cite # 733 of IDS 9A, AdForce, Inc, Agency Training Guide Version 2.6.1 11044—Dec. 1999, pp. 1.
Correcting Cite # 735 of IDS 9A, AdForce, Inc, User Guide Version 2.6 11051—Dec. 1998, pp. 1.
Correcting Cite # of IDS 9A, AdForce, Contents (AdForce User Guide, Version 2.6) 11585-11866, Dec. 1998, pp. 282.
Correcting Cite # of IDS 9A, AdForce, Inc, User Guide Version 2.6 12150-12434, Dec. 1998, pp. 285.
Correcting Cite # 740 of IDS 9A, AdForce, Incm Scheduling and Agency Buy 12435-12455, Jun. 6, 1998, pp. 21.
Correcting Cite # 742 of IDS 9A, AdForce, Inc, User Guide 2.5 12459—Dec. 1998, pp. 1.
Correcting Cite # 745 of IDS 9A, AdForce, Incm Contents (AdForce User Guide, Version 2.6) 12734-13021, Dec. 1998, pp. 288.
Correcting Cite # 748 of IDS 9A, AdForce, Inc, AdForce Technical Schematic Overview 13316-13321, Dec. 1997, pp. 6.
Correcting Cite # 783 of IDS 9A, Document Release Report 13357—Sep. 7, 1998, pp. 1.
Correcting Cite # 805 of IDS 9A, 10.1 SGS Servers 13379—Created at Least by Dec. 1999, pp. 1.
Correcting Cite # 806 of IDS 9A, 10.1 SGS Servers 13380—May 12, 1998, pp. 1.
Correcting Cite # 807 of IDS 9A, AdForce, Inc., AdForce Service 13384-13385, Dec. 1998, pp. 2.
Correcting Cite # 808 of IDS 9A, AdForce, Inc., Content Web Tags 13386-13393, Dec. 1998, pp. 8.
Correcting Cite # 812 of IDS 9A, No Title—Diagram 13421—Created at Least by Dec. 1999, pp. 1.
Correcting Cite # 813 of IDS 9A, No Title—Diagram 13423—Created at Least by Dec. 1999, pp. 1.
Correcting Cite # 814 of IDS 9A, No Title—Diagram 13424—Created at Least by Dec. 1999, pp. 1.
Correcting Cite # 818 of IDS 9A, AdForce, Inc., Reports 13439—Dec. 1998, pp. 1.
Correcting Cite # 834 of IDS 9A, impression forecast vs actuals 13618—Feb. 1, 1998, pp. 1.
Correcting Cite # 835 of IDS 9A, total ads vs default ads 13619—Jan. 1, 1998, pp. 1.
Correcting Cite # 836 of IDS 9A, No Title—Graph 13620—Jan. 1, 1998, pp. 1.
Correcting Cite # 839 of IDS 9A, No Title—Graph 13623—Feb. 1, 1998, pp. 1.
Correcting Cite # 840 of IDS 9A, clients longins by network 13624—Feb. 1, 1998, pp. 1.
Correcting Cite # 841 of IDS 9A, No Title—Graph 13625—Feb. 1, 1998, pp. 1.
Correcting Cite # 843 of IDS 9A, AdForce, Inc., Document Creation and Review Process Flowchart 13629-13634, Created at Least by Dec. 1999, pp. 6.
Correcting Cite # 845 of IDS 9A, Contents (Beta Version 1) 13636-13731, Sep. 30, 1998, pp. 96.
Correcting Cite # 846 of IDS 9A, AdForce, Inc., Additional Help 13733-13734, Dec. 1998, pp. 2.
Correcting Cite # 847 of IDS 9A, AdForce, Inc., Administration 13737-13743, Dec. 1998, pp. 7.
Correcting Cite # 848 of IDS 9A, Advertising 13745-13768, Created at Least by Dec. 1999, pp. 24.
Correcting Cite # 849 of IDS 9A, AdForce, Inc., Content—Add New Web Site 13773-13784, Dec. 1998, pp. 12.
Correcting Cite # 854 of IDS 9A, AdForce, Inc., Index 13859-13868, Dec. 1998, pp. 10.
Correcting Cite # 855 of IDS 9A, AdForce, Inc., Media Plans 13870-13871, Dec. 1998, pp. 2.
Correcting Cite # 856 of IDS 9A, AdForce, Inc., Notifications 13873-13874, Dec. 1998, pp. 2.
Correcting Cite # 857 of IDS 9A, AdForce, Inc., Reports 13876-13877, Dec. 1998, pp. 2.

Correcting Cite # 859 of IDS 9A, No Title—Diagram 13879—Created at Least by Dec. 1999, pp. 1.
Correcting Cite # 868 of IDS 9A, Campaign Checklist 14075-14076, Created at Least by Dec. 1999, pp. 2.
Correcting Cite # 869 of IDS 9A, AdForce, Inc., Training Online 14077-14080, Created at Least by Dec. 1999, pp. 4.
Correcting Cite # 871 of IDS 9A, Excerise 1; Book a campaign to meet the following specifications: 14084-14086, Created at Least by Dec. 1999, pp. 3.
Correcting Cite # 880 of IDS 9A, Agency Campaign: World Traveler Status=Active User frequency=Off 14104—Sep. 27, 1998, pp. 1.
Correcting Cite # 881 of IDS 9A, AdForce makes no statements or warranties with respect to the contents . . . 14112—Dec. 1999, pp. 1.
Correcting Cite # 882 of IDS 9A, rotation percentage for that banner 14151—Created at Least by Dec. 1999, pp. 1.
Correcting Cite # 885 of IDS 9A, Work Queue Items for ADFORCE, Demo network User: Sandi Mathers 14156—Jun. 4, 1998, pp. 1.
Correcting Cite # 889 of IDS 9A, AdForce.com 14167—Dec. 1998, pp. 1.
Correcting Cite # 936 of IDS 9A, AdForce, Existing Reports For: ADFORCE, Demo Network 14314—Jun. 8, 1998, pp. 1.
Correcting Cite # 939 of IDS 9A, AdForce, Existing Reports For:AdForce 14317—Jun. 8, 1998, pp. 1.
Correcting Cite # 940 of IDS 9A, Network Summary by website for IMGIS 14318—Jun. 8, 1998, pp. 1.
Correcting Cite # 947 of IDS 9A, AdForce, Work Queue Items for AdForce 14335—Jun. 4, 1998, pp. 1.
Correcting Cite # 973 of IDS 9A, Existing Reports For: ADFORCE, Demo Network 14499—Jun. 8, 1998, pp. 1.
Correcting Cite # 974 of IDS 9A, AdForce Network Report 14500—Jun. 8, 1998, pp. 1.
Correcting Cite # 984 of IDS 9A, AdForce, Inc., Additional Help 14606—Dec. 1998, pp. 1.
Correcting Cite # 985 of IDS 9A, AdForce, Inc., Advertising 14611-14612, Dec. 1998, pp. 2.
Correcting Cite # 986 of IDS 9A, AdForce, Inc., AdForce Service 14613-14615, Dec. 1998, pp. 3.
Correcting Cite # 987 of IDS 9A, AdForce, Inc., Content—Add New Content Unit 14617-14626, Dec. 1998, pp. 10.
Correcting Cite # 988 of IDS 9A, Cache Prevention Techniques 14628-14635, Sep. 15, 1998, pp. 8.
Correcting Cite # 992 of IDS 9A, AdForce, Inc., Index 14675-14678, Dec. 1998, pp. 4.
Correcting Cite # 993 of IDS 9A, AdForce, Inc., Notifications 14680—Dec. 1998, pp. 1.
Correcting Cite # 994 of IDS 9A, AdForce, Inc., Reports 14682—Dec. 1998, pp. 1.
Correcting Cite # 995 of IDS 9A, AdKnowledge, Customer Reference Guide 14689-14778, May 12, 2000, pp. 90.
Correcting Cite # 996 of IDS 9A, AdKnowledge, Campaign Manager 14779-14801, Nov. 15, 1998, pp. 23.
Correcting Cite # 997 of IDS 9A, AdKnowledge, Company Overview 14802-14803, Jan. 28, 1999, pp. 2.
Correcting Cite # 998 of IDS 9A, AdKnowledge, I-traffic—AdKnowledge Customer 14804-14805, May 3, 1999, pp. 2.
Correcting Cite # 1001 of IDS 9A, AdKnowledge, Campaign Manager 14815-14818, Oct. 31, 1998, pp. 4.
Correcting Cite # 1002 of IDS 9A, AdKnowledge, Campaign Manager 14819-14821, Feb. 21, 1999, pp. 3.
Correcting Cite # 1005 of IDS 9A, FocalLink Communications, MarketMatch User Guide 14828-14855, Created At Least by Dec. 1999, pp. 28.
Correcting Cite # 1006 of IDS 9A, AdKnowledge, MarketMatch Planner 14856-14881, Apr. 15, 1999, pp. 26.
Correcting Cite # 1008 of IDS 9A, AdKnowledge, SmartBanner 14885-4887, Feb. 22, 1999, pp. 3.
Correcting Cite # 1009 of IDS 9A, AdKowledge, The AdKnowledge System 14888-14889, Feb. 21, 1999, pp. 2.
Correcting Cite # 1012 of IDS 9A, Advertising A Unified Approach to Advertising Management 14899-14913, Created at Least by Dec. 1999, pp. 15.
Correcting Cite # 1013 of IDS 9A, Eclipse Services, AdPro 14914-14922, Feb. 22, 1999, pp. 9.

Correcting Cite # 1015 of IDS 9A, Eclipse Services, AdPro 14939-14942, Dec. 2007, pp. 4.
Correcting Cite # 1019 of IDS 9A, PR Newswire, C/Net: 14964-14966, Dec. 6, 1995, pp. 3.
Correcting Cite # 1020 of IDS 9A, DoubleClick, DoubleClick Lead Form 14967-14989, Feb. 5, 1998, pp. 23.
Correcting Cite # 1021 of IDS 9A, ClickZ 14990-14995, Feb. 19, 1998, pp. 6.
Correcting Cite # 1022 of IDS 9A, DoubleClick Technical Specs 14996-14998, Feb. 5, 1998, pp. 3.
Correcting Cite # 1023 of IDS 9A, Doubleclick, Inc., DoubleClick Case Study 14999—Created at Least by Dec. 1999, pp. 1.
Correcting Cite # 1024 of IDS 9A, Doubleclick, Inc., DoubleClick Case Study 15000—Created at Least by Dec. 1999, pp. 1.
Correcting Cite # 1025 of IDS 9A, Doubleclick, Inc., DoubleClick Lead Form 15001—Feb. 5, 1998, pp. 1.
Correcting Cite # 1027 of IDS 9A, Doubleclick, Ad Trafficking 15008-15009, Dec. 6, 1998, pp. 2.
Correcting Cite # 1030 of IDS 9A, DoubleClick, Beyond the Banner 15016—Jan. 27, 1999, pp. 1.
Correcting Cite # 1031 of IDS 9A, DoubleClick, Beyond the Banner 15017—Dec. 5, 1998, pp. 1.
Correcting Cite # 1032 of IDS 9A, DoubleClick, Welcome to DoubleClick 15018-15094, Aug. 5, 1996, pp. 77.
Correcting Cite # 1033 of IDS 9A, DoubleClick, DART Frequently Asked Questions 15095-15097, Dec. 5, 1998, pp. 3.
Correcting Cite # 1037 of IDS 9A, DoubleClick DART 15108-15123, Jun. 19, 1998, pp. 16.
Correcting Cite # 1038 of IDS 9A, DoubleClick, Enhanced Ad Banner Specs 15124-15125, Dec. 1, 1998, pp. 2.
Correcting Cite # 1041 of IDS 9A, DoubleClick, How DART Works 15134—Dec. 6, 1998, pp. 1.
Correcting Cite # 1042 of IDS 9A, Ingredient Co-Branding: Net Firms Leverage Logos 15135-15136, Created at Least by Dec. 1999, pp. 2.
Correcting Cite # 1045 of IDS 9A, DoubleClick, Outsourceing Ad Sales FAQ 15141-15142, Dec. 6, 1998, pp. 2.
Correcting Cite # 1046 of IDS 9A, Journal of Broadcasting & Electronic Media, vol. 46 No. 4 Dec. 2002 15143-15155, Dec. 2002, pp. 13.
Correcting Cite # 1048 of IDS 9A, DoubleClick, Standard Ad Sizes 15162-15163, Dec. 6, 1998, pp. 2.
Correcting Cite # 1049 of IDS 9A, DoubleClick, Targeting Filters 15164-15165, Dec. 2, 1998, pp. 2.
Correcting Cite # 1050 of IDS 9A, DoubleClick, Terms of Agreement 15166-15167, Dec. 6, 1998, pp. 2.
Correcting Cite # 1051 of IDS 9A, NetGravity, NetGravity AdServer Help 15168-15240, Apr. 20, 2000, pp. 73.
Correcting Cite # 1052 of IDS 9A, NetGravity, About NetGravity AdServer 15241-15443, Apr. 20, 2000, pp. 203.
Correcting Cite # 1053 of IDS 9A, Engage Technologies, ClickZ 1544—Aug. 11, 1998, pp. 1.
Correcting Cite # 1057 of IDS 9A, About Engage Technologies 15454-15466, Jul. 9, 1998, pp. 13.
Correcting Cite # 1060 of IDS 9A, Flycast Corp., Form S-1 SEC Filing 15473-15994, Feb. 5, 1999, pp. 522.
Correcting Cite # 1065 of IDS 9A, FocalLink, Welcome to FocalLink 16006-16039, Aug. 4, 1996, pp. 34.
Correcting Cite # 1067 of IDS 9A, Vermeer Technologies, Getting Started Front Page 16041-16134, Dec. 1995, pp. 94.
Correcting Cite # 1068 of IDS 9A, Global Networks Inc., About Global News Incorporated 16135-16136, Jan. 26, 2000, pp. 2.
Correcting Cite # 1069 of IDS 9A, Global Networks Inc., Demographic Geographic On-Line Newspaper Network 16137—Nov. 11, 1999, pp. 1.
Correcting Cite # 1070 of IDS 9A, Global Networks Inc., No Title—gni 16138—May 10, 2000, pp. 1.
Correcting Cite # 1071 of IDS 9A, Global Networks Inc., Global Networks Inc. 16139-16140, Sep, 16, 2000, pp. 2.
Correcting Cite # 1072 of IDS 9A, Global Networks Inc., How it Works 16141-16145, Apr. 8, 2000, pp. 5.
Correcting Cite # 1073 of IDS 9A, Global Networks Inc., About Global Networks Inc. 16146-16148, May 10, 2000, pp. 3.

Correcting Cite # 1074 of IDS 9A, Global Networks Inc., Available Networks 16149-16150, Sep. 16, 2000, pp. 2.
Correcting Cite # 1075 of IDS 9A, Jupiter Online Media, Ad Management Software Comparison Chart 16151-16152, Aug. 25, 1998, pp. 2.
Correcting Cite # 1076 of IDS 9A, Web Developer's Journal, Ad Management Software Roundup 16153-16157, Dec. 2008, pp. 5.
Correcting Cite # 1077 of IDS 9A, ClickZ News Archives 16158-16185, Dec. 2007, pp. 28.
Correcting Cite # 1081 of IDS 9A, firefly passport office 16204-16211, Jun. 20, 1998, pp. 8.
Correcting Cite # 1082 of IDS 9A, Media Metrix, Frequently Asked Questions 16212-16213, Jun. 30, 1998, pp. 2.
Correcting Cite # 1084 of IDS 9A, Product Datasheet 16218-16220, Jul. 9, 1998, pp. 3.
Correcting Cite # 1085 of IDS 9A, MatchLogic Inc., Centralized Ad Management 16221-16222, Jul. 1, 1998, pp. 2.
Correcting Cite # 1086 of IDS 9A, The Journal of The Institution of British Tele . . . , British Telecommunications Engineering 16223-16231, Aug. 1998, pp. 9.
Correcting Cite # 1087 of IDS 9A, The Power of Personalization 16232-16234, Aug. 21, 1998, pp. 3.
Correcting Cite # 1092 of IDS 9A, Web Site Usability 16243-16405, Dec. 1999, pp. 163.
Correcting Cite # 1093 of IDS 9A, NEC Corp, Unitrusive Customization Techniques for Web Advertising 16406-16417, Aug. 19, 2000, pp. 12.
Correcting Cite # 1094 of IDS 9A, NEC Corp, The Artificial Intelligence Solutions for Advertisement Targeting 16418—Aug. 16, 2000, pp. 1.
Correcting Cite # 1096 of IDS 9A, NEC Corp, Unintrusive Customization Techniques for Web Advertising 16452-16465, Dec. 1999, pp. 14.
Correcting Cite # 1097 of IDS 9A, NEC Corp, AdWiz 16466-16467, Dec. 1999, pp. 2.
Correcting Cite # 1098 of IDS 9A, NEC announce ADWIZ, an Artificial Intelligence Solution for . . . 16468-16470, Jan. 8, 1999, pp. 3.
Correcting Cite # 1099 of IDS 9A, Taking Online Ad Targeting to the Next Level 16471-16475, Jun. 19, 2001, pp. 5.
Correcting Cite # 1101 of IDS 9A, NetGravity, AdServer 3 16754-16759, Jul. 9, 1998, pp. 6.
Correcting Cite # 1103 of IDS 9A, NetGravity, Advertiser Report for All Advertisers 16761-16764, Nov. 12, 1996, pp. 4.
Correcting Cite # 1105 of IDS 9A, NetGravity, Calendar 16768—Nov. 12, 1996, pp. 1.
Correcting Cite # 1107 of IDS 9A, NetGravity, Glossary 16773-16776, Created at Least by Dec. 1999, pp. 4.
Correcting Cite # 1109 of IDS 9A, NetGravity, AdManager Main Menu 16778—Nov. 11, 1996, pp. 1.
Correcting Cite # 1110 of IDS 9A, NetGravity, Adserver Ad Types 16779—Nov. 11, 1996, pp. 1.
Correcting Cite # 1111 of IDS 9A, NetGravity, Introduction to AdServer 16780-16838, Mar. 11, 1997, pp. 59.
Correcting Cite # 1112 of IDS 9A, NetGravity, Getting Started 16898-16995, Dec. 1998, pp. 98.
Correcting Cite # 1113 of IDS 9A, NetGravity, Platform Availability 16996-16998, Nov. 11, 1996, pp. 3.
Correcting Cite # 1114 of IDS 9A, Contents 16999-17044, Created at Least by Dec. 1999, pp. 46.
Correcting Cite # 1115 of IDS 9A, NetGravity, Ad Delivery 17045-17046, Nov. 11, 1996, pp. 2.
Correcting Cite # 1116 of IDS 9A, NetGravity, AdServer Extensibility 17047-17048, Nov. 11, 1996, pp. 2.
Correcting Cite # 1117 of IDS 9A, NetGravity, Ad Management 17049—Nov. 11, 1996, pp. 1.
Correcting Cite # 1118 of IDS 9A, NetGravity, Migrating to AdServer 3.5 17050-17068, Dec. 1998, pp. 19.
Correcting Cite # 1119 of IDS 9A, NetGravity, NGAPI Basics 17069-17149, Dec. 1998, pp. 81.
Correcting Cite # 1120 of IDS 9A, NetGravity, Adserver Scalability 17150—Nov. 11, 1996, pp. 1.
Correcting Cite # 1121 of IDS 9A, NetGravity, Adserver Targeting Example 17151-17152, Nov. 11, 1996, pp. 2.
Correcting Cite # 1122 of IDS 9A, NetGravity, Ad Targeting 17153—Nov. 11, 1996, pp. 1.
Correcting Cite # 1123 of IDS 9A, NetGravity, NetGravity, About NetGravity AdServer 17154-17482, Dec. 1998, pp. 329.
Correcting Cite # 1125 of IDS 9A, NetGravity, NetGravity announces second generation ad management with AdServer 2.0 17486-17487, Nov. 11, 1996, pp. 2.
Correcting Cite # 1128 of IDS 9A, Pathfinder / Marc Stein, NetGravity defines the state of the art in Internet advertising 17491-17493, Nov. 11, 1996, pp. 3.
Correcting Cite # 1129 of IDS 9A, NetGravity defines the state of the art in Internet advertising 17495-17496, Nov. 11, 1996, pp. 2.
Correcting Cite # 132 of IDS 9A, Presstime Magazine, Distribution 17501-17504, Jul. 1997, pp. 4.
Correcting Cite # 1133 of IDS 9A, Tim O'Reilly, Publishing Models for Internet Commerce 17505-17512, Jun. 1996, pp. 8.
Correcting Cite # 1134 of IDS 9A, Inktomi Corp, The Inktomi Technology Behind HotBot 17513-17518, May 3, 1997, pp. 6.
Correcting Cite # 1135 of IDS 9A, Claudia Loebbeck & Philip Powell, Understanding Internet Advertising 17519—Created at Least by Dec. 1999, pp. 1.
Correcting Cite # 1136 of IDS 9A, Kannan, Chang & Whinston, Marketing Information in the I-Way 17520-17528, Mar. 1998, pp. 9.
Correcting Cite # 1137 of IDS 9A, Rao, Salm & DosSantos, Marketing and the Internet 17529-17531, Mar. 1998, pp. 3.
Correcting Cite # 1139 of IDS 9A, N. Kushmerick, Learning to remove internet advertisements 17538-17544, Dec. 1999, pp. 7.
Correcting Cite # 1141 of IDS 9A, Web Home Pages as Advertisements 17554-17561, Aug. 1999, pp. 8.
Correcting Cite # 1142 of IDS 9A, Gallagher K Parsons, A framework for targeting banner advertising in the Internet 17562-17573, Dec. 1997, pp. 12.
Correcting Cite # 1143 of IDS 9A, Bhavani Raskutti & Anthony Beitz, Aspiring Customer Preferences fof Information Filtering: a Heuristic-Statistical Approach 17574-17576, Created at Least by Dec. 1999, pp. 3.
Correcting Cite # 1144 of IDS 9A, Adding Value in the Digital Age 17577-17587, Jun. 30, 1998, pp. 11.
Correcting Cite # 1145 of IDS 9A, Hsiangchu Lai & Tzyy-Ching Yang, An Architecture of Interactive Web Advertising System 17588-17590, Created at Least by Dec. 1999, pp. 3.
Correcting Cite # 1146 of IDS 9A, Chang, Kannan, Whinston, "Goodies" in exchange for consumer information on the Internet: the economics ans issues 17591-17602, Dec. 1998, pp. 12.
Correcting Cite # 1147 of IDS 9A, Rick Dedrick, Interactive Electronic Advertising 17603-17614, Dec. 1994, pp. 12.
Correcting Cite # 1148 of IDS 9A, Fortanet, Palmer, Posteguillo, Jaume, Netvertising: content-based subgeneric variations in a digital genre 17615-17626, Dec. 1998, pp. 12.
Correcting Cite # 1149 of IDS 9A, Skoularidou & Tzelepis, Opportunities in E-Commerce: Advertising and Commerce in a Virtual Enterprise 17627-17631, Created at Least by Dec. 1999, pp. 5.
Correcting Cite # 1151 of IDS 9A, Yaniv Vakrat & Abraham Seldmann, Can Online Auctions Beat Online Catalogs? 17636-17647, Dec. 1999, pp. 12.
Correcting Cite # 1152 of IDS 9A, Yannis Bakos, The Emerging Role of Electronic Marketplaces on the Internet 17648-17655, Aug. 1998, pp. 8.
Correcting Cite # 1153 of IDS 9A, Clay Shirky, and nothing to watch an open letter to Jakob nielson, 17665-17668, Jun. 1999, pp. 4.
Correcting Cite # 1154 of IDS 9A, Joseph T Sinclair, Book Preview Typography on the Web 17669-17672, Dec. 1999, pp. 4.
Correcting Cite # 1155 of IDS 9A, Ribeiro-Neto, Laender, Silva, Extracting Semi-Structured Data Through Examples 17673-17680, Dec. 1999, pp. 8.
Correcting Cite # 1157 of IDS 9A, Langheinrich, Nakamura, Abe, Kamba, Koseki, Unintrusive Customization Techniques for Web Advertising 17701-17718, Created at Least by Dec. 1999, pp. 18.
Correcting Cite # 1158 of IDS 9A, Rossi, McCulloch, Allenby, The Value of Purchase History Data in Target Marketing 17719-17736, Dec. 1993, pp. 20.

Correcting Cite # 1161 of IDS 9A, Jupiter Communications, Ad Management Debunking the Turnkey Myth 17745-17757, Dec. 1998, pp. 13.
Correcting Cite # 1162 of IDS 9A, Rick Dedrick / Intel Architecture Labs, A Consumption Model for Targeted Electronic Advertising 17758-17766, Dec. 1995, pp. 9.
Correcting Cite # 1164 of IDS 9A, PointCast, PoinCast Studio Overview 17798-17801, Feb. 23, 1999, pp. 4.
Correcting Cite # 1165 of IDS 9A, PointCast, PointCast Studio What is? 17802-17806, May 4, 1999, pp. 5.
Correcting Cite # 1166 of IDS 9A, PointCast, PointCast Studio—Quick Tips 17807-17811, Oct. 12, 1999, pp. 5.
Correcting Cite # 1167 of IDS 9A, Anderson, Homer, Howard, Sussman, A Preview of Active Server Pages+ 17812-18196, Dec. 2000, pp. 385.
Correcting Cite # 1168 of IDS 9A, Robbin Zeff & Brad Aronson, Advertising and the World Wide Web 18197-18508, Dec. 1999, pp. 312.
Correcting Cite # 1169 of IDS 9A, Advertising on the Internet 2nd Edition 18509-18952, Dec. 1999, pp. 444.
Correcting Cite # 1170 of IDS 9A, Robbin Zeff & Brad Aronson, Advertising on the Internet 18953-19257, Dec. 1997, pp. 305.
Correcting Cite # 1171 of IDS 9A, Net,Genesis & Devra Hall, Build a Web Site 19258-19985, Dec. 1995, pp. 728.
Correcting Cite # 1172 of IDS 9A, David Elderbrock & Nitin Borwankar, Building Successful Internet Businesses 19986-20339, Dec. 1996, pp. 354.
Correcting Cite # 1173 of IDS 9A, Shishir Gundavaram, CGI Programming on the World Wide Web 20340-20791, Dec. 1996, pp. 452.
Correcting Cite # 1174 of IDS 9A, Mary Lou Roberts & Paul Berger, Direct Marketing Management 2nd Edition 20792-21258, Dec. 1999, pp. 467.
Correcting Cite # 1175 of IDS 9A, Ian S. Graham, HTML Sourcebook 21259-21690, Dec. 1995, pp. 432.
Correcting Cite # 1176 of IDS 9A, Kyle Geiger, Inside ODBC 21691-22201, Dec. 1995, pp. 511.
Correcting Cite # 1177 of IDS 9A, Mary Meeker, The Internet Advertising Report 22202-22353, Dec. 1997, pp. 152.
Correcting Cite # 1178 of IDS 9A, Brad Harris, Microsoft Site Server 3 22354-23309, Dec. 1998, pp. 956.
Correcting Cite # 1179 of IDS 9A, Nancy Yeager & Robert McGrath, Web Server Technology 23310-23733, Dec. 1996, pp. 424.
Correcting Cite # 1180 of IDS 9A, World Wide Web Programming with HTML & CGI 23734-24414, Dec. 1995, pp. 681.
Correcting Cite # 1181 of IDS 9A, David Libertone & Andrew Scoppa, Microsoft Site Server 3.0 Commerce Edition 24415-24667, Dec. 2000, pp. 253.
Correcting Cite # 1184 of IDS 9A, Bhavani Raskutti & Anthony Beitz, Acquiring Customer Preferences for Information Filtering: a Heuristic-Statistical Approach 24686-24688, Created at Least by Dec. 1999, pp. 3.
Correcting Cite # 1185 of IDS 9A, Adding Value in the Digital Age 26489-24699, Jun. 30, 1998, pp. 11.
Correcting Cite # 1186 of IDS 9A, AdForce, AdForce Privacy Practices 24700-24704, Jun. 30, 1998, pp. 5.
Correcting Cite # 1188 of IDS 9A, AdForce, AdForce Customers and Partners 24708-24709, Jun. 27, 2000, pp. 2.
Correcting Cite # 1190 of IDS 9A, firefly passport office overview 24749-24756, Jun. 20, 1998, pp. 8.
Correcting Cite # 1191 of IDS 9A, Chang, Kannan, Whinston, "Goodies" in exchange for consumer information on the Internet: the economics and issues 24759-24770, Dec. 1998, pp. 12.
Correcting Cite # 1192 of IDS 9A, MatchLogic, Inc., Why Use MatchLogic's Site Management 24774-24775, Jul. 1, 1998, pp. 2.
Correcting Cite # 1194 of IDS 9A, SelectCast for Ad Servers 24791-24792, Jun. 30, 1998, pp. 2.
Correcting Cite # 1195 of IDS 9A, SelectCast for Commerce Servers 24793—Jun. 30, 1998, pp. 1.
Correcting Cite # 1196 of IDS 9A, Real Media—The Internet Advertising Solution 24818-24819, Created at Least by Dec. 1999, pp. 2.
Correcting Cite # 1197 of IDS 9A, Open ADStream for Web Publishers & Advertisers 24820-24821, Created at Least by Dec. 1999, pp. 2.
Correcting Cite # 1198 of IDS 9A, Web Publishers' Internet Advertising Solution 24822-24824, Created at Least by Dec. 1999, pp. 3.
Correcting Cite # 1199 of IDS 9A, Meeting Advertissers' Needs Worldwide 24825-24826, Jan. 22, 1998, pp. 2.
Correcting Cite # 1201 of IDS 9A, About Real Media 24834-24838, Feb. 5, 1997, pp. 5.
Correcting Cite # 1202 of IDS 9A, Steve Outing, Advertisers Find Newspapers to Their Liking for Web Ads 24839-24843, Feb. 5, 1997, pp. 5.
Correcting Cite # 1203 of IDS 9A, Real Media, Real Media—The Internet Advertising Solution 24844-24846, Feb. 5, 1997, pp. 3.
Correcting Cite # 1204 of IDS 9A, Real Media, Advertisers' FAQ 24847-24848, Feb. 5, 1997, pp. 2.
Correcting Cite # 1205 of IDS 9A, Real Media, Publishers' FAQ 24849-24850, Feb. 5, 1997, pp. 2.
Correcting Cite # 1208 of IDS 9A, Real Media, Press Office 24857—Feb. 5, 1997, pp. 1.
Correcting Cite # 1211 of IDS 9A, Real Media, Web Publishers' Internet Advertising Solution 24862-24864, Feb. 5, 1997, pp. 3.
Correcting Cite # 1215 of IDS 9A, Real Media, The Science of Digital Marketing 24872-24873, Dec. 2007, pp. 2.
Correcting Cite # 1220 of IDS 9A, SelectCast for Ad Servers 24881-24882, Feb. 18, 1999, pp. 2.
Correcting Cite # 1221 of IDS 9A, SelectCast for Ad Servers 24883-24884, Jun. 30, 1998, pp. 2.
Correcting Cite # 1222 of IDS 9A, Advertising Age / Rick E. Bruner, New networks chase per-click ad business 24886-24888, Jan. 11, 1998, pp. 3.
Correcting Cite # 1223 of IDS 9A, Becoming a ValueClick Advertiser 24889—Jan. 11, 1998, pp. 1.
Correcting Cite # 1224 of IDS 9A, ValueClick, Frequently Asked Questions 24890-24892, Jan. 11, 1998, pp. 3.
Correcting Cite # 1225 of IDS 9A, ValueClick, Becoming a ValueClick Host Site 24893-24894, Jan. 11, 1998, pp. 2.
Correcting Cite # 1226 of IDS 9A, ValueClick, ValueClick Banner Advertising Network 24895—Jan. 11, 1998, pp. 1.
Correcting Cite # 1230 of IDS 9A, Worldata Information Marketing Services 24920-24967, Sep. 3, 1996, pp. 48.
Correcting Cite # 1231 of IDS 9A, YellowBrix, Inc, Intelligent Filtering Technology at YellowBrix 24994-24995, Oct. 18, 2000, pp. 2.
Correcting Cite # 1238 of IDS 9A, Accipiter, Accipiter Market Atlas 26172-26189, Created at Least by Dec. 1999, pp. 18.
Correcting Cite # 1241 of IDS 9A, Dart Team, No Title 30101-30118, Dec. 1998, pp. 18.
Correcting Cite # 1242 of IDS 9A, No Title 30119-30183, Dec. 1999, pp. 65.
Correcting Cite # 1249 of IDS 9A, John Black, DoubleClick Confidential Letter 30253-30256, Dec. 2000, pp. 4.
Correcting Cite # 1262 of IDS 9A, Flow of Data in a Data Center 30283—Created at Least by Dec. 1999, pp. 1.
Correcting Cite # 1265 of IDS 9A, Process of Serving a Banner to a User 30286—Created at Least by Dec. 1999, pp. 1.
Correcting Cite # 1274 of IDS 9A, Ad Spider 30344-30345, May 1, 1997, pp. 2.
Correcting Cite # 1275 of IDS 9A, Adult Check Spec 30346—Created at Least by Dec. 1999, pp. 1.
Correcting Cite # 1276 of IDS 9A, Aptex Clustering 30347-30349, Created at Least by Dec. 1999, pp. 3.
Correcting Cite # 1277 of IDS 9A, AV Home Page Sponsor Area 30350-30351, Created at Least by Dec. 1999, pp. 2.
Correcting Cite # 1278 of IDS 9A, Availability and Forecasting 30352-3362, Dec. 1996, pp. 11.
Correcting Cite # 1279 of IDS 9A, Coding Guidelines 30363-30364, Created at Least by Dec. 1999, pp. 2.
Correcting Cite # 1280 of IDS 9A, Data Bank 30365-30375, Created at Least by Dec. 1999, pp. 11.
Correcting Cite # 1284 of IDS 9A, DoubleClick Direct Response Network 30388-30391, Dec. 1997, pp. 4.
Correcting Cite # 1286 of IDS 9A, DoubleClick, Derive Networks Functional Specification 30399-30405, Dec. 1998, pp. 7.
Correcting Cite # 1287 of IDS 9A, DoubleClick, DoubleClick Document (No Title) 30406-30412, Dec. 1997, pp. 7.

Correcting Cite # 1289 of IDS 9A, DoubleClick, DoubleClick—Network Derivation and Geographic Mapping 30418-30421, Created at Least by Dec. 1999, pp. 4.
Correcting Cite # 1293 of IDS 9A, Search Keywords 30434-30435, Dec. 1997, pp. 2.
Correcting Cite # 1294 of IDS 9A, DoubleClick, Operations Doc—"Select Cast" 30436-30440, Created at Least by Dec. 1999, pp. 5.
Correcting Cite # 1295 of IDS 9A, SitePage Creation 30441-30443, Created at Least by Dec. 1999, pp. 3.
Correcting Cite # 1296 of IDS 9A, SqlResultSet 30444—Created at Least by Dec. 1999, pp. 1.
Correcting Cite # 1297 of IDS 9A, DoubleClick, Dart Training System Architecture 30445-30488, Created at Least by Dec. 1999, pp. 44.
Correcting Cite # 1298 of IDS 9A, sz=Migration 30489—Created at Least by Dec. 1999, pp. 1.
Correcting # 1300 of IDS 9A, User Info Server 30493—Created at Least by Dec. 1999, pp. 1.
Correcting Cite # 1301 of IDS 9A, User Info Server 30494-30495, Created at Least by Dec. 1999, pp. 2.
Correcting Cite # 1302 of IDS 9A, User Info Server 30496-30497, Created at Least by Dec. 1999, pp. 2.
Correcting Cite # 1303 of IDS 9A, Account Test Plan—Added Processed Date Field 30498—Dec. 1998, pp. 1.
Correcting Cite # 1304 of IDS 9A, Account Test Plan—Fix for Calculating Two Periods 30499—Dec. 1998, pp. 1.
Correcting Cite # 1305 of IDS 9A, Account Test Plan—Fix for Correct Daily Revenue 30500—Dec. 1998, pp. 1.
Correcting Cite # 1306 of IDS 9A, Account Test Plan—Fix for DART Fraction 30501—Dec. 1998, pp. 1.
Correcting Cite # 1307 of IDS 9A, Account Test Plan—Fix for Direct Response Revenue 30502-30503, Dec. 1998, pp. 2.
Correcting Cite # 1308 of IDS 9A, Account Test Plan—Fix for Same Report Date 30504-30505, Dec. 1998, pp. 2.
Correcting Cite # 1309 of IDS 9A, Account Test Plan—Fix for Site Comp State 30506—Dec. 1998, pp. 1.
Correcting Cite # 1310 of IDS 9A, Account Test Plan—Fix for Time-based Orders 30507-30512, Dec. 1998, pp. 6.
Correcting Cite # 1312 of IDS 9A, DoubleClick, adServer Technical Documentation 30517-30522, Dec. 1998, pp. 6.
Correcting Cite # 1314 of IDS 9A, Ad Server 10.08 Changes & Issues 30539-30540, Create at Least by Dec. 1999, pp. 2.
Correcting Cite # 1315 of IDS 9A, No Title—Blank Diagram 30541—Created at Least by Dec. 1999, pp. 1.
Correcting Cite # 1316 of IDS 9A, Spread Sheet (No Title) 30542-30546, Dec. 1998, pp. 5.
Correcting Cite # 1317 of IDS 9A, Layout of Version 6 adserver log files 30547-30551, Created at Least by Dec. 1999, pp. 5.
Correcting Cite # 1318 of IDS 9A, __/clk Command 30552, Created at Least by Dec. 1999, pp. 1.
Correcting Cite # 1320 of IDS 9A, Spec—Direct Use of Winsock 30554—Aug. 12, 1997, pp. 1.
Correcting Cite # 1321 of IDS 9A, "Front End Project" 30555-30557, Created at Least by Dec. 1999, pp. 3.
Correcting Cite # 1324 of IDS 9A, "No cookie support" 30560—Created at Least by Dec. 1999, pp. 1.
Correcting Cite # 1325 of IDS 9A, Percentage Module 30561-30562, Created at Least by Dec. 1999, pp. 2.
Correcting Cite # 1326 of IDS 9A, SIM File Format Specifications 30563-30567, Created at Least by Dec. 1999, pp. 5.
Correcting Cite # 1328 of IDS 9A, Rules for Targeting by Affinity Group / Site / p. 30570—Created at Least by Dec. 1999, pp. 1.
Correcting Cite # 1333 of IDS 9A, Pushersync: To Do List 30621—Dec. 1999, pp. 1.
Correcting Cite # 1334 of IDS 9A, Action Response at Least by Dec. 1999, pp. 2.
Correcting Cite # 1335 of IDS 9A, Technical Overview of Content Spider 30626-30629, May 1, 2000, pp. 4.
Correcting Cite # 1336 of IDS 9A, DoubleClick, DoubleClick DART Ad Scheduling 30631—Created at Least by Dec. 1999, pp. 1.
Correcting Cite # 1338 of IDS 9A, DART Functionality 30636-30638, Created at Least by Dec. 1999, pp. 3.
Correcting Cite # 1339 of IDS 9A, DoubleClick, DoubleClick Direct and DoubleCLick Darwin 30639-30640, Created at Least by Dec. 1999, pp. 2.
Correcting Cite # of IDS 9A, DoubleClick, DoubleClick Demographics / Database Targeting 30641-30645, Created at Least by Dec. 1999, pp. 5.
Correcting Cite # 1342 of IDS 9A, DoubleClick, Geographic Targeting 30649—Created at Least by Dec. 1999, pp. 1.
Correcting Cite # 1343 of IDS 9A, DoubleClick, DoubleClick hardware configuration 30650—Created at Least by Dec. 1999, pp. 1.
Correcting Cite # of IDS 9A, DoubleClick DART Keyword Ad Scheduling 30651-30653, Created at Least by Dec. 1999, pp. 3.
Correcting Cite # 1345 of IDS 9A, Maximizing Your Site's Click Rate 30654—Created at Least by Dec. 1999, pp. 1.
Correcting Cite # 1346 of IDS 9A, How to Diagnose why an Ad is not Running 30656-30657, Created At Least by Dec. 1999, pp. 2.
Correcting Cite # 1347 of IDS 9A, Ad Overbooking 30658—Created at Least by Dec. 1999. pp. 1.
Correcting Cite # 1348 of IDS 9A, Prefetching Media DART Configuration Notes 30659-30661, Created at Least by Dec. 1999, pp. 3.
Correcting Cite # 1349 of IDS 9A, DoubleClick DART Tethered System Protocol 30662-30663, Created at Least by Dec. 1999, pp. 2.
Correcting Cite # 1350 of IDS 9A, DoubleClick DART Tethered System Overview 30664-30665, Created at Least by Dec. 1999, pp. 2.
COrrecting Cite # 1351 of IDS 9A, Configuring Ads for Use with a Third Party Ad Delivery Service 30666—Created at Least by Dec. 1999, pp. 1.
Correcting Cite # 1352 of IDS 9A, Title Functionality 30667-30669, Created at Least by Dec. 1999, pp. 3.
Correcting Cite # 1354 of IDS 9A, DART Reporting Registry Settings for manage 30671-30672, Created at Least by Dec. 1999, pp. 2.
Correcting Cite # 1355 of IDS 9A, Overview of Reporting Changes for Manage 10.52 30673-30674, Dec. 1998, pp. 2.
Correcting Cite # 1356 of IDS 9A, Open Items for Manage 10.60 Reports 30675-30676, Jul. 18, 2000, pp. 2.
Correcting Cite # 1361 of IDS 9A, Installation and Configurations Instructions PDF Report Generator System . . . 30695-30699, Created at Least by Dec. 1999, pp. 5.
Correcting Cite # 1362 of IDS 9A, Product Manage Registry Settings 30700-30701, Created at Least by Dec. 1999, pp. 2.
Correcting Cite # 1363 of IDS 9A, QA Management Registry Settings 30702-30703, Created at Least by Dec. 1999, pp. 2.
Correcting Cite # 1376 of IDS 9A, Table Documentation Draft 30771-30783, Created at Least by Dec. 1999, pp. 13.
Correcting Cite # 1377 of IDS 9A, No Title 30784-30800, Created at Least by Dec. 1999, pp. 17.
Correcting Cite # 1385 of IDS 9A, High Level Database Targeting Flow 30878—Created at Least by Dec. 1999, pp. 1.
Correcting Cite # 1387 of IDS 9A, Database Targeting Spec 30880-30892, Created at Least by Dec. 1999, pp. 13.
Correcting Cite # 1388 of IDS 9A, No Title 30893—Created at Least by Dec. 1999, pp. 1.
Correting Cite #1390 of IDS 9A, Test Job Creator 30896-30901, Jul. 23, 1998, pp. 6.
Correcting Cite # 1393 of IDS 9A, Doubleclick, Inc., EXPO Server changes to support Populate Expo version 1.0a 30904-30909, Jun. 10, 2008, pp. 6.
Correcting Cite # 1394 of IDS 9A, Doubleclick, Inc., Database Targeting 30910-30914, Jul. 18, 2000, pp. 5.
Correcting Cite # 1405 of IDS 9A, Load all required libraries 31006-31009, Created at Least by Dec. 1999, pp. 4.
Correcting Cite # 1407 of IDS 9A, No Title 31014—Created at Least by Dec. 1999, pp. 1.
Correcting Cite # 1408 of IDS 9A, No Title 31015-31017, Created at Least by Dec. 1999, pp. 3.
Correcting Cite # 1409 of IDS 9A, No Title 31018—Created at Least by Dec. 1999, pp. 1.
Correcting Cite # 1410 of IDS 9A, No Title 31019-31021, Created at Least by Dec. 1999, pp. 3.
Correcting Cite # 1411 of IDS 9A, No Title 31022—Created at Least by Dec. 1999, pp. 1.

Correcting Cite # 1412 of IDS 9A, No Title 31023-31030, Created at Least by Dec. 1999, pp. 8.
Correcting Cite # 1413 of IDS 9A, No Title 31031-31033, Created at Least by Dec. 1999, pp. 3.
Correcting Cite # 1414 of IDS 9A, No Title 31034-31035, Created at Least by Dec. 1999, pp. 2.
Correcting Cite # 1416 of IDS 9A, No Title 31037-31044, Created at Least by Dec. 1999, pp. 8.
Correcting Cite # 1417 of IDS 9A, No Title 31045—Created at Least by Dec. 1999, pp. 1.
Correcting Cite # 1418 of IDS 9A, No Title 31046—Created at Least by Dec. 1999, pp. 1.
Correcting Cite # 1419 of IDS 9A, No Title 31047—Created at Least by Dec. 1999, pp. 1.
Correcting Cite # 1420 of IDS 9A, No Title 31048—Created at Least by Dec. 1999, pp. 1.
Correcting Cite # 1421 of IDS 9A, No Title 31049—Created at Least by Dec. 1999, pp. 1.
Correcting Cite # 1422 of IDS 9A, Clear Command listener 31050—Created at Least by Dec. 1999, pp. 1.
Correcting Cite # 1423of IDS 9A, No Title 31051-31052, Created at Least by Dec. 1999, pp. 2.
Correcting Cite # 1424 of IDS 9A, No Title 31053-31062 Created at Least by Dec. 1999, pp. 10.
Correcting Cite # 1427 of IDS 9A, No Title 31081—Created at Least by Dec. 1999, pp. 1.
Correcting Cite # 1428 of IDS 9A, No Title 31083—Created at Least by Dec. 1999, pp. 1.
Correcting Cite # 1429 of IDS 9A, DoubleClick, Inc, Package Custom Lists 31084-31100, Mar. 5, 1999, pp. 17.
Correcting Cite # 1430 of IDS 9A, No Title 31101—Created at Least by Dec. 1999, pp. 1.
Correcting Cite # 1431 of IDS 9A, No Title 31102—Created At Least by Dec. 1999, pp. 1.
Correcting Cite # 1432 of IDS 9A, DoubleClick, Inc, Package User List Operations 31103-31111, Jan. 25, 1999, pp. 9.
Correcting Cite # 1433 of IDS 9A, No Title 31113—Created at Least by Dec. 1999, pp. 1.
Correcting Cite # 1435 of IDS 9A, No Title 31117—Created at Least by Dec. 1999, pp. 1.
Correcting Cite # 1436 of IDS 9A, Oleg Beregovich, No Title 31119-31121, Dec. 15, 1998, pp. 3.
Correcting Cite # 1437 of IDS 9A, FEMALE . . . SQL 31122—Created at Least by Dec. 1999, pp. 1.
Correcting Cite # 1438 of IDS 9A, FINABCE_PROF_LIST.SQL 31123—Created at Least by Dec. 1999, pp. 1.
Correcting Cite # 1439 of IDS 9A, STOCKS.SQL 31124—Created at Least by Dec. 1999, pp. 1.
Correcting Cite # 1440 of IDS 9A, IND_INVESTOR_PROF_LIST.SQL 31125—Created at Least by Dec. 1999, pp. 1.
Correcting Cite # 1441 of IDS 9A, LEGAL_PROF_PROF_LIST.sql 31126—Created at Least by Dec. 1999, pp. 1.
Correcting Cite # 1442 of IDS 9A, MALE.SQL 31127—Created at Least by Dec. 1999, pp. 1.
Correcting Cite # 1443 of IDS 9A, MARKETING_PROF_LIST.SQL 31128—Created at Least by Dec. 1999, pp. 1.
Correcting Cite # 1444 of IDS 9A,SENIOR_MGMT_PROF_LIST.SQL 31129—Created at Least by Dec. 1999, pp. 1.
Correcting Cite # 1445 of IDS 9A, TECH_PROF_LIST.SQL 31130—Created at Least by Dec. 1999, pp. 1.
Correcting Cite # 1447 of IDS 9A, No Title 31134—Sep. 13, 1998, pp. 1.
Correcting Cite # 1449 of IDS 9A, DoubleClick, DeriveCounters Functional Specifications 31138-31145, Dec. 1998, pp. 8.
Correcting Cite # 1450 of IDS 9A, DoubleClick, Closed Loop Marketing 31147-31148, Created at Least by Dec. 1999, pp. 2.
Correcting Cite # 1451 of IDS 9A, DoubleClick, Activity String Formats 31149-31151, Created at Least by Dec. 1999, pp. 3.
Correcting Cite # 1453 of IDS 9A, DFA Terminology 31162—Created at Least by Dec. 1999, pp. 1.
Correcting Cite # 1454 of IDS 9A, DoubleClick, DoubleClick DART Cache-Free Counting Specifications 31163-31164, Created at Least by Dec. 1999, pp. 2.
Correcting Cite # 1460 of IDS 9A, Spotlight Version 2 31216-31225, Dec. 1998, pp. 10.
Correcting Cite # 1463 of IDS 9A, DoubleClick, Software Design Specification 31235-31253, Dec. 1999, pp. 19.
Correcting Cite # 1464 of IDS 9A, DoubleClick, Software Design Specification 31254-31266, Dec. 1999, pp. 13.
Correcting Cite # 1469 of IDS 9A, Queries for the Buy Site Frequency Reports 31356-31361, Dec. 1999, pp. 6.
Correcting Cite # 1470 of IDS 9A, Queries for the Actuals by Frequency at Buy Level 31362-31365, Dec. 1999, pp. 4.
Correcting Cite # 1476 of IDS 9A, Doubleclick, Inc., Queries for Redirect Sites report. 31390-31393, Dec. 1999, pp. 4.
Correcting Cite # 1481 of IDS 9A, Queries for 'Summary by Banner and Redirect Sites' Report 31403-31412, Dec. 1999, pp. 10.
Correcting Cite # 1482 of IDS 9A, Queries for Summary by Redirect Sites Reports 31413-31416, Dec. 1999, pp. 4.
Correcting Cite # 1483 of IDS 9A, Queries for the Actuals Summary Report 31419-31425, Dec. 1999, pp. 7.
Correcting Cite # 1488 of IDS 9A, NETDEALS 31470-31472, Created at Least by Dec. 1999, pp. 3.
Correcting Cite # 1489 of IDS 9A, No Title 31473—Mar. 31, 1998, pp. 1.
Correcting Cite # of IDS 9A, AdServer Log File Format 31527-31535, Dec. 1998, pp. 9.
Correcting Cite #of IDS 9A, SIM Log File Format 31559-31564, Dec. 1998, pp. 6.
Correcting Cite # 1500 of IDS 9A, Cume by Tume Actual Reports Functional specifications 31589-31592, Dec. 1998, pp. 4.
Correcting Cite # 1501 of IDS 9A, DoubleClick, Inc. / Adam Rabin, Direct Repsonse Advertiser Report Functional Specifications 31593-31597, Dec. 1999, pp. 5.
Correcting Cite # 1502 of IDS 9A, DoubleClick, Inc. / Adam Rabin, Direct Repsonse Data Report Functional Specifications 31598-31602, Dec. 1999, pp. 5.
Correcting Cite # 1503 of IDS 9A, DoubleClick, Inc. / Adam Rabin, Design Specifications 31603-31610, Dec. 1999, pp. 8.
Correcting Cite # 1504 of IDS 9A, Functional Specifications for Modifications to Existing Actuals Reports utilizing Version 2 Placements 31611-31617, Created at Least by Dec. 1999, pp. 7.
Correcting Cite # 1505 of IDS 9A, Functional Specifications for Restricted View in Actuals Reports utilizing Version 2 Placements 31618, Created at Least by Dec. 1999, pp. 1.
Correcting Cite # of IDS 9A, DoubleClick, Inc., Software Functional Specification 31619-31625, Dec. 1999, pp. 7.
Correcting Cite # 1507 of IDS 9A, Manage Site Reports Functional Specifications 31626-31629, Dec. 1998, pp. 4.
Correcting Cite # 1508 of IDS 9A, Migrate_old_pdf 31630—Sep. 1998, pp. 1.
Correcting Cite # 1510 of IDS 9A, Network Level Reports for Affiliates 31632—Created at Least by Dec. 1999, pp. 1.
Correcting Cite # 1511 of IDS 9A, Adam Rabin, Order Signature Status Report Functional Specifications 31633-31636, Created at Least by Dec. 1999, pp. 4.
Correcting Cite # 1512 of IDS 9A, PDF Reports Outline Summary (Revision 9) 31637-31645, Dec. 1999, pp. 9.
Correcting Cite # 1513 of IDS 9A, Row Totals Enhancement to Online Actuals 31646-31647, Dec. 1998, pp. 2.
Correcting Cite # 1515 of IDS 9A, Select and General Orders 31649-31653, Dec. 1998, pp. 5.
Correcting Cite # 1516 of IDS 9A, Simplifying Alta Vista Booking Status Report Functionai Specifications 31654-31655, Created at Least by Dec. 1999, pp. 2.
Correcting Cite # 1517 of IDS 9A, SiteComp Report Logic 31656-31663, Oct. 22, 1998, pp. 8.
Correcting Cite # 1518 of IDS 9A, Adam Rabin, Site compensation Report Function Specifications 31664-31698, Created at Least by Dec. 1999, pp. 35.
Correcting Cite # 1519 of IDS 9A, DoubleClick, Inc., SiteReport Query Updated Features and Requirements Document 31699-31709, Dec. 1998, pp. 11.
Correcting Cite # 1521 of IDS 9A, Spotlight Report Bugs Fix and Features Enhancement Fun Spec 31712-31714, Created at Least by Dec. 1999, pp. 3.

Correcting Cite # 1522 of IDS 9A, Standard Report Summary by Banner by Site 31715-31719, Dec. 1998, pp. 5.
Correcting Cite # 1523 of IDS 9A, Target History (Local) 31720—Sep. 17, 1998, pp. 1.
Correcting Cite # 1524 of IDS 9A, DoubleClick, Inc., Software Testing Log 31721-31724, Mar. 1, 1999, pp. 4.
Correcting Cite # 1526 of IDS 9A, Update to Network Actuals adding Radio 31727-31728, Dec. 1998, pp. 2.
Correcting Cite # 1531 of IDS 9A, Log Manager 2.4a Enhancements 31750-31753, Mar. 14, 2000, pp. 4.
Correcting Cite # 1533 of IDS 9A, Log Manager Next Steps 31789-31792, Created at Least by Dec. 1999, pp. 4.
Correcting Cite # 1534 of IDS 9A, Monitor Database Thread 31793-31798, Created at Least by Dec. 1999, pp. 6.
Correcting Cite # 1535 of IDS 9A, Access Beta Manager 31805-31806, Created at Least by Dec. 1999, pp. 2.
Correcting Cite # 1538 of IDS 9A, Ad Priority 31824-31825, Created at Least by Dec. 1999, pp. 2.
Correcting Cite # 1540 of IDS 9A, "Registering and Advertiser" Page 31831-31836, Created at Least by Dec. 1999, pp. 6.
Correcting Cite # 1541 of IDS 9A, Affiliates 31837-31838, Created at Least by Dec. 1999, pp. 2.
Correcting Cite # 1542 of IDS 9A, AltaVista's Impact on the Manage codebase 31839-31842, Created at Least by Dec. 1999, pp. 4.
Correcting Cite # 1543 of IDS 9A, Child Networks 31843-31844, Created at Least by Dec. 1999, pp. 2.
Correcting Cite # 1544 of IDS 9A, CYberAge additions to the LANG EN table 31849-31856, Created at Least by Dec. 1999, pp. 8.
Correcting Cite # 1548 of IDS 9A, Manage Ad Categories 31865-31866, Created at Least by Dec. 1999, pp. 2.
Correcting Cite # 1549 of IDS 9A, Manage Banner Ad Sizes 31867-31868, Created at Least by Dec. 1999, pp. 2.
Correcting Cite # 1551 of IDS 9A, Strings and Languages 31884-31886, Created at Least by Dec. 1999, pp. 3.
Correcting Cite # 1554 of IDS 9A, Percentage Handling for DART networks—Changes to MANAGE 31933-31937, Dec. 1998, pp. 5.
Correcting Cite # 1557 of IDS 9A, Review New Ads & Site Restrictions 31945-31947, Created at Least by Dec. 1999, pp. 3.
Correcting Cite # 1558 of IDS 9A, Review New Ads System 31948-31949, Created at Least by Dec. 1999, pp. 2.
Correcting Cite # 1560 of IDS 9A, The RPCServer adn RPCClient Classes 31956—Created at Least by Dec. 1999, pp. 1.
Correcting Cite # 1564 of IDS 9A, DoubleClick, Inc, Image Uploading and Image Series 31986-31987, Created at Least by Dec. 1999, pp. 3.
Correcting Cite # 1571 of IDS 9A, RPC Report Server Operations Rollout Instructions 32022-32024, Dec. 1998, pp. 3.
Correcting Cite # 1573 of IDS 9A, Shared Data Management 32027-32031, Created at Least by Dec. 1999, pp. 5.
Correcting Cite # 1579 of IDS 9A, XMLServer branches 32051-32052, Mar. 3, 2000, pp. 2.
Correcting Cite # 1583 of IDS 9A, Xmlserver and Filters 32080-32082, Jan. 1, 2000, pp. 3.
Correcting Cite # 1586 of IDS 9A, Create or Replace Trigger 32101—Created at Least by Dec. 1999, pp. 1.
Correcting Cite # 1589 of IDS 9A, No Title 32113-32131, Created at Least by Dec. 1999, pp. 19.
Correcting Cite # 1599 of IDS 9A, Requests to xmiserver 32153—Created at Least by Dec. 1999, pp. 1.
Correcting Cite # 1600 of IDS 9A, Following are schema additions required for the management of next generation creatives 32154-32155, Created at Least by Dec. 1999, pp. 2.
Correcting Cite # 1603 of IDS 9A, Template Packages 32169-32170, Created at Least by Dec. 1999, pp. 2.
Correcting Cite # 1604 of IDS 9A, The Template Processor and dart:action 32171—Created at Least by Dec. 1999, pp. 1.
Correcting Cite # 1605 of IDS 9A, User Interface Framework 32172-32175, Created at Least by Dec. 1999, pp. 4.
Correcting Cite # 1606 of IDS 9A, Why develop and XML Server? 32176—Created at Least by Dec. 1999, pp. 1.
Correcting Cite # 1607 of IDS 9A, Manage NG DFA XML Data Objects 32177-32199, Created at Least by Dec. 1999, pp. 23.

Correcting Cite # 1608 of IDS 9A, Note on istalling JRunner 32201—Created at Least by Dec. 1999, pp. 1.
Correcting Cite # 1616 of IDS 9A, DoubleClick, Inc., Ora69 Functional Specification 32275-32280, Dec. 1998, pp. 7.
Correcting Cite # 1617 of IDS 9A, Exploring 32283—Dec. 1999, pp. 1.
Correcting Cite # 1619 of IDS 9A, Overview of New executable for counting frequency for Orders/Pages for and Order / Advertiser 32290-32295, Created at Least by Dec. 1999, pp. 6.
Correcting Cite # 1628 of IDS 9A, Creating Workingfiles 32339-32344, Created at Least by Dec. 1999, pp. 6.
Correcting Cite # 1634 of IDS 9A, Impression Count Comparisons for Ads and Sites 32401-32403, Aug. 1999, pp. 3.
Correcting Cite # 1635 of IDS 9A, Impression Count Comparisons for Ads and Sites 32404-32405, Jul. 1999, pp. 2.
Correcting Cite # 1636 of IDS 9A, Impression Count Comparisons for Ads Sites 32406-32407, Jun. 1999, pp. 2.
Correcting Cite # 1637 of IDS 9A, Problems 32408-32410, Oct. 1999, pp. 3.
Correcting Cite # 1638 of IDS 9A, Impression Count Comparisons fo Ads and Sites 32411—Sep. 1999, pp. 1.
Correcting Cite # 1649 of IDS 9A, PdfAdRptGen.exe (Ad PDF Report Generator) Application Bug and Feature . . . 32526-32532, Nov. 1998, pp. 7.
Correcting Cites # 1650 of IDS 9A, PdfAdCompRptGen.Exe (Site Compensation PDF Report Generator) Application Bug and Feature . . . 32533-32535, Jan. 14, 1999, pp. 3.
Correcting Cite # 1651 of IDS 9A, Operations Doc—"Selectcast" 32537-32541, Created at Least by Dec. 1999, pp. 5.
Correcting Cite # 1656 of IDS 9A, DoubleClick Selectcast Operations Manual 32551-32558, Jun. 10, 2008, pp. 8.
Correcting Cite # 1664 of IDS 9A, Tracker Projects and User Groups 32585-32586, Created at Least by Dec. 1999, pp. 2.
Correcting Cite # 1686 of IDS 9A, Version History of UserinfoServer 32798-32804, Jan. 18, 2000, pp. 7.
Correcting Cite # 1696 of IDS 9A, No Title 32833-32951, Created at Least by Dec. 1999, pp. 119.
Correcting Cite # 1699 of IDS 9A, Adserver 9.7 32964-32966, Created at Least by Dec. 1999, pp. 3.
Correcting Cite # 1714 of IDS 9A, No Title 32989-32990, May 28, 1998, pp. 2.
Correcting Cite # 1750 of IDS 9A, Online for Deriver and Derive Counters Testing Jun. 1999 33091-33095, pp. 5.
Correcting Cite # 1752 of IDS 9A, Process Overview, Derive/RepM 33124—Created at Least by Dec. 1999, pp. 1.
Correcting Cite # 1757 of IDS 9A, No Title 33132-33145, Feb. 1999, pp. 14.
Correcting Cite # 1758 of IDS 9A, DoubleClick, Inc., Enhanced Site Login Functionality (Staging Area) in DART for Advertisers 33153-33155, Dec. 1999, pp. 3.
Correcting Cite # 1759 of IDS 9A, Queries for the Buy Site Frequency at Buy Levels 33156-33159, Dec. 1999, pp. 4.
Correcting Cite # 1760 of IDS 9A, Functional Spec for Insertion order in DFA 33160-33161, Created at Least by Dec. 1999, pp. 2.
Correcting Cite # 1761 of IDS 9A, Internal Redirect in DART for Advertisers 33162-33165, Created at Least by Dec. 1999, pp. 4.
Correcting Cite # 1762 of IDS 9A, Macros in DFA 33166-33167, Created at Least by Dec. 1999, pp. 2.
Correcting Cite # 1763 of IDS 9A, Here are all the ddl's for the ORDERFREQ project 33189-33207, Dec. 1999, pp. 19.
Correcting Cite # 1766 of IDS 9A, Queries for 'Summary by Banner and Redirect Sites' Report 33217-33226, Dec. 1999, pp. 10.
Correcting Cite # 1767 of IDS 9A, Queries for Summary by Redirect Sites Reports 33227-33230, Dec. 1999, pp. 4.
Correcting Cite # 1768 of IDS 9A, Queries for the Actuals Summary Report 33231-33237, Dec. 1999, pp. 7.
Correcting Cite # 1770 of IDS 9A, Dart for Advertisers Next Gen Permissions 33266-33272, Created at Least by Dec. 1999, pp. 7.
Correcting Cite # 1771 of IDS 9A, DFA NG Site profile DB Schema 33273-33316, Jan. 31, 2000, pp. 44.
Correcting Cite # 1772 of IDS 9A, DoubleClick, Inc., Nest Generation Trafficking UI-DFA Product Requirements Document 33317-33345, Dec. 1999, pp. 29.

Correcting Cite # 1773 of IDS 9A, No Title 33346-33349, Created at Least by Dec. 1999, pp. 4.
Correcting Cite # 1776 of IDS 9A, Media Planner Table Schema 33353-33363, Created at Least by Dec. 1999, pp. 11.
Correcting Cite # 1779 of IDS 9A, DoubleClick, Inc., Software Implementation Plan Next Generation Manage 33459-33501, Created at Least by Dec. 1999, pp. 43.
Correcting Cite # 1780 of IDS 9A, DoubleClick, Inc., NG Creatives Product Requirements Draft 33502-33512, Dec. 1999, pp. 11.
Correcting Cite # 1781 of IDS 9A, No Title 33513-33530, Created at Least by Dec. 1999, pp. 18.
Correcting Cite # 1793 of IDS 9A, DoubleClick, Inc., XML Server System Functional Specification Module Information 33637-33698, Dec. 2000, pp. 62.
Correcting Cite # 1799 of IDS 9A, Double Click Inc, DART for Agencies Testing 33720-33745, Sep. 30, 1998, pp. 26.
Correcting Cite # 1801 of IDS 9A, DoubleClick, Inc., First USA Project DDFA Manage Software Requirement Specification 33754-33759, Dec. 1999, pp. 6.
Correcting Cite # 1825 of IDS 9A, DoubleClick, Inc., DFA Manage System Installation Instructions 33888-33906, Dec. 1999, pp. 19.
Correcting Cite # 1827 of IDS 9A, Registry Folder 33949-33959, Created at Least by Dec. 1999, pp. 11.
Correcting Cite # 1840 of IDS 9A, DoubleClick, Inc., Spotlight Feature Specification in DART for Advertisers 33984-33988, Dec. 1999, pp. 5.
Correcting Cite # 1842 of IDS 9A, DoubleClick, Inc., First USA Project SPOT Software Requirement Specification 33999-34010, Dec. 1999, pp. 12.
Correcting Cite # 1845 of IDS 9A, Spotlight Version 2 34027-34035, Dec. 1998, pp. 9.
Correcting Cite # 1847 of IDS 9A, DFA QA Group Standard Test Terminology 34047-34048, Created at Least by Dec. 1999, pp. 2.
Correcting Cite # 1855 of IDS 9A, Test Plan DFA 2.3: Media Planner—Siet Search 34131-34140, Created at Least by Dec. 1999, pp. 10.
Correcting Cite # 1858 of IDS 9A, Test Plan DFA 2.3: Media Planner—Site Search 34164-34176, Created at Least by Dec. 1999, pp. 13.
Correcting Cite # 1859 of IDS 9A, Test Plan DFA 2.3: Feature—Review/Ban Ads (SCR #1222) 34177-34185, Apr. 17, 2000, pp. 9.
Correcting Cite # 1876 of IDS 9A, Test Case for SCR #1581 Test Cycle 1 34216—Dec. 1999, pp. 1.
Correcting Cite # 1926 of IDS 9A, No Title 34339-34434, Created at Least by Dec. 1999, pp. 96.
Correcting Cite # 1927 of IDS 9A, Out-Sourcing Campaigns to DART for Advertisers 34435-34440, Created at Least by Dec. 1999, pp. 6.
Correcting Cite # 1928 of IDS 9A, Table of Contents 34441-34522, Created at Least by Dec. 1999, pp. 82.
Correcting Cite # 1929 of IDS 9A, Running a DART for Advertisers Campaign on Your Site 34523-34526, Created at Least by Dec. 1999, pp. 4.
Correcting Cite # 1930 of IDS 9A, Tags for Enhanced Creatives 34527-34532, Created at Least by Dec. 1999, pp. 6.
Correcting Cite # 1931 of IDS 9A, DART for Advertisers Quick Reference Cards 34533-34551, Created at Least by Dec. 1999, pp. 19.
Correcting Cite # 1932 of IDS 9A, Spotlight/Boomerang Setup Questionnaire 34552-34556, Created at Least by Dec. 1999, pp. 5.
Correcting Cite # 1934 of IDS 9A, DoubleClick, Inc., Module Name Functional Specification (FS) Document 34559-34567, Dec. 9, 1998, pp. 9.
Correcting Cite # 1935 of IDS 9A, Your Company, Inc. 34568-34577, Dec. 1997, pp. 10.
Correcting Cite # 1937 of IDS 9A, DoubleClick, Inc., Derive Networks Functional Specification 34603-34621, Dec. 1998, pp. 19.
Correcting Cite # 1938 of IDS 9A, DoubleClick, Inc., Site Page Server v. SPS-1.00:1100 Functional Specification (FS) Document 34653-34674, Dec. 1998, pp. 22.
Correcting Cite # 1939 of IDS 9A, DoubleClick, Inc., Boomerang Functional Specification (FS) Document 34694-34743, Dec. 1998, pp. 50.
Correcting Cite # 1942 of IDS 9A, No Title 34774-34816, Dec. 1998, pp. 43.
Correcting Cite # 1943 of IDS 9A, No Title 34817-34820, Dec. 1998, pp. 4.
Correcting Cite # 1944 of IDS 9A, No Title 34845-34867, Dec. 1998, pp. 23.
Correcting Cite # 1945 of IDS 9A, No Title 34868—Dec. 1998, pp. 1.
Correcting Cite # 1948 of IDS 9A, No Title 34881-34885, Dec. 1999, pp. 5.
Correcting Cite # 1949 of IDS 9A, No Title 34926-35024, Dec. 1998, pp. 99.
Correcting Cite # 1951 of IDS 9A, No Title 35026-35036, Dec. 1999, pp. 11.
Correcting Cite # 1952 of IDS 9A, No Title 35037-35071, Dec. 1999, pp. 35.
Correcting Cite # 1953 of IDS 9A, No Title 35072-35184, Dec. 1999, pp. 113.
Correcting Cite # 1954 of IDS 9A, No Title 35185-35194, Dec. 1999, pp. 10.
Correcting Cite # 1955 of IDS 9A, Manage_T1 35195-35200, Dec. 1998, pp. 6.
Correcting Cite # 1956 of IDS 9A, No Title 35201-35203, Dec. 1999, pp. 3.
Correcting Cite # 1957 of IDS 9A, No Title 35204-35319, Dec. 1999, pp. 116.
Correcting Cite # 1958 of IDS 9A, AdManage Network Management Quality Assurance Test Plan 35320-35327, Jul. 18, 2000, pp. 8.
Correcting Cite # 1959 of IDS 9A, No Title 35334-35374, Dec. 1998, pp. 41.
Correcting Cite # 1960 of IDS 9A, No Title 35391-35393, Created at Least by Dec. 1999, pp. 3.
Correcting Cite # 1961 of IDS 9A, No Title 35394-35413, Dec. 1998, pp. 20.
Correcting Cite # 1963 of IDS 9A, No Title 35418-35432, Dec. 1998, pp. 15.
Correcting Cite # 1964 of IDS 9A, No Title 35433-35446, Dec. 1998, pp. 14.
Correcting Cite # 1965 of IDS 9A, No Title 35447-35464, Dec. 1999, pp. 18.
Correcting Cite # 1966 of IDS 9A, No Title 35500-35523, Dec. 2000, pp. 24.
Correcting Cite # 1967 of IDS 9A, DoubleClick, Inc., Requisite Outline for Test Specifications for Accounts—Sale Revenue Reports, 35557-35575, Dec. 1998, pp. 19.
Correcting Cite # 1968 of IDS 9A, DoubleClick, Inc., Test Plant for <Project Name> 35576-35592, Dec. 1998, pp. 17.
Correcting Cite # 1969 of IDS 9A, Y2K Checklist: Manage System Reporting 35870-35882, Dec. 2001, pp. 13.
Correcting Cite # of IDS 9A, Stephanie Caselia, Training Manual for New Hire Jan. 1999 35887-35888, Dec. 1999, pp. 2.
Correcting Cite # 1974 of IDS 9A, Cross Network Insertion Order Manual 35893-35894, Created at Least by Dec. 1999, pp. 2.
Correcting Cite # 1975 of IDS 9A, Directory Targeting 35895-35900, Created at Least by Dec. 1999, pp. 6.
Correcting Cite # 1981 of IDS 9A, How to label and build the new version of manage 10.50? 35913—Created at Least by Dec. 1999, pp. 1.
Correcting Cite # 1982 of IDS 9A, Manage Ad Categories 35914-35915, Created at Least by Dec. 1999, pp. 2.
Correcting Cite # 1983 of IDS 9A, No Title 35918-35925, Created at Least by Dec. 1999, pp. 8.
Correcting Cite # 1986 of IDS 9A, Order Reservation System 35929—Created at Least by Dec. 1999, pp. 1.
Correcting Cite # 1988 of IDS 9A, Redirect Image URLs 35937-35938, Created at Least byDec. 1999, pp. 2.
Correcting Cite # 1990 of IDS 9A, Review New Ads & Site Restrictions 35950-35951, Created at Least by Dec. 1999, pp. 2.
Correcting Cite # 1992 of IDS 9A, Salesperson Login account and the Manage/Approve Advertisers permission 35963—Created at Least by Dec. 1999, pp. 1.
Correcting Cite # 1996 of IDS 9A, Image Uploading and Image Series 35974-35976, Created at Least by Dec. 1999, pp. 3.

Correcting Cite # 1997 of IDS 9A, No Title 36024-36047, Dec. 1998, pp. 24.
Correcting Cite # 2000 of IDS 9A, No Title 36100-36104, Dec. 1998, pp. 5.
Correcting Cite # 2001 of IDS 9A, No Title 36105-36144, Dec. 1998, pp. 40.
Correcting Cite # 2003 of IDS 9A, No Title 36291-36403, Dec. 1999, pp. 113.
Correcting Cite # 2004 of IDS 9A, No Title 36410-36412, Dec. 1999, pp. 3.
Correcting Cite # 2008 of IDS 9A, No Title 36584-36599, Dec. 1999, pp. 16.
Correcting Cite # 2009 of IDS 9A, No Title 36620-36622, Dec. 1999, pp. 3.
Correcting Cite # 2010 of IDS 9A, No Title 36653-36670, Dec. 1999, pp. 18.
Correcting Cite # 2011 of IDS 9A, No Title 36671-36677, Dec. 1999, pp. 7.
Correcting Cite # 2012 of IDS 9A, No Title 36678-36705, Dec. 1999, pp. 28.
Correcting Cite # 2013 of IDS 9A, No Title 36706-36725, Dec. 1999, pp. 20.
Correcting Cite # 2014 of IDS 9A, No Title 36726-36734, Dec. 1999, pp. 9.
Correcting Cite # 2015 of IDS 9A, DoubleClick, Inc, Requisite Outline of Test Specifications for Accounts—Sales Revenue Reports 36739-36757, Dec. 1998, pp. 19.
Correcting Cite # 2016 of IDS 9A, DoubelClick, Inc, Test Plan 36758-36774, Dec. 1998, pp. 99.
Correcting Cite # 2018 of IDS 9A, No Title 37106-37204, Dec. 1998, pp. 99.
Correcting Cite # 2019 of IDS 9A, No Title 37205-37279, Dec. 1999, pp. 75.
Correcting Cite # 2020 of IDS 9A, No Title 37280-37323, Dec. 1999, pp. 44.
Correcting Cite # 2021 of IDS 9A, No Title 37324-37327, Dec. 1999, pp. 4.
Correcting Cite # 2022 of IDS 9A, No Title 37343-37352, Dec. 1999, pp. 10.
Correcting Cite # 2023 of IDS 9A, No Title 37367-37372, Dec. 1999, pp. 6.
Correcting Cite # 2026 of IDS 9A, No Title 37383-37413, Dec. 1998, pp. 31.
Correcting Cite # 2058 of IDS 9A, Model of New Manage Machine 37566-37568, Created at Least by Dec. 1999, pp. 3.
Correcting Cite # 2190 of IDS 9A, XML Reports Gateway 37928-37932, Jul. 18, 2000, pp. 5.
Correcting Cite # 2202 of IDS 9A, Production Build Notification 37988-37990, Jul. 18, 2000, pp. 3.
Correcting Cite # 2203 of IDS 9A, Production Build Notification 37991-37993, Jul. 18, 2000, pp. 3.
Correcting Cite # 2204 of IDS 9A, Production Build Notification 37994-37996, Jul. 18, 2000, pp. 3.
Correcting Cite # 2206 of IDS 9A, Show Availability Engine Process Rollout Instructions 38000-38003, Dec. 1998, pp. 4.
Correcting Cite # 2207 of IDS 9A, Show Availability Engine Process Version 1.5 Rollout Instructions 38004-38008, Dec. 1998, pp. 5.
Correcting Cite # 2277 of IDS 9A, Dow Jones / Telerate Quick Strike Project Cantor Middle Market Transaction Service . . . 38128-38156, Dec. 1997, pp. 29.
Correcting Cite # 2278 of IDS 9A, FIT Secondary System Diagram 38157—Created at Least by Dec. 1999, pp. 1.
Correcting Cite # 2279 of IDS 9A, Dow Jones Quick Strike Project Fixed Income Transaction Service Products Requirements Document Addendum 38159-38182, Dec. 1997, pp. 24.
Correcting Cite # 2282 of IDS 9A, Dow Jones Quick Strike Project Fixed Income Transaction Service QA Release 0.1, Real Time for IE 3.02 Release Notes 38281-38301, Dec. 1997, pp. 21.
Correcting Cite # 2283 of IDS 9A, DoubleClick, System Design Document 38302-38324, Dec. 1998, pp. 23.
Correcting Cite # 2286 of IDS 9A, Dow Jones Quick Strike Project Fixed Income Transaction Service System Administration Guide 38409-38447, Dec. 1997, pp. 39.
Correcting Cite # 2287 of IDS 9A, Dow Jones Quick Strike Project Fixed Income Transaction Service Test Plan 38448-38468, Created at Least by Dec. 1999, pp. 21.
Correcting Cite # 2291 of IDS 9A, Flow Chart for High Availability Project 38475—Created at Least by Dec. 1999, pp. 1.
Correcting Cite # 2292 of IDS 9A, FIT High Availability / ATF Flowchart 38476—Created at Least by Dec. 1999, pp. 1.
Correcting Cite # 2297 of IDS 9A, IR Tracker 38620-38632, Dec. 1997, pp. 13.
Correcting Cite # 2298 of IDS 9A, Company_Name_Placholder 38633-38647, Dec. 2000, pp. 15.
Correcting Cite # 2299 of IDS 9A, Dow Jones Quick Strike Project Fixed Income Transaction Service Release Notes . . . 38648-38661, Dec. 1997, pp. 14.
Correcting Cite # 2329 of IDS 9A, Dow Jones Quick Strike Report Fixed Income Transaction Service Test Plan 38732-38752, Created at Least by Dec. 1999, pp. 21.
Correcting Cite # 2330 of IDS 9A, Lori Mensik, incident Report #—38891—Jun. 19, 1997, pp. 1.
Correcting Cite # 2331 of IDS 9A, Fixed Income Transaction Service 38905—Created at Least by Dec. 1999, pp. 1.
Correcting Cite # 2357 of IDS 9A, Dow Jones Quick Strike Project Fixed Income Transaction Service 39566—Dec. 1997, pp. 1.
Correcting Cites # 2359 of IDS 9A, Company_Name_Placeholder 39607-39620, Dec. 1996, pp. 14.
Correcting Cite # 2360 of IDS 9A, Dow Jones/Telerate Quick Strike Project Cantor Middle Market Transaction Service . . . 39621-39649, Dec. 1997, pp. 29.
Correcting Cite # 2362 of IDS 9A, Company_Name_Placeholder 39660-39674, Created at Least by Dec. 1999, pp. 15.
Correcting Cite # 2367 of IDS 9A, Dow Jones, Fixed Income Transaction Service 39709—Dec. 1998, pp. 1.
Correcting Cite # 2374 of IDS 9A, DoubleClick, Module Name & Version Functional Specification (FS) Document 39875-39884, Dec. 1998, pp. 10.
Correcting Cite # 2375 of IDS 9A, Company Name 39885-39897, Dec. 1997, pp. 13.
Correcting Cite # 2376 of IDS 9A, Your Company, Inc. 39898-39907, Dec. 1997, pp. 10.
Correcting Cite # 2377 of IDS 9A, Use Case Name 39908-39909, Apr. 27, 1998, pp. 2.
Correcting Cite # 2378 of IDS 9A, AdManage Quality Assurance Plans Network Management 39911-39918, Jul. 18, 2000, pp. 8.
Correcting Cite # 2379 of IDS 9A, DoubleClick, Quality Assurance Test Plan Next Generation Trafficking User Interface . . . 39919-39953, Dec. 2000, pp. 35.
Correcting Cite # 2380 of IDS 9A, DoubleClick, Requisite Outline of Test Specifications for The AdManage Application: All Features 39954-39965, Dec. 1995, pp. 12.
Correcting Cite # 2386 of IDS 9A, Userinfoserver 40025—Created at Least by Dec. 1999, pp. 1.
Correcting Cite # 2400 of IDS 9A, No Title 40098-40100, Dec. 2002, pp. 3.
Correcting Cite # 2401 of IDS 9A, 1999 DoubleClick Strategy 40102—Dec. 1999, pp. 1.
Correcting Cite # 2403 of IDS 9A, DoubleClick / Kevin O'Connor, Growth of The Web—Years to 50 Million Users 40104-40118, Dec. 1999, pp. 15.
Correcting Cite # 2404 of IDS 9A, DoubleClick / Kevin O'Connor, The right message for the right consumer at the right time. 40119-40154, Mar. 1999, pp. 36.
Correcting Cite # 2405 of IDS 9A, No Title 40155-40199, Dec. 1997, pp. 45.
Correcting Cite # 2406 of IDS 9A, DoubleClick / Kevin O'Connor, Delivering the Right Message to the Right Person at the Right Time 40200-40222, Created at Least by Dec. 1999, pp. 23.
Correcting Cite # 2407 of IDS 9A, DoubelClick / Kevin O'Connor, Delivering the Right Message to the Right Person at the Right Time 40223-40267, Dec. 2000, pp. 45.
Correcting Cite # 2408 of IDS 9A, IAN Advertising Rates 1996 40268-40271, Dec. 1996, pp. 4.
Correcting Cite # 2409 of IDS 9A, Advertising Management Product Comparison 40272-40273, Created at Least by Dec. 1999, pp. 2.

Correcting Cite # 2410 of IDS 9A, DoubleClick, Some Really Shocking Quote 40274-40312, Dec. 1998, pp. 39.
Correcting Cite # 2411 of IDS 9A, DoubleClick / Kevin O'Connor, The Future of Internet Media 40313-40341, Dec. 2001, pp. 29.
Correcting Cite # 2412 of IDS 9A, DoubleClick, Outstanding Execution and Growth 40342-40353, Dec. 1999, pp. 12.
Correcting Cite # 2413 of IDS 9A, No Title 40354-40356, Created at Least by Dec. 1999, pp. 3.
Correcting Cite # 2415 of IDS 9A, DoubleClick / Kevin O'Connor, The Future of Internet Media 40470-40499, Dec. 2002, pp. 30.
Correcting Cite # 2416 of IDS 9A, DoubleClick / Kevin O'Connor, eCommerce: How Will Internet Advertising be Affected? 40500-40537, Dec. 2002, pp. 38.
Correcting Cite # 2417 of IDS 9A, DoubleClick, Closed-Loop Marketing 40538-40547, Created at Least by Dec. 1999, pp. 10.
Correcting Cite # 2419 of IDS 9A, DoubleClick, From Concept to Corporation 40549-40584, Sep. 20, 1995, pp. 36.
Correcting Cite # 2420 of IDS 9A, DoubleClick, From Concept to Corporation 40585-40617, Dec. 2000, pp. 33.
Correcting Cite # 2421 of IDS 9A, DoubleClick, From Concept to Corporation 40618-40645, Dec. 1998, pp. 28.
Correcting Cite # 2422 of IDS 9A, Business 40646-40657, Dec. 1997, pp. 12.
Correcting Cite # 2423 of IDS 9A, DoubleClick, Growth of the Web—Years to 50 Million Users 40658-40686, Dec. 2001, pp. 29.
Correcting Cite # 2424 of IDS 9A, DoubleClick, DoubleClick is the leading provider of comprehensive . . . 40687-40704, Dec. 1998, pp. 18.
Correcting Cite # 2427 of IDS 9A, DoubleClick, DoubleClick's Mission 40803-40840, Dec. 1998, pp. 38.
Correcting Cite # 2428 of IDS 9A, DoubleClick, DoubleClick Internet Advertising Solutions 40841-40880, Dec. 1998, pp. 40.
Correcting Cite # 2429 of IDS 9A, DoubleClick, Delivering the right message to the right consumer at the right time 40881-40904, Dec. 1998, pp. 24.
Correcting Cite # 2430 of IDS 9A, DoubleClick, Delivering the right message to the right consumer at the right time 40905-40929, Dec. 1998, pp. 25.
Correcting Cite # 2431 of IDS 9A, DoubleClick, Strategy Rational 40930-40954, Dec. 1998, pp. 25.
Correcting Cite # 2432 of IDS 9A, No Title 40955-40959, Dec. 1997, pp. 5.
Correcting Cite # 2433 of IDS 9A, No Title 40960-40963, Created at Least by Dec. 1999, pp. 4.
Correcting Cite # 2434 of IDS 9A, Dart for Advertisers 40964-40965, Created at Least by Dec. 1999, pp. 2.
Correcting Cite # 2435 of IDS 9A, DoubleClick, DoubleClick The Leader in Building on-Line One-To-One Relationships. . . 40966-40991, Oct. 1998, pp. 26.
Correcting Cite # 2436 of IDS 9A, DoubleClick / Kevin O'Connor, DART for Publishers Clients 40992-41006, Dec. 1998, pp. 15.
Correcting Cite # 2437 of IDS 9A, DoubleClick, DoubleClick Confidential Data Acquisition Strategy 41007-41012, Created at Least by Dec. 1999, pp. 6.
Correcting Cite # 2438 of IDS 9A, No Title 41013-41014, Created at Least by Dec. 1999, pp. 2.
Correcting Cite # 2439 of IDS 9A, DoubleClick / Elliot A. Fishman, PH.D., DART Demographics Overview and Strategy 41015-41030, Created at Least by Dec. 1999, pp. 16.
Correcting Cite # 2440 of IDS 9A, DoubleClick, DataBank Program Overview adn Strategy 41031-41041, Created al Least by Dec. 1999, pp. 11.
Correcting Cite # 2442 of IDS 9A, DoubleClick / Kevin O'Connor, The Future of Internet Media 41044-41071, Dec. 2000, pp. 28.
Correcting Cite # 2443 of IDS 9A, DoubleClick, Diret Marketing and DoubleClick Direct 41072-41086, Aug. 1997, pp. 15.
Correcting Cite # 2444 of IDS 9A, DoubleClick, Product Definition: Key Points 41087-41089, Created at Least by Dec. 1999, pp. 3.
Correcting Cite # 2445 of IDS 9A, DoubleClick, Product Definition: Key Points 41090-41092, Created at Least by Dec. 1999, pp. 3.
Correcting Cite # 2446 of IDS 9A, DoubleClick, International/ Search Presentation of Disney.com @ The Web Site For Families 41093-41100, Created at Least by Dec. 1999, pp. 8.
Correcting Cite # 2447 of IDS 9A, DoubleClick, DoubleClick The Internet Advertising Network 41101-41118, Created at Least by Dec. 1999, pp. 18.
Correcting Cite # 2448 of IDS 9A, DoubleClick, Confidential Business Plan 41120-41143, Created at Least by Dec. 1999, pp. 24.
Correcting Cite # 2449 of IDS 9A, DoubleClick Competition 41144—Created at Least by Dec. 1999, pp. 1.
Correcting Cite # 2450 of IDS 9A, DoubleClick, DoubleClick Confidential DoubleClick Data Strategy 41145-41146, Created at Least by Dec. 1999, pp. 2.
Correcting Cite # 2451 of IDS 9A, DoubleClick Event Network (DEN) 41147—Created at Least by Dec. 1999, pp. 1.
Correcting Cite # 2452 of IDS 9A, DoubleClick Flash Report 41148-41155, Apr. 1, 1996, pp. 8.
Correcting Cite # 2453 of IDS 9A, No Title 41156—Created at Least by Dec. 1999, pp. 1.
Correcting Cite # 2456 of IDS 9A, DoubleClick, Providing Solutions for the Internet Advertising Industry 41198-41212, Created at Least by Dec. 1999, pp. 15.
Correcting Cite # 2457 of IDS 9A, DoubleClick, Providing Solutions for the Internet Advertising Industry 41213-41231, Created at Least by Dec. 1999, pp. 19.
Correcting Cite # 2458 of IDS 9A, DoubleClick, Providing Global Solutions for the Internet Advertising Industry 41232-41249, Created at Least by Dec. 1999, pp. 18.
Correcting Cite # 2459 of IDS 9A, DoubleClick, Providing Solutions for the Internet advertising industry 41250-41271, Created at Least by Dec. 1999, pp. 22.
Correcting Cite # 2462 of IDS 9A, DoubleClick, doubleclick.net The Internet Advertising Network 41290-41303, Created at Least by Dec. 1999, pp. 14.
Correcting Cite # 2463 of IDS 9A, DoubleClick, DoubleClick's Competitive Landscape 41304-41312, Created at Least by Dec. 1999, pp. 9.
Correcting Cite # 2464 of IDS 9A, DoubleClick / Kevin O'Connor, Growth of the Web—Years to 50 Million Users 41313-41345, Dec. 2001, pp. 33.
Correcting Cite # 2466 of IDS 9A, DoubleClick / Kevin O'Connor, You Gotta Have Traffic to Have E-Commerce 41347-41384, Dec. 1998, pp. 38.
Correcting Cite # 2467 of IDS 9A, DoubleClick / Kevin O'Connor, You Gotta Have Qualified Traffic to Have E-Commerce 41385-41407, Dec. 1999, pp. 23.
Correcting Cite # 2473 of IDS 9A, DoubleClick / Kevin O'Connor, The Rapid Evolution of Internet Media 41419-41445, Dec. 1998, pp. 27.
Correcting Cite # 2474 of IDS 9A, No Title 41446-41447, Dec. 1997, pp. 2.
Correcting Cite # 2475 of IDS 9A, No Title 41448—Created at Least by Dec. 1999, pp. 1.
Correcting Cite # 2478 of IDS 9A, IAF FairShare System 41480-41481, Created at Least by Dec. 1999, pp. 2.
Correcting Cite # 2482 of IDS 9A, DoubleClick, Online Commerce + Advertising 42154-42193, Dec. 1998, pp. 40.
Correcting Cite # 2483 of IDS 9A, DoubleClick, Meeting Agenda 42194-42232, Dec. 1998, pp. 39.
Correcting Cite # 2484 of IDS 9A, DoubleClick / Kevin O'Connor, The Role of Ad Networks 42233-42256, Dec. 1996, pp. 24.
Correcting Cite # 2485 of IDS 9A, DoubleClick / Kevin O'Connor, DoubleClick's Mission 42257-42297, Dec. 1998, pp. 41.
Correcting Cite # 2487 of IDS 9A, DoubleClick, DoubleClick's Mission 42299-42312, Dec. 1997, pp. 14.
Correcting Cite # 2488 of IDS 9A, DoubleClick Forecast 42313-42321, Dec. 1998, pp. 9.
Correcting Cite # 2489 of IDS 9A, Statistics since DoubleClick Network Inception: 42322-42323, Created at Least by Dec. 1999, pp. 2.
Correcting Cite # 2490 of IDS 9A, DoubleClick / Kevin O'Connor, The Role of Ad Networks 42324-42348, Dec. 1997, pp. 25.
Correcting Cite # 2491 of IDS 9A, DoubleClick / Kevin O'Connor, The Role of Ad Networks 42349-42363, Dec. 1997, pp. 15.
Correcting Cite # 2492 of IDS 9A, DoubleClick / Kevin O'Connor, The Role of Ad Networks 42364-42387 Dec. 1996, pp. 24.

Correcting Cite # 2495 of IDS 9A, DoubleClick, E-Tailing 2000 Driving Sales on the Web 42393-42419, Dec. 1998, pp. 27.
Correcting Cite # 2498 of IDS 9A, DoubleClick, Growth of the Web—Years to 50 Million Users 42436-42442, Dec. 1997, pp. 7.
Correcting Cite # 2499 of IDS 9A, Kevin O'Connor, Growth of the Web—Years to 50 Million Users 42443-42460, Dec. 1997, pp. 18.
Correcting Cite # 2500 of IDS 9A, DoubleClick, Providing Solutions for the Internet Advertising Industry 42461-42471, Created at Least by Dec. 1999, pp. 11.
Correcting Cite # 2501 of IDS 9A, Kevin O'Connor, Click DoubleClick 42472-42500, Dec. 1999, pp. 29.
Correcting Cite # 2504 of IDS 9A, Kevin O'Connor, Harvard Business School Club 42504-42526, Dec. 1998, pp. 23.
Correcting Cite # 2505 of IDS 9A, DoubelClick / Kevin O'Connor, DoubleClick (DCLK) is the leading provider of . . . 42527-42554, Dec. 1998, pp. 28.
Correcting Cite # 2506 of IDS 9A, DoubleClick / Kevin O'Connor, The Future of Internet Media 42555-42583, Dec. 1998, pp. 29.
Correcting Cite # 2507 of IDS 9A, DoubleClick / Kevin O'Connor, The Future of Internet Media for Heinrich Bauer Verlag 42584-42606, Dec. 1998, pp. 23.
Correcting Cite # 2509 of IDS 9A, How Ads are Placed 42608—Dec. 1995, pp. 1.
Correcting Cite # 2510 of IDS 9A, Simple HTML Change 42609—Dec. 1995, pp. 1.
Correcting Cite # 2516 of IDS 9A, Copithorne & Bellows, IAN Delivers Highly Targeted Internet Advertising 42637—Jan. 1995, pp. 1.
Correcting Cite # 2518 of IDS 9A, Internet Advertising Network 42639-42640, Created at Least by Dec. 1999, pp. 2.
Correcting Cite # 2519 of IDS 9A, Internet Advertising Network (IAN) 42641—Dec. 1995, pp. 1.
Correcting Cite # 2521 of IDS 9A, Copithorne & Bellows, Internet Advertising Network Delivers Revolutionary Service for Advertisers and Web Sites 42644-42645, Jan. 1995, pp. 2.
Correcting Cite # 2522 of IDS 9A, DoubleClick / Kevin O'Connor, DoubleClick (DCLK) is the leading provider of comprehensive Internet . . . 42648-42669, Dec. 1998, pp. 2.
Correcting Cite # 2523 of IDS 9A, DoubleClick / Kevin O'Connor, The Future of Media Buying on the Internet 42671-42678, Created at Least by Dec. 1999, pp. 9.
Correcting Cite # 2524 of IDS 9A, Internet Advertising Network, What is and Impression? 42679—Dec. 1995, pp. 1.
Correcting Cite # 2525 of IDS 9A, Internet Advertising Network, Ian in Action 42680—Dec. 1995, pp. 1.
Correcting Cite # 2527 of IDS 9A, DoubleClick, Internet Usage is Exploding 42682-42689, Dec. 1998, pp. 8.
Correcting Cite # 2529 of IDS 9A, DoubleClick, Doubleclick Expansion into Email 42692-42693, Dec. 1999, pp. 2.
Correcting Cite # 2530 of IDS 9A, DoubleClick, Golden Pages Publications LTD. 42694-42698, Created at Least by Dec. 1999, pp. 5.
Correcting Cite # 2531 of IDS 9A, DoubleClick, No Title—DoubleClick International 42699-42723, Dec. 1999, pp. 25.
Correcting Cite # 2532 of IDS 9A, DoubleClick, No Title—DoubleClick International 42724-42751, Dec. 1999, pp. 28.
Correcting Cite # 2534 of IDS 9A, No Title 42753-42754, Dec. 1998, pp. 2.
Correcting Cite # 2537 of IDS 9A, Internet Advertising Whitepaper 42762-42763, Created at Least by Dec. 1999, pp. 2.
Correcting Cite # 2538 of IDS 9A, Detroit story 42764-42777, Created at Least by Dec. 1999, pp. 14.
Correcting Cite # 2539 of IDS 9A, Internet Advertising Network, The Internet, The Web, and, a perfectly simple explanation. 42778—Dec. 1995, pp. 1.
Correcting Cite # 2541 of IDS 9A, Kevin, Mike 42780-42784, Created at Least by Dec. 1999, pp. 5.
Correcting Cite # 2547 of IDS 9A, DoubleClick, Web in Perspective: Ad Response 42800-42821, Dec. 1996, pp. 22.
Correcting Cite # 2548 of IDS 9A, DoubleClick / Kevin O'Connor, DoubleClick, Inc. The Global Advertising Solutions Company 42822-42839, Dec. 4, 1997, pp. 18.
Correcting Cite # 2551 of IDS 9A, DoubleClick / Kevin O'Connor, The Future of Internet Media 42848-42876, Dec. 1999, pp. 29.
Correcting Cite # 2552 of IDS 9A, Double Click / Kevin O'Connor, Click DoubleClick DoubleClick is the leading providers of comprehensive . . . 42877-42900, Dec. 1998, pp. 24.
Correcting Cite # 2553 of IDS 9A, Double Click / Kevin O'Connor, Web Advertising: Now and the Future 42901-42931, Dec. 1998, pp. 31.
Correcting Cite # 2554 of IDS 9A, DoubleClick, DoubleClick 42932-42934, Dec. 1996, pp. 3.
Correcting Cite # 2558 of IDS 9A, Engineering Deliverable, Jun. 1, 1998 through Aug. 31, 1998 42939-42952, Dec. 1998, pp. 14.
Correcting Cite # 2559 of IDS 9A, DoubleClick & NetGravity Providing Solutions for (and Dominating) the Internet Adversity Industry 42953-42960, Created at Least by Dec. 1999, pp. 8.
Correcting Cite # 2560 of IDS 9A, DoubleClick Strategy 1997 Company Confidential 42961-42969, Created at Least by Dec. 1999, pp. 9.
Correcting Cite # 2563 of IDS 9A, No Title 43033-43034, Created at Least by Dec. 1999, pp. 2.
Correcting Cite # 2564 of IDS 9A, DoubleClick Advertiser List 43035—Created at Least by Dec. 1999, pp. 1.
Correcting Cite # 2565 of IDS 9A, DoubleClick, The DoubleClick International Partners Program An Overview 43036-43046, Created at Least by Dec. 1999, pp. 11.
Correcting Cite # 2566 of IDS 9A, DoubleClick, DoubleClick Strategic Planning Summary 43047—Created at Least by Dec. 1999, pp. 1.
Correcting Cite # 2567 of IDS 9A, No Title 43048-43049, Created at Least by Dec. 1999, pp. 2.
Correcting Cite # 2568 of IDS 9A, Accipiter Technology and Network 43050—Feb. 1997, pp. 1.
Correcting Cite # 2569 of IDS 9A, Commonwealth Network 43051-43052, Feb. 1997, pp. 2.
Correcting Cite # 2570 of IDS 9A, Excite Search Engine 43053-43054, Feb. 1997, pp. 2.
Correcting Cite # 2571 of IDS 9A, FocaLink Communications Technology 43055—Feb. 1997, pp. 1.
Correcting Cite # 2572 of IDS 9A, Content Site and Technology 43056—Feb. 1997, pp. 1.
Correcting Cite # 2573 of IDS 9A, Imgris Technology and Network 43057—Feb. 1997, pp. 1.
Correcting Cite # 2574 of IDS 9A, Infoseek Search Engine and Networks 43058-43059, Feb. 1997, pp. 2.
Correcting Cite # 2575 of IDS 9A, Lycos Search Engine 43060—Feb. 1997, pp. 1.
Correcting Cite # 2576 of IDS 9A, NetGravity Technology 43061—Feb. 1997, pp. 1.
Correcting Cite # 2577 of IDS 9A, SIMweb Network 43062—Feb. 1997, pp. 1.
Correcting Cite # 2578 of IDS 9A, WebConnect Network 43063—Feb. 1997, pp. 1.
Correcting Cite # 2579 of IDS 9A, Yahoo Search Engine 43064—Feb. 1997, pp. 1.
Correcting Cite # 2580 of IDS 9A, Advertiser Performance—DoubleClick Direct Sep. 1-30, 1997, 43065-43086, Dec. 1997, pp. 22.
Correcting Cite # 2581 of IDS 9A, Advertisers Performance—DoubleClick Direct Sep. 1-30, 1997 43087-43107, Dec. 1997, pp. 21.
Correcting Cite # 2586 of IDS 9A, DART Functionality 43129-43131, Created at Least by Dec. 1999, pp. 3.
Correcting Cite # 2587 of IDS 9A, DoubleClick DART 43137-43141, Created at Least by Dec. 1999, pp. 5.
Correcting Cite # 2588 of IDS 9A, NetGravity, NetGravity E-Marketing An Integrated Solution for Driving E-Commerce . . . 43142-43158, Created at Least by Dec. 1999, pp. 17.
Correcting Cite # 2589 of IDS 9A, DART Search Keyword Targeting 43162—Created at Least by Dec. 1999, pp. 1.
Correcting Cite # 2590 of IDS 9A, Maximmizing Your Site's Click Rate 43166—Created at Least by Dec. 1999, pp. 1.
Correcting Cite # 2591 of IDS 9A, DoubleClick, DoubleClick Tech Groups add: SVC vs SW pub vs agency serving 43172-43181, Dec. 1999, pp. 10.

Correcting Cite # 2592 of IDS 9A, Syntax for Targeting 43186-43189, Created at Least by Dec. 1999, pp. 4.
Correcting Cite # 2593 of IDS 9A, Targeting in DART 43190-43192, Created at Least by Dec. 1999, pp. 3.
Correcting Cite # 2594 of IDS 9A, Optimizing Banner Performance 43193-43195, Created at Least by Dec. 1999, pp. 3.
Correcting Cite # 2495 of IDS 9A, Glossary 43196-43208, Created at Least by Dec. 1999, pp. 13.
Correcting Cite # 2596 of IDS 9A, Directory Hierarchy Targeting 43209-43217, Created at Least by Dec. 1999, pp. 9.
Correcting Cite # 2597 of IDS 9A, Caching of Ads on the Internet 43218-43223, Created at Least by Dec. 1999, pp. 6.
Correcting Cite # 2598 of IDS 9A, Ad Delivery Priorities 43224-43229, Created at Least by Dec. 1999, pp. 6.
Correcting Cite # 2599 of IDS 9A, DoubleClick, DART White Paper 43230-43247, Created at Least by Dec. 1999, pp. 18.
Correcting Cite # 2600 of IDS 9A, DART Counting Methodology 43248-43260, Created at Least by Dec. 1999, pp. 13.
Correcting Cite # 2601 of IDS 9A, Technical Overview of DART 43261-43273, Dec. 1998, pp. 13.
Correcting Cite # 2603 of IDS 9A, doubleclick.net Affiliate Agreement 43275-43280, Created at Least by Dec. 1999, pp. 6.
Correcting Cite # 2605 of IDS 9A, Get Ad Transaction 43288-43293, Created at Least by Dec. 1999, pp. 6.
Correcting Cite # 2607 of IDS 9A, Advertising Information 43303-43310, Jan. 1996, pp. 8.
Correcting Cite # 2610 of IDS 9A, Internet Advertising Network (IAN) 43314-43323, Dec. 1997, pp. 10.
Correcting Cite # 2611 of IDS 9A, Internet Advertising Federation Confidential Business Plan 43324-43343, Dec. 1999, pp. 20.
Correcting Cite # 2612 of IDS 9A, Internet Advertising Network, Inc., Target Selection Criteria 43344-43348, Dec. 1995, pp. 5.
Correcting Cite # 2613 of IDS 9A, Internet Advertising and Ad Fed Market Size Forecast 43350-43361, Created at Least by Dec. 1999, pp. 12.
Correcting Cite # 2614 of IDS 9A, Why Should My Web Site Join Ian Today? 43362—Created at Least by Dec. 1999, pp. 1.
Correcting Cite # 2615 of IDS 9A, 1996 Ian Advertising Rates 43363-43365, Dec. 1996, pp. 3.
Correcting Cite # No Title 43380—Created at Least by Dec. 1999, pp. 1.
Correcting Cite # 2618 of IDS 9A, IAF Budget.xls 43381-43402, Dec. 1996, pp. 22.
Correcting Cite # 2619 of IDS 9A, No Title 43427-43430, Created at Least by Dec. 1999, pp. 4.
Correcting Cite # 2620 of IDS 9A, IAF Budget.xls 43431-43442, Dec. 1996, pp. 12.
Correcting Cite # 2623 of IDS 9A, Internet Advertising Network, Your Internet Advertising Problems are Solved 43454—Feb. 1, 1996, pp. 1.
Correcting Cite # 2624 of IDS 9A, DoubleClick, Target Selection Criteria 43455-43458, Created at Least by Dec. 1999, pp. 4.
Correcting Cite # 2627 of IDS 9A, Internet Advertising Network, Ad Registration 43463-43468, Dec. 1995, pp. 6.
Correcting Cite # 2629 of IDS 9A, Internet Advertising Network, Why Advertise on the Internet? 43470-43471, Dec. 1995, pp. 2.
Correcting Cite # 2647 of IDS 9A, SIC Codes 43610-43631, Created at Least by Dec. 1999, pp. 22.
Correcting Cite # 2651 of IDS 9A, Valuable Internet Resources 44239-44250, Dec. 1995, pp. 12.
Correcting Cite # 2655 of IDS 9A, No Title 44257-44258, Dec. 12, 1992, p. 2.
Correcting Cite # 2662 of IDS 9A, Internet Advertising Network, how your Web Site Makes Money 44277-44278, Dec. 1995, pp. 2.
Correcting Cite # 2670 of IDS 9A, Rapid Target 44903—Created at Least by Dec. 1999, pp. 1.
Correcting Cite #2681 of IDS 9A, Newsgroups Info Center 45033-45506, Dec. 1995, pp. 474.
Correcting Cite # 2688 of IDS 9A, Internet Advertising Network, The IAF Advertising Rates 1996 45528-45532, Dec. 1996, pp. 5.
Correcting Cite # 2689 of IDS 9A, Internet Advertising Network, IAM Frequently Asked Questions—FAQ 45533-45534, Dec. 1995, pp. 2.

Correcting Cites # 2696 of IDS 9A, Internet Advertising Network, About IAN, Inc., 45553-45554, Dec. 1995, pp. 2.
Correcting Cite # 2697 of IDS 9A, Internet Advertising Network, Web Site Registration 45555-45556, Created at Least by Dec. 1999, pp. 2.
Correcting Cite # 2699 of IDS 9A, Internet Advertising Network, Revenue Sharing 45562—Created at Least by Dec. 1999, pp. 1.
Correcting Cite # 2701 of IDS 9A, Internet Advertising Network, Internet Advertising Network Overview 45565-45566, Dec. 1995, pp. 2.
Correcting Cite # 2702 of IDS 9A, IAN Advertising Report 45567-45588, Created at Least by Dec. 1999, pp. 22.
Correcting Cite # 2703 of IDS 9A, Internet Advertising Network, Ad Registration 45589-45594, Created at Least by Dec. 1999, pp. 6.
Correcting Cite # 2705 of IDS 9A, Internet Advertising Network, Advertising FAQs 45598-45599, Dec. 1995, pp. 2.
Correcting Cite # 2706 of IDS 9A, Internet Advertising Network, Web Site FAQs 45600-45601, Dec. 1995, pp. 2.
Correcting Cite # 2707 of IDS 9A, Internet Advertising Network, User FAQs 45602-45603, Dec. 1995, pp. 2.
Correcting Cite # 2709 of IDS 9A, Internet Advertising Network, General FAQs 45605—Dec. 1995, pp. 1.
Correcting Cite # 2713 of IDS 9A, Internet Advertising Network, What is Send Info? 45612—Dec. 1995, pp. 1.
Correcting Cite # 2715 of IDS 9A, Internet Advertising Network, Send Infor Registration 45615-45616, Dec. 1995, pp. 2.
Correcting Cite # 2716 of IDS 9A, Internet Advertising Network, How to Advertise on the Internet Without Hitting Everyone's Target But Yours 45617-45619, Dec. 1995, pp. 3.
Correcting Cite # 2719 of IDS 9A, No Title 45628-45635, Dec. 1995, pp. 8.
Correcting Cite # 2736 of IDS 9A, Internet Advertising Network, 1996 Ian Advertising Rates 45703-45706, Dec. 1996, pp. 4.
Correcting Cite # 2737 of IDS 9A, Internet Advertising Network, How to Advertise on the Internet Without Hitting Everyone's Target But Yours 45707-45710, Dec. 1995, pp. 4.
Correcting Cite # 2740 of IDS 9A, Internet Advertising Network, Restrict Web Sites 45713—Dec. 1995, pp. 1.
Correcting Cite # 2741 of IDS 9A, Kevin O'Connor, To: Kelly Hopkins 45714-45716, Created at Least by Dec. 1999, pp. 3.
Correcting Cite # 2742 of IDS 9A, Internet Advertising Network, Ian Member Site Documentation 45717-45720, Dec. 1995, pp. 4.
Correcting Cite # 2743 of IDS 9A, Internet Advertising Network, Send Info FAQs 45721-45722, Dec. 1995, pp. 2.
Correcting Cite # 2749 of IDS 9A, Internet Advertising Network, The Internet. The Web. And, a perfectly simple explanation. 45736—Dec. 1995, pp. 1.
Correcting Cite # 2754 of IDS 9A, DoubleClick, Inc Reciprocal Nondisclosure Agreement 45746-45747, Dec. 1995, pp. 2.
Correcting Cite # 2755 of IDS 9A, No Title—Diagram 45837—Created at Least by Dec. 1999, pp. 1.
Correcting Cite # 2757 of IDS 9A, AdForce, Adforce Report Manage Quick Reference Guide Version 3.0 45858-45910, Dec. 1999, pp. 53.
Correcting Cite # 2758 of IDS 9A, AdForce, Adforce TrackForce User Guide Beta Version 2.0 45911-45955, Dec. 1999, pp. 45.
Correcting Cite # 2760 of IDS 9A, SelectCast Phas 2 Maintenance Essentails 45961-45967, Created at Least by Dec. 1999, pp. 7.
Correcting Cite # 2761 of IDS 9A, SelectCast for Advertising Servers 2.1 45968-45969, Created at Least by Dec. 1999, pp. 2.
Correcting Cite # 2762 of IDS 9A, Sabela Technology, Adserver Architecture 45970—Dec. 1999, pp. 1.
Correcting Cite # 2764 of IDS 9A, Sabela Media, Site Map 45972—Jun. 8, 2000, pp. 1.
Correcting Cite # 2765 of IDS 9A, Sabela Media, Corporate Info Customers 45973—Mar. 7, 2000, pp. 1.
Correcting Cite # 2766 of IDS 9A, Sabela Media, Corporate Infor Executive Team 45974-45975, Nov. 11, 1999, pp. 2.
Correcting Cite # 2767 of IDS 9A, Sabela Technology Adserving Models Supported 45976-45977, Jun. 8, 2000, pp. 2.
Correcting Cite # 2768 of IDS 9A, Sabela Media, Company Information "now there's Savela Media. Now you know. For sure." 45978-45979, Mar. 7, 2000, pp. 2.

Correcting Cite # 2769 of IDS 9A, Sabela Media, Sabela Media—Login 45980—Jun. 21, 2000, pp. 1.
Correcting Cite # 2770 of IDS 9A, Sabela Media, Corporate Info Overview 45981-45982, May 18, 2000, pp. 2.
Correcting Cite # 2771 of IDS 9A, Sabela Media, Sabela Technology 45983—Jun. 9, 2000, pp. 1.
Correcting Cite # 2772 of IDS 9A, Sabela Media, News 45984—Jun. 9, 2000, pp. 1.
Correcting Cite # 2773 of IDS 9A, Sabela Media, Corporate Infor Privacy Policy 45985-45987, Mar. 8, 2000, pp. 3.
Correcting Cite # 2774 of IDS 9A, Sabela Media, Sabela Technology 45988—Jun. 9, 2000, pp. 1.
Correcting Cite # 2775 of IDS 9A, Sabela Media, Sabela Technology 45989—Jun. 9, 2000, pp. 1.
Correcting Cite # 2776 of IDS 9A, Sabela Media, News 45990—May 24, 2000, pp. 1.
Correcting Cite # 2777 of IDS 9A, Sabela Media, Sabela for Publishers 45991—Jun. 21, 2000, pp. 1.
Correcting Cite # 2779 of IDS 9A, Jupiter Strategic Planning Services, Server Software 45994-46016, Jun. 1998, pp. 23.
Correcting Cite # 2780 of IDS 9A, Skyline Network Technologies, Inc, SpinBox Contact 46017-46048, Mar. 4, 2000, pp. 32.
Correcting Cite # 2782 of IDS 9A, DoubleClick, DART for Advertisers Sabela and AdKnowledge Competitive Overview & . . . 46050-46079, Dec. 2000, pp. 30.
Correcting Cite # 2787 of IDS 9A, Projected Freud Company Background 27532-27535, Dec. 2000, pp. 4.
Correcting Cite # 2789 of IDS 9A, No Title 27539—Created at Least by Dec. 1999, pp. 1.
Correcting Cite # 2793 of IDS 9A, Net Gravity, The More Business you Want to do on The Internet, The More you . . . 27543-27550, Dec. 1998, pp. 8.
Correcting Cite # 2794 of IDS 9A, NetGravity, NetGravity Inc. Company Fact Sheet 27551-27552, Created at Least by Dec. 1999, pp. 2.
Correcting Cite # 2795 of IDS 9A, NetGravity, Ad Solution Assessment 27553-27554, Dec. 1998, pp. 2.
Correcting Cite # 2796 of IDS 9A, NetGravity, NetGravity E-Marketing Solution for Net.Commerce 27555-27556, Created at Least by Dec. 1999, pp. 2.
Correcting Cite # 2797 of IDS 9A, NetGravity, NetGravity is the premier provider if closed-loop marketing solutions for e-business 27557-27558, Dec. 1999, pp. 2.
Correcting Cite # 2798 of IDS 9A, NetGravity / Rick Jackson, Direct Marketing 27559-27560, Created at Least by Dec. 1999, pp. 2.
Correcting Cite # 2800 of IDS 9A, NetGravity, NetGravity Publisher Solutions 27577-27590, Dec. 1999, pp. 14.
Correcting Cite # 2801 of IDS 9A, NetGravity, E-Marketing 27591-27604, Dec. 1999, pp. 14.
Correcting Cite # 2802 of IDS 9A, NetGravity, Increasing Online Advertising Effectiveness with Segmentation Targeting and Profiling 27605-27612, Dec. 1999, pp. 8.
Correcting Cite # 2803 of IDS 9A, NetGravity, Measuring Advertising on Today's Internet 27613-27621, Dec. 1998, pp. 9.
Correcting Cite # 2804 of IDS 9A, NetGravity, The Force Behind Online Marketing Feb. 1999, Update 27622-27635, Dec. 1999, pp. 14.
Correcting Cite # 2805 of IDS 9A, NetGravity Case Study 27636-27637, Created at Least by Dec. 1999, pp. 2.
Correcting Cite # 2806 of IDS 9A, NetGravity 27638-27640, Created at Least by Dec. 1999, pp. 3.
Correcting Cite # 2807 of IDS 9A, NetGravity Case Study 27641-27642, Created at Least by Dec. 1999, pp. 2.
Correcting Cite # 2808 of IDS 9A, NetGravity Case Study 27643—Created at Least by Dec. 1999, pp. 1.
Correcting Cite # 2809 of IDS 9A, NetGravity, NetGravity GeoTargeting 27644-27645, Dec. 1999, pp. 2.
Correcting Cite # 2810 of IDS 9A, NetGravity, NetGravity GeoTargeting 27646-27647, Dec. 1999, pp. 2.
Correcting Cite # 2811 of IDS 9A, NetGravity, Adserver Network Package 27648-27649, Dec. 1998, pp. 2.
Correcting Cite # 2812 of IDS 9A, NetGravity, NetGravity AdServer Network Architecture 27650-27656, Dec. 1998, pp. 7.

Correcting Cite # 2813 of IDS 9A, NetGravity, Using NetGRavity Adserver Network 27657-27660, Created at Least by Dec. 1999, pp. 4.
Correcting Cite # 2814 of IDS 9A, NetGravity, Adserver Enterprise Package 27661-27662, Dec. 1998, pp. 2.
Correcting Cite # 2815 of IDS 9A, NetGravity, NetGravity Adserver Enterprise Architecture 27663-27673, Dec. 1998, pp. 11.
Correcting Cite # 2816 of IDS 9A, NetGravity, AdServer Site Package 27674-27675, Dec. 1998, pp. 2.
Correcting Cite # 2817 of IDS 9A, NetGravity, NetGravity AdServer Features and Benefits 27676-27678, Created at Least by Dec. 1999, pp. 3.
Correcting Cite # 2818 of IDS 9A, NetGravity, SureStart Migration 27679-27680, Dec. 1998, pp. 2.
Correcting Cite # 2819 of IDS 9A, NetGravity, Migrating to Adserver 3 27681-27692, Dec. 1998, pp. 12.
Correcting Cite # 2820 of IDS 9A, NetGravity, Building Reports with NetGravity AdServer 3 27693—Oct. 12, 1998, pp. 1.
Correcting Cite # 2821 of IDS 9A, NetGravity, Leveraging the Features of NetGravity Adserver 3.5 27694—Sep. 29, 1998, pp. 1.
Correcting Cite # 2822 of IDS 9A, NetGravity, NetGravity AdServer 3.5 27695-27696, Dec. 1998, pp. 2.
Correcting Cite # 2823 of IDS 9A, NetGravity, NetGravity Adserver 4 27697-27698, Dec. 1999, pp. 2.
Correcting Cite # 2824 of IDS 9A, NetGravity, Migrating AdServer 4 27699-27709, Dec. 1999, pp. 11.
Correcting Cite # 2825 of IDS 9A, NetGravity, High Availability AdServer 27710-27720, Dec. 1998, pp. 11.
Correcting Cite # 2826 of IDS 9A, NetGravity, AdCenter 27721-27726, Dec. 1998, pp. 6.
Correcting Cite # 2827 of IDS 9A, Aberdeen Group, Inc, Aberdeen Group profile 27727-27730, Dec. 1998, pp. 4.
Correcting Cite # 2830 of IDS 9A, NetGravity AdCenter Features and Benefits 27745-27746, Created at Least by Dec. 1999, pp. 2.
Correcting Cite # 2831 of IDS 9A, NetGravity, NetGravity AdCenter 3.5 27747-27748, Dec. 1999, pp. 2.
Correcting Cite # 2832 of IDS 9A, NetGravity, AdCenter Action Trak 27749-27750, Created at Least by Dec. 1999, pp. 2.
Correcting Cite # 2833 of IDS 9A, NetGravity, AdCenter PinPoint 27751-27752, Created at Least by Dec. 1999, pp. 2.
Correcting Cite # 2834 of IDS 9A, NetGravity, AdCenter Implementation Service 27753—Created at Least by Dec. 1999, pp. 1.
Correcting Cite # 2835 of IDS 9A, NetGravity, NetGravity AdCenter for Agencies 27754-27755, Dec. 1999, pp. 2.
Correcting Cite # 2837 of IDS 9A, NetGravity, AdCenter for Agencie Update 27764-27776, Created at Least by Dec. 1999, pp. 13.
Correcting Cite # 2839 of IDS 9A, NetGravity, AdCenter for Publishers 27797-27798, Created at Least by Dec, 1999, pp. 2.
Correcting Cite # 2841 of IDS 9A, NetGravity, AdService Support Programs 27801-27802, Created at Least by Dec. 1999, pp. 2.
Correcting Cite # 2842 of IDS 9A, NetGravity, Support & Professional Services 27803-27808, Dec. 1998, pp. 6.
Correcting Cite # 2844 of IDS 9A, Competitive Positioning Brief 27810-27811, Created at Least by Dec. 1999, pp. 2.
Correcting Cite # 2846 of IDS 9A, NetGravity, Competitive Analysis 27834-27851, Created at Least by Dec. 1999, pp. 18.
Correcting Cite # 2847 of IDS 9A, NetGravity, Analysis of CMGI (Accipiter) 27852-27874, Jan. 19, 2000, pp. 23.
Correcting Cite # 2848 of IDS 9A, NetGravity, 30 second kills / Questions to ask your Accipter sales rep 27875-27876, Jan. 19, 2000, pp. 2.
Correcting Cite # 2849 of IDS 9A, NetGravity, AdForce 27877-27886, Jan. 19, 2000, pp. 10.
Correcting Cite # 2850 of IDS 9A, NetGravity, 30 second kills / Questions to ask your AdForce sales rep 27887-27888, Jan. 19, 2000, pp. 2.
Correcting Cite # 2851 of IDS 9A, NetGravity, AdJuggler 27889-27890, Jan. 19, 2000, pp. 2.
Correcting Cite # 2852 of IDS 9A, NetGravity, AdKnowledge 27891-27901, Jan. 19, 2000, pp. 11.
Correcting Cite # 2853 of IDS 9A, NetGravity, ATG Dynamo Ad Station Competitive Brief 27902-27903, Jan. 19, 2000, pp. 2.

Correcting Cite # 2854 of IDS 9A, NetGravity, BroadVision Competitive Overview 27904-27906, Jan. 19, 2000, pp. 3.
Correcting Cite # 2855 of IDS 9A, NetGravity, DoubleClick 27907-27928, Jan. 19, 2000, pp. 22.
Correcting Cite # 2856 of IDS 9A, NetGravity, 30 second kills / Questions to ask your DoubleClick sales rep 27929-27932, Jan. 19, 2000, pp. 4.
Correcting Cite # 2857 of IDS 9A, NetGravity, MatchLogic 27933-27939, Jan. 19, 2000, pp. 7.
Correcting Cite # 2858 of IDS 9A, NetGravity, 30 second kills / Questions to ask your MatchLogic sales rep 27940—Jan. 19, 2000, pp. 1.
Correcting Cite # 2859 of IDS 9A, NetGravity, Microsoft 27941-27946, Jan. 19, 2000, pp. 6.
Correcting Cite # 2860 of IDS 9A, NetGravity, 30 second kills / Questions to ask your Microsoft sales rep 27947—Jan. 19, 2000, pp. 1.
Correcting Cite # 2861 of IDS 9A, NetGravity, Analysis of Real Media 27948-27959, Jan. 19, 2000, pp. 12.
Correcting Cite # 2862 of IDS 9A, NetGravity, 30 second kills / Questions to ask your Real Media sales rep 27960-27963, Jan. 19, 2000, pp. 4.
Correcting Cite # 2863 of IDS 9A, NetGravity, Soliant Competitive Overview 27964-27966, Jan. 19, 2000, pp. 3.
Correcting Cite # 2864 of IDS 9A, NetGravity, Thinking Media 27967-27968, Jan. 19, 2000, pp. 2.
Correcting Cite # 2865 of IDS 9A, NetGravity, Analysis of 24/7 Media, Inc. 27969-27972, Created at Least by Dec. 1999, pp. 4.
Correcting Cite # 2866 of IDS 9A, NetGravity, Key Strengths Key Weaknesses 27973-27974, Jan. 19, 2000, pp. 2.
Correcting Cite # 2867 of IDS 9A, NetGravity, W3 Competitive Overview 27975—Jan. 19, 2000, pp. 1.
Correcting Cite # 2868 of IDS 9A, W3 Competitive Overview 27976—Jan. 19, 2000, pp. 1.
Correcting Cite # 2869 of IDS 9A, DoubleClick, Confidential Business Plan DoubleClick, Inc. 27977-27998, Created at Least by Dec. 1999, pp. 22.
Correcting Cite # 2873 of IDS 9A, Sabela, Sabela Independent Ad Serving, Tracking & Analysis 28305-28320, Dec. 1999, pp. 16.
Correcting Cite # 2874 of IDS 9A, Sabela, Sabela Independent Ad Serving, Tracking & Analysis 28321-28337, Dec. 1999, pp. 17.
Correcting Cite # 2877 of IDS 9A, DoubleClick, Overview 28340-28347, Created at Least by Dec. 1999, pp. 8.
Correcting Cite # 2878 of IDS 9A, DoubleClick, DoubleClick Case Study 28348-28349, Created at Least by Dec. 1999, pp. 2.
Correcting Cite # 2882 of IDS 9A, DoubleClick, DoubleClick's Ad List 28359—Created at Least by Dec. 1999, pp. 1.
Correcting Cite # 2884 of IDS 9A, DoubleClick, a premiere collection 28358-28386, Oct. 31, 1996, pp. 29.
Correcting Cite # 2885 of IDS 9A, DoubleClick, TestIt! 28388-28389, Created at Least by Dec. 1999, pp. 2.
Correcting Cite # 2886 of IDS 9A, DoubleClick, Tips & terms for successful web advertising 28390-28391, Created at Least by Dec. 1999, pp. 2.
Correcting Cite # 2889 of IDS 9A, DoubleClick, Advertising Report 28396-28408, Dec. 1996, pp. 13.
Correcting Cite # 2891 of IDS 9A, Sponsorship Programs 28411-28412, Created at Least by Dec. 1999, pp. 2.
Correcting Cite # 2892 of IDS 9A, DoubleClick's CPTM 28413-28414, Created at Least by Dec. 1999, pp. 2.
Correcting Cite # 2895 of IDS 9A, DoubleClick, TestIt! 28417-28418, Created at Least by Dec. 1999, pp. 2.
Correcting Cite # 2896 of IDS 9A, DoubleClick, An Overview of DoubleClick and the DoubleClick Network 28419—Created at Least by Dec. 1999, pp. 1.
Correcting Cite # 2897 of IDS 9A, DoubleClick, Target Selection Criteria 28420-28421, Created at Least by Dec. 1999, pp. 2.
Correcting Cite # 2898 of IDS 9A, DoubleClick, How does DoubleClick make Web Advertising even more effective? 28422-28423, Created at Least by Dec. 1999, pp. 2.
Correcting Cite # 2899 of IDS 9A, DoubleClick, Questions 28424-28425, Created at Least by Dec. 1999, pp. 2.
Correcting Cite # 2902 of IDS 9A, DoubleClick, Banners in Image Series 28447-28449, Dec. 1998, pp. 3.
Correcting Cite # 2903 of IDS 9A, DoubleClick, Premium collection of sites 28451-28452, Aug. 12, 1997, pp. 2.
Correcting Cite # 2904 of IDS 9A, DoubleClick, 12 Tips to Successful Web Advertising 28453-28454, Created at Least by Dec. 1999, pp. 2.
Correcting Cite # 2909 of IDS 9A, DoubleClick, DoubleClick Network 28472-28474, Sep. 13, 1996, pp. 3.
Correcting Cite # 2910 of IDS 9A, DoubleClick, Closed-Loop Marketing Solutions 28476-28508, Dec. 1998, pp. 33.
Correcting Cite # 2911 of IDS 9A, Stephen E Recht, NetGravity 28509-28535, Dec. 1999, pp. 27.
Correcting Cite # 2912 of IDS 9A, NetGravity, NetGravity, Inc. 1998 Annual Report and Form 10-K 28536-28625, Dec. 1998, pp. 90.
Correcting Cite # 2915 of IDS 9A, NetGravity, NetGravity 3,000,000 Shares Common Stock 28860-28960, Jun. 11, 1998, pp. 101.
Correcting Cite # 2917 of IDS 9A, NetGravity / Competitive—Q1 1998 28962-28963, Dec. 1998, pp. 2.
Correcting Cite # 2918 of IDS 9A, NetGravity / Competitive—Q2 1998, 28964-28965, Dec. 1998, pp. 2.
Correcting Cite # 2925 of IDS 9A, Jupiter Strategic Planning Services, Ad Management Tools Overview 29020-29021, Dec. 1998, pp. 2.
Correcting Cite # 2926 of IDS 9A, NetGravity, NetGravity Mail List Archive—a_compinfo Message 282 29022-29025, Jan. 27, 1998, pp. 4.
Correcting Cite # 2927 of IDS 9A, NetGravity, NetGravity Mail List Archive—a_compinfo Message 312 29026—May 25, 1999, pp. 1.
Correcting Cite # 2928 of IDS 9A, NetGravity, NetGravity Mail List Archive—a_compinfo Message 313 29027—May 25, 1999, pp. 1.
Correcting Cite # 2929 of IDS 9A, NetGravity, NetGravity Mail List Archive—a_compinfo Message 319 29028—Jun. 8, 1999, pp. 1.
Correcting Cite # 2930 of IDS 9A, NetGravity, DoubleClick Dart Competitive Analysis 29029—Dec. 1997, pp. 1.
Correcting Cite # 2931 of IDS 9A, DoubleClick Key Strengths NetGravity Counter 29030-29041, Jan. 11, 2000, pp. 12.
Correcting Cite # 2932 of IDS 9A, AdCenter Competitive Analysis 29042-29047, Jan. 11, 2000, pp. 6.
Correcting Cite # 2933 of IDS 9A, NetGravity, Product Marketing Brief: positioning on Engage's Data 29048-29051, Jan. 11, 2000, pp. 4.
Correcting Cite # 2959 of IDS 9A, DoubleClick, Online Advertising Challenges 29084—Created at Least by Dec. 1999, pp. 1.
Correcting Cite # 2961 of IDS 9A, DoubleClick, How Closed-Loop Marketing Works 29086—Created at Least by Dec. 1999, pp. 1.
Correcting Cite # 2963 of IDS 9A, DoubleClick, DART Returns Control to the Advertiser 29088—Created at Least by Dec. 1999, pp. 1.
Correcting Cite # 2964 of IDS 9A, DoubleClick, Run the Entire Campaign from your Computer 29089—Created at Least by Dec. 1999, pp. 1.
Correcting Cite # 2965 of IDS 9A, DoubleClick, how it Works . . . 29090—Created at Least by Dec. 1999, pp. 1.
Correcting Cite # 2967 of IDS 9A, DoubleClick, Improved Metrics for Managing Campaigns 29092—Created at Least by Dec. 1999, pp. 1.
Correcting Cite # 2971 of IDS 9A, DoubleClick, DataBank—Knowledge Discovery 29096—Created at Least by Dec. 1999, pp. 1.
Correcting Cite # 2972 of IDS 9A, DoubleClick, Closed-Loop Marketing Solutions 29097—Created at Least by Dec. 1999, pp. 1.
Correcting Cite # 2974 of IDS 9A, DoubleClick, Boomerang—Bring Your Customers Back 29099—Created at Least by Dec. 1999, pp. 1.
Correcting Cite # 2975 of IDS 9A, DoubleClick, How it Works . . . 29100—Created at Least by Dec. 1999, pp. 1.
Correcting Cite # 2976 of IDS 9A, DoubleClick, Powerful Targeting Opportunities 29101—Created at Least by Dec. 1999, pp. 1.
Correcting Cite # 2977 of IDS 9A, DoubleClick, Easy and Efficiency 29102—Created at Least by Dec. 1999, pp. 1.
Correcting Cite # 2981 of IDS 9A, DoubleClick, Reseller Channel Model 29107—Created at Least by Dec. 1999, pp. 1.
Correcting Cite # 2982 of IDS 9A, DoubleClick, US West Dex signed and running . . . 29108—Created at Least by Dec. 1999, pp. 1.

Correcting Cite # 2983 of IDS 9A, DoubleClick, . . . And Others on the Way 29109—Created at Least by Dec. 1999, pp. 1.
Correcting Cite # 2984 of IDS 9A, DoubleClick, Competitive Issues 29110—Created at Least by Dec. 1999, pp. 1.
Correcting Cite # 2985 of IDS 9A, DoubleClick, Competitive Issues (continued) 29111—Created at Least by Dec. 1999, pp. 1.
Correcting Cite # 2986 of IDS 9A, DoubleClick, Inventory Issues 29112—Created at Least by Dec. 1999, pp. 1.
Correcting Cite # 2989 of IDS 9A, DoubleClick, Engineering Accomplishements 29115—Created at Least by Dec. 1999, pp. 1.
Correcting Cite # 2991 of IDS 9A, DoubleClick, Engineering Outlook 29117—Dec. 1998, pp. 1.
Correcting Cite # 2993 of IDS 9A, DoubleClick, Q3 Goals 29119—Created at Least by Dec. 1999, pp. 1.
Correcting Cite # 2995 of IDS 9A, Acquisition Strategy: Companies Approached 29121—Created at Least by Dec. 1999, pp. 1.
Correcting Cite # 2999 of IDS 9A, DoubleClick, What is Hyper Space 29125-29133, Created at Least by Dec. 1999, pp. 9.
Correcting Cite # 3002 of IDS 9A, Hyper Net, Inc, Hypers Systems—Interactive Direct Marketing System 29153-29177, Apr. 20, 1996, pp. 25.
Correcting Cite # 3004 of IDS 9A, Hyper Net, Inc, Hyper System Media Coverage 29179-29211, Jun. 1996, pp. 33.
Correcting Cite # 3005 of IDS 9A, Forrester Report, Adserving and Measurement 29212-29228, May 1997, pp. 17.
Correcting Cite # 2977 of IDS 9A, DoubleClick Technology 29229-29240, Dec. 1998, pp. 12.
Correcting Cite # 3007 of IDS 9A, DoubleClick, DART 29241-29255, Dec. 1997, pp. 15.
Correcting Cite # 3009 of IDS 9A, FocaLink Media Services, FocaLink Services 29257-29258, Dec. 1996, pp. 2.
Correcting Cite # 3012 of IDS 9A, FocaLink Communications, FocaLink Communications Overview 29261—Created at Least by Dec. 1999, pp. 1.
Correcting Cite # 3013 of IDS 9A, FocaLink Communications, FocaLink Communications SmartBanner Overview for Web Sites 29262, Created at Least by Dec. 1999, pp. 1.
Correcting Cite # 3014 of IDS 9A, FocaLink Communications, FocaLink Communications Advertiser Package 29263—Created at Least by Dec. 1999, pp. 1.
Correcting Cite # 3015 of IDS 9A, FocaLink Communications, FocaLink Communications Web Site Package 29264—Created at Least by Dec. 1999, pp. 1.
Correcting Cite # 3016 of IDS 9A, FocaLink Communications, FocaLink Communications SmartBanner Overview for Advertisers 29265, Created at Least by Dec. 1999, pp. 1.
Correcting Cite # 3017 of IDS 9A, FocaLink Communications, SmartBanner Technical Drawing 29266—Created at Least by Dec. 1999, pp. 1.
Correcting Cite # 3018 of IDS 9A, FocaLink Communications, FocaLink Communications Sample Report 29267—Created at Least by Dec. 1999, pp. 1.
Correcting Cite # 3021 of IDS 9A, FocaLink Communications, Advertising Performance Report for (Advertiser) Top 20 Level Domains, Ranked by Click Rate 29270—Created at Least by Dec. 1999, pp. 1.
Correcting Cite # 3022 of IDS 9A, FocaLink Communications, Advertising Performance Report for (Advertiser) Top 20 Domains, Ranked by Pageviews 29271—Created at Least by Dec. 1999, pp. 1.
Correcting Cite # 3023 of IDS 9A, FocaLink Communications, Advertising Performance Report for (Advertiser) Top Domains, Ranked by Click Rate 29272—Created at Least by Dec. 1999, pp. 1.
Correcting Cite # 3024 of IDS 9A, FocaLink Communications, Advertising Performance Report for (Advertiser) 29273—Created at Least by Dec. 1999, pp. 1.
Correcting Cite # 3025 of IDS 9A, FocaLink Communications, Advertising Performance Report for (Advertiser) 29274—Jan. 1996, pp. 1.
Correcting Cite # 3026of IDS 9A, FocaLink Communications, Advertising Performance Report for (Advertiser) 29275—Created at Least by Dec. 1999, pp. 1.

Correcting Cite # 3027 of IDS 9A, FocaLink Communications, FocaLink Communications FAQ 29276—Created at Least by Dec. 1999, pp. 1.
Correcting Cite # 3028 of IDS 9A, FocaLink Communications, FocaLink Communications FAQ 29279—Created at Least by Dec. 1999, pp. 1.
Correcting Cite # 3029 of IDS 9A, FocaLink Communications, FocaLink Communications Web Site Rated 29280—Created at Least by Dec. 1999, pp. 1.
Correcting Cite # 3030 of IDS 9A, FocaLink Communications, FocaLink Communications Advertiser Rated 29281—Created at Least by Dec. 1999, pp. 1.
Correcting Cite # 3031 of IDS 9A, FocaLink Communications, FocaLink Communications Client List 29282—Created at Least by Dec. 1999, pp. 1.
Correcting Cite # 3032 of IDS 9A, FocaLink Communications, FocaLink Communications Welcome to FocaLink 29283-29305, Dec. 1996, pp. 23.
Correcting Cite # 3033 of IDS 9A, Internet Advertising Network, How to Advertise in the Internet without Hitting Everyone's Target but Yours. 29306-29313, Created at Least by Dec. 1999, pp. 8.
Correcting Cite # 3034 of IDS 9A, FocaLink Communications, FocaLink Communications Welcome to FocaLink 29314-29337, Mar. 14, 1996, pp. 24.
Correcting Cite # 3035 of IDS 9A, Debra Aho Williamson, Advertising Age—Web Ads mark 2nd birthday with decisive issues ahead 29338-29348, Dec. 1996, pp. 11.
Correcting Cite # 3036 of IDS 9A, Randall Rothenberg, Advertising Age The Advertising Century 29349-29363, Jan. 12, 2000, pp. 15.
Correcting Cite # 3038 of IDS 9A, Increase in Ad Spending Predicted 29369-29370, Mar. 25, 1999, pp. 2.
Correcting Cite # 3039 of IDS 9A, Cyber Atlas internet Economy Looking Good 29371-29372, Jun. 10, 1999, pp. 2.
Correcting Cite # 3040 of IDS 9A, Adrienne W. Fawcett, Advertising Age Publishers thankful but nervous about boom 29373-29378, Nov. 1999, pp. 6.
Correcting Cite # 3044 of IDS 9A, Jeff Epstein, DoubleClick EVP 29585-29673, Dec. 1999, pp. 89.
Correcting Cite # 3045 of IDS 9A, Kevin O'Connor, DoubleClick Investor Day 29674-29873, Dec. 1999, pp. 200.
Correcting Cite # 3046 of IDS 9A, AdForce, How AdForce Works 29874-29876, Sep. 13, 1999, pp. 3.
Correcting Cite # 3047 of IDS 9A, AdForce, Getting Started 29877-29878, Sep. 13, 1999, pp. 2.
Correcting Cite # 3048 of IDS 9A, AdForce, Our Date Center 29879-29880, Sep. 13, 1999, pp. 2.
Correcting Cite # 3049 of IDS 9A, AdForce, How It Works 29881-29882, Sep. 13, 1999, pp. 2.
Correcting Cite # 3051 of IDS 9A, Wired News, No Title 29884—Sep. 14, 1999, pp. 1.
Correcting Cite # 3052 of IDS 9A, Wired News, No Title 29885—Sep. 14, 1999, pp. 1.
Correcting Cite # 3053 of IDS 9A, Switchboard, Switchboard.Corporate Background History of Switchboard 29886-29887, Sep. 14, 1999, pp. 2.
Correcting Cite # 3054 of IDS 9A, DoubleClick, Target List by Category 29888-29917, Sep. 30, 1999, pp. 30.
Correcting Cite # 3055 of IDS 9A, Closed Loop Marketing—Competitive analysis 29918-29919, Sep. 29, 1999, pp. 2.
Correcting Cite # 3056 of IDS 9A, Avenue A FAQ 29920-29924, Sep. 29, 1999, pp. 5.
Correcting Cite # 3057 of IDS 9A, Virtual SpinBox FAQ 29925—Dec. 1998, pp. 1.
Correcting Cite # 3058 of IDS 9A, Flycast Network Competitive Overview 29926-29946, Jul. 1998, pp. 21.
Correcting Cite # 3059 of IDS 9A, Sabela Media Executive Summary 29947-29950, Aug. 1999, pp. 4.
Correcting Cite # 3060 of IDS 9A, *Feature Comparison DoubleClick DART* vs *NetGravity* 29951-29952, Created at Least by Dec. 1999, pp. 2.
Correcting Cite # 3061 of IDS 9A, Accipiter Company Overview 29953-29956, Created at Least by Dec. 1999, pp. 4.

Correcting Cite # 3062 of IDS 9A, Closed Loop Marketing AdKnowledge Company Overview 29957-29958, Dec. 1999, pp. 2.
Correcting Cite # 3063 of IDS 9A, Closed Loop Marketing Avenue A Company Overview 29959-29960, Dec. 1999, pp. 2.
Correcting Cite # 3064 of IDS 9A, Closed Loop Marketing AdForce Company Overview 29961-29962, Dec. 1999, pp. 2.
Correcting Cite # 3065 of IDS 9A, Closed Loop Marketing Accipiter Company Overview 29963-29964, Dec. 1999, pp. 2.
Correcting Cite # 3066 of IDS 9A, AdForce Executive Summary 29965-29971, Aug. 1999, pp. 7.
Correcting Cite # 3067 of IDS 9A, Real Media Executive Summary 29972-29976, Aug. 1999, pp. 5.
Correcting Cite # 3070 of IDS 9A, NetGravity AdServer 2.0 30038-30041, Created at Least by Dec. 1999, pp. 4.
Correcting Cite # 3072 of IDS 9A, NetGravity Corporate Presentation Sep. 1996 30049-30064, Sep. 1996, pp. 16.
Correcting Cite # 3073 of IDS 9A, NetGravity the Force Behind Online Marketing 30065-30090, Created at Least by Dec. 1999, pp. 26.
Correcting Cite # 3074 of IDS 9A, Jim Sterne, What makes people click Advertising on the Web 49184-49643, Dec. 1997, pp. 460.
Correcting Cite # 3075 of IDS 9A, ClickOver About Us 49644—Created at Least by Dec. 1999, pp. 1.
Correcting Cite # 3078 of IDS 9A, ClickOver, Inc, ClickOver Company Background 49648-49649, May 1996, pp. 2.
Correcting Cite # 3081 of IDS 9A, ClickOver, Inc., ClickOver Team 49652—Created at Least by Dec. 1999, pp. 1.
Correcting Cite # 3084 of IDS 9A, ClickOver, Inc., ClickOver Company Fact Sheet 49657-49659, Created at Least by Dec. 1999, pp. 3.
Correcting Cite # 3085 of IDS 9A, ClickOver, Inc., ClickOver Contract Information 49660—Created at Least by Dec. 1999, pp. 1.
Correcting Cite # 3087 of IDS 9A, ClickOver, Inc., ClickOver Copyright 49663—Dec. 1997, pp. 1.
Correcting Cite # 3091 of IDS 9A, ClickOver, Inc., ClickWise Intelligent Ad Management Made Easy 49667—Created at Least by Dec. 1999, pp. 1.
Correcting Cite # 3092 of IDS 9A, ClickOver, Inc., ClickWise Maximum Scalability 49668-49669, Created at Least by Dec. 1999, pp. 2.
Correcting Cite # 3094 of IDS 9A, ClickOver, Inc., ClickWise The Difference 49671-49672, Created at Least by Dec. 1999, pp. 2.
Correcting Cite # 3098 of IDS 9A, ClickOver, Inc., ClickWise Endorsements 49677-49678, Created at Least by Dec. 1999, pp. 2.
Correcting Cite # 3100 of IDS 9A, ClickOver, Inc., ClickWise FAQ 49681-49686, Created at Least by Dec. 1999, pp. 6.
Correcting Cite # 3102 of IDS 9A, ClickOver, Inc, ClickWise Flexibility 49688-49689, Created at Least by Dec. 1999, pp. 2.
Correcting Cite # 3103 of IDS 9A, ClickOver, Inc, ClickWise Features and Benefits 49690—Created at Least by Dec. 1999, pp. 1.
Correcting Cite # 3106 of IDS 9A, ClickOver, Inc, ClickWise Features and Benefits 49693—Created at Least by Dec. 1999, pp. 1.
Correcting Cite # 3107 of IDS 9A, ClickOver, Inc, ClickWise Delivering on the Promise of Electronic Advertising 49694—Created at Least by Dec. 1999, pp. 1.
Correcting Cite # 3125 of IDS 9A, No Title 49717—Created at Least by Dec. 1999, pp. 1.
Correcting Cite # 3127 of IDS 9A, No Title—Diagram 49721—Created at Least by Dec. 1999, pp. 1.
Correcting Cite # 3128 of IDS 9A, No Title—Diagram 49723—Created at Least by Dec. 1999, pp. 1.
Correcting Cite # 3129 of Ids 9A.ClickOver Delivering on the Promise of Electronic Advertising 49724—Created At LeasT by Dec. 1999, pp. 1.
Correcting Cite # 3131 of IDS 9A, ClickOver, Inc., ClickWise Features and Benefits 49726—Created at Least by Dec. 1999, pp. 1.
Correcting Cite # 3132 of IDS 9A, ClickOver, Inc., ClickWise Features and Benefits 49727—Created at Least by Dec. 1999, pp. 1.
Correcting Cite # 3133 of IDS 9A, ClickOver, Inc., ClickWise Overview 49728-49729, Created at Least by Dec. 1999, pp. 2.
Correcting Cite # 3134 of IDS 9A, ClickOver Jobs 49730-49732, Created at Least by Dec. 1999, pp. 3.
Correcting Cite # 3135 of IDS 9A, ClickOver, Inc., Kleiner Perkins Caufield and Byers Invests in ClickOver, Inc. 49733-49734, Feb. 24, 1997, pp. 2.

Correcting Cite # 3137 of IDS 9A, ClickOver, Inc., ClickOver, Inc. Introduces ClickWise 49736-49738, Created at Least by Dec. 1999, pp. 3.
Correcting Cite # 3138 of IDS 9A, ClickOver, Inc., Electronic Advertising Market Overview 49740-49744, Created at Least by Dec. 1999, pp. 5.
Correcting Cite # 3148 of IDS 9A, ClickOver, Inc., ClickOver Partner 49755-49757, Created at Least by Dec. 1999, pp. 3.
Correcting Cite # 3149 of IDS 9A, ClickOver, Inc., ClickOver Press Center 49759—Created at Least by Dec. 1999, pp. 1.
Correcting Cite # 3155 of IDS 9A, ClickOver, Inc., ClickWise Product Fact Sheet 49765-49767, Created at Least by Dec. 1999, pp. 3.
Correcting Cite # 3156 of IDS 9A, ClickOver, Inc., ClickWise Products 49768—Created at Least by Dec. 1999, pp. 1.
Correcting Cite # 3159 of IDS 9A, ClickOver, Inc., ClickWise Reviewer's Guide 49772-49784, Dec. 1997, pp. 13.
Correcting Cite # 3161 of IDS 9A, ClickOver, Inc., ClickWise Features and Benefits 49786—Created at Least by Dec. 1999, pp. 1.
Correcting Cite # 3168 of IDS 9A, ClickOver, Inc., ClickWise System Requirements 49797—Created at Least by Dec. 1999, pp. 1.
Correcting Cite # 3187 of IDS 9A, Click Wise Features and Benefits 49818-49819, Created at Least by Dec. 1999, pp. 2.
Correcting Cite # 3189 of IDS 9A, ClickOver, Inc., ClickWise Why 49822-49823, Created at Least by Dec. 1999, pp. 2.
Correcting Cite # 3193 of IDS 9A, Requirements for NetGravity "MarketPlace" 49827-49833, Created at Least by Dec. 1999, pp. 7.
Correcting Cite # 3194 of IDS 9A, Jim Sterne, World Wide Marketing Integrating the Web into Your Marketing Strategy 2nd Edition 49834-50241, Dec. 1999, pp. 408.
Correcting Cite # 3195 of IDS 9A, Jim Sterne, World Wide Marketing Integrating the Web into Your Marketing Strategy 3rd Edition 50242-50666, Dec. 2001, pp. 425.
Correcting Cite # 3196 of IDS 9A, No Title 3512-3587, Dec. 1998, pp. 76.
Correcting Cite # 3198 of IDS 9A, No Title 3690-3714, Dec. 1998, pp. 25.
Correcting Cite # 3199 of IDS 9A, Reports 3715-3738, Dec. 1998, pp. 24.
Correcting Cite # 3200 of IDS 9A, Reports 3739-3762, Dec. 1998, pp. 24.
Correcting Cite # 3202 of IDS 9A, No Title 3809-3813, Feb. 1999, pp. 5.
Correcting Cite # 3203 of IDS 9A, Local Resellers Guide 3814-3817, Feb. 1999, pp. 4.
Correcting Cite # 3204 of IDS 9A, Local Reseller Manual 3818-3843, Feb. 1999, pp. 26.
Correcting Cite # 3205 of IDS 9A, Managing Inventory 3844-3850, Dec. 1999, pp. 7.
Correcting Cite # 3216 of IDS 9A, No Title 4016-4701, Dec. 1999, pp. 686.
Correcting Cite # 3217 of IDS 9A, Join 24/7 Media, Inc. 5293-5294, Dec. 1999, pp. 2.
Correcting Cite # 3218 of IDS 9A, 24/7 Media, Inc., 24/7 Connect Due for Release First Quarter 2000 5295—Dec. 1999, pp. 1.
Correcting Cite # 3219 of IDS 9A, Aaddzz, Best Way to Buy and Sell Web Advertising 5296-5301, Dec. 1997, pp. 6.
Correcting Cite # 3221 of IDS 9A, Aaddzz, The Maximum Performance Ad Network 5311-5312, Jan. 30, 1998, pp. 2.
Correcting Cite # 3219 of IDS 9A, Aaddzz, Introduction to Aaddzz 5313-5314, Jan. 30, 1998, pp. 2.
Correcting Cite # 3223 of IDS 9A, Aaddzz, Publishers 5315-5316, Jan. 30, 1998, pp. 2.
Correcting Cite # 3224 of IDS 9A, Aaddzz, Advertisers 5317-5320, Jan. 30, 1998, pp. 4.
Correcting Cite # 3225 of IDS 9A, Aaddzz, Ads, Spaces, & Places 5321-5322, Jan. 30, 1998, pp. 2.
Correcting Cite # 3226 of IDS 9A, Aaddzz, Real Time Reporting and Statements 5323-5324, Jan. 30, 1998, pp. 2.
Correcting Cite # 3227 of IDS 9A, Aaddzz, Buying Ad Space with Aaddxx 5325-5329, Jan. 30, 1998, pp. 5.
Correcting Cite # 3228 of IDS 9A, Aaddzz, Selling Ad space with Aaddzz 5330-5334, Jan. 30, 1998, pp. 5.

Correcting Cite # 3229 of IDS 9A, Aaddzz, Fee and Payments 5335-5337, Jan. 30, 1998, pp. 3.
Correcting Cite # 3230 of IDS 9A, Aaddzz, Ratings 5338-5340, Jan. 30, 1998, pp. 3.
Correcting Cite # 3231 of IDS 9A, Aaddzz, Ad Sizes 5341-5342, Jan. 30, 1998, pp. 2.
Correcting Cite # 3232 of IDS 9A, Aaddzz, Aaddzz Free Access Reports 5343-5344, Jan. 30, 1998, pp. 2.
Correcting Cite # 3233 of IDS 9A, Aaddzz, Advanced Topics 5345-5348, Jan. 30, 1998, pp. 4.
Correcting Cite # 3234 of IDS 9A, Aaddzz, Frequently Asked Questions 5349-5352, Jan. 30, 1998, pp. 4.
Correcting Cite # 3240 of IDS 9A, Accipiter, Inc, Accipiter AdManager 2.0 Features and Benefits 5365-5369, Feb. 1, 1998, pp. 5.
Correcting Cite # 3241 of IDS 9A, Accipiter, Inc, AdManager 2.0 Screen Shots 5370-5372, Feb. 1, 1998, pp. 3.
Correcting Cite # 3242 of IDS 9A, Accipiter, Inc, Frequently Asked Questions 5373-5374, Feb. 1, 1998, pp. 2.
Correcting Cite # 3240 of IDS 9A, Accipiter, Inc, AdManager Product Overview 5375-5377, Feb. 1, 1998, pp. 3.
Correcting Cite # 3244 of IDS 9A, Advertisement Administration 5378—Created at Least by Dec. 1999, pp. 1.
Correcting Cite # 3245 of IDS 9A, Accipiter AdManager 5379—Dec. 1997, pp. 1.
Correcting Cite # 3246 of IDS 9A, Engage Technologies, Frequently Asked Questions 5380-5381, Feb. 3, 1999, pp. 2.
Correcting Cite # 3247 of IDS 9A, Engage Technologies, Accipiter AdBureau 5382—Feb. 4, 1999, pp. 1.
Correcting Cite # 3248 of IDS 9A, Engage Technologies, Precision Profiling Options 5383—Feb. 4, 1999, pp. 1.
Correcting Cite # 3249 of IDS 9A, Engage Technologies, Frequently Asked Questions 5384-5386, Feb. 8, 1999, pp. 3.
Correcting Cite # 3250 of IDS 9A, Engage Technologies, What's new in version 4.0 5387-5389, Feb. 9, 1999, pp. 3.
Correcting Cite # 3251 of IDS 9A, Engage Technologies, Precision Profiling Options 5390—Dec. 6, 1998, pp. 1.
Correcting Cite # 3252 of IDS 9A, Engage Technologies, Questions and Answers about using Accipiter AdManage with Engage Precision Profiles 5391-5393, Feb. 9, 1999, pp. 3.
Correcting Cite # 3255 of IDS 9A, New Products 5400-5403, Feb. 1998, pp. 4.
Correcting Cite # 3257 of IDS 9A, AdForce, AdForce Privacy Practices 5407-5411, Jun. 30, 1998, pp. 5.
Correcting Cite # 3259 of IDS 9A, AdForce, Inc., Adforce One—Advertiser Benefits 5415—May 8, 1999, pp. 1.
Correcting Cite # 3260 of IDS 9A, AdForce, Inc., Adforce One—Charter Members 5416—Oct. 10, 1999, pp. 1.
Correcting Cite # 3263 of IDS 9A, AdForce—Comsumers and Partners 5428-5429, Mar. 27, 2000, pp. 2.
Correcting Cite # 3264 of IDS 9A, AdForce, AdForce—User Guide 5430-5714, Dec. 1998, pp. 285.
Correcting Cite # 3267 of IDS 9A, AdForce Advertiser Report 5722—Jan. 18, 1999, pp. 1.
Correcting Cite # 3271 of IDS 9A, AdForce, Passing and Using Multiple Parameters in AdForce Tags 5741-5748, Nov. 20, 1998, pp. 8.
Correcting Cite # 3273 of IDS 9A, Cookie 5750-5751, Created at Least by Dec. 1999, pp. 2.
Correcting Cite # 3275 of IDS 9A, No Title 5753—Created at Least by Dec. 1999, pp. 1.
Correcting Cite # 3282 of IDS 9A, Add A New Web Site—Web Site ID 5761—Created at Least by Dec. 1999, pp. 1.
Correcting Cite # 3287 of IDS 9A, Agency Campaign—Campaign: Agency 1 Status=Active 5769—Jul. 1998, pp. 1.
Michael F. Heim, Petition Under 37 C.F.R. 1.183 and 37 C.F.R. 1.304(a)(3)(i) for Suspension of the Requirements of 37 C.F.R. 1.304(a)(1), Mar. 9, 2012, pp. 7.
Cynthia L. Nessler, Transmittal of Communication to Third Party Requester Inter Partes Reexamination, Decision Denying Petition to Terminate, Mar. 13, 2012, pp. 5.
Michael F, Heim, Notice of Appeal to the Federal Circuit, Mar. 24, 2012, pp. 3.
Notice Forwarding Certified List—U.S. Appl. No. 95/001,073, May 3, 2012, pp. 5.
U.S. Court of Appeals for the Federal Circuit, Notice of Docketing 12-1381, May 11, 2012, p. 3.
Michael F. Heim, Appeal Docketing Notice for 025, Jul. 8, 2011, pp. 2.
Michael F. Heim, Notice of Appeal—059, Mar. 24, 2012, pp. 3.
Notice Forwarding Certified List—U.S. Appl. No. 95/001,069, May 3, 2012, pp. 5.
Notice of Docketing—U.S. Appl. No. 95/001,069, May 11, 2012, pp. 3.
Michael F. Heim, Appeal Docketing Notice for 059, Jul. 13, 2011, pp. 2.
Michael F. Heim, Notice of Court Judgment in Concurrent Proceedings Under 37 CFR 1.985 for 059, Sep. 15, 2011, pp. 3.
Brief of Appellee Google, Inc., *Function Media L.L.C., v. David J. Kappos, Director, United States Patent and Trademark Office, and Google, Inc.*, Document 33, Appeal 2012-1380, U.S. Appl. No. 95/001,069; United States Patent 6,446,045, dated Sep. 24, 2012, 47 pages.
Brief of Appellee Director of the United States Patent and Trademark Office; *Function Media, L.L.C. v. David J. Kappos, Director, United States Patent and Trademark Office and Google, Inc.*, Document 32, Appeal 2012-1380, U.S. Appl. No. 95/001,069; United States Patent 6,446,045, dated Sep. 24, 2012, 56 pages.
Brief of Appellee Director of the United States Patent and Trademark Office; *Function Media, L.L.C. v. David J. Kappos, Director, United States Patent and Trademark Office and Google, Inc.*, Appeal 2012-1380, U.S. Appl. No. 95/001,069; United States Patent 6,446,045 B1, dated Sep. 24, 2012, 56 pages.
Brief of Appellee Google, Inc., *Function Media L.L.C., v. David J. Kappos, Director, United States Patent and Trademark Office, and Google, Inc.*, Appeal 2012-1380, U.S. Appl. No. 95/001,069; United States Patent 6,446,045 dated Sep. 24, 2012, 48 pages.
Office Action dated Jun. 25, 2010, 319 pages, U.S. App. No. 11/803,659, filed May 15, 2007.
Michael F. Heim, Notice of Appeal—587, Mar. 24, 2012, pp. 3.
Notice Forwarding Certified List—U.S. Appl. No. 95/001,068, May 3, 2012, pp. 5.
Notice of Docketing—U.S. Appl. No. 95/001,068, May 10, 2012, pp. 3.
Jeffrey L. Gellner, Inter Parties Reexamination Examiner's Answer for 587, Jul. 15, 2011, pp. 3.
Michael F. Heim, Appeal Docketing Notice for 587, Sep. 15, 2011, pp. 2.
Brief of Appellee Director of the United States Patent and Trademark Office; *Function Media, L.L.C. v. David J. Kappos, Director, United States Patent and Trademark Office and Google, Inc.*, Appeal 2012-1381 U.S. Appl. No. 95/001,073; United States Patent 7,240,025, dated Sep. 24, 2012, 48 pages.
Brief of Appellee Google, Inc., *Function Media L.L.C., v. David J. Kappos, Director, United States Patent and Trademark Office, and Google, Inc.*, Appeal 2012-1381, U.S. Appl. No. 95/001,073; United States Patent 7,240,025, dated Sep. 24, 2012, 48 pages.
Max L. Tribble, Jr., Brief of Plaintiff—Appellant Function Media LLC, Dec. 12, 2011, pp. 366.
Charles K. Verhoeven, Brief of Defendant—Appellee Google, Inc. Oct. 24, 2011, pp. 79.
Max L. Tribble, Jr., Reply Brief of Plaintiff—Appellant Function Media LLC, Mar. 12, 2012, pp. 36.
Non-Confidential Joint Appendix vol. 1 of 2—pp. A1 to A1666, Apr. 2, 2012, pp. 407.
Non-Confidential Joint Appendix vol. 2 of 2—pp. A2779 to A24227, Apr. 2, 2012, pp. 344.
Carl G. Anderson, Letter to Clerk of the Court, Jun. 4, 2012, pp. 15.
Video Optimizatio Essentials Dress for Success, PX0030.PDF, 1 page.
Not Authored, Video Speeding Up in a Slowdown Increasing Your Revenue Potential, PX0036.PDF, 1 page.
Google, Inc., Web page re Google AdSense—Overview (Miller 3), Mar. 3, 2009, PX0046.PDF, 3 pages.
Google, Inc., Web page re Google AdSense—Overview—2009 (Miller 28), PX0071.PDF, 2 pages.

Google, Inc., Web page re Google AdSense—Help (Holden 43), Mar. 4, 2009, PX0085.PDF, 4 pages.
Google, Inc., Exhibit A—Curriculum Vitae of V. Thomas Rhyne, Mar. 25, 2009, PX0091.PDF, 13 pages.
Google, Inc., Screenshot re Google AdSense Help (Feng 150), Jun. 22, 2009, PX0122.PDF, 2 pages.
Google, Inc., Google, Inc. Accounting Policy Overview of Revenue . . . , Feb. 13, 2009, PX0127.PDF, 4 pages.
Johnny Chen, E-mail from J.Chen to J. Koplin RE Discussion re AMR encoding . . . , Aug. 6, 2008, 3 pages.
Google, Inc., Licensing Agreement the Board of Trustlees of the Leland Stanford . . . , Mar. 3, 1999, PX0318.PDF, 13 pages.
Google, Inc, AFC Overview for Joan, Mar. 1, 2007, PX0372.PDF, 27 pages.
Google, Inc., Google Presentation re Content-Targeted Advertising Discussion, Mar. 5, 2003, PX0677.PDF, 28 pages.
Google, Inc., Google Presentation re Acquisition of Applied Semantics, Inc., Apr. 10, 2003, PX0807.PDF, 4 pages.
Eric E. Schmidt / Google, Inc., Google Inc. Form 10-K, Feb. 13, 2009, PX1047.PDF, 117 pages.
Alex Carobus, Google Presentaiton re Content Ads, PX1090.PDF, 40 pages.
Google, Inc., Google Web Pages re Inside AdSense, Sep. 24, 2009, PX1212.PDF, 445 pages.
Google, Inc., Google screeshot re Reach your customers, wherever they are on the web, PX1293.PDF, 5 pages.
Google, Inc., Google Web Page re AdWords Help—Can I run ads on my website?, Feb. 5, 2009, PX1298.PDF, 2 pages.
Tunguz-Zawislak et al, Tunouz U.S. Appl. No. 11/939,786, Reply to Action of Apr. 16. 2009. Nov. 14, 2007, PX1632.PDF, 83 pages.
Kim Malone., K. Malone Presentation re Key AFC Online Publisher Issues, Nov. 2, 2004, PX1656.pdf, 6 pages.
Google, Inc., Google Company Presentation, May 11, 2001, PX1665.pdf, 37 pages.
Susan Wojcicki, Email from S. Wojcicki to S. Brin re Content Targeting, PX1690.pdf, 17 pages.
"Alt Attribute," Wikipedia, http://en.wikipedia.org/wiki/Alt_text, downloaded from the Internet Aug. 15, 2012, 3 pages.
Michael F. Heim, Further Briefing Response—045, Feb. 27, 2012, pp. 38.
John C. Phillips, Requester's Response to Requirement for Further Briefing, Mar. 25, 2012, pp. 11.
Michael F. Heim, Appeal Docketing Notice for 045, Jul. 8, 2011, pp. 2.
Correcting Cite #1 Under "Non-Patent Literature Documents" of IDS#1, GRALA, P. "How the Internet Works," Millennium Edition, Que Corporation, Dec. 1999, pp. 359.
Correcting Cite #6 Under "Non-Patent Literature Documents" of IDS#1, White, R. "How Computers Work, "Millennium Edition, Que Corporation, Dec. 1999, pp. 280.
Correcting Cite #11 Under "Non-Patent Literature Documents" of IDS#1, NEXPO 97 Report, Presstime Magazine, Newspaper of America, Dec. 1997, pp. 8.
Correcting Cite #35 Under "Non-Patent Literature Documents" of IDS#2, ADFORCE, Inc. AdForce User Guide—Dec. 1998, pp. 285, App C—AdForce.pdf.
Correcting Cite #36 Under "Non-Patent Literature Documents" of IDS#2, Adknowledge Campaign Manager Oct. 30, 1998, pp. 23, App E1—CM Reviewer Guide.pdf.
Correcting Cite #37 Under "Non-Patent Literature Documents" of IDS#2, Adkowledge MarketMatch Planner Apr. 15, 1999, pp. 26, App E2—MP Reviewer Guide.pdf.
Correcting Cite #39 Under "Non-Patent Literature Documents" of IDS#2, Aaddzz, aaddzz brochure Dec. 1997, pp. 7, App F1—Aaddzz Brochure.pdf.
Correcting Cite #40 Under "Non-Patent Literature Documents" of IDS#2, Aaddzz, aaddzz webpages—Jan. 30, 1998, pp. 42, App F2—Aaddzz Website.pdf.
Correcting Cite #41 Under "Non-Patent Literature Documents" of IDS#2, Ad-Star, Ad-Star webpages—Apr. 12, 1997 pp. 43, App G—AdStar.pdf.
Correcting Cite #42 Under "Non-Patent Literature Documents" of IDS#2, Zeff/Aronson, Advertising on the Internet Dec. 1997, pp. 444, App H1—Zeff97.pdf.
Correcting Cite #43 Under "Non-Patent Literature Documents" of IDS#2, Zeff/Aronson, Advertising on the Internet, Dec. 1999, pp. 444, App H2—Zeff99.pdf.
Correcting Cite #44 Under "Non-Patent Literature Documents" of IDS#2, Function Media LLC, Patent Owner Infringement Contentions, Dec. 2008, pp. 77, Other a—Patent Owner Infringement Contentions.pdf.
Correcting Cite #36 Under "Non-Patent Literature Documents" of IDS#3, Ad-Star, Ad-Star webpages—Apr. 12, 1997, pp. 43, App C—AdStar.pdf.
Correcting Cite #37 Under "Non-Patent Literature Documents" of IDS#3, AdManagerPro, AdManagerPro Administrator's Manual Jun. 1998, pp. 226, App D.pdf.
Correcting Cite #39 Under "Non-Patent Literature Documents" of IDS#3, AdForce, Inc. AdForce User Guide—Dec. 1998, pp. 285, App F1—AdForceUserGuide.pdf.
Correcting Cite #41 Under "Non-Patent Literature Documents" of IDS#3, Zeff/Aronson, Advertising on the Internet—Chapter 1-7, Dec. 1997, pp. 150, App J1—Zeff97 Part1.pdf.
Correcting Cite #42 Under "Non-Patent Literature Documents" of IDS#3, Zeff/Aronson, Advertising in the Internet—Chapter 7—end, Dec. 1997, pp. 151, App J1—Zeff97 Part2.pdf.
Correcting Cite #43 Under "Non-Patent Literature Documents" of IDS#3, Zeff/Aronson, Advertising on the Internet—Chapter 1-4, Dec. 1999, pp. 130, App J2—Zeff99 Part1.pdf.
Correcting Cite #44 Under "Non-Patent Literature Documents" of IDS#3, Zeff/Aronson, Advertising on the Internet—Chapter 4-10, Dec. 1999, pp. 130, App J2—Zeff99 Part2.pdf.
Correcting Cite #45 Under "Non-Patent Literature Documents" of IDS#3, Zeff/Aronson, Advertising on the Internet—Chapter 10—end, Dec. 1999, pp. 180, App J2—Zeff99 Part3.pdf.
Correcting Cite #46 Under "Non-Patent Literature Documents" of IDS#3, Function Media LLC, Patent Owner Infringement Contentions, Dec. 2009, pp. 85, Other A—Patent Owner Infringement Contentions.pdf.
Correcting Cite #46 Under "Non-Patent Literature Documents" of IDS#4, Zeff/Aronson, Appendix J1—Advertising on the Internet—Chapter 1-6, Dec. 1998, pp. 150, AppendixJ11.pdf.
Correcting Cite #47 Under "Non-Patent Literature Documents" of IDS#4, Zeff/Aronson, Appendix J1—Advertising on the Internet—Chapter 7—end, Dec. 1998, pp. 154, AppendizJ12.pdf.
Correcting Cite #48 Under "Non-Patent Literature Documents" of IDS#4, Zeff/Aronson, Appendix J2—Advertising on the Internet—Chapter 1-4, Dec. 1999, pp. 130, AppendizJ2.pdf.
Correcting Cite #49 Under "Non-Patent Literature Documents" of IDS#4, Zeff/Aronson, Appendix J2—Advertising on the Internet—Chapter 4-10, Dec. 1999, pp. 130, AppendizJ22.pdf.
Correcting Cite #50 Under "Non-Patent Literature Documents" of IDS#4, Zeff/Aronson, Appendix J2—Advertising on the Internet—Chapter 10—end, Dec. 1999, pp. 180, AppendezJ23.pdf.
Correcting Cite #1 Under "Non-Patent Literature Documents" of IDS#4A, Function Media LLC, Patent Owner Infringement Contentions, Dec. 2009, pp. 115, OtherA1.pdf.
Correcting Cite #2 Under "Non-Patent Literature Documents" of IDS#4A, Function Media LLC, Patent Owner Infringement Contentions, Dec. 2009, pp. 86, OtherA2.pdf.
Correcting Cite #3 Under "Non-Patent Literature Documents" of IDS#4A, Function Media LLC, Patent Owner Infringement Contentions, Dec. 2009, pp. 122, OtherA3.pdf.
Correcting Cite #4 Under "Non-Patent Literature Documents" of IDS#4A, Function Media LLC, Patent Owner Infringement Contentions, Dec. 2009, pp. 100, OtherA4.pdf.
Correcting Cite #5 Under "Non-Patent Literature Documents" of IDS#4A, Function Media LLC, Patent Owner Infringement Contentions, Dec. 2009, pp. 78, OtherA5.pdf.
Correcting Cite #6 Under "Non-Patent Literature Documents" of IDS#4A, Function Media LLC, Patent Owner Infringement Contentions, Dec. 2009, pp. 35, OtherA6.pdf.

Correcting Cite #3 Under "Non-Patent Literature Documents" of IDS#4B, Michael F. Heim, Petition to Terminate Inter Parties Reexamination Pursuant to 35 U.S.C. 317(b) and 37 C.F.R. 1907(b), Dec. 2011, pp. 3.
Correcting Cite #36 Under "Non-Patent Literature Documents" of IDS#5, AdForce Inc., Appendix D AdForce User Guide, Dec. 1998 pp. 285, AppendixD.pdf.
Correcting Cite #37 Under "Non-Patent Literature Documents" of IDS#5, Aaddzz, aasszz Brochure, Dec. 1997 pp. 6, AppendixE.pdf.
Correcting Cite #40 Under "Non-Patent Literature Documents" of IDS#5, Zeff / Aronson, Advertising on the Internet, Chapter 1-4, Dec. 1999, pp. 130, Appendix11.pdf.
Correcting Cite #41 Under "Non-Patent Literature Documents" of IDS#5, Zeff / Aronson, Advertising on the Internet, Chapter 4-10, Dec. 1999, pp. 130, Appendix12.pdf.
Correcting Cite #42 Under "Non-Patent Literature Documents" of IDS#5, Zeff / Aronson, Advertising on the Internet, Chapter 10—end, Dec. 1999, pp. 180, Appendix13.pdf.
Correcting Cite #43 Under "Non-Patent Literature Documents" of IDS#5, Function Media LLC, Patent Owner Infringement Contentions, Dec. 2009, pp. 86, AppendixOtherA4.pdf.
Correcting Cite #44 Under "Non-Patent Literature Documents" of IDS#5, Function Media LLC, Patent Owner Infringement Contentions, Dec. 2009, pp. 51, AppendixOtherA2.pdf.
Correcting Cite #3 Under "Non-Patent Literature Documents" of IDS#7, DART User Manual, Feb. 1998, pp. 76, D0149.pdf.
Correcting Cite #5 Under "Non-Patent Literature Documents" of IDS#7, DoubleClick Network Level Reports, Jul. 1998, pp. 24, D0256.pdf.
Correcting Cite #8 Under "Non-Patent Literature Documents" of IDS#7, DoubleClick, DART for Advertisers, created at least by Dec. 1999, pp. 91, D0373.pdf.
Correcting Cite #10 Under "Non-Patent Literature Documents" of IDS#7, AdForce, AdForce Inc., User's Guide:A Complete Guide to AdForce, Dec. 1998, pp. 285, D0403.pdf.
Correcting Cite #31 Under "Non-Patent Literature Documents" of IDS#7, Web pages re Google Adsense—Help (Miller 22), Feb. 2009, pp. 5, PX0065.pdf.
Correcting Cite #33 Under "Non-Patent Literature Documents" of IDS#7, Google, Inc., Web pages re Google's Adsense—Help—2009 (Miller 27), Dec. 2009, pp. 1, PX0070.pdf.
Correcting Cite #34 Under "Non-Patent Literature Documents" of IDS#7, Google, Inc., Web pages re Google's Adsense—Overview—2009, (Miller 28), Dec. 2009, pp. 2, PX0071.pdf.
Correcting Cite #40 Under "Non-Patent Literature Documents" of IDS#7, George Reyes, Presentation re Benchmark talking points, Jul. 28, 2009, pp. 31, PX0166.pdf.
Correcting Cite #46 Under "Non-Patent Literature Documents" of IDS#7, Google, Inc., Google's Presentation re 2003-2004 Operating Margin Camparison, created at least by Dec. 2009, pp. 7, PX0375.pdf.
Correcting Cite #52 Under "Non-Patent Literature Documents" of IDS#7, Alex Garobus, Google Presentation re Content Ads, created at least by Dec. 2009, pp. 40, PX1090.pdf.
Correcting Cite #55 Under "Non-Patent Literature Documents" of IDS#7, Google, Inc., Google Web pages re Google Adsense—Help Glossary, Dec. 2009, pp. 79, PX1214.pdf.
Correcting Cite #56 Under "Non-Patent Literature Documents" of IDS#7, Google, Inc., Google screenshot re Reach your customers, wherever they are on the web, created at least by Dec. 2009, pp. 5, PX1293.pdf.
Correcting Cite #61 Under "Non-Patent Literature Documents" of IDS#7, Susan Wojcicki, Email from S. Wojcicki to S. Brin re Content Targeting, Dec. 2002, pp. 17, PX1690.pdf.
Correcting Cite #123 Under "Non-Patent Literature Documents" of IDS#8, Not Authored, Propsed Order Granting Plaintiffs's Unopposed Motion for Extension of Deadline to Exchange Expert Declarations, Feb. 19, 2009, pp. 1, DOCKET098-B.pdf.
Correcting Cite #314 Under "Non-Patent Literature Documents" of IDS#8, Not Authored, (Proposed) Order GRanting Motion to Expedite Consideration of Motion to Preclude Admission of Untimely Evidence, Dec. 7, 2009, pp. 1, DOCKET334A.pdf.
Correcting Cite #332 Under "Non-Patent Literature Documents" of IDS#8, Max L. Tribble, Jr, Motion for Adverse Inference Instruction Regarding Google's Destruction of Documents, Dec. 2009, pp. 5, DOCKET342A.pdf.
Correcting Cite #333 Under "Non-Patent Literature Documents" of IDS#8, Not Authored, (Proposed) Order Granting Motion to Expedite Consideration of Motion to Preclude Admission of Untimely Evidence, Jan. 2010, pp. 1, DOCKET343.pdf.
Correcting Cite #334 Under "Non-Patent Literature Documents" of IDS#8, Not Authored, (Proposed) Order Granting Motion to Expedite Consideration of Motion to Preclude Admission of Untimely Evidence, Jan. 2010 pp. 1, DOCKET343A.pdf.
Google, Inc, Google Adwords web page help center—Can I Choose, Jan. 1, 2005, D0111.pdf, 1 page.
Google, Inc, Google Adwords web page help center—Where will my ads appear, Mar. 13, 2005, D0140.pdf, 3 pages.
DART User Manual, D0149.pdf, 76 pages.
Jeremy J. Brandon, Function Media LLC's First Amended Response and Objections to First Set of Interrogatories, Nov. 12, 2008, D0163.pdf, 28 pages.
DoubleClick Network Level Reports, D0256.pdf, 24 pages.
Rama Ranganath, Overview of Adsense for Content, Jul. 28, 2005, D0319.pdf, 32 pages.
DoubleClick, Documental Projects, Feb. 1999, D0370.pdf, 129 pages.
DoubleClick, DART for Advertisers, D0373.pdf, 91 pages.
Content-Based Ad Serving System, Sep. 21, 2002, D0389.pdf, 4 pages.
AdForce, AdForce Inc., User's Guide: A Complete Guide to AdForce 1998, D0403.pdf, 285 pages.
AdForce, Passing and using multiple parameters in AdForce Tags, Nov. 17, 1998, D0404.pdf, 8 pages.
AdForce, Guidelines for Creating and Submitting Creatives, Jan. 18, 1999, D0405.pdf, 15 pages.
NetGrvity, NetGravity AdServer v.3.5, User Assistance Guide, D0422.pdf, 329 pages.
DoubleClick, DoubleClick University, Dec. 31, 2000, D0594.pdf, 40 pages.
DoubleClick, DART for Advertisers Trafficking Training, Dec. 31, 1999, D0596.pdf, 32 pages.
Google, VoiceAge Corporation Patent License, Dec. 13, 2008, D0703.pdf, 39 pages.
Carl Meyer, Carl Meyer Patent Purchase and Sale Agreement, Dec. 18, 2008, D0710.pdf, 9 pages.
Alcatel-Lucent USA Patent License Agreement, D0735.pdf, 21 pages.
Document headed tome Fri.Jun 28 23;07;40 1996, Oct. 20, 2007, D0882.PDF, 26 pages.
Woojin Kim, E-mail from Woojin to Jeremiah Harrisen . . . May 15, 2009, D0897.pdf, 4 pages.
Stone, et al, U.S. Patent No. 7,240,025, Jul. 3, 2007, PX0001.PDF, 83 pages.
Stone, et al, U.S. Patent No. 7,249,059, Jul. 24, 2007, PX0003.PDF, 105 pages.
Video Adsense Optimization Webiner, May 8, 2009, PX0015.PDF, 1 page.
Video Adsense Orientation Webinar, Apr. 23, 2009, PX0016.PDF, 1 page.
Demostrations of Google's System, PX0024.PDF, 1 page.
Video Optimization Essentials Dress for Success, PX0030.PDF, 1 page.
Not Authored, Video Speeding Up in a Slowdown Increasing Your Revenue Potentialm PX0036.PDF, 1 page.
Google, Inc., Web page re Google AdSense—Overview (Miller 3), Mar. 3, 2009, PX0048.PDF, 3 pages.
Google, Inc., Web page re Google AdSense Help Can I customize . . . (Miller 15), Mar. 3, 2009, PX0058.PDF, 1 page.
Google, Inc., Web page re Google AdSense—Help (Miller 19), Mar. 3, 2009, PX0062.PDF, 1 page.
Web page re Google Adsense—Help (Miller 22), PX0065.pdf, 5 pages.
Google, Inc., Web page re Google Adsense—Help (Miller 26), Jul. 2, 2009, PX0069.PDF, 7 pages.

Google, Inc., Web page re Google AdSense—Help—2009 (Miller 27), PX0070.PDF, 1 page.
Goggle, Inc., Web page re Google AdSense—Overview—2009 (Miller 28), PX0071.PDF, 2 pages.
Goggle, Inc., Web page re Google AdSerise—Help (Holden 43), Mar. 4, 2009, PX0085.PDF, 4 pages.
Goggle, Inc., Exhibit A—Curriculum Vitae of V. Thomas Rhyne, Mar. 25, 2009, PX0091.PDF, 13 pages.
Goggle, Inc., Screenshot re Google AdSense Help (Feng 150), Jun. 22, 2009, PX0122.PDF, 2 pages.
Goggle, Inc., Google, Inc. Accounting Policy Overview of Revenue . . . Feb. 13, 2009, PX0127.PDF, 4 pages.
USA Today, USA Today article entitled "The house that helped build Google", Jul. 24, 2009, PX0157.PDF, 4 pages.
George Reyes, Presentation re Benchmark talking points, PX0166.PDF, 31 pages.
Communications Plan Fresh Choice Launch, Jun. 17, 2003, PX0192.PDF, 3 pages.
Johnny Chen, E-mail from J. Chen to J. Koplin Re Discussion re AMR encoding . . . , Aug. 6, 2008, PX0313.PDF, 3 pages.
Google, Inc., Licensing Agreement the Board of Trstiees of the Leland Standord . . . , Mar. 3, 1999, PX0318.PDF, 13 pages.
Google, Inc., Google Presentation re 2004 Plan, Jan. 27, 2004, PX0370.PDF, 42 pages.
Goggle, Inc, AFC Overview for Joan, Mar. 1, 2007, PX0372.PDF, 27 pages.
Google, Inc, Google Presentation re 2003-2004 Operating Margin Comparison, PX0375.PDF, 7 pages.
Brian Axe / Google, Inc, Email from B. Axe re Content Ads GPS Notes, Mar. 27, 2003, PX0549.PDF, 23 pages.
Goggle, Inc., Google Presentation re Content-Targeted Advertising Discussion, Mar. 5, 2003, PX0677.PDF, 28 pages.
Goggle, Inc., Google Presentation re Acquisition of Applied Semantics, Inc., Apr. 10, 2003, PX0807.PDF, 4 pages.
Eric E. Schmidt / Goggle, Inc., Google Inc. Form 10-K, Feb. 13, 2009, PX1047.PDF, 117 pages.
Google, Inc., Google Design Document re Publisher Controls in AdSense, Jan. 13, 2006, PX1074.PDF, 10 pages.
Alex Carobus, Google Presentation re Content Ads, PX1090.PDF, 40 pages.
Google Source Code, Feb. 19, 2009, PX1204.PDF, 518 pages.
Goggle, Inc., Google Web Pages re Inside AdSense, Sep. 24, 2009, PX1212.PDF, 445 pages.
Google, Inc., Google Web page re Google Adsense—Help Glossary 2009, PX1214.PDF, 79 pages.
Google, Inc., Google screenshot re Reach you customers, wherever they are on the web, PX1293.PDF, 5 pages.
Google, Inc., Google Web Page re AdWords Help—Can I run ads on my website? Feb. 5, 2009, PX1296.PDF, 2 pages.
Tunguz-Zawislak et al, Tunguz U.S. Appl. No. 11/939,786, Reply to Action of Apr. 16, 2009, Nov. 14, 2007, PX1632.PDF, 83 pages.
Kim Malone, K. Malone Presentation re Key AFC Online Publisher Issues, Nov. 2, 2004, PX1656.pdf, 6 pages.
Google, Inc. Google Company Presentation, May 11, 2001, PX1665.pdf, 37 pages.
Susan Wojcicki, Ernall from S. Wejcicki to S. Britt re Content Targeting, PX1690.pdf, 17 pages.
Jonathan Rosenberg, Email from J. Rosenberg re AdSense Business Review, Nov. 18, 2003, PX1696.pdf, 36 pages.
Sergy Brin, Email from S. Brin to Googlers re Recent Founders' Award, Apr. 19, 2005, PX1700.pdf, 2 pages.
Decision on Appeal, *Google, Inc.* v. *Function Media, LLC.*, Appeal 2011-010724, Inter parties U.S. Appl. No. 95/001,061, United States Patent 6,446,045 B1, dated May 23, 2012, 12 pages.

\* cited by examiner

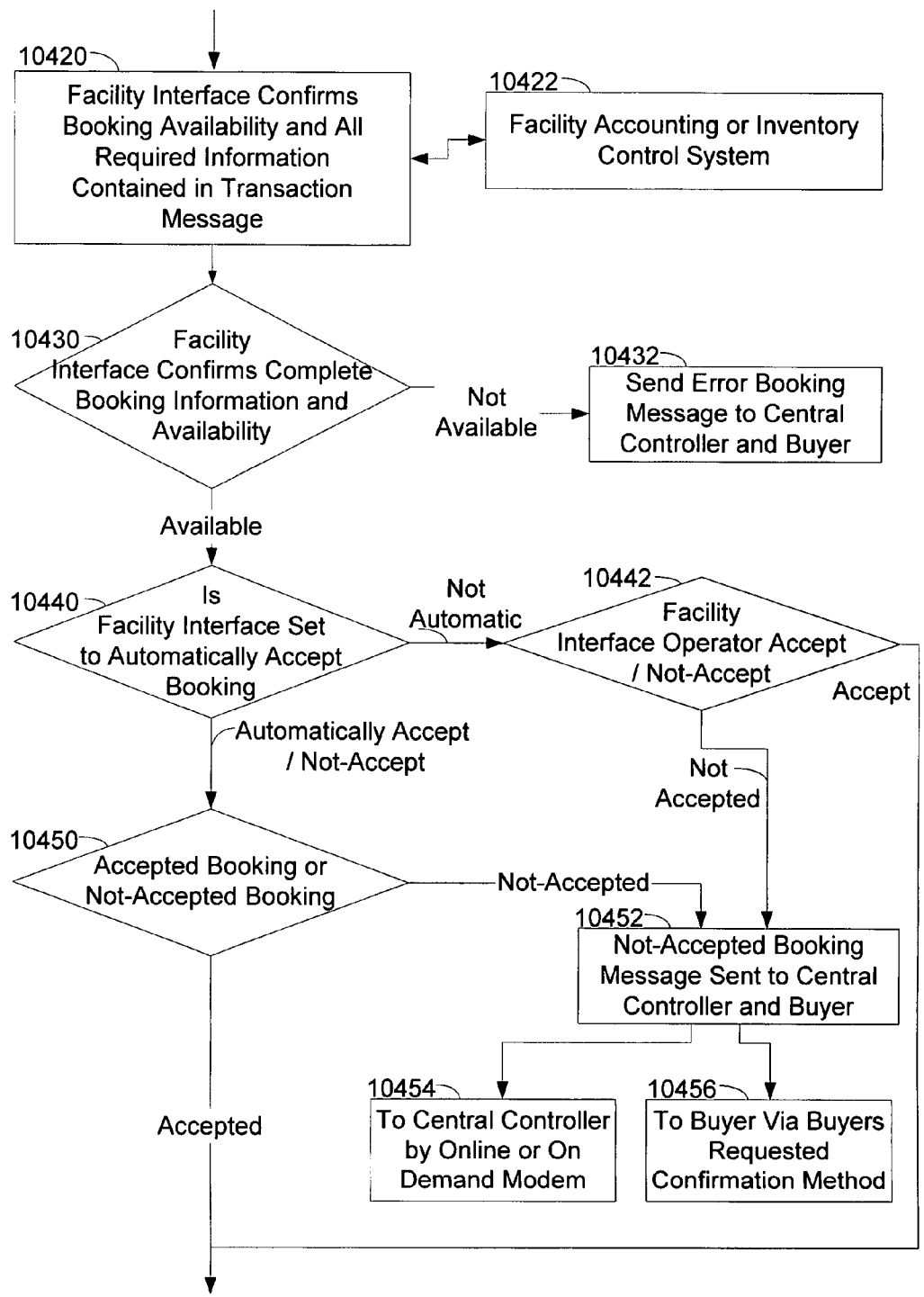

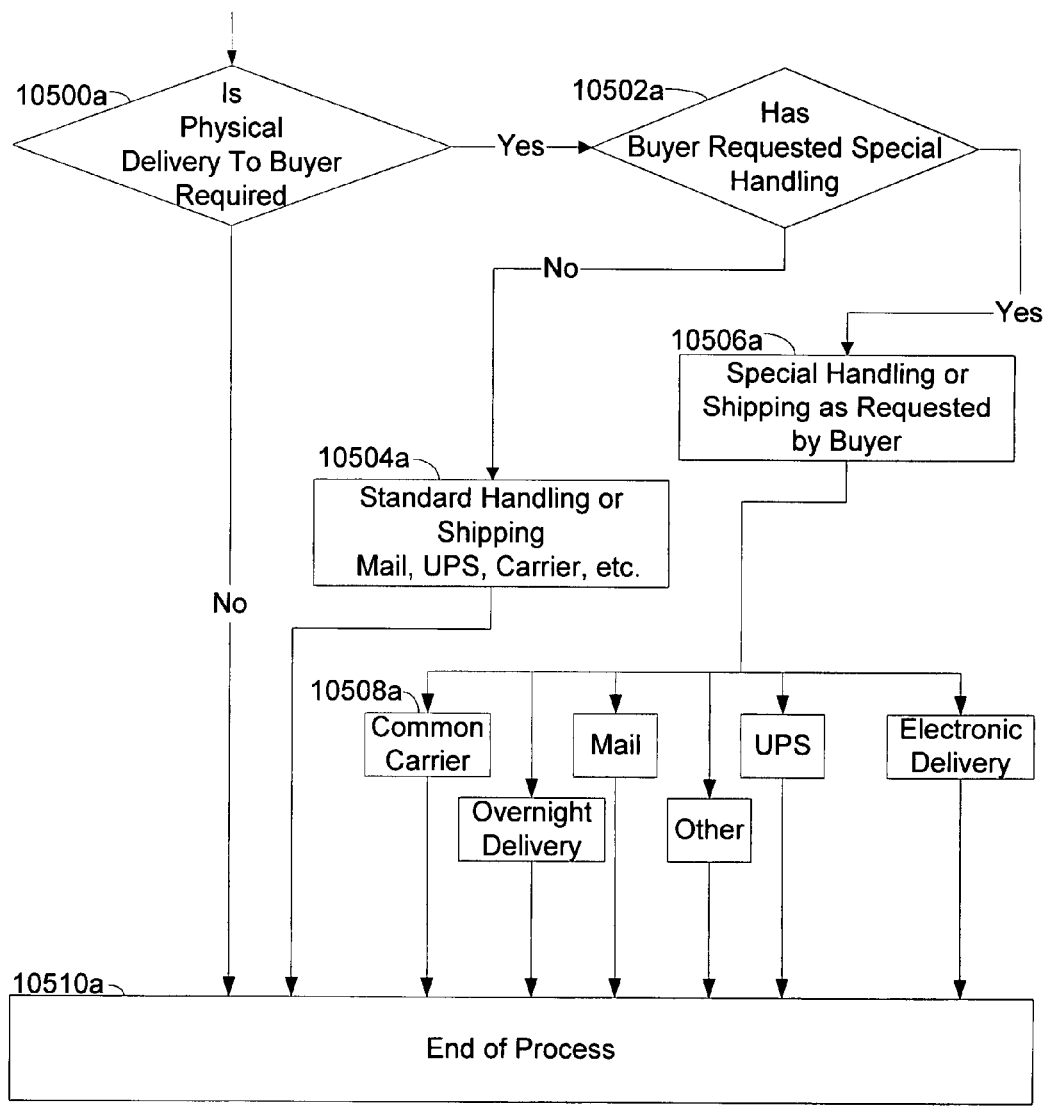
Fig. 3i-a

METHOD FOR USING COMPUTERS TO FACILITATE AND CONTROL THE CREATING OF A PLURALITY OF FUNCTIONS

This application is a continuation of parent application Ser. No. 10/954,820 filed Oct. 7, 2004 (issued as U.S. Pat. No. 7,240,025 on Jul. 3, 2007) which, was a continuation of the then parent application Ser. No. 10/165,091, filed Jun. 7, 2002, (issued as U.S. Pat. No. 6,829,587 on Dec. 7, 2004), which was a continuation of the then parent application Ser. No. 09/480,303 filed Jan. 10, 2000, (issued as U.S. Pat. No. 6,446,045 on Sep. 3, 2002.) In addition Divisional application Ser. No. 10/165,094, filed Jun. 7, 2002, (issued as U.S. Pat. No. 6,738,750 on May 18, 2004) and Divisional application Ser. No. 10/165,078, filed Jun. 7, 2002, (issued as U.S. Pat. No. 6,873,969 on Mar. 29, 2005) were filed in response to the "Election of Divisional" on copending application Ser. No. 09/480,303. Additionally a Continuation In Part (CIP) application Ser. No. 10/193,465, filed Jul. 11, 2002 is currently copending under a notice of allowance with fees paid awaiting issue date and assignment of patent number.

BACKGROUND OF THE INVENTION

Field of Invention

The method and apparatus of the present invention is related to Automated Media Creation and Publication Engine with Resource Saver, Inventory Control, and Ticket Distribution Vending System.

The invention also relates to the Automated Media Creation, Publication, Placement, and Control Engine with Processing and Communications Resource Saver, including a Sales and Inventory Control protocol, and a Reservation, Access, and Verification System Utilizing Ticket and Confirmation. Replacement Methods.

In another aspect the invention relates to Automated Media Creation, Publication, Placement, and Control Engine with Processing and Communications Resource Saver, including a Sales and Inventory Control protocol, and a Reservation, Access, and Verification System Replacing Traditional Ticket and Confirmation Methods.

In yet another aspect the invention relates to Automated Media Creation, Publication, Placement, and Control Engine, including a Sales and Inventory Control protocol with Processing and Communications Resource Saver, and a Reservation, Access, and Verification System Replacing Traditional Ticket and Confirmation Methods.

Prior art for electronic and other presentations of commercial products, goods, and services is accomplished by individual sellers or seller organizations or their agents submitting materials to each and every media outlet or to stand-alone electronic malls, outlets, or directories. Most sellers choose the media or outlet for the sale of their products, goods, or services; obtain the guidelines and requirements; negotiate a contract; and then compile material and design individual presentations to conform to the requirements for each media. This time consuming and costly business necessity has created huge marketing programs and agencies for large businesses.

When created individually by sellers or seller organizations, media presentations may not be standardized in that they do not carry consistent, up-to-date inventory, pricing, and information for the consumer. A buyer may find conflicting presentations on different electronic or traditional channels or outlets. The management for the advertising and electronic commerce for many small to mid-size sellers falls either as additional duties to current staff or as new departments. In the media of electronic presentations, the lack of experience may result in presentations that are cumbersome, ineffective, or not accessible to the widest range of consumer. Currently, the non-standardized format for the presentation of products, goods, and services provides for both the advantage of allowing unlimited creativeness in presentation and the disadvantage, in inexperienced hands, of not delivering the most effective and motivating sales message. In many cases, this lack of standardization appropriate to each and every venue or media outlet may result in the presenting of goods and services in a way that does not entice the buyer to make a purchase.

In the prior art, electronic Internet and Intranet presentations are developed either as static files that require constant and laborious manual updating or as dynamic (database-driven)

Although the dynamic presentations require less labor to produce and update, the various Internet or Intranet search or retrieval programs do not generally read or index them because of their "dynamic, database-driven" nature. This fact alone substantially reduces their effectiveness in reaching the most motivated buying public because those presentations are largely invisible to the wide range of automated searches conducted by potential buyers. With either design choice, substantial cost is experienced for the small to mid-size seller, either in the form of labor intensive presentation methods or in lost sales opportunity, which can never be recovered.

The electronic Internet malls and electronic directories, although generally much better staffed and able to produce effectively designed and edited content to motivate the buyer, suffer in part from the same dilemma. They are still faced with the same no-win choice between the labor intensive creation and placement for each presentation that gets the maximum visibility to the search methods of potential buyers and the easier database-driven presentation which get minimal visibility. One of the disadvantages to the advertising client of these electronic directories is that they find themselves publishing the same information in multiple directories or indexes as well as in their own stand-alone presentations in order to obtain the maximum coverage for access to the buying public. This supervision of multiple presentations is a control and management problem that is very costly and inefficient for the seller.

Electronic malls and electronic directories also experience a high ratio of cost to generated income associated with sales, billing, and collections. The clients of these electronic malls and directories are typically contracted for some period of time and then billed for that period of time during the contract period.

Currently, the sale of tickets, passes, admission documents, or reserved services is performed in a variety of ways that require the buyer to either call the agent or seller, contact a third-party seller, have a specific ID for that venue or event, or make the purchase electronically using a network presentation of some kind, usually the Internet. Upon the sale of those tickets, passes, admission documents, or reserved services, the transaction requires, or, would be enhanced by, the physical delivery of those proofs of purchase. In the prior state of the art, proof of purchase must be picked up at some physical facility or point of sale when the tickets, passes, admission, or reserved services are purchased. Or, they must be delivered via mail or one of the overnight services, delivered by courier, or picked up on a "will call" basis at the facility, site, business, or venue. Or, they must be a member and a holder of a specific ID used by that Seller of goods or services. All of these methods, at the very least, create additional inconvenience for the Buyer, requiring either travel time, waiting in lines, applying for and receiving specific ID card, or the uncertainty of last-minute delivery. In many cases where last-minute purchase decisions are made, there is additional expense to either the Buyer or Seller to insure timely delivery. In prior art, if the buyer is a existing member of an organization that issues special single purpose ID cards, the buyer may apply for and use that special single purpose ID card for access. This forces the buyer to have an individual access ID for each service that he wishes to periodically use.

In regards to the Resource Saver Protocol, prior art requires a message to be recorded and sent for each and every transaction (purchase) at a resource cost for each transaction or transmission. If a Seller has inventory on multiple electronic sites or channels, each and every site must be updated and adjusted on an individual basis, one-by-one manually. It must be noted that prior art does not even communicate in an automated two-way method. This means that in many cases, the Seller has to receive the transmission of sale, record the inventory change manually onto his management or accounting software, and then update each and every place where this inventory is offered for sale. Through prior art, buyers and sellers often experience mistakes in over-selling or overbooking products, goods, or service because of the delays of manual updating.

SUMMARY

The invention allows sellers to present their inventory, products, goods and services in a choice of one or a variety of supported media outlets: in print, such as newspapers, magazines, periodicals, guidebooks, catalogs, brochures, fliers, and directories; in electronic form, such as online directories, web sites, bulletin boards, news groups, CD-ROMs, and interactive media and networks; and in other media, such as billboards, skywriters, bus benches, radio, interactive kiosk and any other form of customer outreach or information distribution. When these media choices are made, the present invention prompts the seller for information that is then used in the creation of presentations for the media outlets he has chosen. The Presentation Rules Database holds all the criteria, formatting architecture, and distribution factors for each participating media outlet. The present invention's Presentation Generation Program, along with the Presentation Rules Database, then creates a presentation for each and every media outlet the seller has chosen. The Presentation Generation Program then either transmits the presentation to the appropriate destination or holds it for a publication date to be submitted for a particular deadline or predetermined promotional market.

The seller can then print out a report that shows him each presentation, distribution or media outlet, and the pricing of each media choice for an overall marketing valuation.

The present invention allows the Seller to update, change, control inventory, and automatically process sales either from his in-house or third party accounting or management software that has a compatible communication component with the present invention or in the present invention. He can accomplish this updating and inventory control to all media outlets simultaneously.

The invention is a method and apparatus that allows for the creation of presentations for the commerce of products, goods and services for any and all size of business; the accessibility of those presentations to a vast population of the buying public both in print, electronic, interactive electronic, and other media; the sale, reservation, and purchasing of those products, goods and services; the confirmation of these purchases and reservations through a Network ID or confirmation system; and the management of inventory control through multiple media outlets while saving resources of processing, transmission, and communications.

The invention is a method and apparatus that allows for the creation of presentations that comply with the design and architectural requirements of any and all participating media. This is applicable to all media either in print, such as newspapers, magazines, advertisements, guidebooks, directories, fliers, and brochures; and electronic media, such as online directories and malls, web sites, bulletin boards, news groups, CD-ROMs, and interactive media and networks; and other media, such as billboards, skywriters, bus benches, radio, interactive kiosk, and any other form of customer advertising, outreach, or information distribution. These presentations can be updated for either presentation content or inventory control in near real time, by either manual or automatic means, via electronic message units from third-party management or inventory control software. Electronic presentations created can be either static open-access or database driven dynamic server presentations. Where appropriate, these presentations allow for the sale of products, goods, or services and for the making of payments by buyers. Inventory adjustments for production, sales, and other reasons are made in near real time, allowing for an accurate presentation of availability of inventory to buyers. The present invention allows for lower cost to management when used with all media outlets by creating a self-serve, automated billing environment for the seller's creation and display of presentations.

The invention is a method and apparatus that allows for the creation of both static and dynamic Internet and Intranet presentations for the sale of products, goods, and services to be accessible to the maximum number buyers and the interactive purchase of those products, goods and service. The present invention is a method and apparatus that allows buyers to purchase products, goods and service electronically and receive confirmation of that purchase.

The invention allows for the verification and substantiation of the purchase of access or admission to those services or events that traditionally have controlled access by means of tickets, passes, admission documents, reservations, reservation confirmations, or other substantiation at the facility, site, business, or venue. The invention provides several methods for the buyer to provide a ID at the time of purchase, which is then transmitted electronically to the facility, site, business, or venue. That buyer Network ID is then confirmed by the facility, site, business, or venue by means of readers or scanners of the magnetic, smart, or optical ID cards or by other electronic means when biometric authentication is required. This confirmation may automatically result in the printing of the tickets, passes, admission documents, reservation confirmations, or other documents required for admittance or in the automatic and immediate physical admittance of the buyer or ID holder.

The present invention allows for both complete inventory control and management and the global updating and accessibility of real-time and time-sensitive inventory while saving communication resources and time for any and all businesses that sell products, goods, and services regionally or worldwide. The invention allows for a substantial reduction of the communications and computer resources necessary to control and coordinate the availability, presentation, and sales of common, unique, or time-sensitive products, goods, and services. The present invention allows for the sales process to be adjusted so as to optimize the communications and computer resources used in relationship to the sales volume and Seller, Buyer, and usage profiles.

OBJECTS AND ADVANTAGES

Several objects and advantages of the Presentation Generation component of the present invention are:

To provide an effective system of edit and content control for the creation and publishing of commercial sales or information-oriented traditional media and electronic presentations in a cost-effective manner for small, medium, and large sellers of products, goods, and services. This invention improves on the prior art by creating a controlled, managed environment for the sellers in which to create their presentations. This invention automatically applies not only editing, style, graphics, data, and content controls but also design specification and architectural requirements to the design environment of all forms of specific member media venues or outlets, both electronic print and all other media formats.

To create open-access electronic presentations that can receive maximum electronic visibility from private, public, or commercial search algorithms and commercial search engines and indexes, as well as from other automated or on-demand computer search systems. This invention improves on the prior art by automatically publishing the information and data received from sellers in an open-access format that is readily available to public automatic search and index programs as well as to on-demand search programs. With this invention, the seller's presentation can be published in several different directories or indexes, taking on a different style, look, and feel in each as a result of the automatic restructuring of the data entered by the seller. This is accomplished by using different presentation formatting guidelines and rules for the targeted directories or indexes. This single-entry and automatically distributed method is more efficient than managing each directory or index individually.

To allow sellers to create presentations on their computers that are automatically transmitted to be published and viewed on electronic networks and other traditional advertising media. The present invention partially resides on the sellers' computers, controls and edits the presentation, and then automatically transmits that information and data for publication in traditional media and electronic networks.

To allow media venues, outlets, vendors, and representatives automated presentations giving media buyers' self-serve access to their products and services.

To allow for the automatic publishing or updating of presentations within a simple environment that does not require lower-level coding or formatting of the presentation material. The present invention employs a text-only entry of information and data, thereby not requiring the seller to have knowledge of presentation computer codes or low-level formatting.

To allow for automatic global updating of the description, price, quantity, and availability of products, goods, and services in traditional periodic media or electronic presentations. The present invention allows for the direct input of this information as well as for the automatic transmission of presentation-related data by compatible third-party, accounting, inventory control, or other management software for the inclusion or updating of the electronic presentation through common message files read and transmitted by the present invention.

To allow for the central control and management of presentations, thereby allowing for a greater degree of promotion and flexibility of the category or group of products, goods, or services by the controlling server in order to attract more buyers. The present invention directs all presentations through a central controller, which standardizes the presentations within the style, editing, and content standards set by the controller standards for each presentation, directory, or index. All electronic interactive presentations are optimized for presentation search visibility by the controller and can then be globally refined, based on traffic analysis.

To provide lower overhead cost associated with sales, billing, and collections for the operators of the present invention. By creating a self-serve, automated, direct billing environment for the sellers to create their presentations in, the operators of the present invention will experience substantial savings over traditional sales and billing methods. Allowing the sellers to create their presentations with a cafeteria-style selection and billing that presents all their options, including the associated cost up front, will also result in greater add-on sales without the associated sales overhead.

Several objects and advantages of the Resource Saver Protocol component of the present invention are:

To allow for the presentation of availability of products, goods, and services for sale in a real-time environment without requiring constant real-time communications during the sales process.

To allow a substantial portion of the real-time sales to be completed without the overhead of a concurrent verification process.

To reduce the necessary processing and communications resources used to control inventory presentations of products, goods, and services.

To reduce the necessary processing and communications resources used to control sales and/or reservations of products, goods, and services.

To transfer communications and processing resources to time periods of lower utilization of those resources.

Several objects and advantages of the Network ID and Purchase Verification System component of the present invention are:

To allow for the replacement of traditional tickets, passes, admission documents, reservations, reservation confirmations, and other means of verification that require prior or "will call" delivery to the buyer. The present invention improves on the prior art by creating a controlled universal ID at time of purchase that can be transmitted to the facility, site, business, or venue to be used for verification of the buyer and purchase. This ID can be used for one purchase or maintained within the network for future use as a permanent ID for the purchase and access to any facility, site, business, or venue that is represented by that instance of the present invention.

To allow for a more convenient method of purchase of tickets, passes, admission documents, or reserved services, or for the late purchase of those tickets, passes, admission documents, or reserved services beyond what would be feasible if physical delivery of the access or admission documents were required. The present invention allows for purchases to be made and buyer IDs to be transmitted to the facility, site, business or venue within a matter of minutes of the buyer arriving for admittance. By using an electronic network, Internet, Intranet, or phone service, a buyer could literally make the purchase by laptop computer with wireless modem or by cell phone from the car on the way to the facility, site, business, or venue for admittance. The invention, when used in conjunction with an electronic inventory-available presentation, can allow buyers to become aware of and take advantage of last-minute cancellations and changes of availability.

The invention reduces labor and material requirements by the sellers of tickets, passes, admission documents, or reserved services. The invention substantially reduces the labor and material requirement for fulfillment of purchases of tickets, passes, admissions, or reserved services in several ways. By eliminating the requirement of delivery of those documents that allow the buyer admittance, there is no outgoing correspondence and/or fulfillment package to prepare. The costs associated with shipping, tracking, or follow-up on lost items as well as the customer service costs that accompany late or poorly communicated delivery instructions are reduced or eliminated. At admission time, additional costs are saved with the full implementation of the present invention by the use of automatic vendors that print the admission documents on demand by the buyer and with automated verification of the buyer's ID. This function replaces the "will call" method of admission document delivery and the associated cost in labor and facility overhead.

Further objects and advantages of the present invention will become apparent from a consideration of the drawings and ensuing description.

BRIEF DESCRIPTION OF DRAWINGS

FIG. 3a through 3k and 3i-a is a block diagram showing the transaction processing and buyer's use of one embodiment of the present invention. This Example Embodiment of this invention is configured for delivery of tickets or reservation confirmation.

Further Breakdown of the block diagrams 5a through h.

Figure 5A:
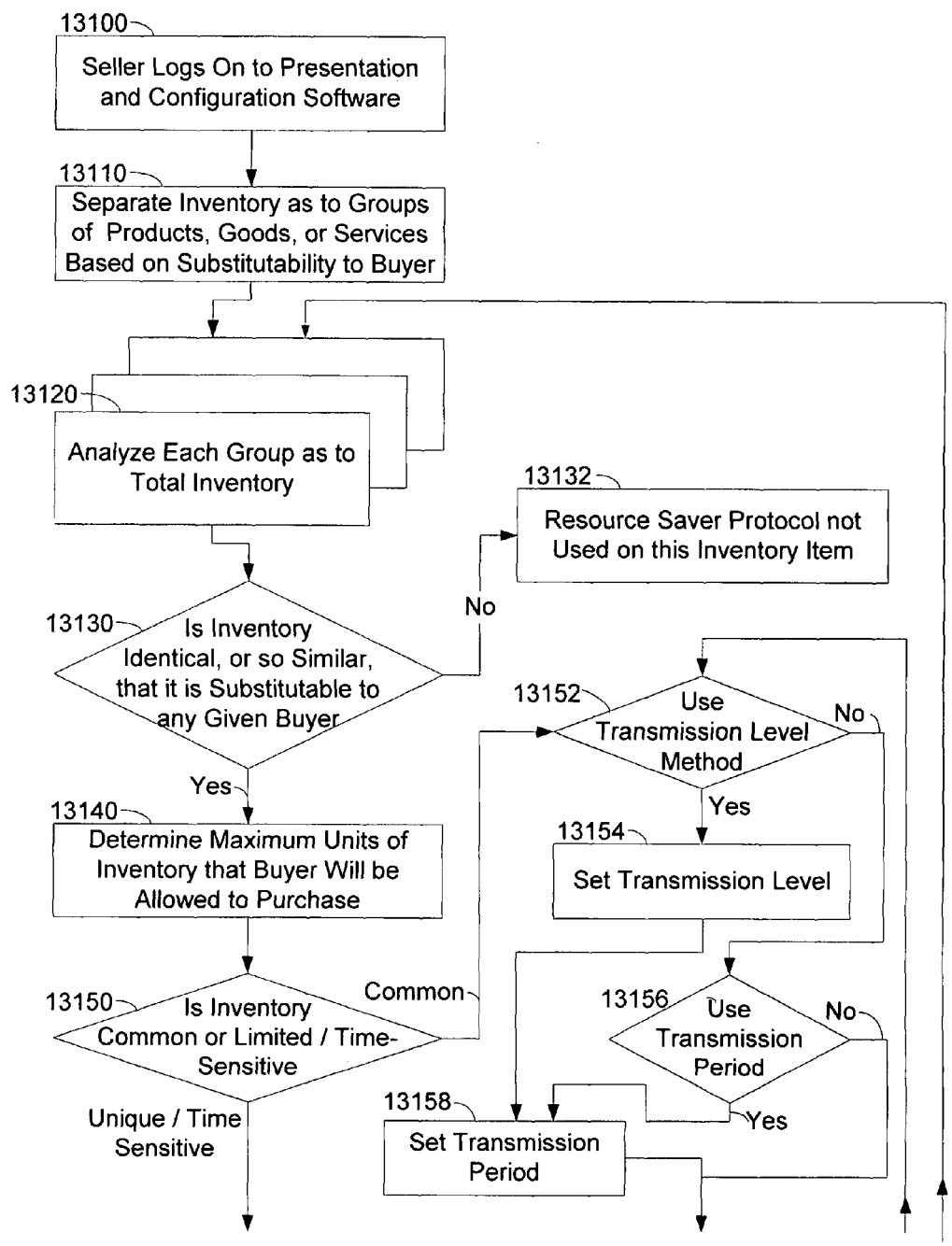
FIG. 5a through 5h is a block diagram showing the Seller's use of the Resource Saver Protocol of the invention. This Example Embodiment of this invention is configured for delivery of tickets or reservation confirmation.
Figure 5B:
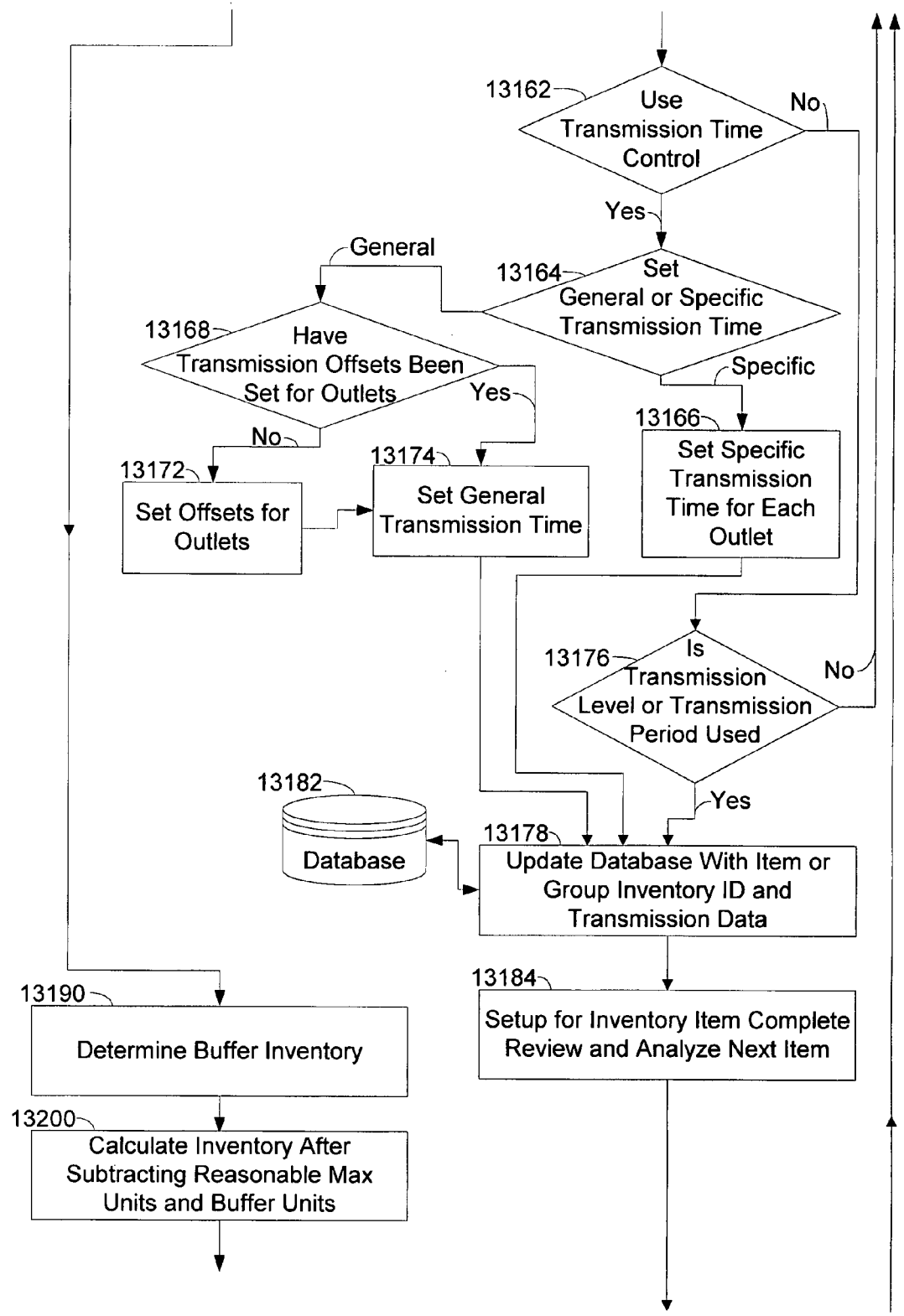
Figure 5C:
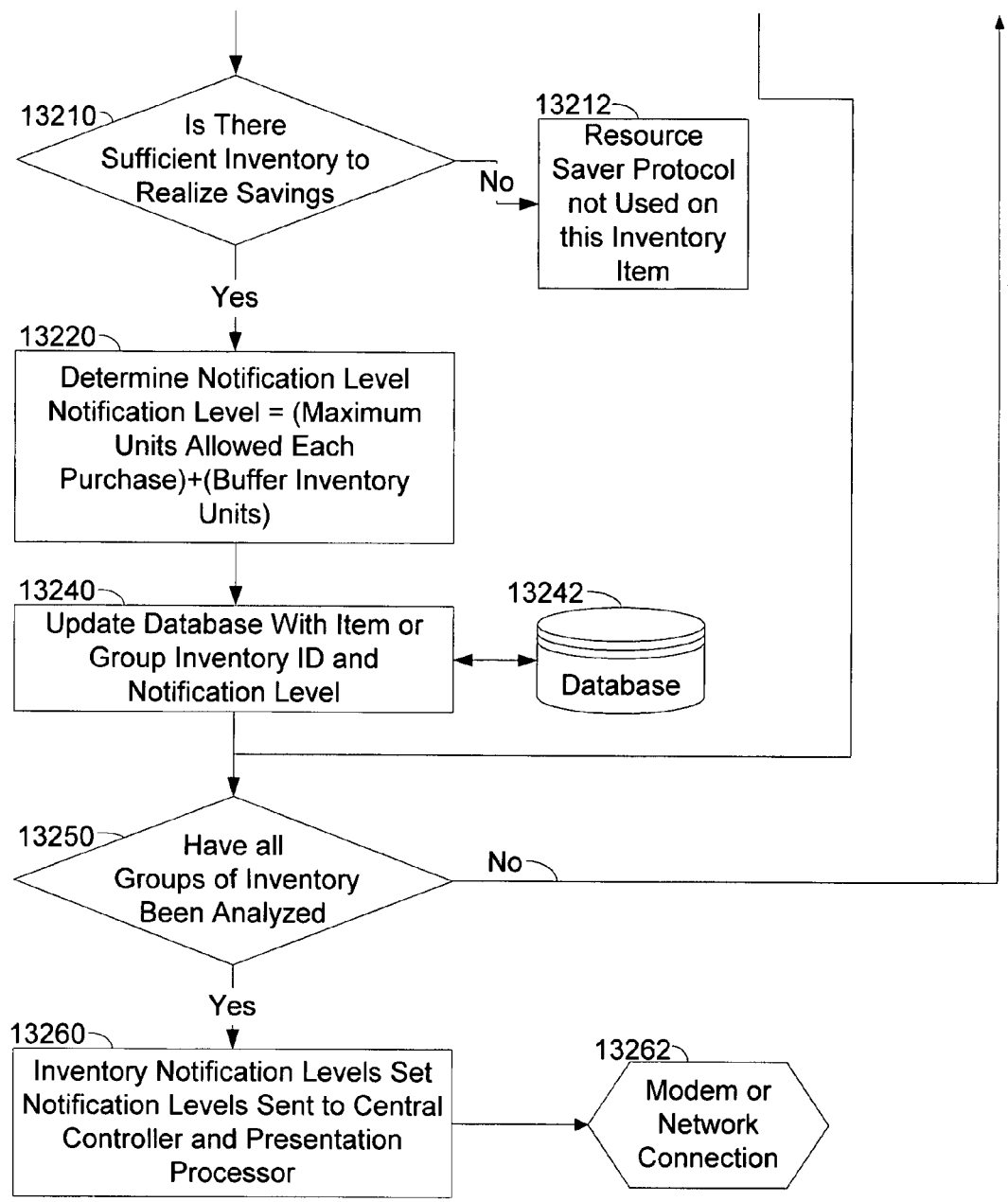

FIG. 5a through 5c is a block diagram showing Seller's Setup and use of Resource Saver Protocol.

Figure 5D:
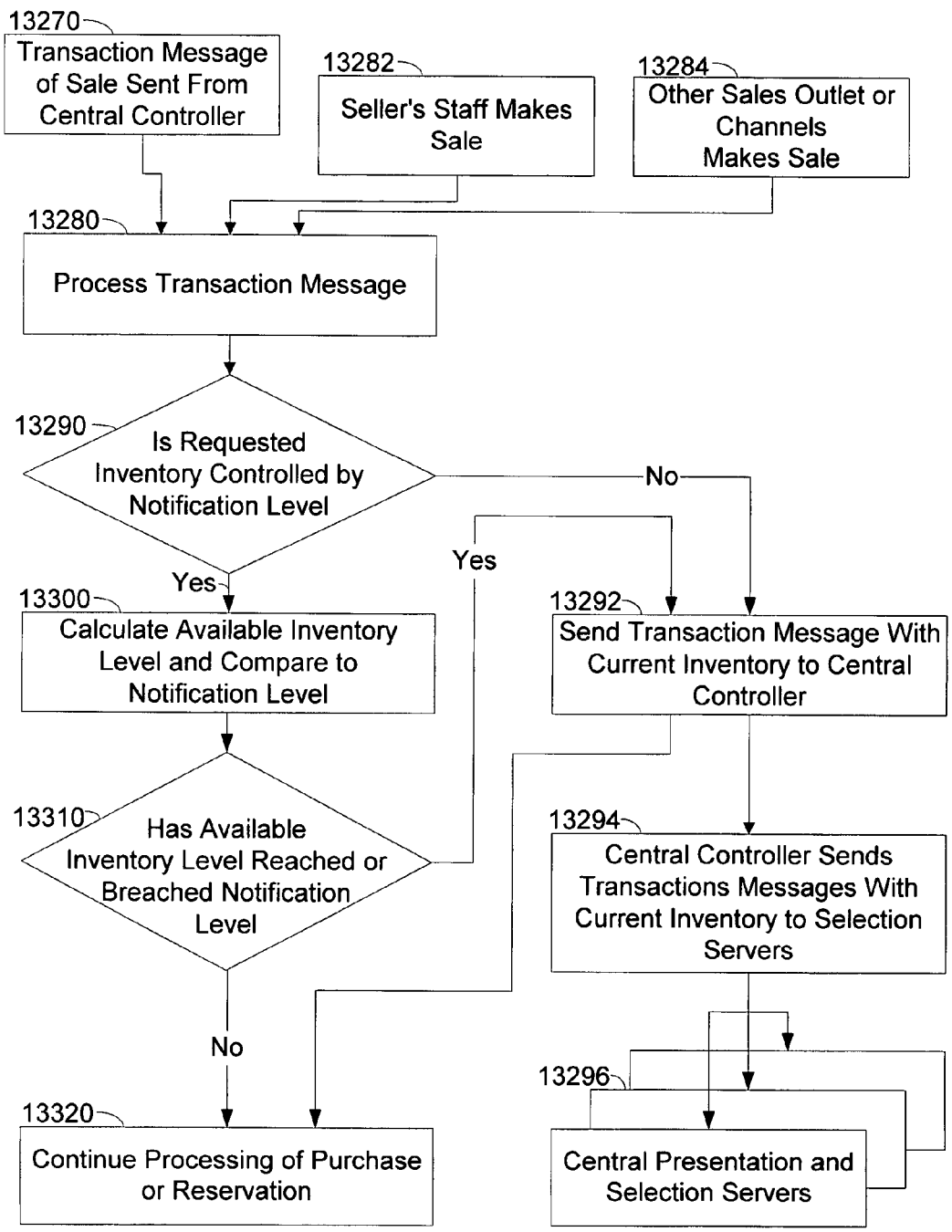

FIG. 5d is a block diagram showing the Seller's Use of Notification Level Processing of Resource Saver Protocol at Seller Interface 4000.

Figure 5E:
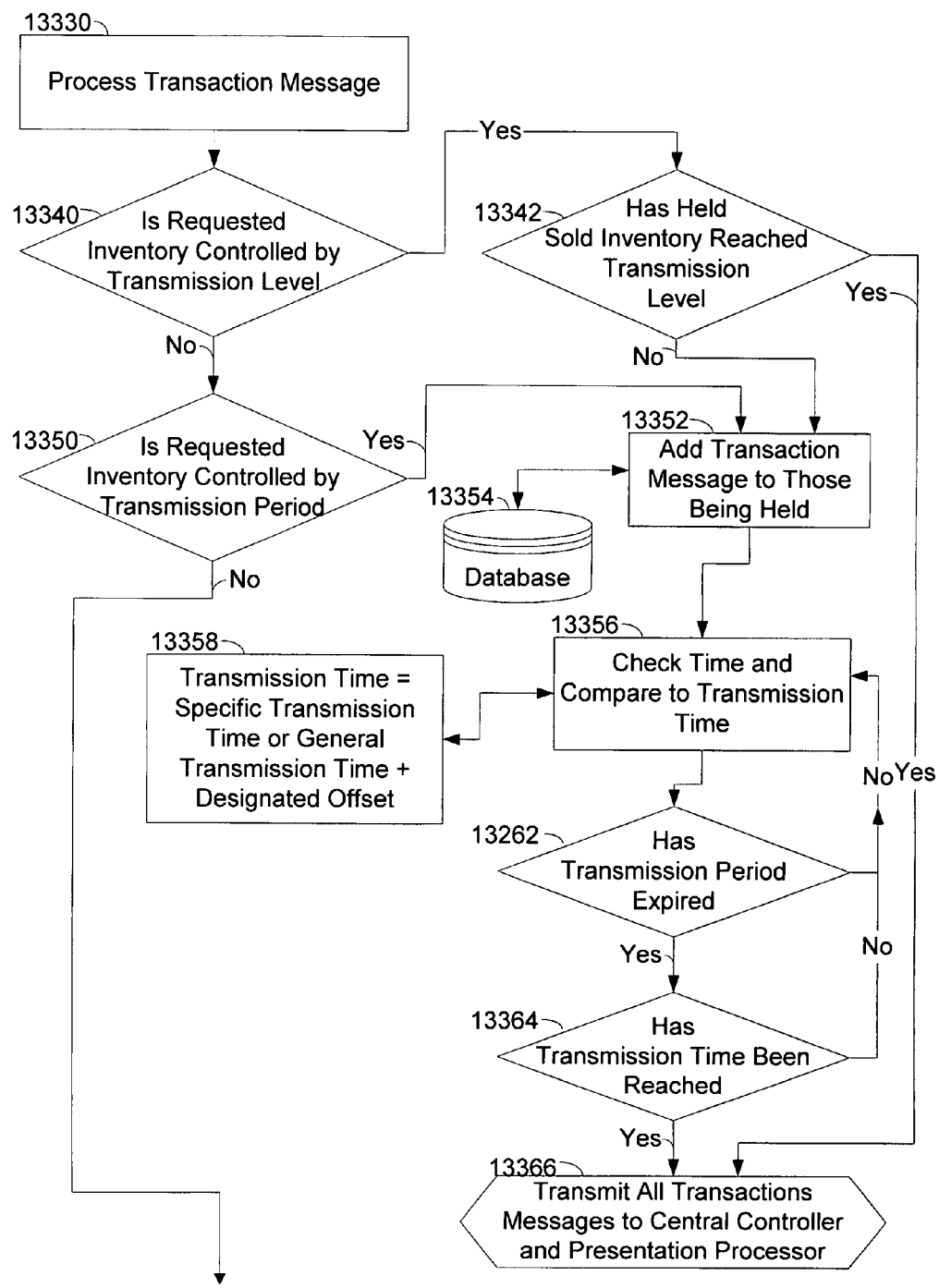
Figure 5F:
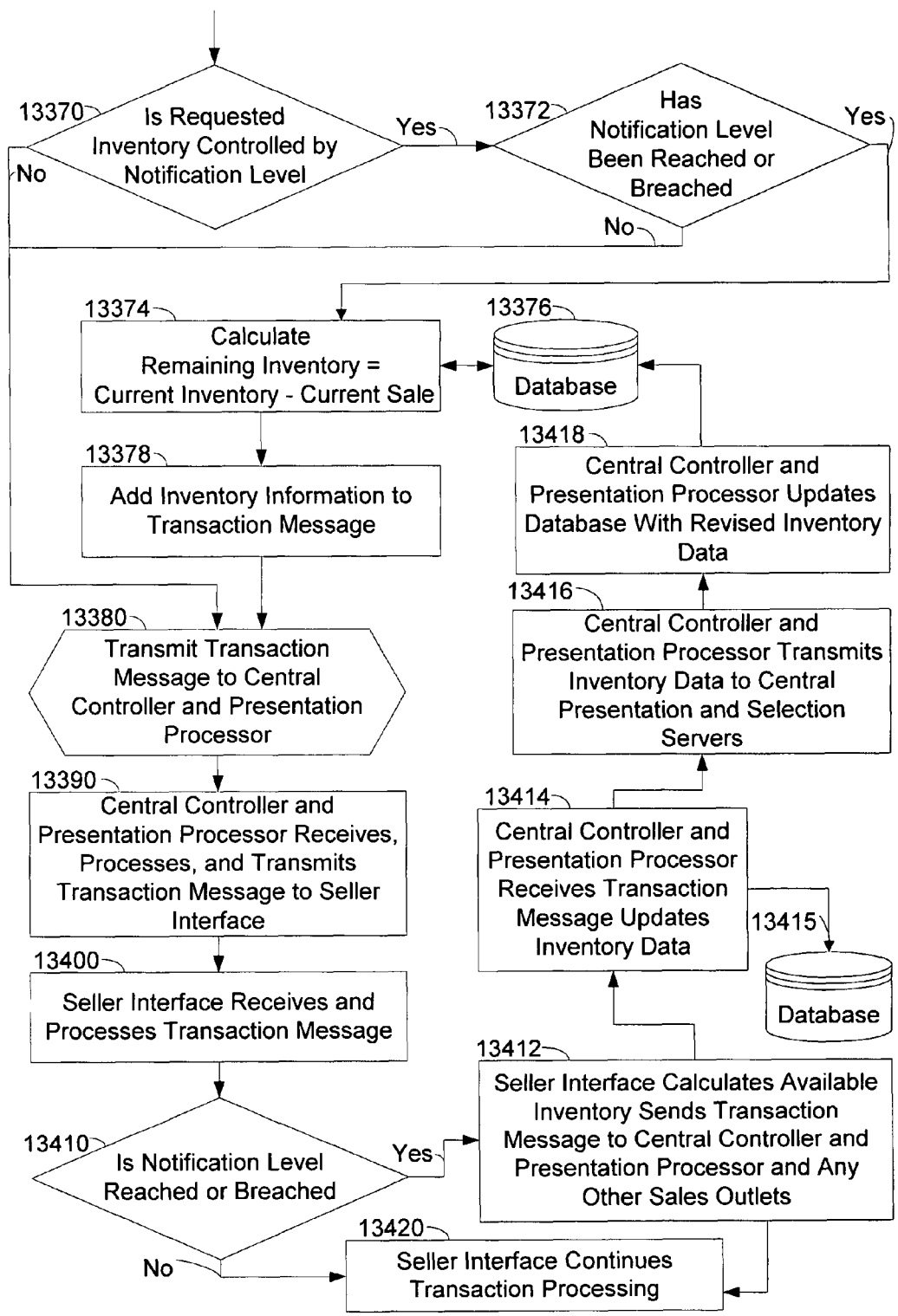

FIG. 5e through 5f is a block diagram showing the Seller's Use of Resource Saver Protocol on Central Presentation and Selection Server 2000 or Other Selling Outlets.

Figure 5G:
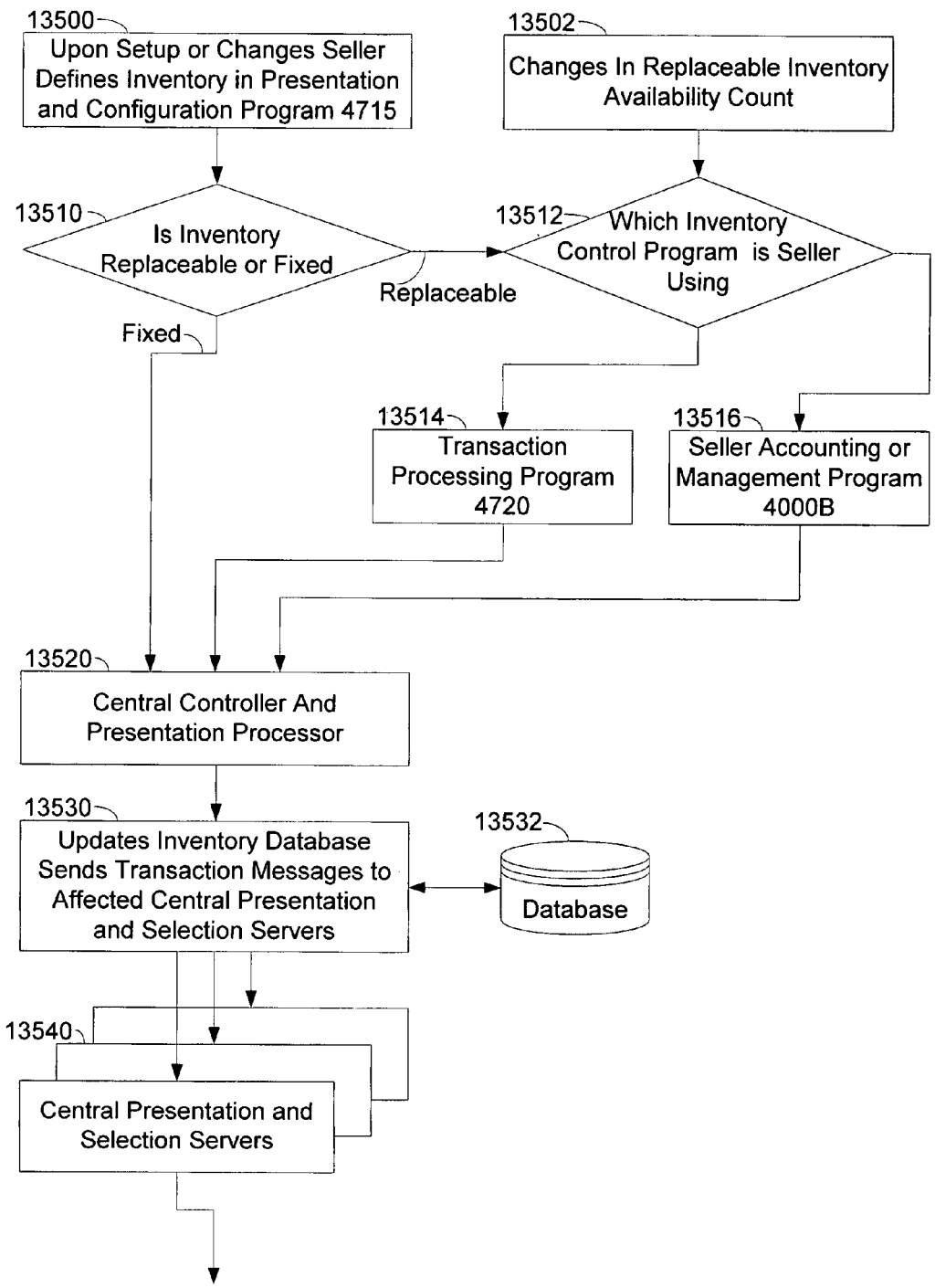
Figure 5H:
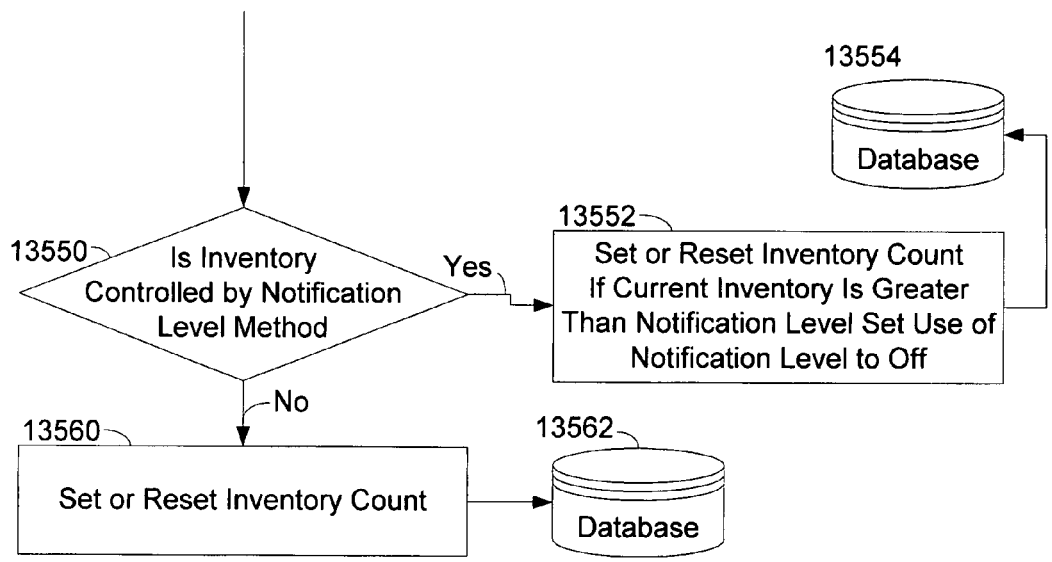

FIG. 5g through 5h is a block diagram showing the Seller's Use of Resource Saver Protocol for Inventory Adjustment or Replacement.

PATENT APPLICATION GLOSSARY

The following are explanations and or definitions of names or descriptors as used in the invention. For the purpose of this invention the following terms have the following definitions. These are meant to aid the reader in understanding the inventors' descriptions of the present invention and its components, design, use, and purpose.

Advertising
Any presentation or effort to inform or influence target demographics or the general public. This includes all media types and methods such as but not limited to audio and visual, print, electronic, multimedia etc.

Algorithm
The method or logic that performs given functions within a program. Typically can be described as a series of information access, comparisons, decisions, choices, and resulting outputs.

Automatic Searches
These are information text-based searches that are conducted of targeted Internet or Intranet sites on a page-by-page basis using either the information contained within the meta tags of each HTML page or full text searches of all content.

Automatic Vendors
Machines that read or scan the Delivery or Network ID Cards, access a database of Buyer information for confirmation of ID, and then dispense a custom printed ticket, pass, admission document, or reservation confirmation showing the appropriate access information. The tickets, passes, admission documents, reservations, or reservation confirmations could then be processed with normal procedures.

Biometric identification
Identification that is accomplished by using an individuals distinctive natural biological differences, such as finger prints, iris scans, full face scans, voice prints, DNA etc.

Buyer
Any person, corporation, partnership, group, or any other legal entity that desires or may desire or consume the purchase, reservation, acquisition, consumption, of items, services, or ideas offered by the Seller either paid for or as a gratuity.

Central Controller
Refers to the Controller part or function of the Central Controller and Presentation Processor 1000

Central Processor
The CPU or main processing computer chip or unit within a given computer. Depending on the operating system a computer must have one but may have more than one CPU thereby increasing the processing speed of the computer.

Client channel
Means, outlet, or avenue of advertising, marketing, distribution, or sales.

Cookies
Information formatted to be delivered or downloaded to the Internet Browser utilized by the Buyer Interface 5000, stored on the Data Storage Device 5500 within the Location for Cookie Storage 5695, and then accessed later by that Internet Browser. This information would thereby provide a carryover of information such as Buyer preferences.

Database
The term Database is used referring not only to the structured or relational storage of data within files, but also to the tables or sub divisions of data storage within those databases or files or any method or system of organizing data for storage and access by computers.

Directory
  A consolidation, accumulation, or compilation of similar, competing, or complementing "Sellers" (see above) that are offered or presented in some logical or systematic presentation allowing "Buyers" (see above) to review, compare, and contrast the offerings or presentations. These directories may or may not allow for direct access or interactive sales or acquisition. These directories may be in any media such as, but not limited to, electronic, Internet, Intranet, CD-ROM, or print.

Dynamic Presentations
  These are presentations that are created when the reader or viewer accesses them. They are typically created in response to queries or actions of the reader or viewer and are generated from database information that resides at the server that is being accessed. (See "Static Presentations")

Editorial and Design Standards
  These are the editorial, design, and style guidelines, standards, restrictions, and other specifications that are specific to each media venue that control the look and content of all presentations within that media venue.

Electronic Directory
  Internet, Intranet, or bulletin board based directories or indexes focusing on narrow based collections of sellers, suppliers, vendors, purveyors, or providers of goods, products, services, information, ideas, etc.

Electronic Mall
  A collection of electronic directories, indexes, "Sellers" (see above), or other Internet or Intranet sites at one place.

Fixed Inventory
  Refers to Inventory that is limited and constant in its availability. One example might be rooms in a hotel. If the hotel has 300 identical rooms, then the fixed inventory is 300 units for each day into the future that the hotel is open for business. Adjustments can be made for units taken off line or made not available for maintenance etc. but rooms cannot easily be added.

Given Instance
  For the purpose of this application the term "Given Instance" refers to a single particular established configuration of the present invention that has been designed to serve a defined demographics of Buyers and/or Sellers. A single copy of the present invention would be an instance of the present invention.

Goods
  Merchandise or wares that are to be sold or transferred.

Identification documents
  Any artificial method of specifically Identifying an individual such as Credit Cards, Drivers License, Identification Cards, Membership Cards, and Academic Identification Cards etc. These documents may be read magnetically, optically or in some other manner to allow for verification.

Independent Presentations Directories and Indexes
  Those directories and indexes, operated by management other than that of a given instance of the present invention, that have associated themselves with one or more Central Presentation and Selection Servers 2000 of the present invention for the purpose of utilizing the content and interactive services of those Central Presentation and Selection Servers 2000.

Index
  Same as "Directory" but with less information or material presented for the "Buyer."

Internet Browser
  Any Client-side program that resides on the Buyer Interface 5000 to facilitate the reading and or viewing or pages or presentations on the Internet or Intranet. Typically pages or presentations are based on the HTML display language or one of its successors or derivatives for presentations. Examples of Browser software are Netscape, Internet Explorer, etc.

Inventory
  Refers in a very broad and general sense to any identifiable measure, item, or unit that can be sold, transferred, conveyed, or reserved. The term inventory can apply to goods, products, services, reservations for services, or any other identifiable unit to be sold, conveyed, or reserved. Units of Inventory may actually be a function of time with the same item being used over and over such as a room in a lodging facility, a seat in a sports stadium, or a table at a restaurant.

Inventory Substitutability
  Inventory (defined above) is used in a very broad sense. The substitutability of those items that make up any given line of inventory being offered within the present invention may not always be clear. Though not always clear, the substitutability of the inventory must be determined and represented by the Seller, who has the clearest understanding of the makeup of the Buyer and their use of the goods, products, and services. If the inventory were a one-of-a-kind item, obviously there can be no substitutability and the inventory is unique. At the other extreme, for example, if the inventory were music CDs, with 1,000,000 copies in stock and another printing anticipated, then the inventory is common and substitutable. In between the extremes is a wide variety of items that are limited in quantity or availability and yet are substitutable. An example of an item that is limited in availability and is substitutable to the Buyer is rooms of a 100-room block at a hotel that are of the same standard (king bed, TV, phone, and desk). Although the rooms are not identical (as the CDs are) due to being on different floors and having different views, they are substitutable to the traveler.

Media
  A means of communicating, delivering, or projecting concepts, ideas, or information to potential buyers, such as radio, television, newspapers, magazines, internet, Intranet, CD-ROMs, directories, brochures, flyers, billboards, bus benches, sky writers, direct mail or any other method or means of reaching a large number of people or a smaller number of targeted potential buyers or consumers.

Media Venues or Media Outlets
  Those physical or virtual locations where presentations are placed or made available to present the information within the framework of the media so that it is accessible by the end users, consumers, viewers, or Buyers. This may mean an Internet directory, a newspaper, a multimedia CD-ROM, a travel guidebook, or any number of other examples.

Near Real Time
  Refers to processing or access that takes place within a time frame that allows for some possibility that human interaction or other process may intercede or interpret that processing or access. For the purpose of this application, Near Real Time is referring to processing or access that take place within time limits that are unlikely to allow interruptions in the normal course of business. As an example, if you have a process that takes place randomly 15 times per day and each process takes within 1 minute due to communications delays, the likelihood of an interruption is approximately 1 chance in 1440 per event.

Network or Delivery ID
  Magnetic, smart, or optical identification cards approved for use within the preferred embodiment of the present invention as identification, or biometric identification, that is used as substitution for the delivery of traditional tickets, to access to facilities, events, or venues.

Network of Computers
  Two or more computers that may communicate either continuously or on-demand for the purpose of sharing processing, transferring information and data.

Non-Resident Media
  Refers to media that is not wholly owned or controlled by the management, operators, or affiliates of the given instance of the present invention but are contracted for, designed, submitted, and controlled through the given instance of the present invention.

On-demand
  Functions, programs, or resources that are called or utilized when needed as opposed to being employed, engaged, or utilized continuously.

Presentation
  Any content intended to inform or influence the viewers or readers of a given media venue. It may be in an advertising, public service, editorial, informational or any other format. It may be text, graphics, audio, multimedia, or a combination of any communication methods.

Products
  Items that are manufactured, assembled, processed or created by the Seller and offered for sale or transfer.

Publishing
  The act of placing or making available the presentation or information within the framework of media venue so that it is accessible by the end users, consumers, viewers, or Buyers. This may mean placing an HTML page on an Internet directory, printing a 12-word classified ad in a newspaper, adding a hotel presentation to a multimedia CD-ROM or guidebook, or any number of other examples.

Reader or viewer client
  The reader or viewer client is the program that computer users use when accessing electronic information servers. The most common of these reader or viewer clients are Netscape Navigator and Internet Explorer, which are Internet Browsers.

Real-time
  Refers to processing, communications, information transfer, or access that takes place within fractions of a second so that it is humanly impossible to discern, intercede or interpret that processing, communications, information transfer, or access. (See "Near Real Time".)

Resident Media
  Refers to media that is wholly owned or controlled by the management, operators, or affiliates of the given instance of the present invention.

Replaceable Inventory
  This is inventory that can either be purchased, manufactured, produced, or added to easily by the Seller thereby changing the inventory count and availability to the Buyer at any given time.

Reservation
  A promise or commitment made by the Buyer and held by the Seller, to take, use, consume, utilize, attend, or enjoy a unit of inventory. Usually reservations are made by Buyers to reserve a time and facility to consume goods, products, or services.

Seller
  A person, corporation, partnership, group, or any other legal entity that desires representation of its goods, products, services, reservations for services, ideas, views, or any legal intent or desire to be made public and offered for sale, exchange, trade, or distribution either paid for or free.

Seller type
  Refers to a category of Sellers that are offering comparable or similar information, products, or services classified by that type of information, product, or service.

Static Presentations
  Presentations that are fixed in time as to the content that they display or convey to the client reader or viewer. They are created and then set into a presentation framework that can be accessed. These presentations are currently the most familiar to all of us now and are the standard presentations on the Internet or most Intranets. (See "Dynamic Presentations")

Transaction Message
  Any unit of information that is transferred or communicated between clients, components, or programs of the present invention or third-party compatible clients, components, or programs.

Services
  Duties or work offered to be performed for the buyer or consumer, often but not necessarily specialized or professional in nature.

Standalone Presentations
  Refers to independent presentations that are not part of organized Directories or Indexes of complementing and/or competing products or services.

Traffic
  Generally refers to the number of times users access Internet or Intranet sites or presentations. More specifically, traffic refers to how many times Buyers access an electronic presentation directory, index, server, or instance of the present invention.

Transmission Level
  One of the variables set within the Resource Saver Protocol for use with common inventory. A predetermined number of units that triggers the immediate transmission of inventory sold or reserved. This count is the total inventory sold or reserved within the Transaction Messages, that are being held awaiting transmission from the Central Presentation and Selection Server 2000 or any other sales outlet to the Central Controller and Presentation Processor 1000.

Transmission Time Control
  One of the variables set within the Resource Saver Protocol for use with common inventory. Transmission Time Control is a setting that controls the time of transmission for held transaction messages from the Central Presentation and Selection Server 2000 or any other sales outlet to the Central Controller and Presentation Processor 1000

Transaction Period
  One of the variables set within the Resource Saver Protocol for use with common inventory. A setting to control the maximum period in hours that the Central Presentation and Selection Server 2000 or any other sales outlet may hold transaction messages prior to transmitting them to the Central Controller and Presentation Processor 1000.

Will Call

The act of, or a reference to, the picking up of tickets, passes, admission documents, reservations, or reservation confirmations or other access documents from a particular department of a venue for the purpose of being admitted to an event at that venue.

DETAILED DESCRIPTION OF THE INVENTION

It should be noted that although specific hardware or software components may be referenced within this detailed description, newer, improved, or successor generations of given hardware or software should be substituted as available to increase reliability, performance, or cost effectiveness or to take advantage of new or replacement technology.

The method and apparatus of the present invention will be discussed with reference to FIGS. 1a, 1b, 2a, 2b, 2c, 2d, and 2e. In one embodiment, the present invention includes a Central Controller and Presentation Processor 1000, Central Presentation and Selection Server 2000, Seller Interface 4000, Buyer Interface 5000, and Media Interface 6000. Each of these components includes hardware, software programs, databases, communications programs and devices. The present invention edits and structures data and information from an individual seller, at a single location, into consistent, designed and controlled presentations. These presentations can be simultaneously published or displayed in a variety of traditional and electronic media as chosen by the Seller through the Seller Interface 4000. The presentations can also be integrated into interactive sales-enabled standalone presentations or as unified presentations of complementing and or competing products, goods, and services. In addition, the present invention allows buyers to purchase, commit to purchase, or reserve products, goods, and services in a real-time or near real-time environment. This also allows, where appropriate, for an alternative to the advance physical delivery of tickets, passes, admission documents, reservations, reservation confirmations, or other physical methods of controlling access or proving purchase or reservation. The present invention also allows sellers to control inventory of common, unique, or time-sensitive products, goods, and services with reduced computer and communications resources while decreasing the time necessary for buyers to confirm the availability and then confirm the reservation, purchase, or commitment of purchase of that inventory. The interactive portion of the present invention enables the buyer to view or compare the products, goods, and services from a single source or a variety of sellers and then purchase or reserve those products, goods, and services in a real or near real-time environment. Where appropriate, in an embodiment of the present invention, access to events, venues, reserved services, and other access controlled products or services can be accomplished without the requirement of delivery for any tickets, passes, admission documents, reservations, reservation confirmations, or other access documents.

Design and Structure of the Present Invention

The design and structure of the first embodiment of the method and apparatus of the present invention is diagramed with reference to FIG. 1a, 1b, 2a, 2b, 2c, 2d, and 2e. Shown in FIG. 1a, the components of the present invention are presented as a "1 each" single-level diagram of the interaction between the components. The components are the Central Controller and Presentation Processor 1000, the Central Presentation and Selection Server 2000, Seller Interface 4000, Buyer Interface 5000, and Media Interface 6000. Sub components of Seller Interface 4000 are Seller 4000A as client, Seller Accounting or Management Program 4000B, and Optional On Site Verification of Purchase Magnetic, Optical Card Reader or Biometric ID Reader with Ticket or Confirmation Printer 4350. Sub components and events of Buyer Interface 5000 are Buyer 5000A as client and Buyer Arrives at Facility or Event for Admission or Check-in 5000B as an event.

Communication between the components is accomplished by use of on-demand, direct dial-up public phone lines, network, or Internet connection between Seller Interface 4000, Media Interface 6000, and Central Controller and Presentation Processor 1000; standard Internet connections between Buyer Interface 5000 and Central Presentation and Selection Server 2000; and a high-speed network or Internet connection between Central Controller and Presentation Processor 1000 and Central Presentation and Selection Server 2000. Connections between components may be accomplished by any combination of public switched phone network, cellular, Personal Communication System, dedicated data lines, microwave, private network, shared data network, satellite network, or any other means that will provide data transfer. Seller Interface 4000, Media Interface 6000, and Buyer Interface 5000 represent components that are limited in number only by the capacity of both the Central Controller and Presentation Processor 1000 and Central Presentation and Selection Servers 2000 and the associated communications and data transfer methods. The present invention allows for the modular expansion of capacity by duplicating any component or portions of a component requiring additional capacity and running the new component in parallel with the original existing component. In the embodiment, there is one Central Controller and Presentation Processor 1000 and at least one Central Presentation and Selection Server 2000; however, the Central Controller and Presentation Processor 1000 can support more than one Central Presentation and Selection Server 2000. An example of this embodiment is shown on FIG. 1b. The Central Controller and Presentation Processor 1000 and the Central Presentation and Selection Server 2000 are separate but co-located in the embodiment, however, they could be remotely located with a high-speed data connection. Both the Central Controller and Presentation Processor 1000 and the Central Presentation and Selection Server 2000 could also coexist on the same computer in some specific low traffic or low transaction volume embodiments. In the embodiment, multiple Seller Interface 4000, Independent Presentation 3000, Media Interface 6000, and of course Buyer Interface 5000 are served, with the only limitations being the capacity of the associated processing, data storage, and communications hardware that can, as indicated above, be expanded.

Figure 2A:
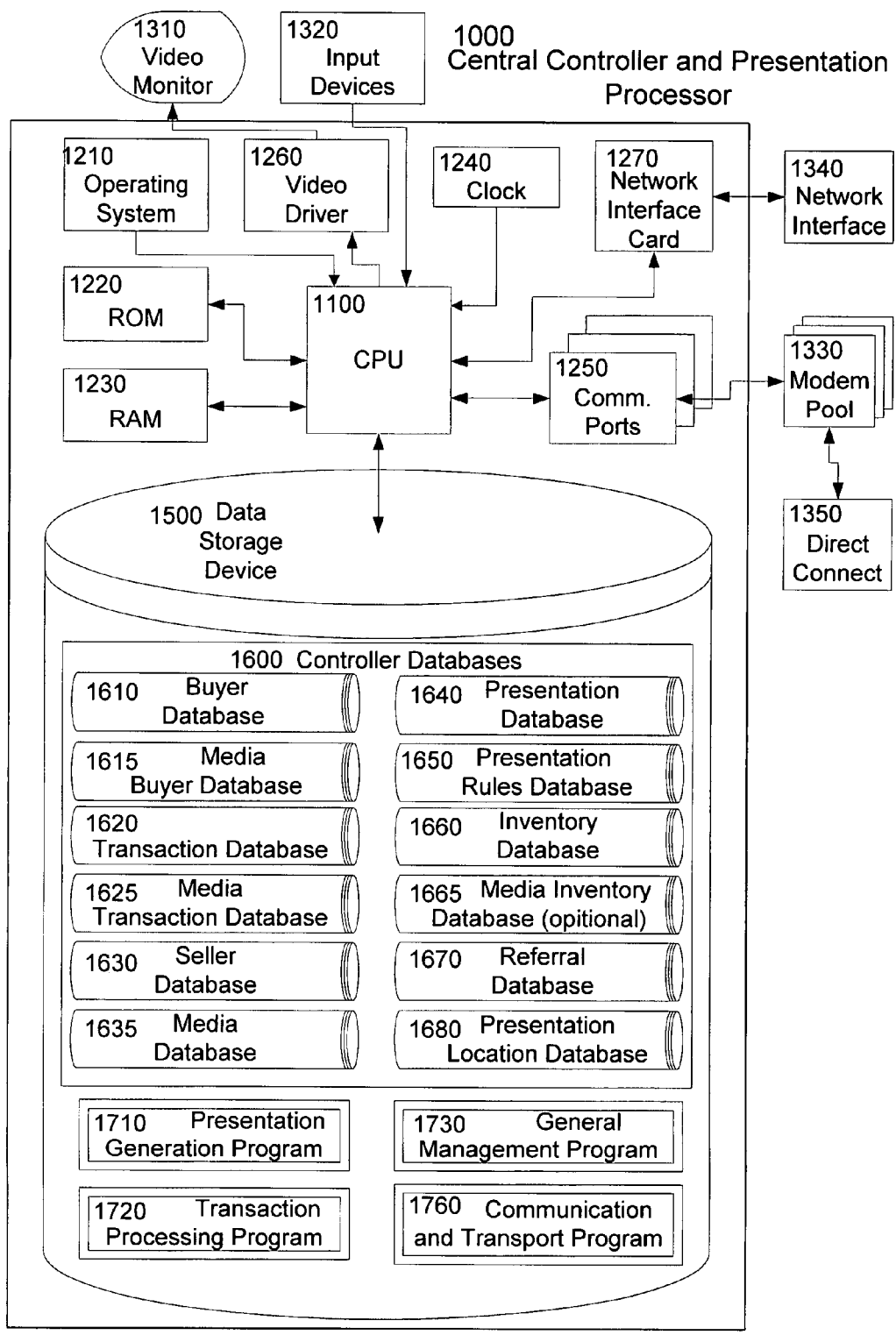
FIG. 2a is a block diagram showing one embodiment of the Central Controller and Presentation Processor.

FIG. 2a diagrams the Central Controller and Presentation Processor 1000, which includes a central processor (CPU) 1100, operating system 1210, ROM 1220, RAM 1230, clock 1240, communication ports 1250, video driver 1260, network interface card 1270, video monitor 1310, input devices 1320, modem pool 1330, network interface 1340, and data storage device 1500.

A personal, workstation, or server-grade computer with sufficient processing capacity, program and data storage capacity, and memory may be used as a Central Controller and Presentation Processor 1000. The CPU 1100 may be a single CPU or multiple CPUs as necessary to provide sufficient processing capacity. The Intel Pentium II Processor with a speed of 300 MH or any comparable capacity processor that is compatible with the chosen operating system could be used as CPU 1100. In the embodiment of the present invention, the operating system 1210 should be one that allows for multiple processors, such as Windows NT by Microsoft, so that increases in utilization of the present invention can be handled with increases of processing capacity. The video monitor 1310 is a standard "SVGA" color monitor or its equivalent. The input devices 1320 are a standard keyboard and mouse or other replacement items. The communication ports 1250 are RS232 serial ports with 16550 UART or alternatives that provide comparable connections to the Modem Pool 1330. The Modem Pool 1330 may be made up of modems such as the US Robotics 56K external made by 3Com Inc or any high-grade multi-modem equivalent. The Modem Pool 1330 should be made up of a sufficient number of modems to handle both incoming and outgoing messages from the Seller Interface 4000 using on-demand modem communications. If a given instance of the present invention generates sufficient modem traffic, the Modem Pool 1330 and its overhead and functions may be separated from the Central Controller and Presentation Processor and placed in a Modem Server to handle the Modem Pool 1330 and the associated communications overhead.

The data storage device 1500 may be one or a combination of standard hard disks, optical storage devices, CD-W drives, CD-RW drives, DVD, flash memory, magnetic tape, or other data storage devices. It must be of sufficient capacity to store all the programs and data necessary for the present invention as well as provide for future capacity needs. In the embodiment, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Central Controller and Presentation Processor 1000 and the Central Presentation and Selection Server 2000 FIG. 2*b*. In a catastrophic destruction of either the Central Controller and Presentation Processor 1000 or the Central Presentation and Selection Server 2000 FIG. 2*b*, the most critical data can be recovered from the surviving component in order to rebuild the lost data and ensure the integrity of all transactions.

The data storage device 1500 in the embodiment of the present invention contains relational databases controlled and managed by database software such as Microsoft SQL Server 7 by Microsoft Inc. Data used in the client control, the generation of presentations, and the processing of inventory sales in the present invention are contained within the Controller Databases 1600. The Controller Databases are the Buyer Database 1610, Transaction Database 1620, Media Transaction Database 1625, Seller Database 1630, Media Database 1635, Presentation Database 1640, Presentation Rules Database 1650, Inventory Database 1660, Referral Database 1670, the Presentation Location Database 1680, and any other databases necessary or desired to service the Buyers and Sellers.

Figure 1A:
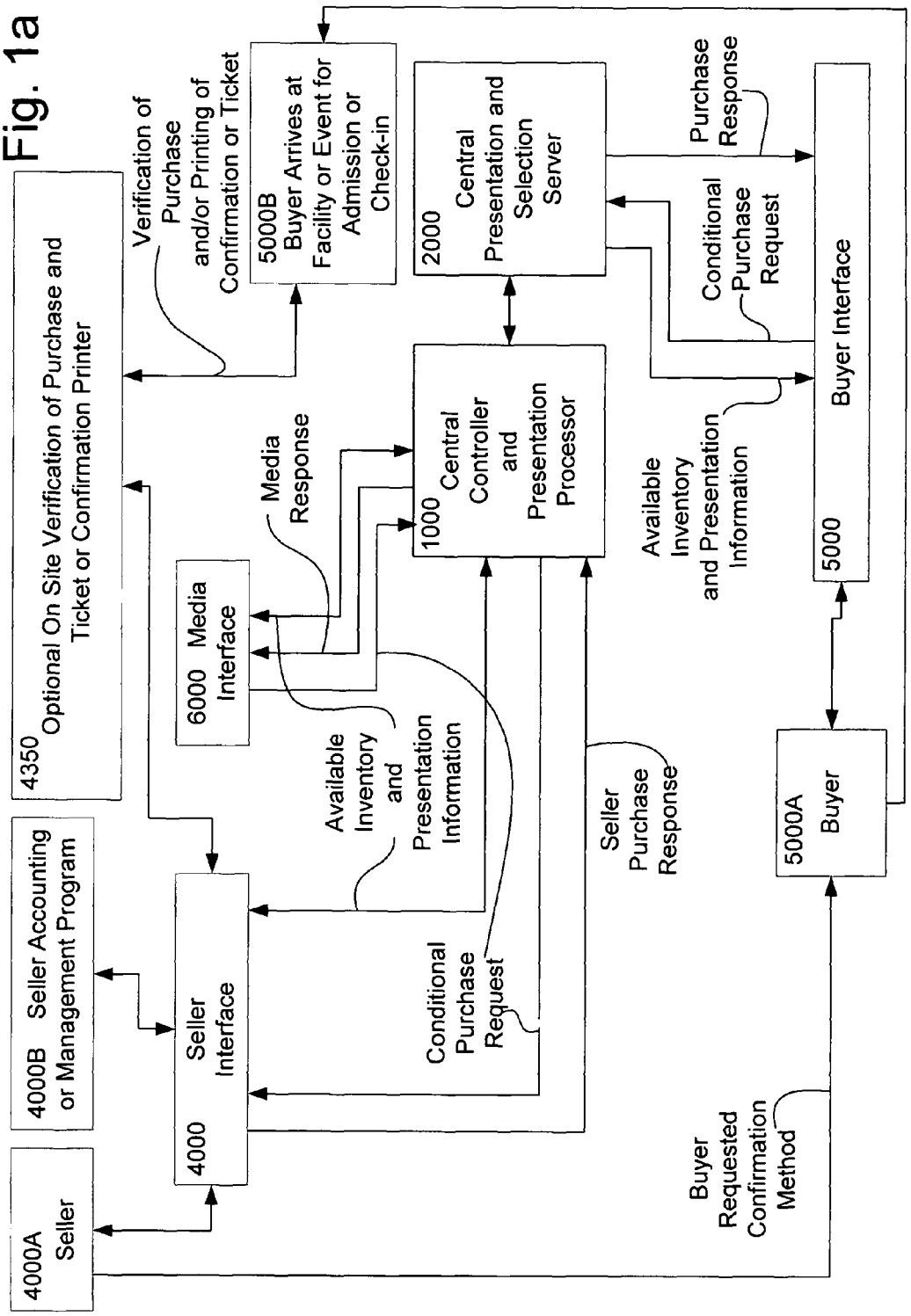
FIG. 1a diagrams an embodiment of the present invention with a single level of service without Independent Directories.
Figure 1B:
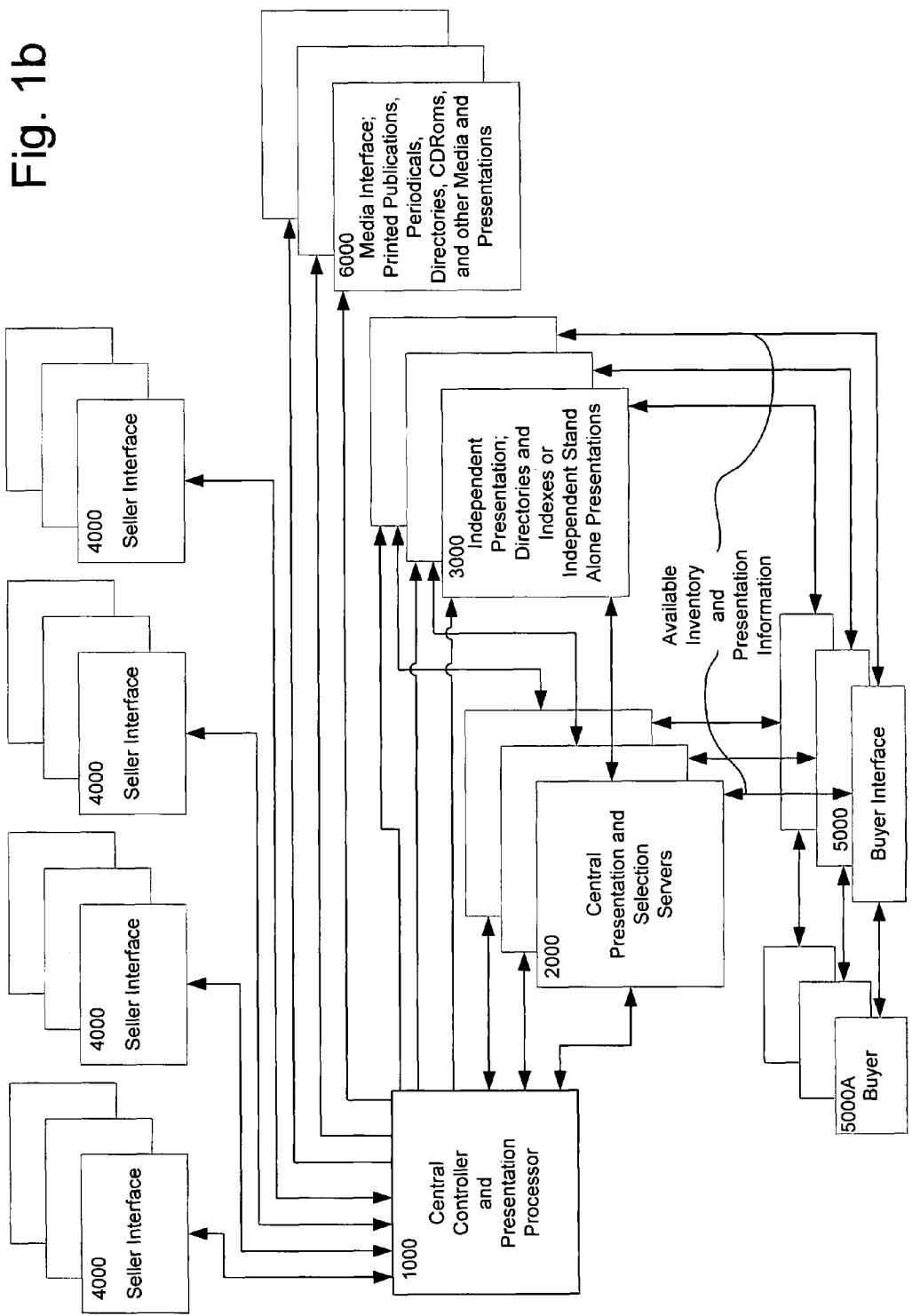
FIG. 1b diagrams an embodiment of the present invention with a sample depth of service of Sellers, Buyers, Presentation and Selection Servers, Independent Presentations, and Media.

The Buyer Database 1610 maintains data on Buyers who make interactive purchases or reservations of the products, goods, or services offered by the Sellers over the Central Presentation and Selection Server 2000 FIG. 2*a* or other Independent Presentation Directories and Indexes 3000 FIG. 1*b*. The Buyer Database 1610 will have data fields containing Buyer name, network or delivery ID, physical address, phone, email address, credit card information, and any other information deemed necessary to support the Buyers and the Seller's required buyer information. The Buyer has the option to input the information when joining the network prior to attempting a purchase. As an alternative, the Central Presentation and Selection Server 2000 will prompt the Buyer for the information after the Buyer has found a desired product, good, or service to purchase but before forwarding the purchase transaction to the Central Controller and Presentation Processor.

The Media Buyer Database 1615 maintains data on Media Buyers (Sellers) who make selections and purchases of media products or services offered by the Media through the Central Controller and Presentation Processor 1000 and the Seller Interface 4000. The Media Buyer Database 1615 will have data fields containing Media Buyer name, physical address, phone, email address, credit card information, and any other information deemed necessary to support the Media Buyers and the requirements of the Media.

Figure 2B:
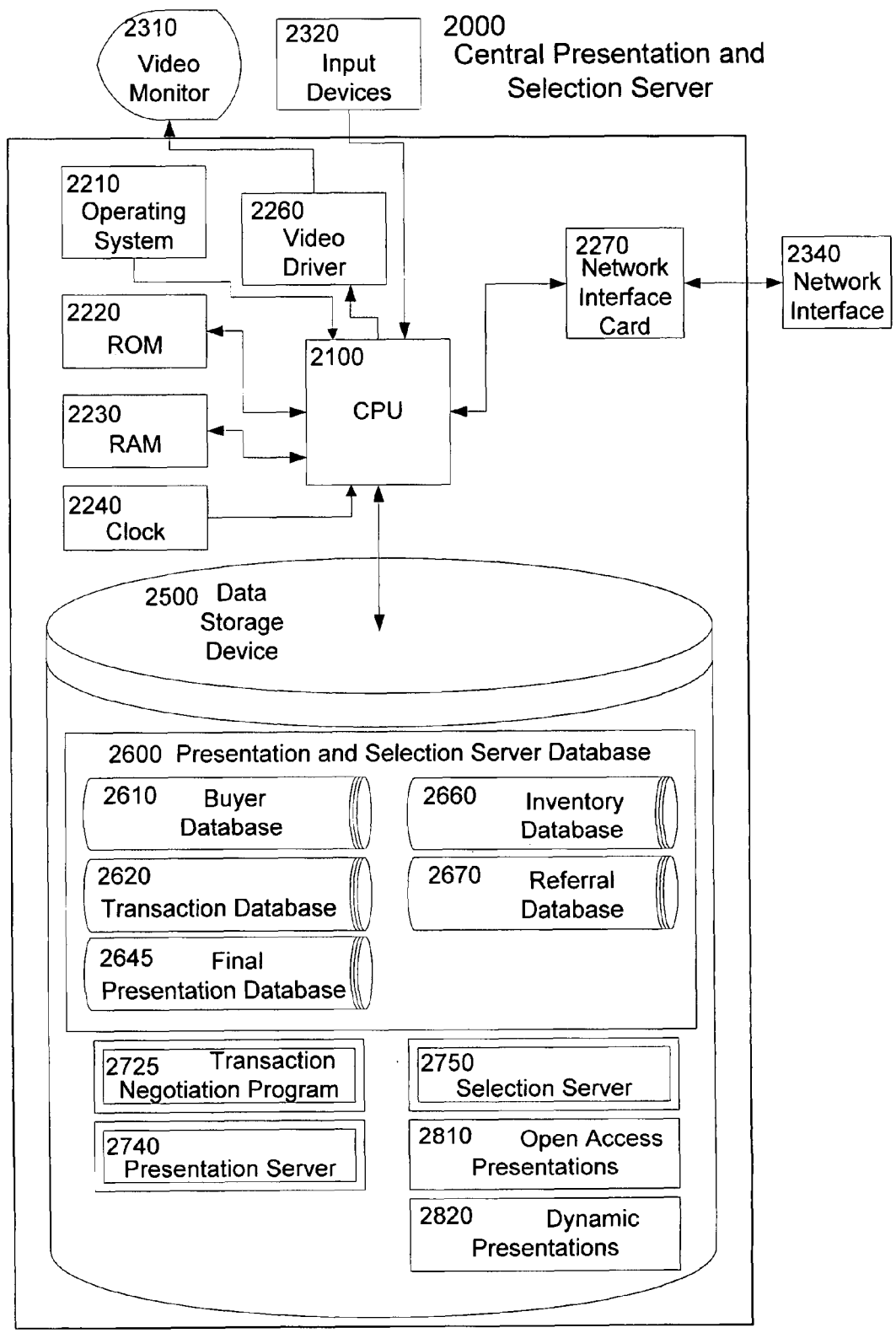
FIG. 2b is a block diagram showing one embodiment of the Central Presentation and Selection Server.

The Transaction Database 1620 maintains data on the Buyers' interactive purchases or reservations of products, goods, or services offered by the Sellers over the Central Presentation and Selection Server 2000 FIG. 2*b* or other Independent Presentation Directories and Indexes 3000 FIG. 1*b*. The Transaction Database 1620 will have data fields containing information that relates to the purchases or reservations made by the Buyer. The specific fields within the Transaction Database 1620 will depend on the type of Seller and their product, goods, or service, but would always contain the field for the purchase or reservation tracking ID. As an example, if an embodiment of the present invention were configured to present lodging facilities, the Transaction Database 1620 might contain fields for Buyer ID, room type or specific room, bed type, check-in date, check-out date, number of adults, number of children, smoking or non-smoking, room rate paid, taxes paid, responses to requests, and any special requests such as extra pillows, late check-in, airport pickup service, etc. The information in the Transaction Database 1620 is the result of each requested purchase made with the Central Presentation and Selection Server 2000 FIG. 2*b*, which is then passed to the Central Controller and Presentation Processor 1000 and then to the Seller Interface 4000 FIG. 2*c*.

The Media Transaction Database 1625 maintains data on the Sellers' interactive purchases of non-resident media presentations offered by the management or operators of that given instance of the present invention through the Seller Interface 4000. The specific fields within the Media Transaction Database 1625 will depend on the type of media. As one example, if the non-resident media were a newspaper, the Media Transaction Database 1625 might contain publishing deadlines, placement or section requirements, rate paid, taxes paid, and any other information necessary to support that given media.

The Seller Database 1630 will have data fields containing information that relates to the Sellers who have created presentations for traditional media or offer their products, goods, and services interactively over the Central Presentation and Selection Server 2000 or other Independent Presentation 3000 FIG. 1*b*. The specific fields within the Seller Database 1630 will cover all necessary information on the Seller for use both within the presentations created and by the managers of the present invention for the management of the Seller's account. The Seller Database 1630 will have data fields containing company name, contact name, marketing name, physical address, phone, email address, credit card or other payment information, contract dates, product or reservation types for presentation, data transfer modem numbers, third-party accessible management software, and any other information fields deemed necessary to support the proposed sellers. The seller will input this information when first accessing the present invention and joining as a Seller. The Seller Interface 4000 FIG. 2c, specifically the Configuration and Presentation Program 4715 FIG. 2c, will prompt the Seller for the necessary information as well as obtain an agreement to a contract for the services of the present invention and the distribution and payment of all presentations.

The Media Database 1635 will have data fields containing information that relates to the Non-Resident Media organizations that have contracted with the management or operators of the given instance of the present invention to offer their services to the Sellers that are associated with the given instance of the present invention. The Media Database 1635 will have data fields containing company name, contact name, marketing name, physical address, phone, email address, contract dates, data transfer modem numbers, third-party accessible management software, and any other information fields deemed necessary to support the Non-Resident Media.

The Presentation Database 1640 will have data fields containing information that relates to the Seller's choice of media or venues as well as the presentation of their products, goods, or services offered to the Buyers. This information is the majority of the data that, when combined with portions of the information within the Seller Database 1630 and the Presentation Rules Database 1650 and processed through the Presentation Generation Program 1710, creates the presentations that are transmitted to the Central Presentation and Selection Server 2000 for presentation to the Buyer or to other non-resident media to be published. The data fields held by Presentation Database 1640 will vary from seller type to seller type, depending on the design of the presentations and the types of resident and non-resident media offered by the given instance of the present invention. As an example, if an embodiment of the present invention were configured to present lodging facilities, the Presentation Database 1640 might contain fields for facility description, facility photos, room descriptions, room photos, facility amenities, room amenities, room service menu, payment types accepted, meeting and reception services offered, meeting rooms, photos of meeting rooms, policies, rates, special package offers, media or venue choices, and any other information to assist in the presentation and sale of the lodging. The Seller Interface 4000, specifically the Configuration and Presentation Program 4715 FIG. 2c, will prompt the Seller for the necessary information for the presentations and non-resident media they have selected. The data relationship between the Presentation Database 4640 FIG. 2c, which is a part of the Seller Interface 4000 FIG. 2c, and the Presentation Database 1640 is one of continual synchronization of the Seller's information. The Presentation and Configuration Program 4715 FIG. 2c and the Communication and Transport Program 4760 maintain that synchronization. The Seller makes any updates or corrections to the presentation within the Presentation and Configuration Program 4715 FIG. 2c, which then updates the Presentation Database 4640 FIG. 2c. The Communication and Transport Program 4760 FIG. 2c sends those updates or corrections to the Central Controller and Presentation Processor 1000 for updating to the Presentation Database 1640. The Presentation Generation Program 1710 in conjunction with the Presentation Database 1640 then creates the new or updated presentations for publishing on the Central Presentation and Selection Servers or the appropriate non-resident media.

The Presentation Rules Database 1650 will have data fields containing information that controls and limits the style and editing of the presentations created by the Presentation Generation Program 1710. The Central Controller and Presentation Processor 1000 administrator or management of that given instance of the present invention inputs this information based on the types of media and interactive presentations that are supported by that given instance. For the non-resident media components of the present invention this information is submitted and updated directly by means of the Media Interface 6000 and specifically the Media Configuration Program 6715. The data fields held by the Presentation Rules Database 1650 will vary from seller type to seller type, as well as from one media type to another, depending on the design of the presentations. Some of the fields that might be maintained are presentation templates; blocked words; blocked phrases; blocked references; presentation cost and options; publication dates and deadlines; blocked URLs; grammar guidelines; spelling dictionaries; presentation size restrictions; photo or graphics specifications such as size, compression, and file format; and any other guidelines, benchmarks, or controlling algorithms. The data within the Presentation Rules Database 1650 will be synchronized with the Presentation Rules Database 4650 FIG. 2c stored on the Seller Interface 4000 FIG. 2c. This synchronization will take place by the sending of updates from the Central Controller and Presentation Processor 1000 to the Presentation and Configuration Program 4715 FIG. 2c, which then updates the Presentation Rules Database 4650.

The Inventory Database 1660 will have data fields containing information that monitors and controls the inventory of products, goods, and services offered for sale by the Sellers within the interactive sales portion of the present invention. The data fields held by the Inventory Database 1660 will vary from seller type to seller type, depending on the type of products, goods, or services that are being sold or reserved. As an example, if an embodiment of the present invention were configured to present lodging facilities, the Inventory Database 1660 might contain fields for Buyer ID, types of rooms, number of rooms available for each type, blocked rooms, blocked dates, room rates, exception date rates, and any other fields necessary to present and control that room inventory.

The Media Inventory Database 1665 (optional) will have data fields containing information that monitors and controls the media inventory offered by the Non-Resident Media to the Sellers. The data fields held by the Media Inventory Database 1665 (optional) will vary from media seller type to media seller type, depending on the type media supported by the given instance of the present invention. As an example, if an embodiment of the present invention were configured to offer a given newspaper as a Non-Resident Media the Inventory Database 1665 (optional) might contain fields for number display ads available per size, number of classified lines available, number of color pages available, and any other fields necessary to present and control that media inventory.

The Referral Database 1670 will have data fields containing information from the Sellers that refers Buyers to other sources of the same products, goods, or services offered when a given Seller cannot meet the wishes or needs of the Buyer. The information within the Referral Database 1670 is provided by the Seller through prompting by the Presentation and Configuration Program 4715 FIG. 2c. This information is intended and designed to provide the Buyer with alternative sources when the products, goods, or services offered by the Seller interactively are either not available or do not meet the needs of the Buyer. The data fields held by the Referral Database 1670 will vary from seller type to seller type, depending on the type of products, goods, or services that are being sold or reserved. As an example, if an embodiment of the present invention were configured to present lodging facilities, the Referral Database 1670 might contain fields for other alternative accommodations, alternative dates, or alternative lodging facilities. An embodiment of the present invention configured to present professional services might contain alternative professionals or associates that might be acceptable to the Buyer.

The preferred embodiment of the Central Controller and Presentation Processor 1000 has a Presentation Generation Program 1710, Transaction Processing Program 1720, General Management Program 1730, Communication and Transport Program 1760, and other programs as necessary.

The Presentation Generation Program 1710 utilizes the information submitted by the Sellers and held in the Presentation Database 1640, Inventory Database 1660, and Seller Database 1630. The Presentation Generation Program 1710 uses these databases to create the requested presentations for the various desired resident or non-resident media as well as those presentations necessary for the interactive Central Presentation and Selection Servers 2000 with its interactive sales presentations, using the Presentations Rules Database 1650 for style and control guidelines. It should be noted that in the preferred embodiment of the present invention, the same rules and guidelines contained in the Presentation Rules Database 1650 are also held in the Presentation Rules Database 4650 FIG. 2c, which is part of the Seller Interface 4000 FIG. 2c. With the same rules and guidelines as those in the Presentations Rules Database 1650 applied and enforced during data input at the Seller Interface 4000 FIG. 2c module, no modification or editing should be necessary at the Central Controller and Presentation Processor 1000 module. Although the same rules and guidelines are applied and enforced at Seller Interface 4000 FIG. 2c module as at the Central Controller and Presentation Processor 1000 module, both processes should be utilized to ensure consistency and quality control. After the initial setup and publishing, the Presentation Generation Program 1710 automatically re-creates presentations either in the event of changes to the data for the Seller which affect any given presentation or upon the addition or deletion of any Seller. While creating or updating the Sellers' presentations, the Presentation Generation Program 1710 will determine which portions of the general presentation framework and structure on the overall directory or index require updating and republishing. This determination is made on a case-by-case basis for each non-resident media presentation requested by the Seller as well as for any interactive presentation on the Central Presentation and Selection Servers 2000 FIG. 2b. This embodiment of the present invention allows the Seller to determine the urgency of original or revised publishing of presentations, depending on the media and the accessibility of republishing. With the present invention, there are two publishing levels of processing. With the choice of "Urgent Publishing," the Presentation Generation Program 1710 would immediately process and publish the Seller's presentation to those non-resident media or Central Presentation and Selection Servers 2000 that are accessible for updating, but the Seller would be surcharged for this service. The Seller's second choice is "Standard Publishing," which does not carry a surcharge. This "Standard Publishing" would be performed in the normal schedule of publishing for the non-resident media. "Standard Publishing" for any Central Presentation and Selection Server 2000 presentations would be done when the Central Controller and Presentation Processor 1000 and the Central Presentation and Selection Servers 2000 FIG. 2b are at their lowest processor and network loads in handling the Buyers' requests and transactions. This economic choice gives a solution to the Seller who truly requires an immediate publishing of data while encouraging the bulk of the publishing to be done during times with less processor load. In this embodiment of the present invention, the Presentation Generation Program 1710 would be set to immediately process any "Urgent Publishing" request and any associated required structures. All other "Standard Publishing" would be processed as a batch at a preset low-traffic or low-utilization time for the Central Controller and Presentation Processor 1000 and the Central Presentation and Selection Server 2000 FIG. 2b. In this embodiment, the Central Controller and Presentation Processor processes the publishing function in the following order: all new Sellers' presentations, all Sellers' updates, then all associated structure and presentation frameworks.

With this embodiment of the present invention, the Transaction Processing Program 1720 is responsible for processing the transaction messages of all interactive sales and/or reservation of products, goods, or services offered by the Sellers and all media selections made by the Sellers from the offerings by the resident and non-resident media.

Figure 2C:
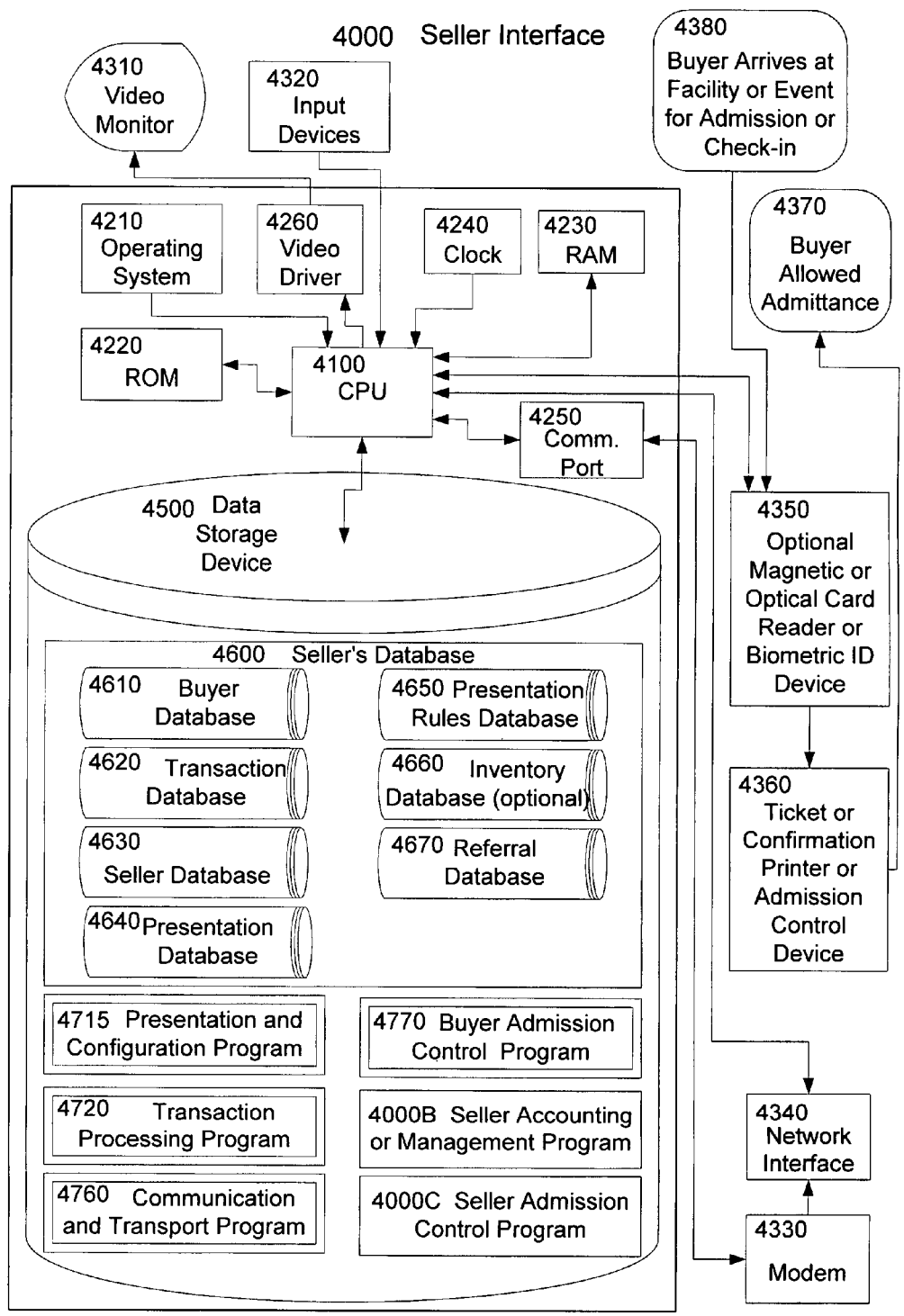
FIG. 2c is a block diagram showing one embodiment of the Seller Interface.

The Transaction Processing Program 1720 confirms available inventory and rates/pricing, updates any other Central Presentation and Selection Servers 2000 FIG. 2b and Independent Presentations Directories and Indexes 3000 FIG. 1b if necessary, updates databases, and creates and sends the transaction message to the Seller Interface 4000 FIG. 2c. The transmission of transaction messages from the Central Controller and Presentation Processor 1000 to the Seller Interface 4000 FIG. 2c takes place immediately upon processing, as there is no provision for holding those messages at this level. New Media presentation selections of the non-resident media offerings made by the Sellers are processed immediately upon receiving them from the Seller Interface 4000 and are sent to the Media Interface 6000.

With this embodiment of the present invention, the General Management Program 1730 is responsible for the business accounting, billing and collections, reporting, trend analysis, general Seller maintenance, and any other necessary functions.

Figure 2D:
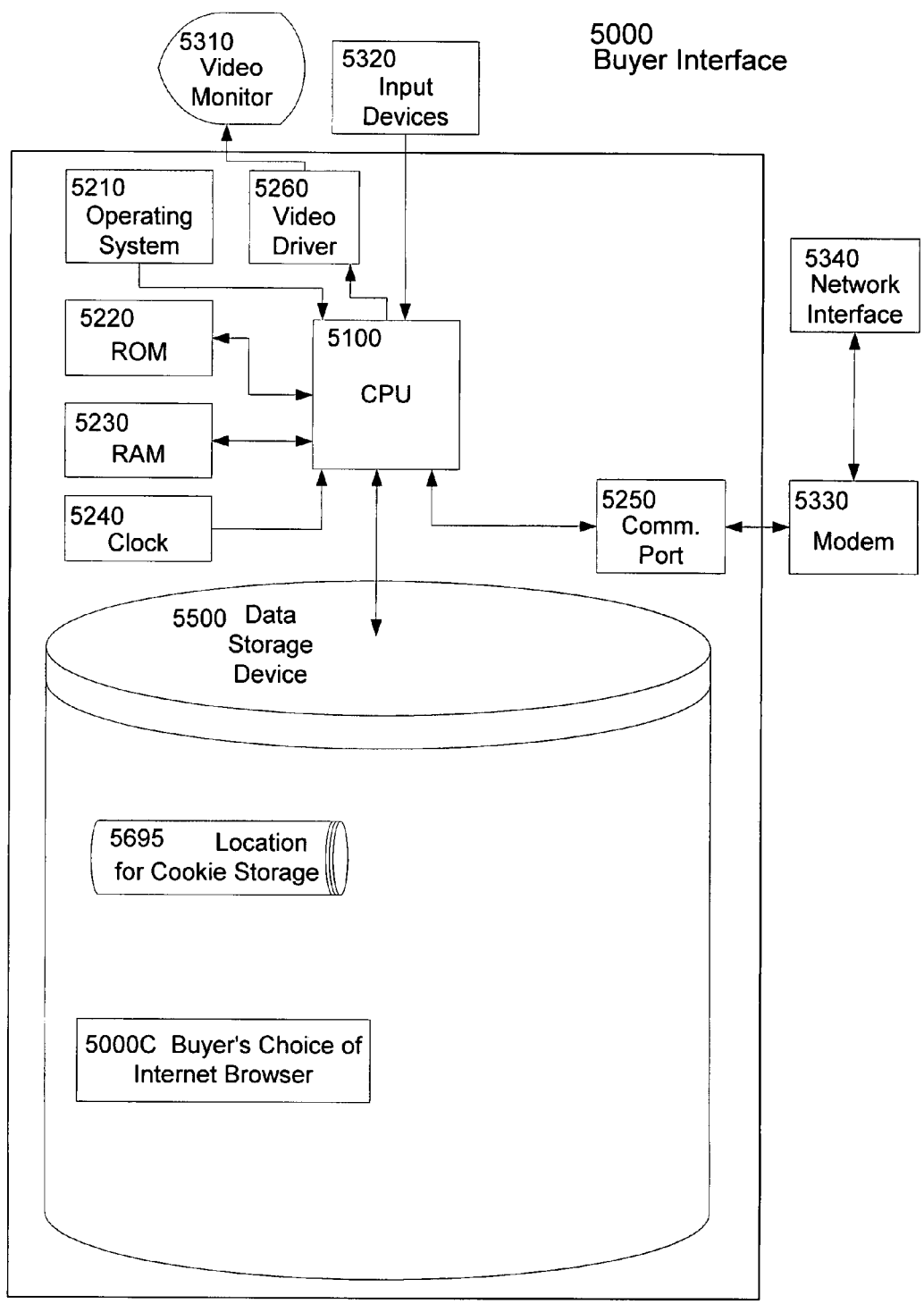
FIG. 2d is a block diagram showing one embodiment of the Buyer Interface.
Figure 2E:
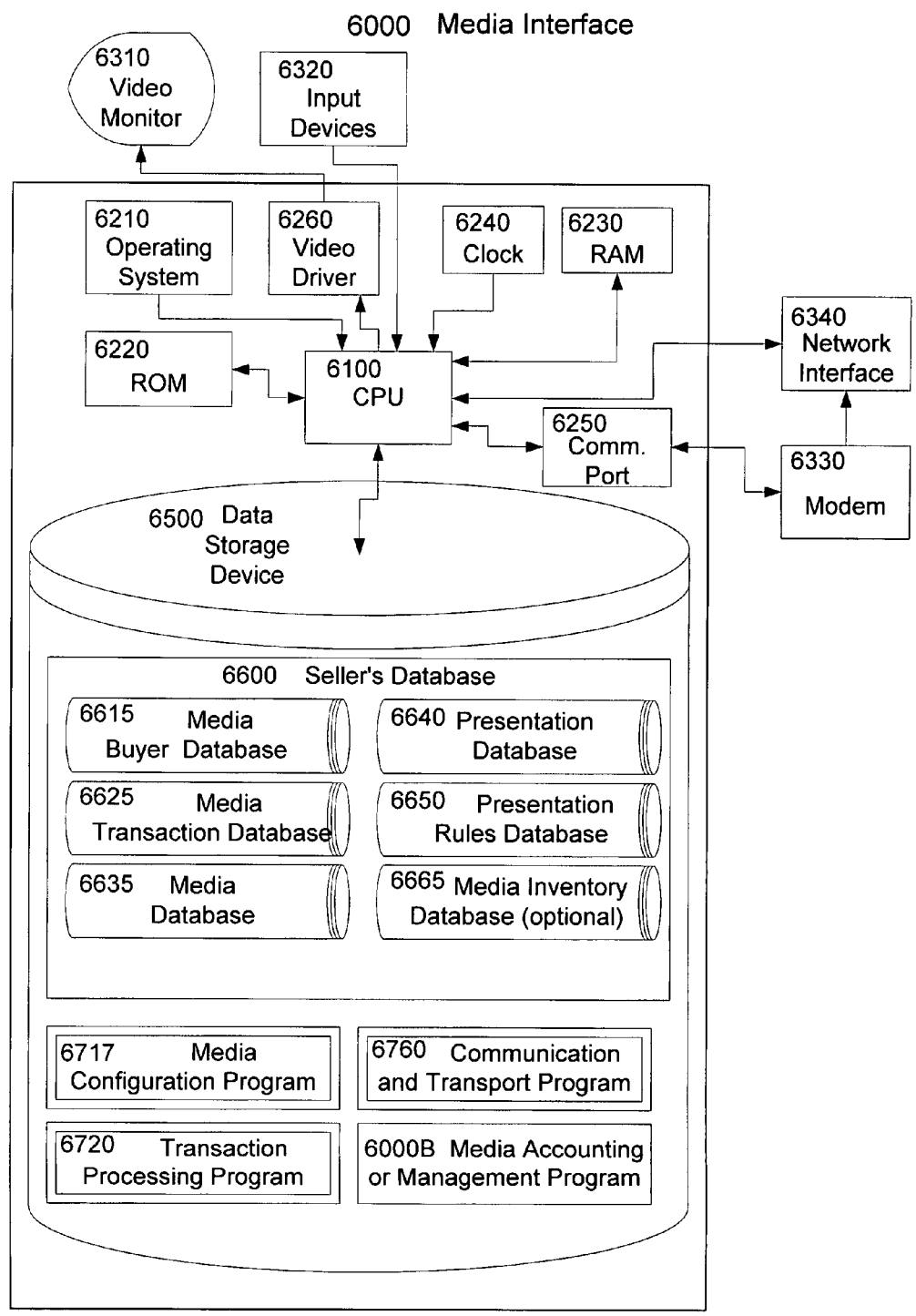
FIG. 2e is a block diagram showing one embodiment of the Media Interface.

Within this embodiment of the present invention, the Communication and Transport Program 1760 monitors, directs, and controls the receiving and transmitting of messages between the Central Controller and Presentation Processor 1000, Seller Interface 4000 FIG. 2c, and the Media Interface 6000 FIG. 2e.

FIG. 2b diagrams the Central Controller and Presentation Processor 2000, which includes a central processor (CPU) 2100, operating system 2210, ROM 2220, RAM 2230, clock 2240, video driver 2260, video monitor 2310, input devices 2320, network interface 2340, and data storage device 2500.

A personal, workstation, or server-grade computer with sufficient processing capacity, program and data storage capacity, and memory may be used as a Central Presentation and Selection Server 2000. The CPU 2100 may be a single CPU or multiple CPUs as necessary to provide sufficient processing capacity. The Intel Pentium II Processor with a speed of 300 MH or any comparable capacity processor that is compatible with the chosen operating system could be used as CPU 2100. The operating system 2210 should be one that allows for multiple processors, such as Windows NT by Microsoft, so that increases in utilization of the present invention can be handled with increases of processing capacity. The video monitor 2310 is a standard "SVGA" color monitor or its equivalent. The input devices 2320 are a standard keyboard and mouse or other replacement items or methods.

The data storage device 2500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data.

The data storage device 2500 in this embodiment of the present invention contains relational databases controlled and managed by database software such as Microsoft SQL Server 7 by Microsoft Inc. The data used in the Central Presentation and Selection Server 2000 and in the processing of inventory sales in the present invention is contained within the Presentation and Selection Server Databases 2600. The Presentation and Selection Server Databases are the Buyer Database 2610, Transaction Database 2620, Final Presentation Database 2645, Inventory Database 2660, Referral Database 2670, and any other databases necessary or desired to service the Buyers and Sellers.

The Buyer Database 2610 maintains data on Buyers who make purchases or reservations for the products, goods, or services offered by the Sellers over the Central Presentation and Selection Server 2000 or other Independent Presentation Directories and Indexes 3000 FIG. 1b. The Buyer Database 2610 will have data fields containing Buyer name, network or delivery ID, physical address, phone, email address, credit card information, and any other information deemed necessary to support the Buyers and the requirements of the proposed Sellers. The Buyer has the option to input the information when joining the network prior to attempting to make a purchase or reservation. As an alternative, the Central Presentation and Selection Server 2000 will prompt the Buyer for the information after the Buyer has found a desired product, good, or service to purchase, but before forwarding the purchase transaction to the Central Controller and Presentation Processor 1000 FIG. 2a. The information contained in the Buyer Database 2610 is synchronized with that in the Buyer Database 1610 FIG. 2a on the Central Controller and Presentation Processor 1000 FIG. 2a. It should be noted that if an embodiment of the present invention is configured with more than one Central Presentation and Selection Server 2000 and is controlled by a single Central Controller and Presentation Processor 1000 (as in FIG. 1b). Then the Buyers represented on each Central Presentation and Selection Server 2000 Buyer Database 2610 will be represented on the Central Controller and Presentation Processor 1000 Buyer Database 1610 FIG. 2a. However all Buyers on Buyer Database 1610 may not be represented on each Central Presentation and Selection Server 2000 Buyer Database 2610. A similar relationship exists between the Central Controller and Presentation Processor 1000 and the Seller Interface 4000 in that all Buyers are represented within the Buyer Database 1610 FIG. 2a, but only those Buyers that any given Seller has had transactions with are represented within the Buyer Database 4610 FIG. 2c of any given Seller. It should also be noted that any given Buyer might choose to utilize any or all Central Presentation and Selection Servers 2000 controlled by the Central Controller and Presentation Processor 1000. When this happens, the information contained within the associated Buyer Databases 2610 would be the same, but the Transaction Databases 2620 would be different, because the Transaction Database 1620 FIG. 2a represents the cumulative transactions made by that particular buyer.

The Transaction Database 2620 maintains data on the Buyers' purchases of products, goods, or services offered by the Sellers over the Central Presentation and Selection Server 2000 or other Standalone Presentations or Independent Presentation Directories and Indexes 3000 FIG. 1b. The Transaction Database 2620 will have data fields containing information that relates to the purchases or reservations made by the Buyer. The specific fields within the Transaction Database 2620 will depend on the type of Seller and their product, goods, or service, but would always contain the field for the purchase or reservation tracking ID. As an example, if an embodiment of the present invention were configured to present lodging facilities, the Transaction Database 2620 might contain fields for Buyer ID, room type or specific room, bed type, check-in date, check-out date, number of adults, number of children, smoking or non-smoking, room rate paid, taxes paid, responses to requests, and any special requests such as extra pillows, late check-in, airport pickup service, etc. The information in the Transaction Database 2620 is the result of each requested purchase or reservation made with the Central Presentation and Selection Server 2000; this information is then passed to the Central Controller and Presentation Processor 1000 FIG. 2a and then to the Seller Interface 4000. The relationship between the Central Controller and Presentation Processor 1000 Transaction Database 1620 FIG. 2a and the Central Presentation and Selection Server 2000 Transaction Database 2620 is the same as the relationship between the Buyer Database 1610 FIG. 2a and Buyer Database 2610 explained above.

The Final Presentation Database 2645 will have data fields containing information that relates to the Sellers' presentations of their products, goods, or services to the Buyers on this instance of the Central Presentation and Selection Server 2000. This is data that has been designed, edited and created by the Presentation Generation Program 1710 FIG. 2a of the Central Controller and Presentation Processor 1000 FIG. 2a and then transmitted to the instance of the Central Presentation and Selection Server 2000 for presentation to the Buyers. The data fields held by Final Presentation Database 2645 will vary from seller type to seller type, depending on the structure and design of the presentations. As an example, if an embodiment of the invention were configured to present lodging facilities, the Final Presentation Database 2645 might contain fields for combined facility descriptions, room descriptions, facility amenities, room amenities, payment types accepted, meeting rooms, policies, and any other information to assist in the presentation and sale of the lodging. These fields, as used in the lodging example, would contain information for all the lodging facilities represented. The Final Presentation Database 2645 is the result of the information contained within the Presentation Database 1640 FIG. 2a processed by the Presentation Generation Program 1710 FIG. 2a in conjunction with the information contained in the Presentation Rules Database 1650 FIG. 2a. There is no synchronization of this data, as it only exists for the presentations on a given Central Presentation and Selection Server 2000 and is generally not transferable to other Central Presentation and Selection Servers 2000 due to differing presentation designs and structures. However the Presentation Generation Program 1710 FIG. 2a, using the Presentation Rules Database 1650 FIG. 2a and the Presentation Location Database 1680 FIG. 2c to identify and create the differing presentations, maintains the control of the various presentation designs and structures.

The Inventory Database 2660 will have data fields containing information that monitors and controls the inventory of products, goods, and services offered for sale by the Sellers. In the preferred embodiment of the present invention, the Inventory Database 2660 is synchronized with the Inventory Database 1660 FIG. 2a and the Seller Accounting or Management Program 4000B FIG. 2c depending on the inventory type (see discussion on Resource Saver Protocol). The Inventory Database 2660 can also be used as an alternative to Seller Accounting or Management. Program 4000B with the optional Inventory Database 4660 FIG. 2c. The data fields held by the Inventory Database 2660 will vary from seller type to seller type, depending on the type of products, goods, or services that are being sold or reserved. As an example, if an embodiment of the present invention were configured to present lodging facilities, the Inventory Database 2660 might contain fields for Buyer ID, types of rooms, number of rooms available for each type, blocked rooms, blocked dates, exception date rates, and any other fields necessary to present and control that room inventory.

The Referral Database 2670 will have data fields containing information, from the Sellers and from the input of the management of the given instance of the present invention. This data refers Buyers to other sources of the same products, goods, or services offered when a given Seller cannot meet the wishes or needs of the Buyer. The information within the Referral Database 2670 is synchronized with the Referral Database 1670 FIG. 2a. See discussion of Referral Database 1670 FIG. 2a for reasons and origin of data.

The preferred embodiment of the Central Presentation and Selection Server 2000 has a Transaction Negotiation Program 2725, Presentation Server 2740, Selection Server 2750, and other programs as necessary.

Within the embodiment of the present invention, the Transaction Negotiation Program 2725 is responsible for the negotiations and processing of all sales and/or reservation of products, goods, and services.

The Transaction Negotiation Program 2725 of the Central Presentation and Selection Server 2000 negotiates the interactive transaction with the Buyer. The program facilitates the transaction by presenting products, goods, services, offerings, options, add-on items, rates or prices, availability, alternatives or discounts in response to unavailable or denied requests, and other choices to assist the Buyer in making the purchase transaction. During the transaction negotiations, the inventory is held or reserved for that particular Buyer. If the Buyer does not complete the purchase or reservation, the inventory is made available once again. Once the Buyer makes a purchase or reservation decision, the inventory is deemed sold and taken off the available inventory list, and the Transaction Negotiation Program 2725 transmits a transaction message to the Central Controller and Presentation Processor 1000 for confirmation and processing. This transmission either takes place immediately or on a delayed or batch basis depending on the type of inventory being sold or reserved and the settings entered by the Seller. The Transaction Processing Program 1720 FIG. 2a of the Central Controller and Presentation Processor 1000 FIG. 2a performs some of the same functions and calculations as the Transaction Negotiation Program 2725 of the Central Presentation and Selection Server when it receives the transaction message. This duplication serves as both a check of the processes and a validation of the transaction message. It should be noted that although the Transaction Negotiation Program 2725 is referred to as a program, in the embodiment of the present invention it is a collection of programs, procedures and functions that work with the Selection Server 2750 to provide the selection and negotiation environment in which the Buyer can purchase or reserve the products, goods, or services.

The Presentation Server 2740 is a fully functioning Internet or Intranet Web server. In the preferred embodiment of the present invention, the Internet Information Server by Microsoft is the Presentation Server 2740. The Presentation Server 2740 performs the function of controlling the Buyers' access to the Sellers' presentations through the Internet or Intranet. The Presentation Server 2740 is able to allow access either with or without login and password control (in the embodiment of the present invention, no password control is used). The Presentation Server 2740 would allow full access to the Open Access Presentations 2810 without restrictions.

The Selection Server 2750 is a fully functioning Internet or Intranet Dynamic Page Server. This is a server or server component that allows for presentations to be made based on the actions of the user and the functions or algorithms of the presentation designer or programmer. In this embodiment of the present invention, the server component, Active Server Pages by Microsoft, is added to the Presentation Server 2740 to provide this dynamic functionality. The Selection Server 2750 provides the control and access to the presentations held within the Dynamic Presentations 2820. These presentations are only accessible from presentations held within Open Access Presentations 2810 and cannot be independently viewed or accessed.

The embodiment of the Central Presentation and Selection Server 2000 has directory structures Open Access Presentations 2810, Dynamic Presentations 2820, and other directory structures as necessary. Not only do these directory structures provide the physical storage location for the presentation files, but they also provide the framework and path references for access to the presentations by using the Presentation Server 2740 and the Selection Server 2750.

FIG. 2c diagrams the Seller Interface 4000, which includes a central processor (CPU) 4100, operating system 4210, ROM 4220, RAM 4230, clock 4240, communication ports 4250, video driver 4260, video monitor 4310, input devices 4320, modem 4330, network interface 4340, and data storage device 4500. This embodiment of the present invention would also include a Magnetic or Optical Card Reader or Biometric ID Device as well as a Ticket or Confirmation Printer or Admission Control Device.

A personal, workstation, or server-grade computer with sufficient processing capacity, program and data storage capacity, and memory may be used as a Seller Interface 4000. The CPU 4100 may be a single CPU or multiple CPUs as necessary to provide sufficient processing capacity. The Intel Pentium II Processor with a speed of 300 MH or any comparable capacity processor that is compatible with the chosen operating system could be used as CPU 4100. In this embodiment of the present invention, the operating system 4210 is Windows NT by Microsoft, although Windows 98 by Microsoft should be sufficient in most cases. The video monitor 4310 is a standard "SVGA" color monitor or its equivalent, with this embodiment of the present invention being a 19-inch standard video monitor. The input devices 4320 are a standard keyboard and mouse or other replacement items. The communication ports 4250 are RS232 serial ports with 16550 UART or alternatives that provide comparable connections to the Modem 4330. The Modem 4330 may be a US Robotics 56K external made by 3Com Inc or a comparable quality modem.

A data storage device 4500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Seller Interface 4000 and the Central Controller and Presentation Processor 1000 FIG. 2*a*. In a catastrophic destruction of the Seller Interface 4000, the most critical of data can be recovered from the Central Controller and Presentation Processor 1000 FIG. 2*a* and allow the rebuilding of the lost databases, thereby ensuring the integrity of all transactions.

The data storage device in this embodiment contains relational databases controlled and managed by database software such as Microsoft SQL Server 7 by Microsoft Inc. or, for smaller. Sellers, Access 2000 by Microsoft Inc. Data used in the generation of presentations and for the processing of inventory sales in the present invention is contained within the Seller's Databases 4600. The Seller's Databases 4600 contains the Buyer Database 4610, Transaction Database 4620, Seller Database 4630, Presentation Database 4640, Presentation Rules Database 4650, Inventory Database 4660, Referral Database 4670, and any other databases necessary or desired to service the Sellers.

The Buyer Database 4610 maintains data on Buyers who make interactive purchases or reservations of the products, goods, or services offered by the Sellers over the Central Presentation and Selection Server 2000 FIG. 2*b* or other Independent Presentation Directories and Indexes 3000 FIG. 1*b*. The Buyer Database 4610 will have data fields containing Buyer name, network or delivery ID, physical address, phone, email address, credit card information, and any other information deemed necessary to supported the Buyers and the requirements of the Seller. The information within the Buyer Database 4610 is contained in transaction messages received from the Central Controller and Presentation Processor 1000 FIG. 2*a* along with the purchase information of a given transaction.

The Transaction Database 4620 maintains data on the Buyers' interactive purchases or reservations of products, goods, or services offered by the Sellers over the Central Presentation and Selection Server 2000 FIG. 2*b* or other Independent Presentation Directories and Indexes 3000 FIG. 1*b*. The Transaction Database 4620 will have data fields containing information that relates to purchases or reservations made by the Buyer. The specific fields within this database will depend on the type of Seller and their products, goods, or services, but would always contain the field for the purchase or reservation tracking ID. As an example, if an embodiment of the present invention were configured to present lodging facilities, the Transaction Database 4620 might contain fields for Buyer ID, room type or specific room, bed type, check-in date, check-out date, number of adults, number of children, smoking or non-smoking, room rate paid, taxes paid, and special requests such as extra pillows, late check-in, airport pickup service, etc. The information in the Transaction Database 4620 is the result of each requested purchase made with the Central Presentation and Selection Server 2000 FIG. 2*b*. This information is then passed, via transaction messages, to the Central Controller and Presentation Processor 1000 FIG. 2*a* and then to the Seller Interface 4000.

The Seller Database 4630 will have data fields containing information that relates to the Seller. The specific fields within the Seller Database 4630 will cover all the necessary information on the Seller, for use both within the Seller's presentation and by the managers of the present invention for the management of the Seller's account. The Seller Database 4630 will have data fields containing company name, contact name, marketing name, physical address, phone, email address, credit card or other payment information, contract dates, product or reservation types for presentation, data transfer modem numbers, accessible third-party management software, and any other information fields deemed necessary to supported the proposed seller. The seller will input this information when first accessing the present invention and joining as a Seller. The Configuration and Presentation Program 4715 will prompt the Seller for the necessary information as well as obtain an agreement to a contract for the services of the present invention and the distribution and payment of all presentations.

The Presentation Database 4640 will have data fields containing information that relates to the Seller's choice of non-resident media or advertising channels as well as to the interactive presentation of information and data describing their products, goods, or services for presentation to the Buyers. The data fields within Presentation Database 4640 will vary from seller type to seller type, depending on the design of the presentation and the types of other media offered by the given instance of the present invention. As an example, if an embodiment of the present invention were configured to present lodging facilities, the Presentation Database 4640 might contain fields for facility description, facility photos, room descriptions, room photos, facility amenities, room amenities, room service menu, payment types accepted, meeting and reception services offered, meeting rooms, photos of meeting rooms, policies, rates, special package offers, media or advertising channel choices, and any other information to assist in the presentation and sale of the lodging. The Configuration and Presentation Program 4715 will prompt the Seller for the necessary information for the presentations desired by the Seller. The data relationship between the Presentation Database 4640 and the Presentation Database 1640 FIG. 2*a* part of the Central Controller and Presentation Processor 1000 FIG. 2*a* is one of continual synchronization of the Seller's information. The synchronization is maintained by the Presentation and Configuration Program 4715 and the Communication and Transport Program 4760. The seller makes any updates or corrections to the presentation within the Presentation and Configuration Program 4715. These corrections are then updated to the Presentation Database 4640 and sent to the Central Controller and Presentation Processor 1000 for updating to the Presentation Database 1640 FIG. 2*a*.

The Presentation Rules Database 4650 will have data fields containing information that controls and limits the style and editing of the presentations created by the Seller using the Presentation and Configuration Program 4715. The data within the Presentation Rules Database 4650 will be synchronized with the data within the Presentation Rules Database 1650, which is stored on the Central Controller and Presentation Processor 1000 FIG. 2*a*. This synchronization will take place by the sending of updates from the Central Controller and Presentation Processor 1000 FIG. 2*a* to the Presentation and Configuration Program 4715. The data fields contained in the Presentation Rules Database 4650 will vary from seller type to seller type, depending on the types of media and interactive presentations that are supported by the given instance of the present invention and the design of the presentations. Some fields that might be maintained are presentation templates; blocked words; blocked phrases; blocked references; blocked URLs; grammar guidelines; spelling dictionaries; presentation size restrictions; photo or graphics specifications such as size, compression, and file format; and any other guidelines, benchmarks, or controlling algorithms.

The Inventory Database 4660 will have data fields containing information that monitors and controls the inventory of products, goods, and services offered for sale or reservation by the Sellers within the interactive sales portion of the present invention. In the preferred embodiment of the present invention, the inventory data is maintained by the Seller Accounting or Management Program 4000B. If that software cannot communicate or can only communicate partial data with the present invention, then the Inventory Database 4660 would be used alone or in combination with the Seller Accounting or Management Program 4000B, respectively. The embodiment of the present invention communicates with the Seller Accounting or Management Program 4000B for the synchronization of inventory and other data that can be coordinated. The data fields within the Inventory Database 4660 will vary from seller type to seller type, depending on the type of products, goods, or services that are being sold or reserved. As an example, if an embodiment of the present invention were configured to present lodging facilities, the Inventory Database 4660 might contain fields for Buyer ID, types of rooms, number of rooms available for each type, blocked rooms, blocked dates, exception date rates, and any other fields necessary to present and control that room inventory.

The Referral Database 4670 will have data fields containing information from the Sellers that refers Buyers to other sources of the same products, goods, or services offered when the Sellers cannot meet the wishes or needs of the Buyers. The Seller through prompting by the Presentation and Configuration Program 4715 provides the information within the Referral Database 4670. This information is intended and designed to provide the Buyer with alternative sources when the products, goods, or services offered interactively by a given Seller are either not available or do not meet the needs of the Buyer. The data fields held by the Referral Database 4670 will vary from seller type to seller type, depending on the type of products or services that are being sold or reserved. As an example, if an embodiment of the present invention were configured to present lodging facilities, the Referral Database 4670 might contain fields for alternative accommodations, dates, or lodging facilities. An embodiment of the present invention configured to present professional services might contain alternative professionals or associates that might be acceptable to the Buyer.

The programs of the preferred embodiment of Seller Interface 4000 are a Presentation and Configuration Program 4715, Transaction Processing Program 4720, Communication and Transport Program 4760, Buyer Admission Control Program 4770, Seller Accounting or Management Program 4000B, Seller Admission Control Program 4000C, and other programs as may be necessary or desirable.

The Presentation and Configuration Program 4715 is both the gateway to the present invention and the controlling software interface for the Seller. The Presentation and Configuration Program 4715 introduces the Seller to the instance of the present invention and allows the Seller to choose in which presentations and which media or advertising channels the Seller wishes to participate. The Presentation and Configuration Program 4715 offers the choices of media and presentations to the Seller, giving requirements and cost for each. Upon choosing media and presentations, the Seller is then presented with a series of questions to answer. The answering of these questions contributes to the Seller Database 4630, Presentation Database 4640, Inventory Database 4660, Referral Database 4670, and any other databases necessary. The responses to the questions asked, text entry areas, photos, graphics, and other input, either required or optional, are monitored by the Presentation and Configuration Program 4715 using the information within the Presentation Rules Database 4650 to guide the Seller in the creation of a presentation that meets the style, editorial, and content guidelines of that instance of the present invention for each media venue or outlet chosen.

Within this embodiment of the present invention, the Transaction Processing Program 4720 is not utilized, as its functions are performed by the Seller Accounting or Management Program 4000B. If there is no Seller Accounting or Management Program 4000B or it is not able to handle those functions, then the Transaction Processing Program 4720 will perform the necessary functions to process the incoming Transaction Messages; update databases; notify Seller of product, goods, or services sold or reserved; notify Seller of prices or rates paid; perform the necessary confirmations of available inventory and rates/pricing; create or send confirmation messages to buyer or other requested confirmation methods; and perform other functions necessary to process the incoming transaction.

The Communication and Transport Program 4760 monitors, directs, and controls the receiving and transmitting of messages between the Seller and the Central Controller and Presentation Processor 1000 FIG. 2a. During the setup of the Presentation and Configuration Program 4715, the Communication and Transport Program 4760 is initialized and tested with the Modem 4330 and/or Network Interface 4340. The functions of the Communication and Transport Program 4760 are largely transparent to the Seller. It should be noted, however, that in this embodiment of the present invention, the Seller Interface 4000 should be left on, with the Communication and Transport Program 4760 running, 24 hours a day, 7 days a week. This is necessary so that the Transaction Processing Program 4720 can receive and process any transaction messages from the Central Controller and Presentation Processor 1000 FIG. 2a regardless of the hour of the day.

The Buyer Admission Control Program 4770 is present and utilized in the preferred embodiment of the present invention if the Seller's products, goods, or services lend themselves to the type of access control that has traditionally been accomplished using tickets, passes, admission documents, reservations, reservation confirmations, or other physical evidence of purchase or authorization. In this embodiment of the present invention, the Buyer Admission Control Program 4770 may be replaced with Seller Admission Control Program 4000C, a third-party program that is either currently in use or is preferred by the Seller. Normally, communications in the form of admission-controlling messages must be from either the Transaction Processing Program 4720 or the Seller Accounting or Management Program 4000B to the Buyer Admission Control Program 4770 or the Seller Admission Control Program 4000C, depending upon which software is used. In some instances, however, the Seller Accounting or Management Program 4000B may assume the duties of the Seller Admission Control Program 4000C. The Buyer Admission Control Program 4770 or the Seller Admission Control Program 4000C uses the information in the Buyer Database 4610 to confirm the admission or access of a given Buyer who is physically at the Seller's facility, site, business, venue, or other physical location seeking access. In this embodiment of the present invention, the information from the Buyer Database 4610 is confirmed by use of a magnetic or optical card reader portion of the Optional Magnetic or Optical Card or Biometric ID Device 4350 that reads the physical ID or their Biometric ID in the possession of the Buyer. This physical Magnetic or Optical Card ID is one that was previously issued to the Buyer for another use and is currently valid for that use. It could be a standard credit card, association ID, school ID, credit union ID, a driver's license, or any other "issued ID" that has been approved for use by the management of any given instance of the invention. This feature of the invention, of having the latitude to accept a variety of existing methods of identification, is important in that it allows the Buyer immediate access without requiring the Buyer to be processed to obtain a new ID. An example of this use within an embodiment of the present invention would be a "Major Credit Card" that has agreed to allow its cards to be used as identification for purchases within the invention. An example of this "alternate ID" use would be an instance of the invention that was established as a "Sports Reservation Network". When the Buyer chooses the event that he wants to attend, he would enter the number off of his "Major Credit Card" into the Buyer Interface 5000 FIG. 2d. When the Buyer arrived at the Facility or Event for Admission or Check-in 4380, the Magnetic or Optical Card Reader 4350 would read his "Major Credit Card". The Magnetic or Optical Card Reader 4350, in conjunction with the Buyer Admission Control Program 4770, which draws its information from the Buyer Database 4610, would confirm the Buyer's admission and send the ticket information to the Ticket or Confirmation Printer or Admission Control Device 4360. The Ticket or Confirmation Printer or Admission Control Device 4360 would either print the tickets, allowing the buyer to proceed to the standard ticket entry point, or trip a physical gate or bar that would allow the Buyer entry to the event (Buyer Allowed Admittance 4370).

In another example of an embodiment of the invention, the management of the invention has chosen to support the Biometric Identification method for assessing and guaranteeing the identity of the Buyer. With this method, the Buyer is first registered to use the invention by one of the Sellers who is part of the network and is equipped to perform the appropriate biometric scan. After the Buyer presents proof of identify, they submit to the biometric scan which is then transmitted to the Central Controller and Presentation Processor to become part of the Buyer's record. The Buyer is given an ID number to allow access to the invention. The next time the Buyer accesses the invention he can use the ID number to make the purchase and then when showing up at that facility his Biometric Scan becomes his ID. Biometric IDs can be any biological feature of the Buyer that is so deemed to be sufficiently unique that it can be used as a method of identification. Features such as fingerprints, palm prints, iris scans, voice, and full-face scans are just some of the currently accepted biometric identification methods. We believe this list of methods will expand and that new methods can easily be utilized by an embodiment of this invention as they are developed and become available. It should be noted that the level of certainty necessary for determining identification using biometric techniques is obviously lower for use in the present invention than the certainty required for other critical applications such as law enforcement or military security access.

In yet another example of an embodiment of the invention, the management of the invention has chosen to support a function to allow Buyers to access their identification documents through the Network in combination with their biometric identification for the purchasing of goods and services. In this embodiment the Buyer is allowed to make purchases of goods and services from those Sellers that support biometric identification using only their personal biometric identification. The charges or payments requested and the biometric ID submitted by the Seller are transmitted to the Central Controller and Presentation Processor 1000 FIG. 2a. The Transaction Processing Program 1720 verifies the biometric ID with the information held within the Buyer Database 1610. The Transaction Processing Program 1720 further verifies that sufficient funds are available for the requested transaction, either through third party sources such as the Identification Documents sponsor or through in-house financing or accounts. The acceptance or rejection of the transaction is then transmitted back to the Seller for the Sellers completion of the purchase or transaction.

FIG. 2d diagrams the Buyer Interface 5000, which includes a central processor (CPU) 5100, operating system 5210, ROM 5220, RAM 5230, clock 5240, communication port 5250, video monitor 5310, input devices 5320, modem 5330, network interface 5340, and data storage device 5500.

A personal or workstation computer with sufficient processing capacity, program and data storage capacity, and memory may be used as a Buyer Interface 5000. The CPU 5100 may be a single CPU. The Intel Pentium Processor with a speed of 166 MH or any comparable capacity processor that is compatible with the chosen operating system could be used as CPU 5100. In the preferred embodiment of the present invention, the operating system 5210 is either Windows 95 or Windows 98 by Microsoft. The video monitor 5310 is a standard 17-inch "SVGA" color monitor or its equivalent. The input devices 5320 are a standard keyboard and mouse or other replacement items. The communication ports 5250 are RS232 serial ports with 16550 UART or alternatives that provide comparable connections to the Modem 5330. The Modem 5330 may be a modem such as the US Robotics 56K external made by 3Com Inc.

A Data Storage Device 5500 may be one or a combination of standard hard disks, optical storage devices, CD-W drives, CD-RW drives, DVD, flash memory, or other data storage devices. It must be of sufficient capacity to store the programs necessary to access the Sellers' presentations.

The hardware requirements for the Buyer Interface 5000 are minimal compared to the requirements for the Central Controller and Presentation Processor 1000 FIG. 2a, Central Presentation and Selection Server 2000 FIG. 2b, and the Seller Interface 4000 FIG. 2c.

The only software or programs required for the Buyer Interface 5000 is an Internet Browser 5000C of the Buyer's choice. In the embodiment of the present invention, Internet Explorer by Microsoft would be used as Buyer's Choice of Internet Browser 5000C.

No databases are required for the Buyer Interface 5000. The only data storage required is performed by the Buyer's Choice of Internet Browser 5000C in the form of saving "cookies" in the Location for Cookie Storage 5695.

Although the above has described the preferred embodiment of the present invention, any Internet-enabled computer, operating system, and browser combination that can access the Internet and specifically standard HTML presentations should be able to serve as the Buyer Interface 5000.

FIG. 2e diagrams the Media Interface 6000, which includes a central processor (CPU) 6100, operating system 6210, ROM 6220, RAM 6230, clock 6240, communication ports 6250, video driver 6260, video monitor 6310, input devices 6320, modem 6330, network interface 6340, and data storage device 6500.

A personal, workstation, or server-grade computer with sufficient processing capacity, program and data storage capacity, and memory may be used as a Media Interface 6000. The CPU 6100 may be a single CPU or multiple CPUs as necessary to provide sufficient processing capacity. The Intel Pentium II Processor with a speed of 300 MH or any comparable capacity processor that is compatible with the chosen operating system could be used as CPU 6100. In this embodiment of the present invention, the operating system 6210 is Windows NT by Microsoft, although Windows 98 by Microsoft should be sufficient in most cases. The video monitor 6310 is a standard "SVGA" color monitor or its equivalent, with this embodiment of the present invention being a 19-inch standard video monitor. The input devices 6320 are a standard keyboard and mouse or other replacement items. The communication ports 6250 are RS232 serial ports with 16550 UART or alternatives that provide comparable connections to the Modem 6330. The Modem 6330 may be a US Robotics 56K external made by 3Com Inc or a comparable quality modem.

A data storage device 6500 may be one or a combination of standard hard disks, optical storage devices, CD-W drives, CD-RW drives, DVD, flash memory, magnetic tape, or other data storage devices. It must be of sufficient capacity to store all the programs and data necessary as well as provide for future capacity needs. In this embodiment of the present invention, mirrored hard disks with separate hard disk controllers provide a redundancy of data storage and therefore increased dependability and data integrity. This configuration allows for easier recovery in case of data corruption or data storage equipment failure. The aforementioned Windows NT operating system allows for this mirrored configuration. In addition to the mirrored hard disk, daily or more frequent backup of all data to tape, which is then taken off-site for storage, is a required procedure to ensure safe data. The present invention has a degree of data security built into it by design, with the most critical data kept with both the Media Interface 6000 and the Central Controller and Presentation Processor 1000 FIG. 2a. In a catastrophic destruction of the Media Interface 6000, the most critical of data can be recovered from the Central Controller and Presentation Processor 1000 FIG. 2a and allow the rebuilding of the lost databases, thereby ensuring the integrity of all transactions.

The data storage device in this embodiment contains relational databases controlled and managed by database software such as Microsoft SQL Server 7 by Microsoft Inc. or, for smaller Media outlets, Access 2000 by Microsoft Inc. Data used in the generation of presentations and for the processing of inventory sales in the present invention is contained within the Media's Databases 6600. The Media's Databases 6600 contains the Media Buyer's Database 6615, Media Transaction Database 6625, Media Database 6635, Presentation Database 6640, Presentation Rules Database 6650, Media Inventory Database 6665, and any other databases necessary or desired to service the Media.

The Media Buyer Database 6615 maintains data on Sellers who make interactive purchases of presentations offered by the Media over the Central Controller and Presentation Processor 1000 and the Seller Interface 4000. The Media Buyer Database 6615 will have data fields containing Seller name, physical address, phone, email address, credit card information, and any other information deemed necessary to supported the Media Buyers and the requirements of the Media. The information within the Buyer Database 6615 is contained in transaction messages received from the Central Controller and Presentation Processor 1000 FIG. 2a along with the media purchase information of a given transaction.

The Media Transaction Database 6625 maintains data on the Media Buyers' (Sellers') interactive selection and purchases of presentations offered by the Media over the Central Controller and Presentation Processor 1000 and the Seller Interface 4000. The Transaction Database 6625 will have data fields containing information that relates to the selection and purchases of presentations made by the Seller. The specific fields within this database will depend on the type of Media and their products and services. As an example, if an embodiment of the present invention were configured to offer newspaper advertising as a non-resident media the Media Transaction Database 6625 might contain fields for rates, publishing dates, publishing deadlines, etc. The information in the Media Transaction Database 6625 is the result of each requested purchase made with the Seller Interface 4000. This information is then passed, via transaction messages, to the Central Controller and Presentation Processor 1000 FIG. 2a and then to the Media Interface 6000.

The Media Database 6635 will have data fields containing information that relates to the Media. The specific fields within the Media Database 6635 will cover all the necessary information about the Media, for use both within the Media's presentation and by the managers of the present invention for the management of the Media's account. The Media Database 6635 will have data fields containing company name, contact name, marketing name, physical address, phone, email address, payment information, contract dates, product or service types for presentation, data transfer modem numbers, accessible third-party management software, and any other information fields deemed necessary to supported the proposed Media. The Media will input this information when first accessing the present invention and joining as a Media. The Media Configuration Program 6717 will prompt the Media for the necessary information as well as obtain an agreement to a contract between the Media and the management or operators of the present invention.

The Presentation Database 6640 will have data fields containing information that relates to the Media's interactive presentation of information and data describing their products or services offered to Media Buyers (Sellers). The data fields within Presentation Database 6640 will vary from Media type to Media type, depending on the design of the presentation and the types of other media offered by the given instance of the present invention. The Media Configuration Program 6717 will prompt the Media for the necessary information. The data relationship between the Presentation Database 6640 and the Presentation Database 1640 FIG. 2a, part of the Central Controller and Presentation Processor 1000 FIG. 2a, is one of continual synchronization of the Media's information. The synchronization is maintained by the Media Configuration Program 6717 and the Communication and Transport Program 6760. The Media makes any updates or corrections to the presentation within the Media Configuration Program 6717. These corrections are then updated to the Presentation Database 6640 and sent to the Central Controller and Presentation Processor 1000 for updating to the Presentation Database 1640 FIG. 2a.

The Presentation Rules Database 6650 will have data fields containing information that controls and limits the style and editing of the presentations to be created by the Sellers using the Seller Interface 4000 and the Presentation and Configuration Program 4715 for this given Media's product or service. The data within the Presentation Rules Database 6650 will be synchronized with the data within the Presentation Rules Database 1650, which is stored on the Central Controller and Presentation Processor 1000 FIG. 2a. This synchronization will take place by sending updates from the Media Interface to the Central Controller and Presentation Processor 1000 FIG. 2a. The data fields contained in the Presentation Rules Database 6650 will vary from Media type to Media type, depending on the types of media and interactive presentations that are supported by the given instance of the present invention and the design of the presentations. Some fields that might be maintained are presentation templates; blocked words; blocked phrases; blocked references; blocked URLs; grammar guidelines; spelling dictionaries; presentation size restrictions; photo or graphics specifications such as size, compression, and file format; and any other guidelines, benchmarks, or controlling algorithms.

The Media Inventory Database (optional) 6665 will have data fields containing information that monitors and controls the inventory of products and services offered by the Media within the interactive Presentation and Configuration Program 4715 of the Seller Interface 4000 of the present invention. In the preferred embodiment of the present invention, the Media Accounting or Management Program 6000B maintains the inventory data. If that software cannot communicate or can only communicate partial data with the present invention, then the Media Inventory Database 6665 would be used alone or in combination with the Media Accounting or Management Program 6000B, respectively. The embodiment of the present invention communicates with the Media Accounting or Management Program 6000B for the synchronization of inventory and other data that can be coordinated. The data fields within the Inventory Database (optional) 6665 will vary from Media type to Media type, depending on the type of products, goods, or services that are being sold or reserved. The reason that the Media Inventory Database 6665 is optional is that some media types such as newspaper classified ads or printed directories such as regional phone directories have no real limit as to the number or quantity of presentations that they can accept. Therefore there would be no need to track or control inventory.

The programs of this embodiment of Media Interface 6000 are; Media Configuration Program 6717, Transaction Processing Program 6720, Communication and Transport Program 6760, Media Accounting or Management Program 6000B, and other programs as may be necessary or desirable.

The Presentation and Configuration Program 6717 is both the gateway to the present invention and the controlling software interface for the Media. The Media Configuration Program 6717 introduces the Media to the instance of the present invention. The Media Configuration Program 6717 presents the Media with a series of questions to answer. The answering of these questions contributes to the Media Database 6635, Presentation Database 6640, Presentation Rules Database 6650, Media Inventory Database (optional) 6665, and any other databases necessary. The Media Configuration Program 6717 monitors the responses to the questions asked, text entry areas, photos, graphics, and other input, either required or optional.

Within this embodiment of the present invention, the Transaction Processing Program 6720 is not utilized, as the Media Accounting or Management Program 6000B performs its functions. If there is no Media Accounting or Management Program 6000B or it is not able to handle those functions, then the Transaction Processing Program 6720 will perform the necessary functions to process the incoming Transaction Messages. These messages may update databases; notify Media of product, goods, or services sold or reserved; notify Media of prices or rates paid; perform the necessary confirmations of available inventory and rates/pricing; create or send confirmation messages to buyer or other requested confirmation methods; and perform other functions necessary to process the incoming transaction.

The Communication and Transport Program 6760 monitors, directs, and controls the receiving and transmitting of messages between the Media and the Central Controller and Presentation Processor 1000 FIG. 2a. During the setup of the Media Configuration Program 6717, the Communication and Transport Program 6760 is initialized and tested with the Modem 6330 and/or Network Interface 6340. The functions of the Communication and Transport Program 6760 are largely transparent to the Media. It should be noted, however, that in this embodiment of the present invention, the Media Interface 6000 should be left on, with the Communication and Transport Program 6760 running, 24 hours a day, 7 days a week. This is necessary so that the Transaction Processing Program 6720 can receive and process any transaction messages from the Central Controller and Presentation Processor 1000 FIG. 2a regardless of the hour of the day.

Buyer's Use of Present Invention Demonstrating Transaction Processing and Access Delivery Substitution The preferred embodiment of the present invention allows for "open access" to all electronic presentations by assembling the presentations in an accessible format that can be searched and read by independent, public, electronic search engines as well as by individual private search programs. We are referring to Internet Search Engines such as Yahoo, Lycos, Web Crawler, Excite, Hotbot, Altavista, and other referral and/or robotic, publicly accessible "Search Engines." The block diagram of FIG. 3a through 3k is an example of the preferred embodiment of the present invention that, for this example, has been configured for presenting lodging and event service-type sellers.

With this open-access design or architecture, the Buyer may choose any of the available access methods to find or search for the goods, products, events, or services represented. If the Buyer is aware of how to access the directory, index, or presentation site that may contain the subject presentations that the Buyer is interested in, he can go directly to the site or direct his personal search program to search the site. This searching of the site may be done either on a single search basis or as part of a group or list of sites that the Buyer wants to search. As an example, if the Buyer is looking for lodging in a given city, the Buyer might give instructions and search parameters to the Buyer's private search program. Those instructions and search parameters would include a list of sites that the Buyer wants to search. That list of sites could contain a wide range of sites that have been created under various methods including the present invention. The private search program can perform the searches while the Buyer is waiting for the results or can be scheduled to search during off-peak hours, then present the search results to the Buyer at his convenience. The search results delivered to the Buyer are a listing of those pages or presentations that meet the search instructions and parameters that were entered by the Buyer (blocks 10100, 10110-10118).

If the Buyer has the access location knowledge, he also has the option to access the presentations directly using Internet access and any Internet Browser such as Netscape 4.0 or any other browser software. Once the Buyer has accessed the site directly, he has the choice to either conduct a search for the desired products, goods, or services using the on-site search capabilities or browse the presentations much the same way one would browse the aisles of books at a library. Search methods of the present invention can vary from instance to instance, but the preferred embodiment would always give the option of a full text-based search of all presentations or a database search of the information contained within the Final Presentation Database 2645 FIG. 2b. The search function is easily accessed by the Buyer entering key words or phrases that will most likely result in finding the information that he wants (blocks 10120-10126). The search results obtained from the on-site search function will direct the Buyer to those presentations contained within that Central Presentation and Selection Server 2000, but not to other sites or sources. For the Buyer who wishes to browse the structure of the presentations contained on the Central Presentation and Selection Server 2000, the design and architecture of the presentation structure will direct him to the information he seeks by means of subject indexes and directories.

Buyers who are not aware of how to access the directory, index, or presentation site can access the presentations by using the public search engines such as Yahoo, Lycos, Web Crawler, Excite, Hotbot, Altavista, and other referral and/or robotic publicly accessible "Search Engines". With the open-access format and structure, the present invention allows the search engines to have full access to the presentations to review and index the subject matter of each presentation. Every search engine uses different algorithms to conduct the search and to establish the priorities in presenting the results of the requested searches. The result of these searches is presented to the Buyer in the form of direct references to the presentations which the search algorithms have determined contain the requested information (blocks 10102, 10104).

Once the Buyer has narrowed his information search to a manageable amount by either automated search systems or by browsing, the Buyer would then review the presentations available (blocks 10140, 10150). If, for example, the Buyer is searching for lodging, he would, after deciding on a specific lodging facility and room type, request a reservation for a given set of dates (blocks 10660, 10162). This request is made interactively while he views the presentations on the Central Presentation and Selection Server 2000. The Transaction Negotiation Program 2725 processes that request, using the information contained within the Inventory Database 2660 and the Referral Database 2670 if necessary. Continuing the lodging example, the program checks if the requested room is available for the dates requested and, if not, enters a negotiation mode. The program will suggest alternative accommodations (different rooms or even a different lodging facility and rooms), using logic to suggest the best alternative. As an example of this logic, the algorithms would not suggest a bridal suite when the Buyer has requested a single economy room, or it may offer a discount for an upgraded room (block 10170-10198). If the suggested alternatives do not meet the needs of the Buyer, then the buyer is referred back to the indexes to review the lodging possibilities again and start over (block 10140). Once the Buyer has chosen a facility, room, and dates (in the lodging example) which the Transaction Negotiation Program 2725 accepts, that program puts that particular inventory on a hold status to allow the Buyer time to respond with the additional information necessary to make the purchase or reservation (block 10200, 10202). It is important that the Buyer is not burdened with inputting the required information until the items (in the lodging example, room and dates) that he wants are confirmed to be available. If a Buyer is forced to input the additional information and then find that the inventory is not available, he will feel that the system has wasted his time and will probably not use the service in the future. Only when the program first confirms the availability of the inventory and then asks for the additional information will the Buyer view the process as appropriate and necessary. The type and amount of additional information that is required largely depends on the type of products, goods, or services that are represented. In the preferred embodiment of the present invention, the Buyer would be prompted to apply for a Delivery or Network ID. Once the Buyer has this ID number and the associated password, then he would only have to enter that ID number for future use instead of entering all required information. The Delivery or Network ID is also used as a substitute for the more traditional methods of proof-of-access such as tickets, passes, admission documents, reservations, reservation confirmations, and other physical proof of purchase. In this embodiment of the present invention, the Delivery or Network ID could also be used to give discounts for use, promotional offers, upgrades, or other marketing incentives. The information required in the application for the Delivery or Network ID would be owner names; contact names, numbers, and address; payment and credit information or payment method information; and any other information necessary to support the Delivery or Network ID. The Buyer would also be required to identify which physical card or ID that he currently holds, he intends to use as the Delivery or Network ID. (blocks 10220-10232). An example of the appropriate use for the Delivery or Network ID would be in conjunction with an instance of the present invention that is configured to represent professional sporting events. The Buyer in our example could purchase access to a given represented sporting event through the Central Presentation and Selection Server 2000, and the only requirement of the Buyer when arriving at the facility to attend the event would be to present his Delivery or Network ID for processing. If the Buyer has a Delivery or Network ID, he is prompted for the Delivery or Network ID and its password. If the Buyer does not want a Delivery or Network ID, he is prompted for the necessary information in lieu of the Delivery or Network ID. Depending on the information required and the responses from the Buyer, the Transaction Negotiation Program continues to prompt the Buyer until all information requirements have been met (blocks 10220-10262).

Having received and reviewed all the required information requested from the Buyer, the Transaction Negotiation Program 2725 then requests a transaction approval code from a credit card processing company. If the credit card is not approved, the program then requests an alternative payment method from the Buyer (blocks 10270-10282).

A Transaction ID is assigned after the Transaction Approval Code has been received (block 10290). With the assignment of the Transaction ID, the Transaction Negotiation Program 2725 creates a confirmation proof of purchase or order (Confirmation of Booking in the lodging example). This confirmation is presented to the Buyer with prompts for choosing any additional information that may be available to add to this document prior to the Buyer printing it. With the lodging example, the additional information might include directions to the facility, description and photos of the facility and or room, list of amenities of the facility such as pool and gym, list of activities in the area, or any other information of interest or concern to the Buyer (blocks (10300-10308). If, in the preferred embodiment of the present invention, the Buyer later wishes to cancel or modify his purchase, reservation, or request, he would return to the Seller's presentation and access and modify his purchase or reservation by using his Delivery or Network ID, Transaction ID, confirmation number, credit card number, some combination of these, or some other identification method (blocks 10312-10316).

After the Transaction ID has been assigned and the Buyer has been presented with the purchase response, the Transaction Negotiation Program 2725 determines if the inventory sold or reserved was controlled by the Resource Saver Protocol. If the inventory is controlled by the Resource Saver Protocol, the program determines if the Inventory Notification Level has been reached and if so, what the remaining inventory count currently is after subtracting the transactions currently on hold (blocks 10320-10324). Regardless of whether the Resource Saver Protocol applies to a particular instance of this invention, the program must calculate the Inventory Confirmation Number (block 10330). This Inventory Confirmation Number, which varies from seller type to seller type, is used as a "check number" to confirm that all components, the Central Presentation and Selection Server 2000, the Central Controller and Presentation Processor 1000, and the Seller Interface 4000 have their associated inventory databases in synchronization.

The Transaction Negotiation Program 2725 also assigns a sequential transaction message number associated with this transaction. It is through the tracking of this number that the Central Controller and Presentation Processor 1000 and Seller Interface 4000 can determine if a gap exists and a missing transaction message needs to be requested from the component that sent the missed message.

The Transaction Negotiation Program 2725 updates Buyer Database 2610, Transaction Database 2620, Inventory Database 2660, and any other databases necessary. It uses all the aforementioned data to create the Transaction Message that is sent from the Central Presentation and Selection Server 2000 to the Central Controller and Presentation Processor 1000 (blocks 10340, 10342).

Upon receipt of the Transaction Message, the Transaction Processing Program 1720 on the Central Controller and Presentation Processor 1000 confirms the transaction logic and then updates the Buyer Database 1610, Transaction Database 1620, Inventory Database 1660, and any other database affected. By confirming the transaction logic, we mean that the Transaction Processing Program 1720 recalculates all of the calculations done by the Transaction Negotiation Program 2725 on the Central Presentation and Selection Server 2000. This is done for quality control and security reasons (blocks 10360-10364).

The Transaction Processing Program 1720 then creates the Transaction Messages to send to the Seller Interface 4000 and updates any other Central Presentation and Selection Servers 2000 that may be affected by any change in inventory as a result of this transaction. It should be noted that this is an example of the savings presented by the Resource Saver Protocol. For those items of inventory that are controlled by the Resource Saver Protocol, Transaction Messages need not be sent to the related or sibling Central Presentation and Selection Servers 2000 unless the Notification Level has been reached or breached for that group of inventory. For those items of inventory that are not controlled by the Resource Saver Protocol, the Central Controller and Presentation Processor 1000 sends Transaction Messages to the Seller Interface 4000 and to all affected Central Presentation and Selection Servers 2000. In this embodiment of the present invention, the Central Controller and Presentation Processor 1000 and any Central Presentation and Selection Servers 2000 are linked via a full-time network connection, which would allow the update or Transaction Message to be sent via the network. The Sellers could be on the same network, but more likely would be communicating with the use of modem on demand, meaning that a communications link would only be established when there were Transaction Messages, Updates, or other data or information to exchange or deliver. The communications between the Central Presentation and Selection Server 2000, the Central Controller and Presentation Processor 1000 and the Seller Interface 4000 is either protected by encryption or only takes place on a private network or secure line modem (blocks 10370-10400).

Upon receiving a Transaction Message, either the Transaction Processing Program 4720 or the Seller Accounting or Management Program 4000B of the Seller Interface 4000 confirms that the purchased inventory or reservation is available and recalculates and confirms all needed data contained within the Transaction Message. If the Transaction Message is found to contain erroneous or missing data, then error messages are sent to the Central Controller and Presentation Processor 1000, the management or administrator, and to the Buyer (blocks 10410-10432). It should be noted that in this embodiment of the present invention, the Transaction Processing Program 4720 is present but disabled whenever a compatible Seller Accounting or Management Program 4000B is in use and capable of performing the functions of the Transaction Processing Program 4720.

In this embodiment of the present invention, the Transaction Processing Program 4720 or the Seller Accounting or Management Program 4000B of the Seller Interface 4000, whichever is enabled, will have the option to be set to automatically accept or reject the purchase or reservation without any further operator interaction. If the automatic option is not invoked by the management of the Seller Interface 4000, then the processing of the Transaction Message would require the human operator to review the transaction and either accept or reject the transaction and provide the appropriate responses (blocks 10440-10456).

All appropriate databases are updated, and then, if the Transaction Processing Program 4720 has been used instead of the Seller Accounting or Management Program 4000B, a Transaction Message may be sent to a second-level or non-compatible accounting or management software. An embodiment of the present invention distinguishes between a fully compatible Seller Accounting or Management Program 4000B that performs all the necessary functions and a second-level or non-compatible accounting or management software that the seller may be using that does not meet the standards of the present invention (blocks 10460-10472).

If the inventory or reservations purchased are controlled by the Resource Saver Protocol, then the Transaction Processing Program 4720 or the Seller Accounting or Management Program 4000B performs the appropriate inventory calculations. If the inventory level has reached or breached the notification level, then the Transaction Processing Program 4720 or the Seller Accounting or Management Program 4000B must send a transaction message to the Central Controller and Presentation Processor 1000, which in turn sends it to the Central Presentation and Selection Servers 2000. The transaction message prompts the Central Controller and Presentation Processor 1000 and the Central Presentation and Selection Servers 2000 to update their respective databases. Regardless of whether or not the Resource Saver Protocol has been activated, the Transaction Processing Program or Seller Accounting or Management Program 4000B sends an Acknowledgment Message to the Central Controller and Presentation Processor 1000 to confirm that it has received and processed the Transaction Message (blocks 10480-10490).

Depending on the Seller type, the Transaction Message may contain a request from the Buyer for a confirmation of the purchase or reservation. This request will be delivered to the Seller and, by necessity, would primarily be handled or satisfied outside the realm of the present invention (blocks 10500-10512).

Figure 3A:
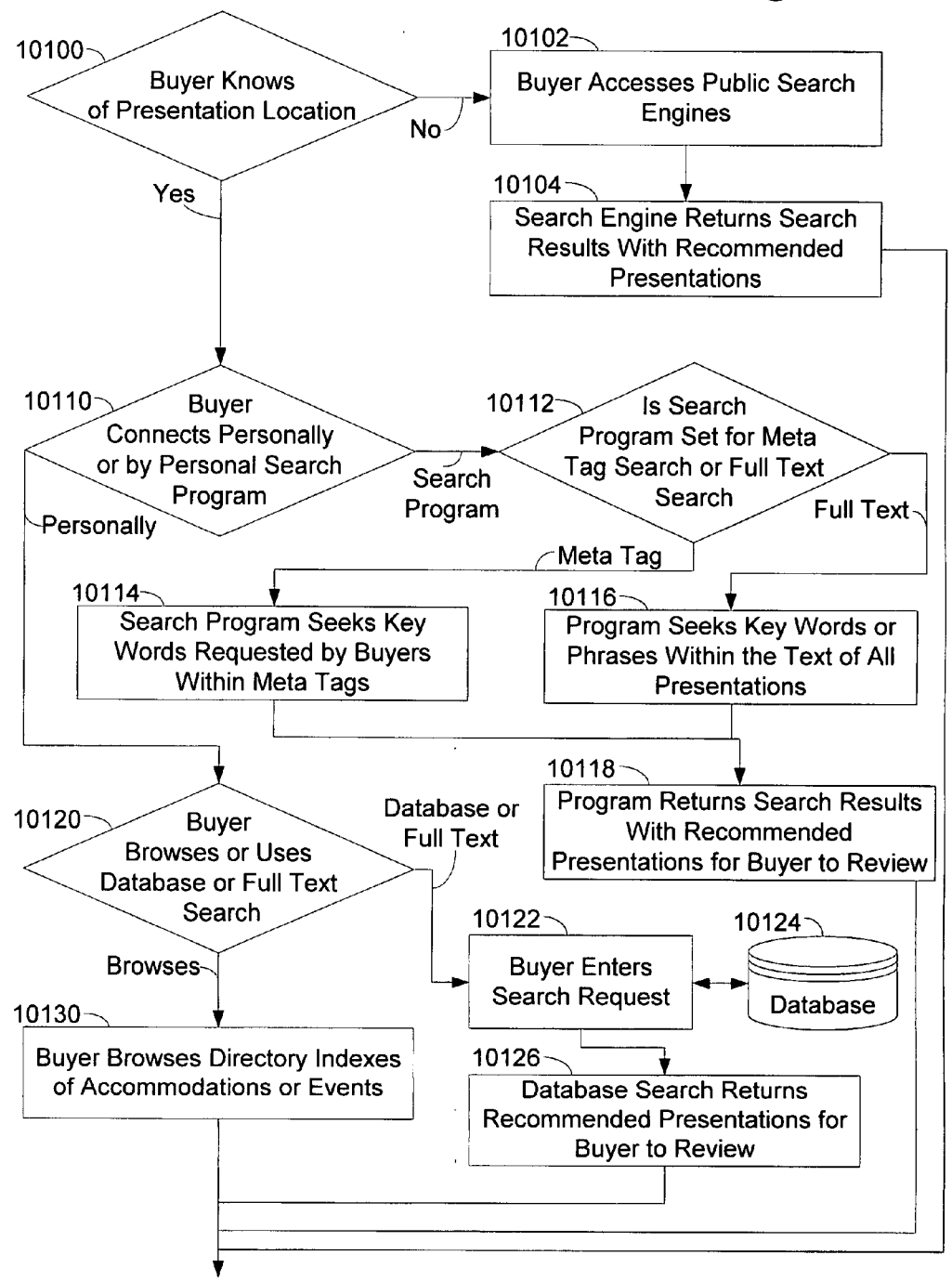
Figure 3B:
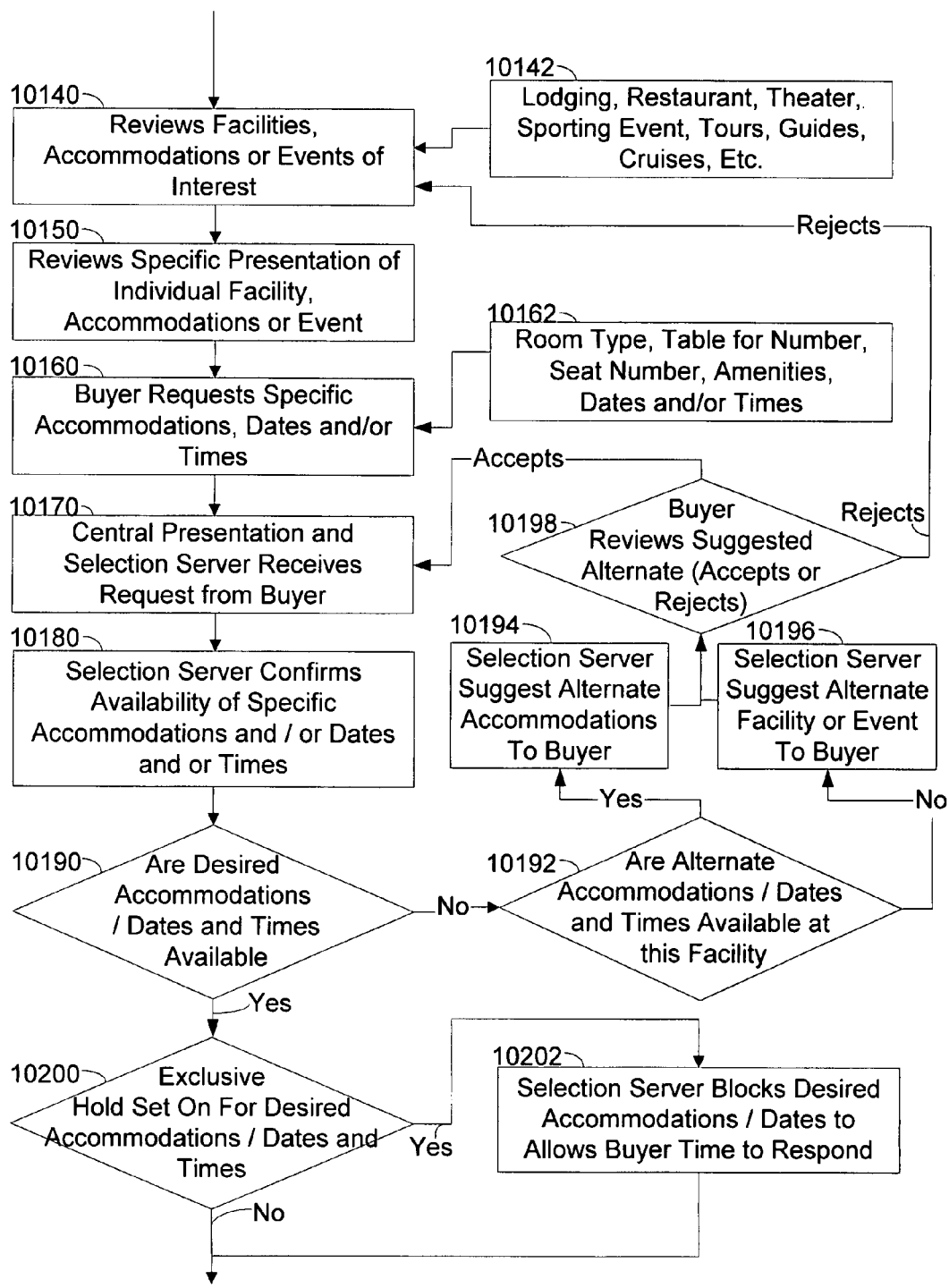
Figure 3C:
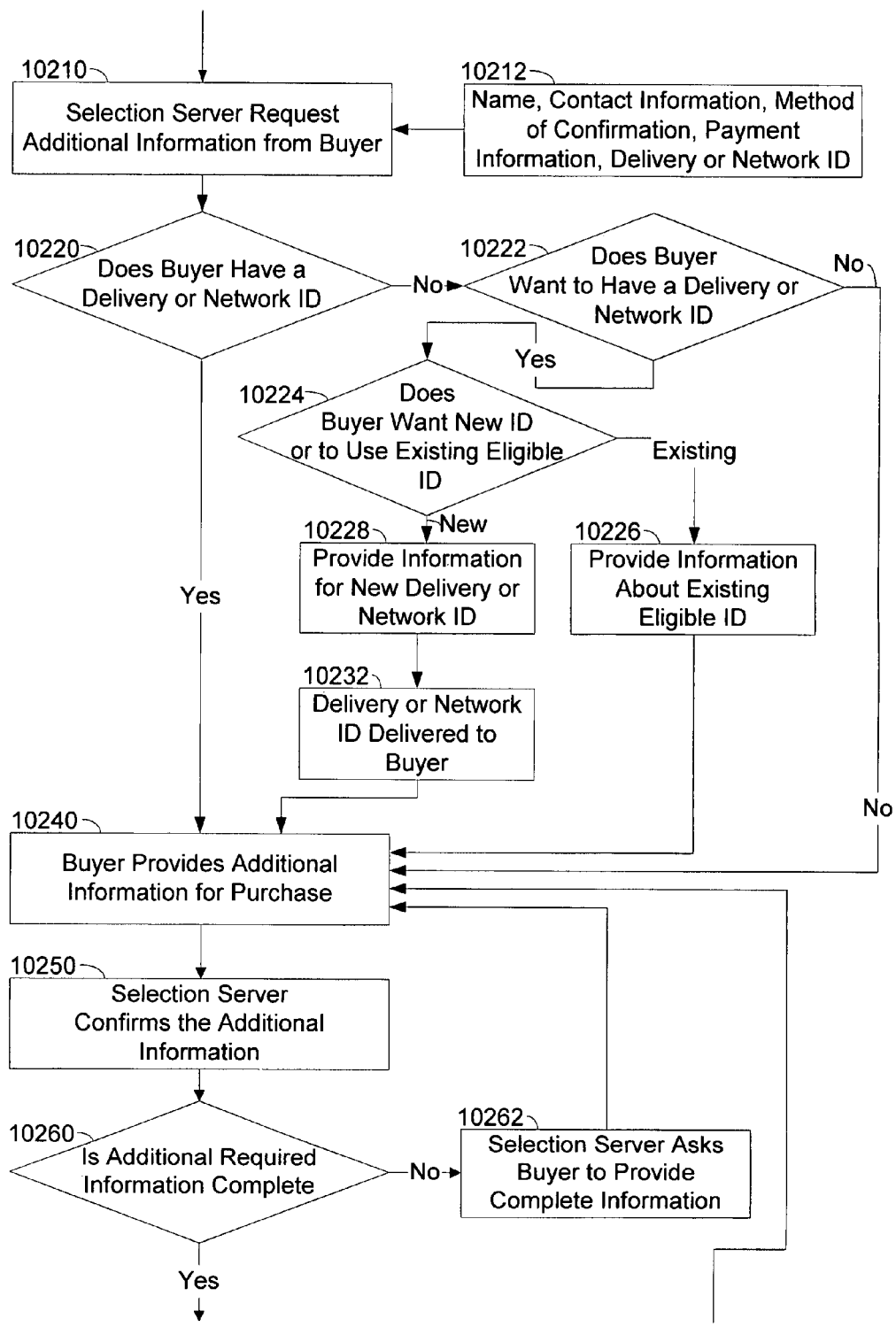
Figure 3D:
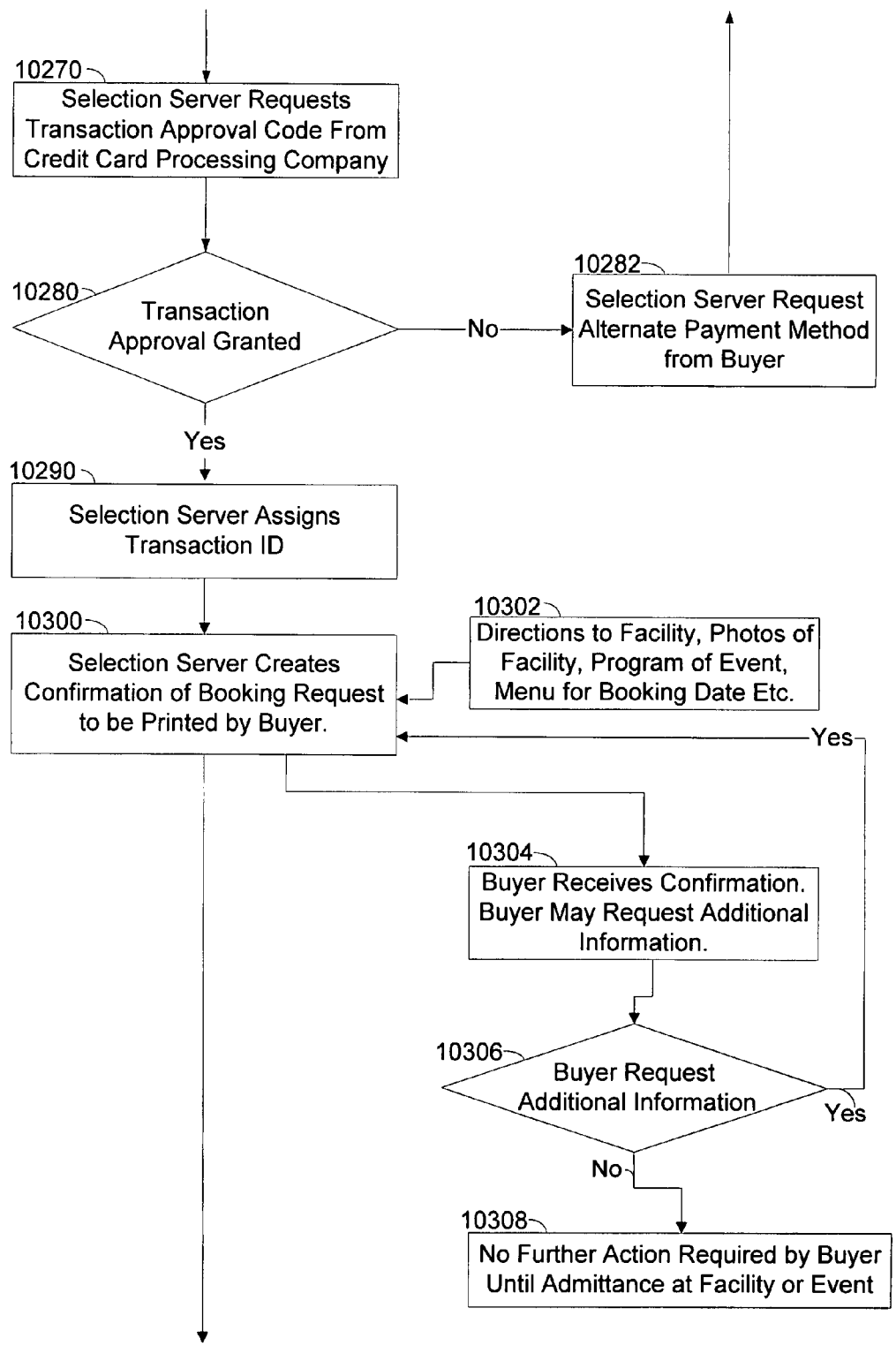
Figure 3E:
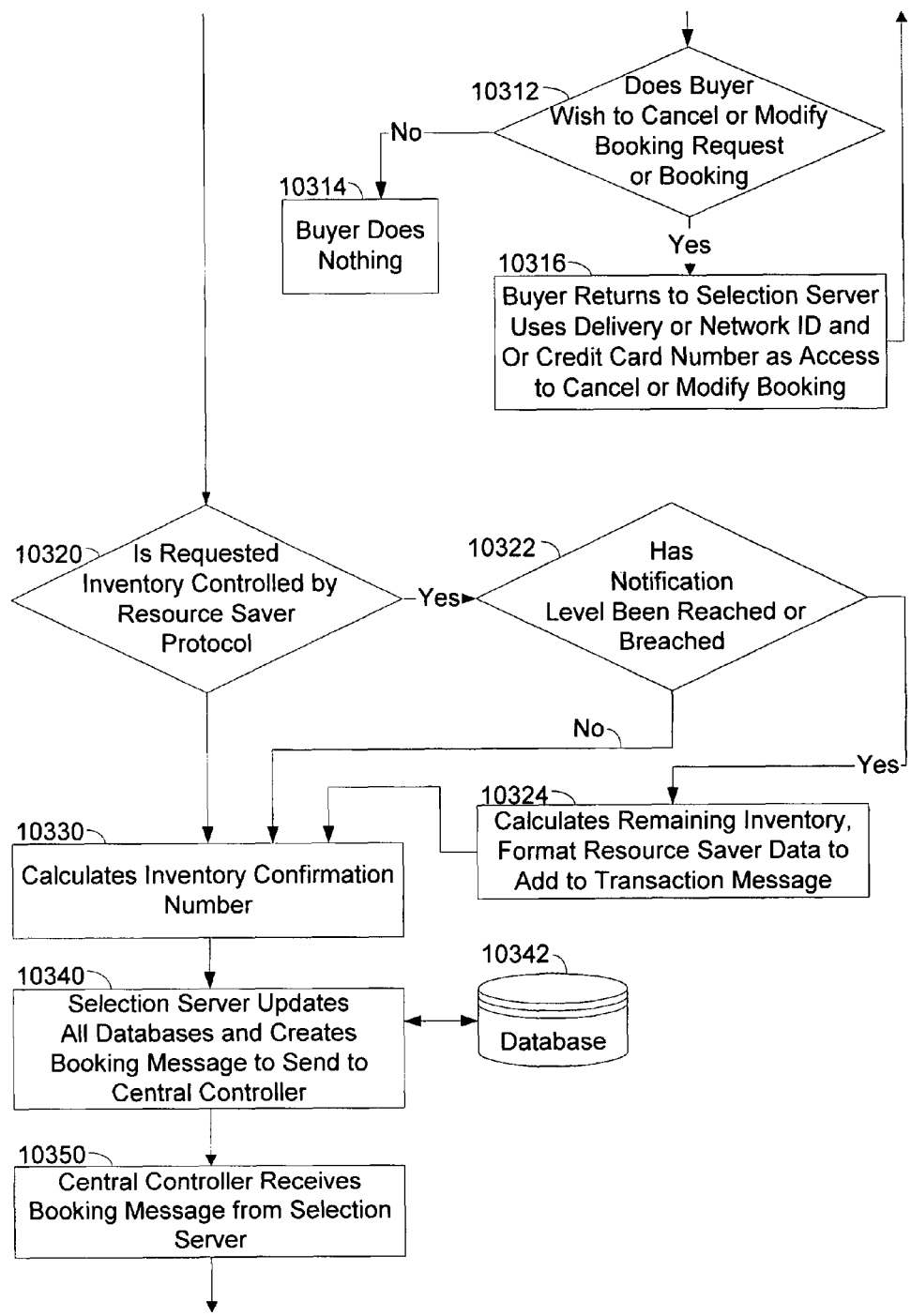
Figure 3F:
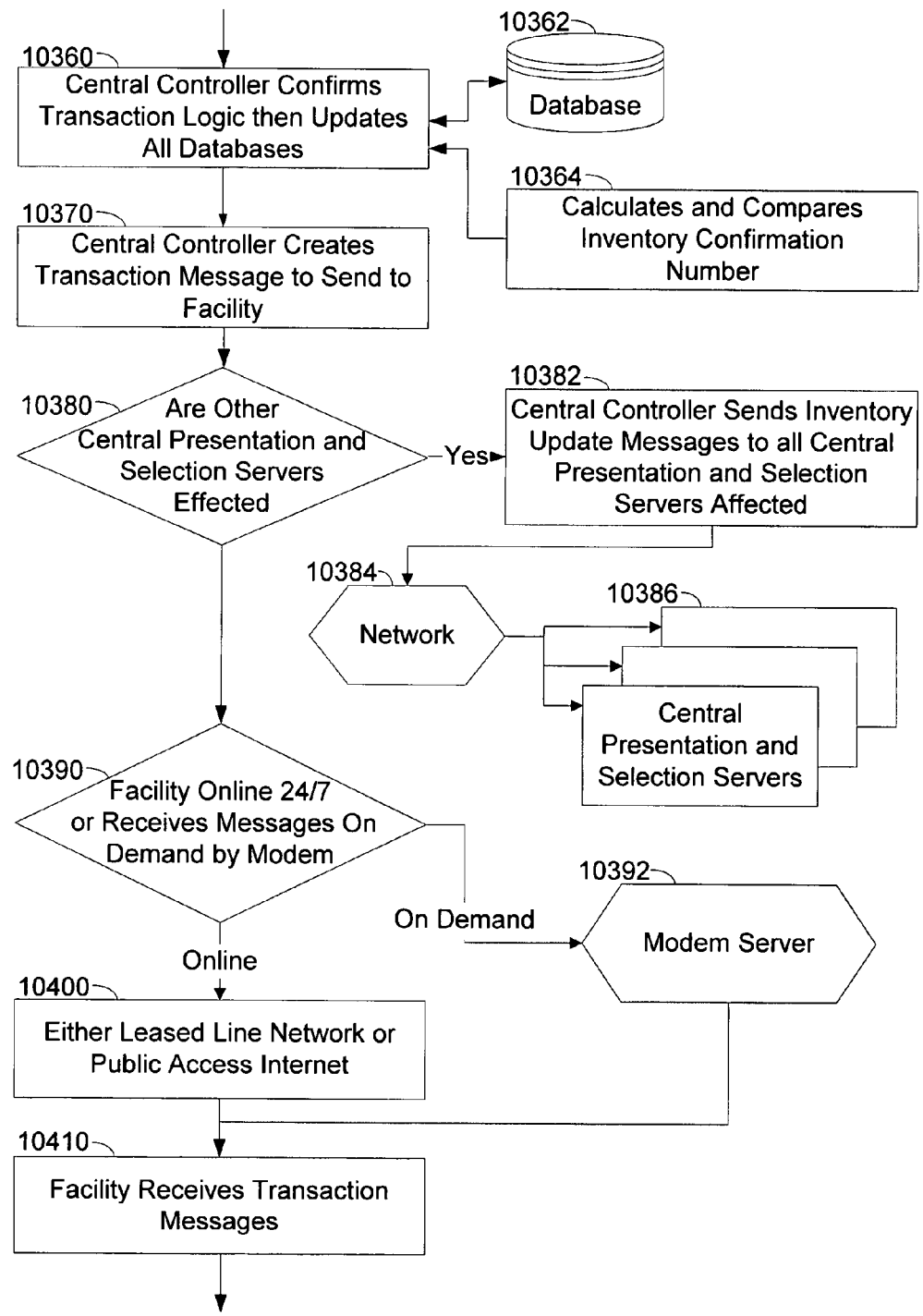
Figure 3H:
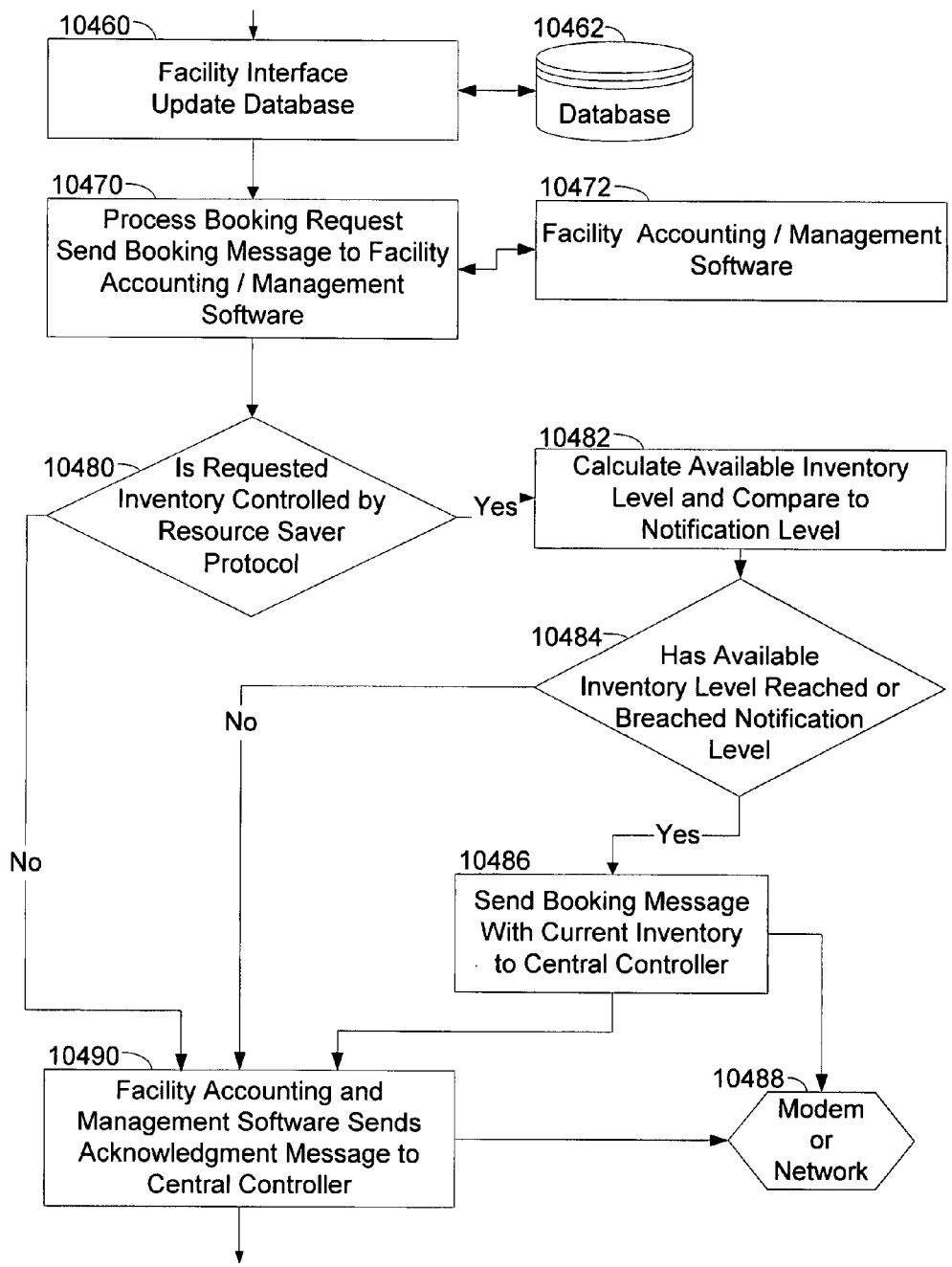
Figure 3I:
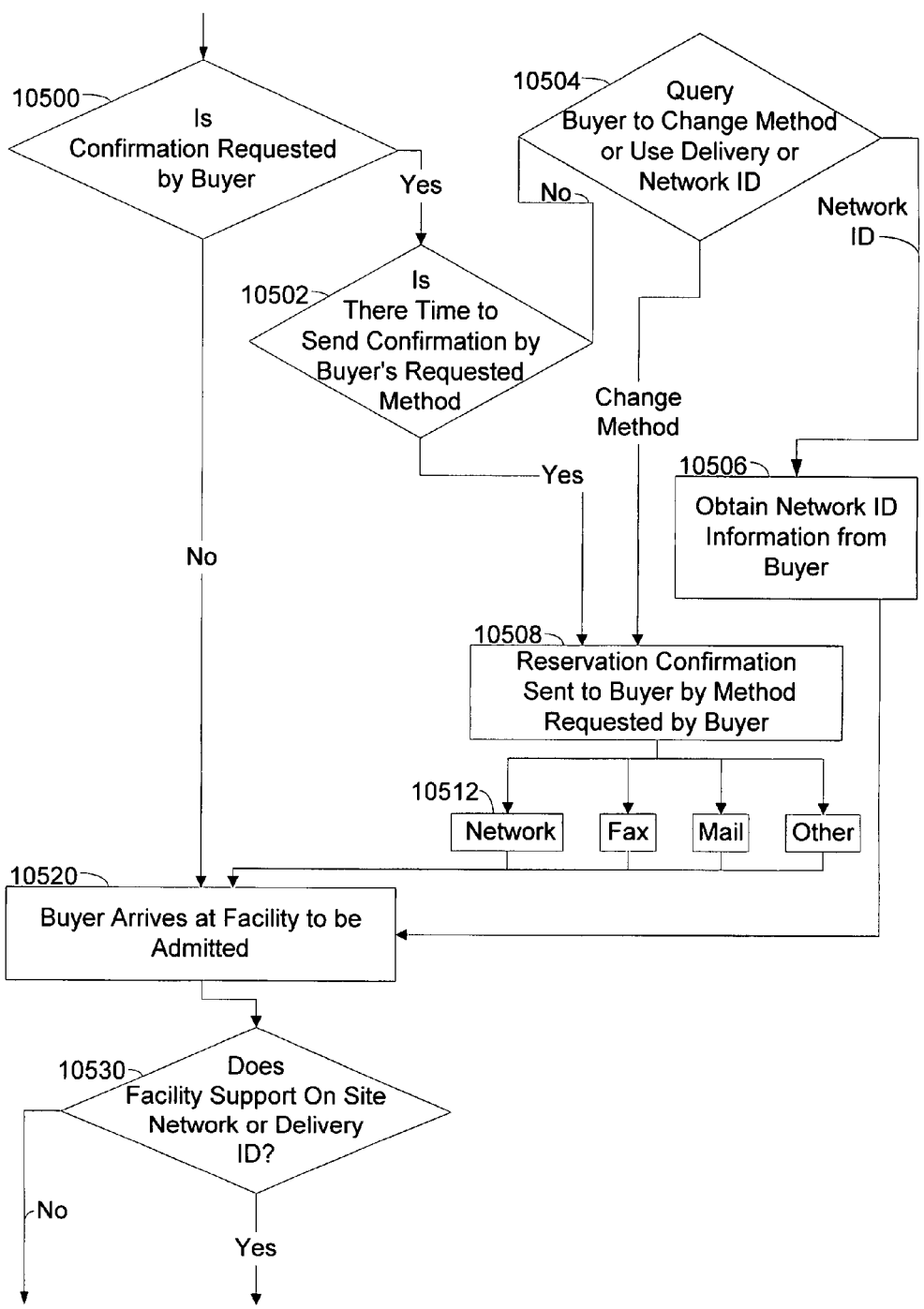
Figure 3J:
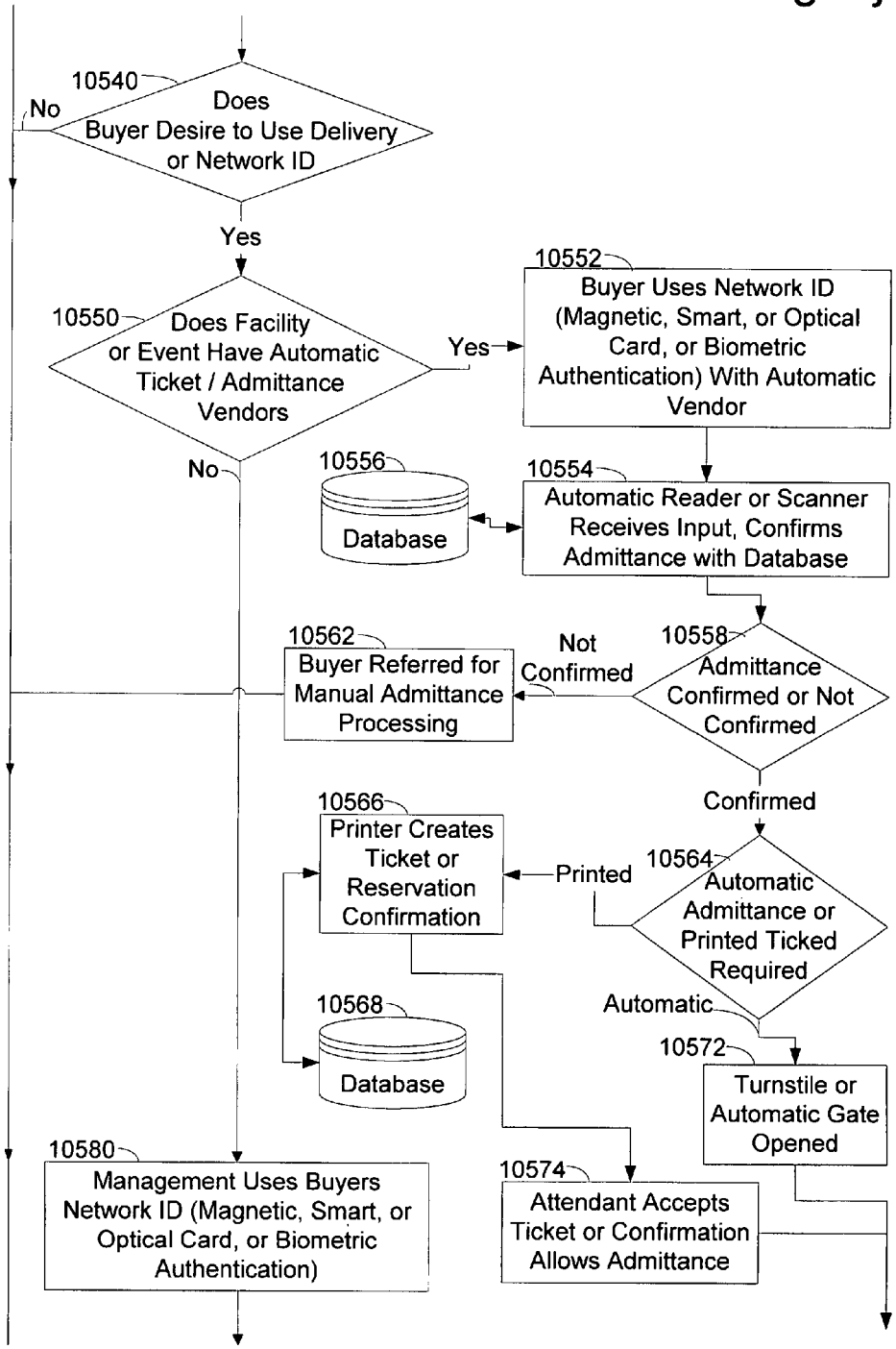
Figure 3K:
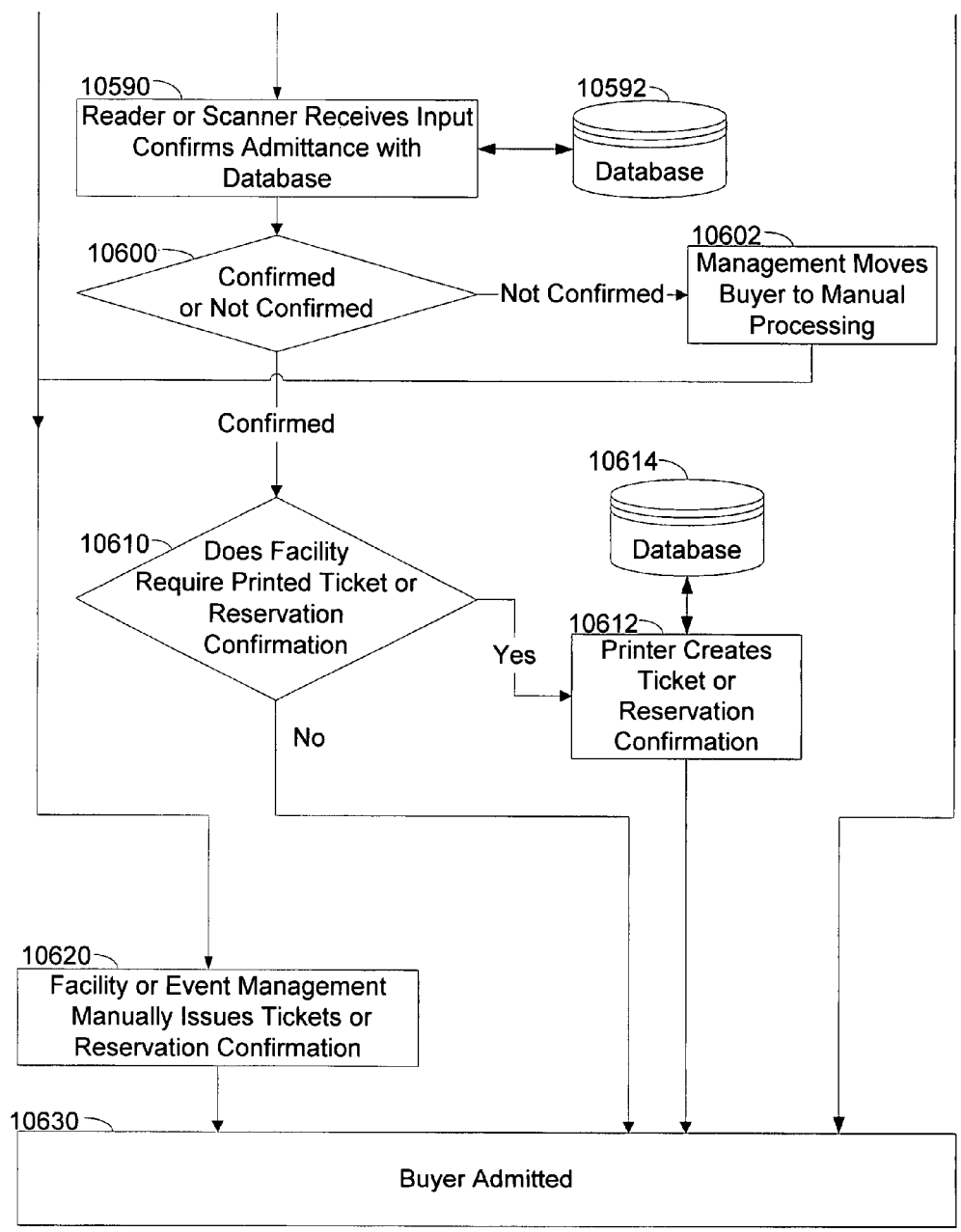

If the purchased item is to be delivered to the buyer, then the alternative block diagram FIG. **3*i-a* shows the possible configuration of that transaction flow. This configuration would be for goods or products that might require physical delivery of the good or product to the Buyer. The Central Presentation and Selection Server 2000 formats and sends a Transaction Message, which contains any shipping request or special instructions to the Seller. The Central Controller and Presentation Processor 1000 processes the Transaction Message and then sends it to the Seller Interface 4000. The Seller will respond to those shipping and special requests outside the realm of the present invention. (FIG. 3*i-a*, blocks 10500*a* - 10510*a***).

In keeping with the configuration of the block diagram that is intended for the delivery of tickets, passes, admission documents, reservations, or reservation confirmations, all processing is completed at block 10512 until the Buyer arrives at the facility, site, business, or venue to be admitted. For events that might traditionally require a ticket, pass, admission document, or reservation confirmation as proof of admittance, an instance of the present invention has several options for the confirmation and delivery of said documents. It should be noted that even though the Central Presentation and Selection Server 2000 supports the use of the Network or Delivery ID, which makes repeated use of the Central Presentation and Selection Server 2000 easier for the Buyer to utilize. The physical use of the Network or Delivery ID is optional at the level of the facility, site, business, or venue. The preferred embodiment of the present invention, when fully configured for the acceptance of the Delivery or Network ID, allows the Buyer several options. If the Buyer arriving at the facility, site, business, or venue chooses to use the Delivery or Network ID, he would simply have his ID Card read by an unattended automatic reader that would either print the necessary ticket, pass, admission document, or reservation confirmation or immediately allow admittance through a gate or turnstile (blocks 10550-10574). The savings to the Seller, in the form of time and labor for processing admittance, is obvious. The real advantage, however, comes in the form of Buyer goodwill resulting from the convenience of reducing the time it takes to be admitted or to obtain the physical tickets, passes, admission documents, reservations, or reservation confirmations. The use of the Delivery or Network ID within an embodiment of the present invention is accomplished by either the Buyer Admission Control Program 4770, which is a component of the present invention, or by compatible third-party programs such as the Seller Admission Control Program 4000C or the Seller Accounting or Management Program 4000B with an integrated admission control program to either print tickets or passes or open physical barriers.

If the Seller's facility, site, business, or venue does not support the automatic processing of the Buyer's admittance, then the Seller may use the Delivery or Network ID, with an attendant visually examining the ID or operating the scanner or reader and responding to the results with either admittance or the printing of the tickets, passes, admission documents, reservations, or reservation confirmations. This would not be as efficient as the automatic process, but may present a transition method to the full implementation of the preferred embodiment of the present invention (blocks 10580-10612). In each of these methods, there is a small risk of the physical failure of the Delivery or Network ID or of the reader to accurately identify the Buyer. In all cases of failure, the management would manually confirm the identification and process the admittance of the Buyer (block 10620). In this embodiment of the present invention, the Delivery or Network ID is a Magnetic, Smart, or Optical Card similar to a standard Credit Card. The present invention allows for the use of any unique identification method either presently in use or to be developed in the future. The use of biometric scanners for voice, full face, finger print, iris, or other identification methods are just becoming commercially economical for this type of use and will require the secure and verified obtaining of the original scan or sample.

Buyer is admitted to facility or event (block 10630).

Seller's Use of Present Invention.

Figure 4A:
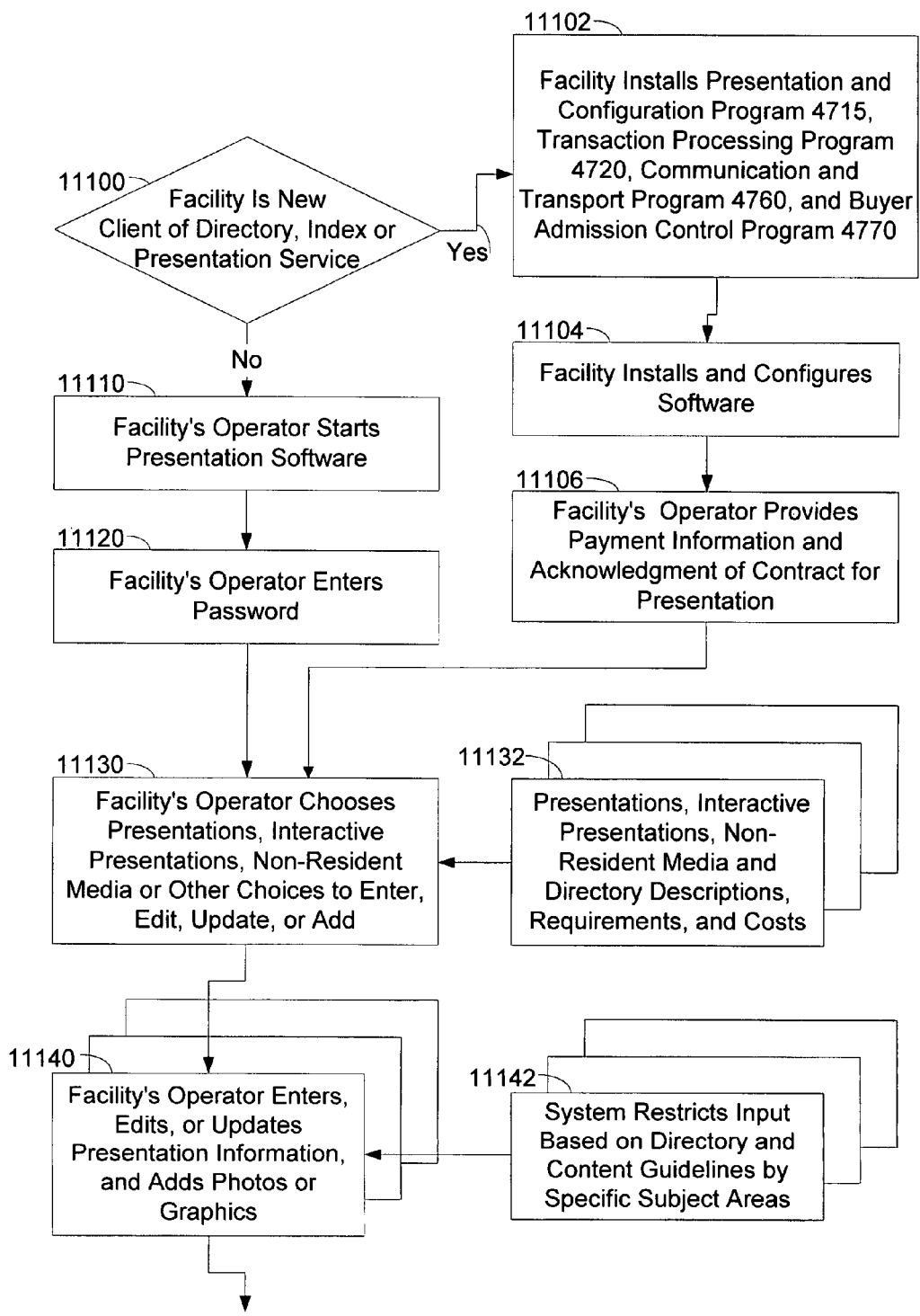
FIG. 4a through 4h is a block diagram showing the Seller's use of the invention. This Example Embodiment is configured for delivery of tickets or reservation confirmation.
Figure 4B:
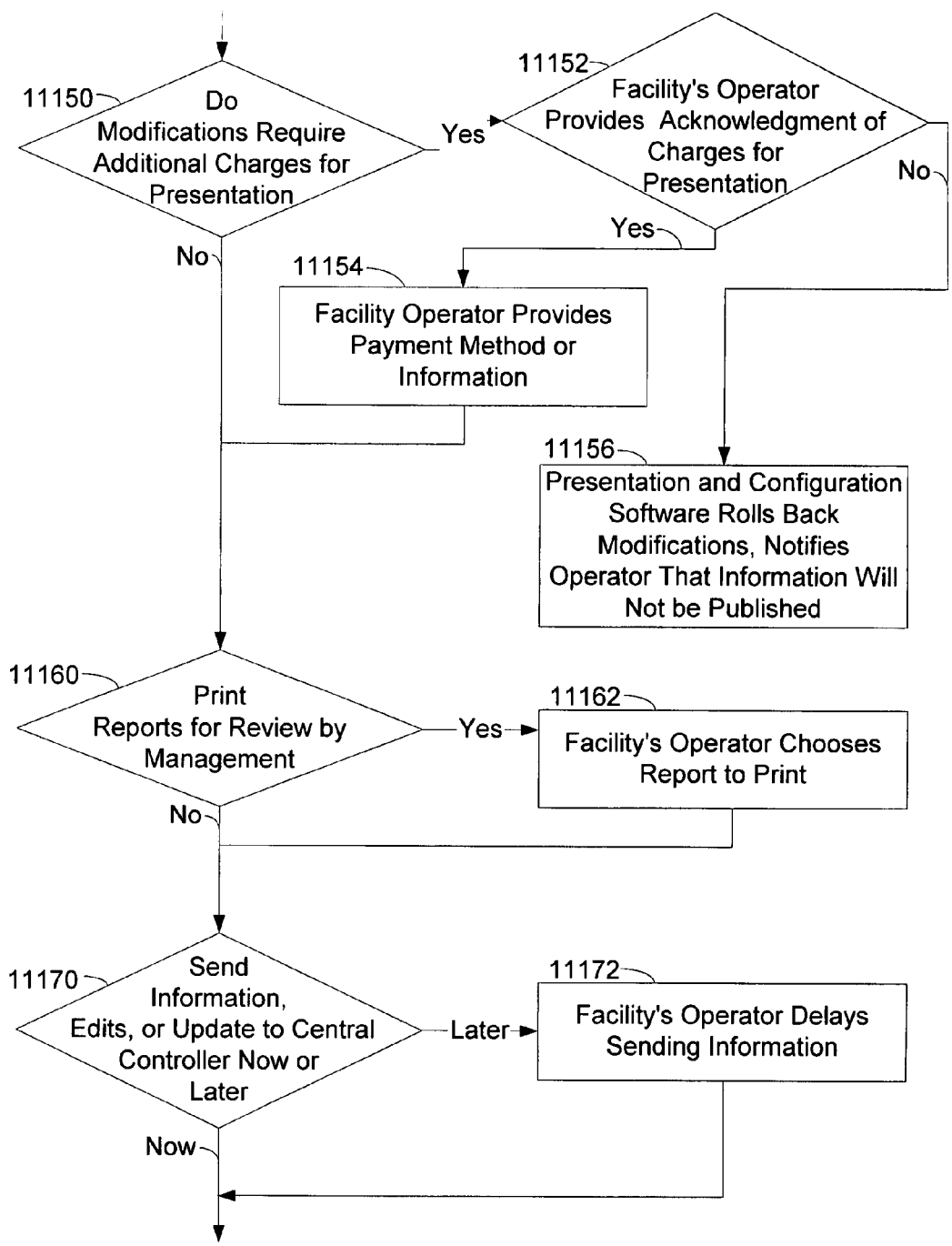
Figure 4C:
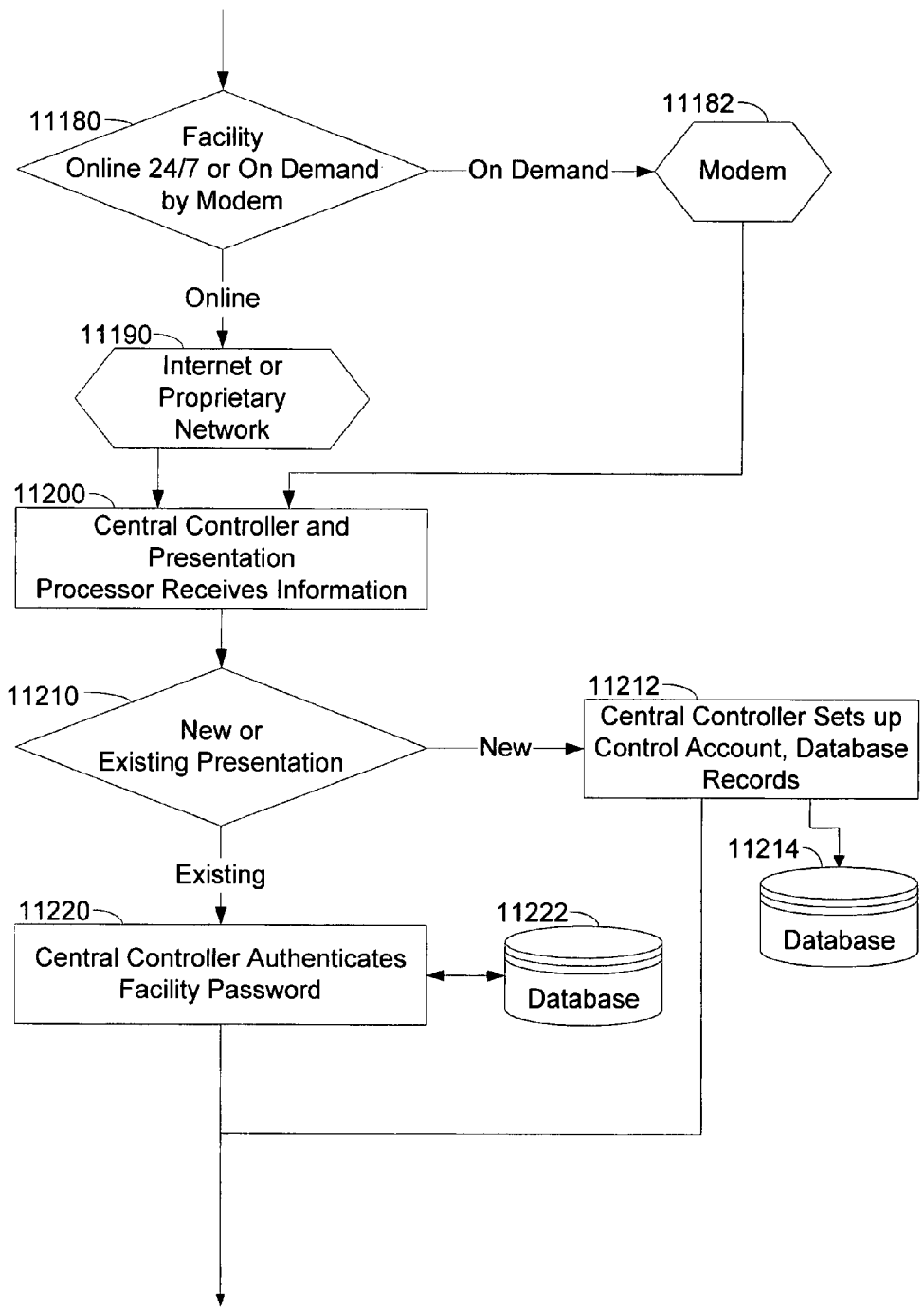
Figure 4D:
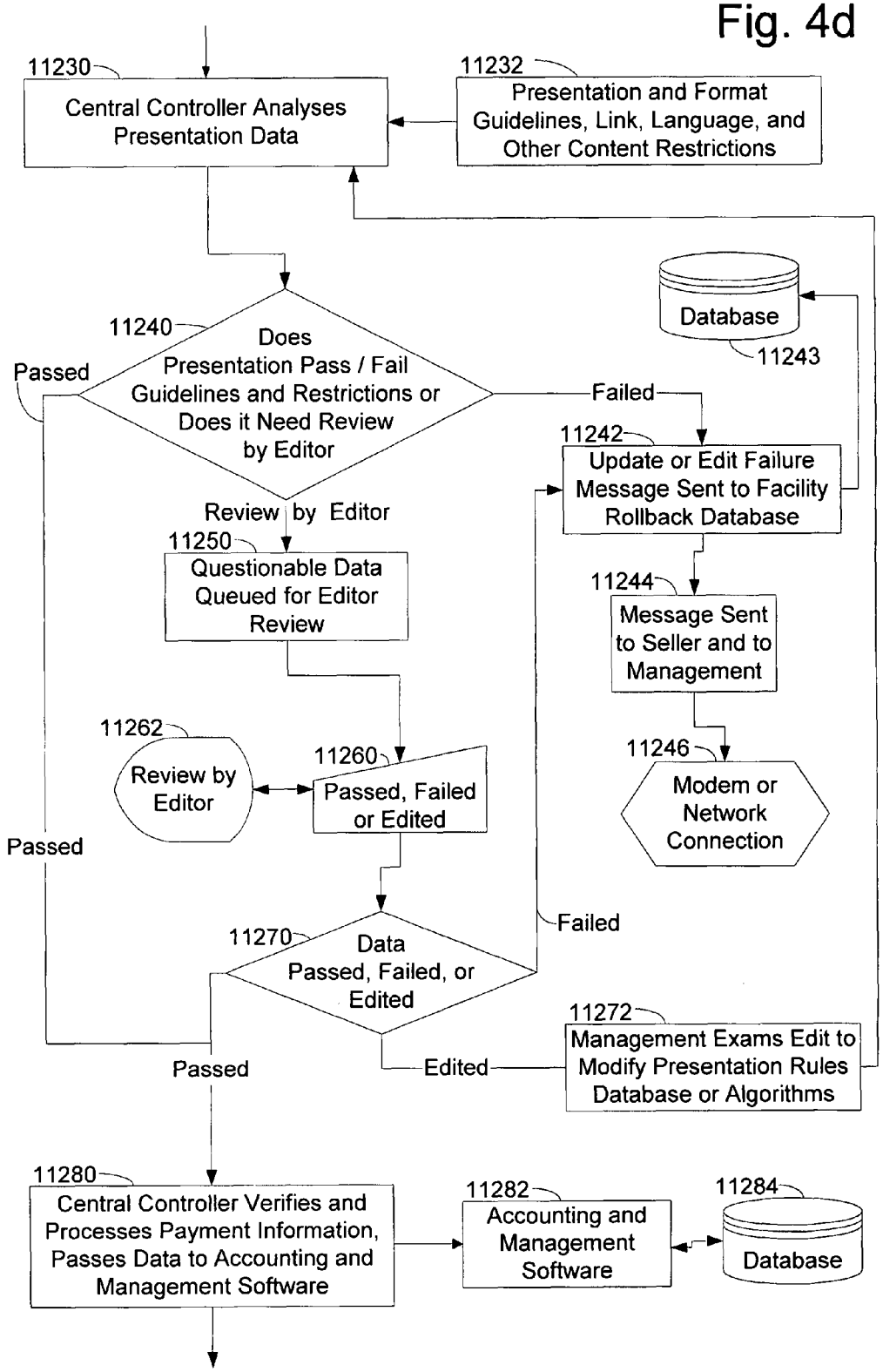
Figure 4E:
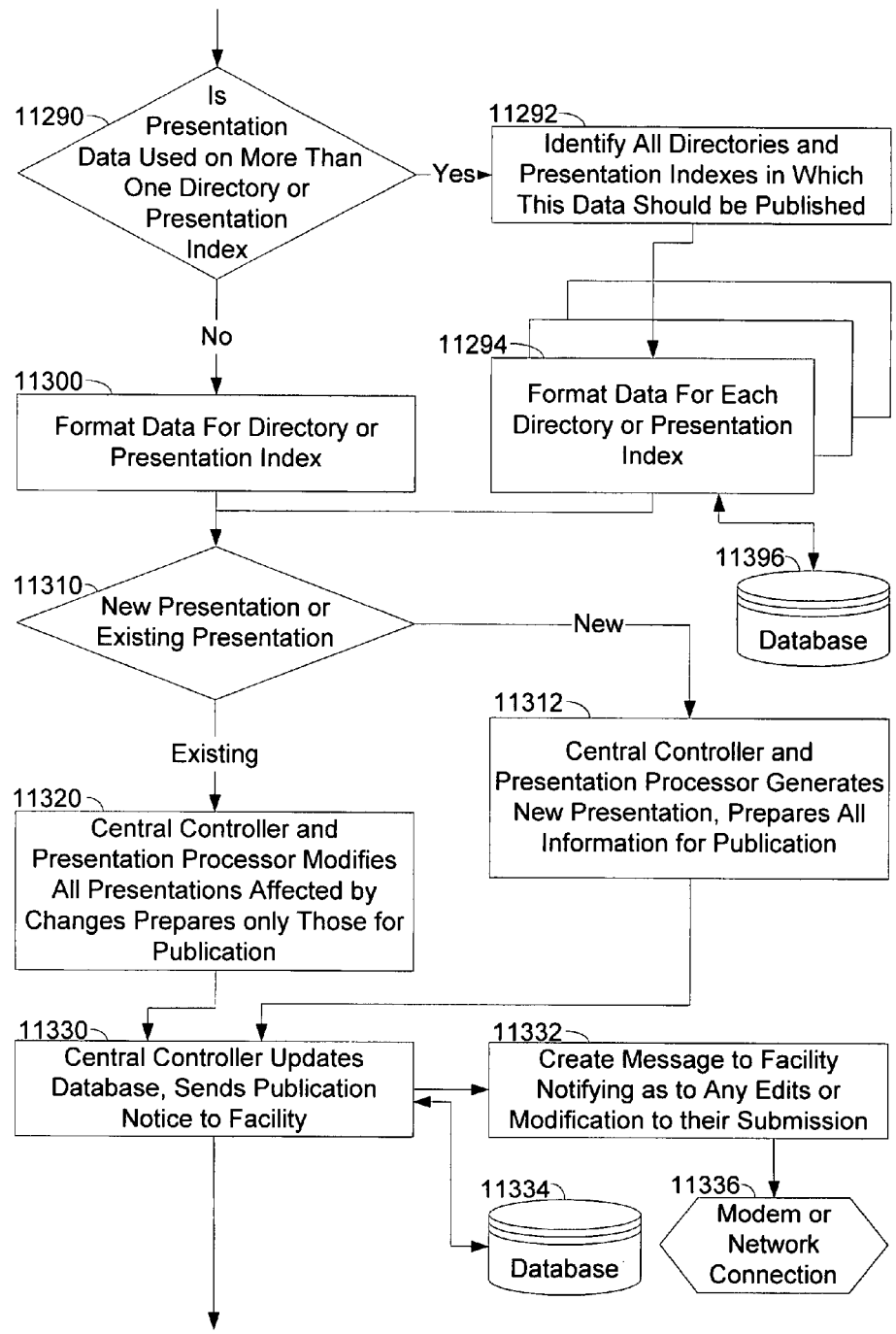
Figure 4F:
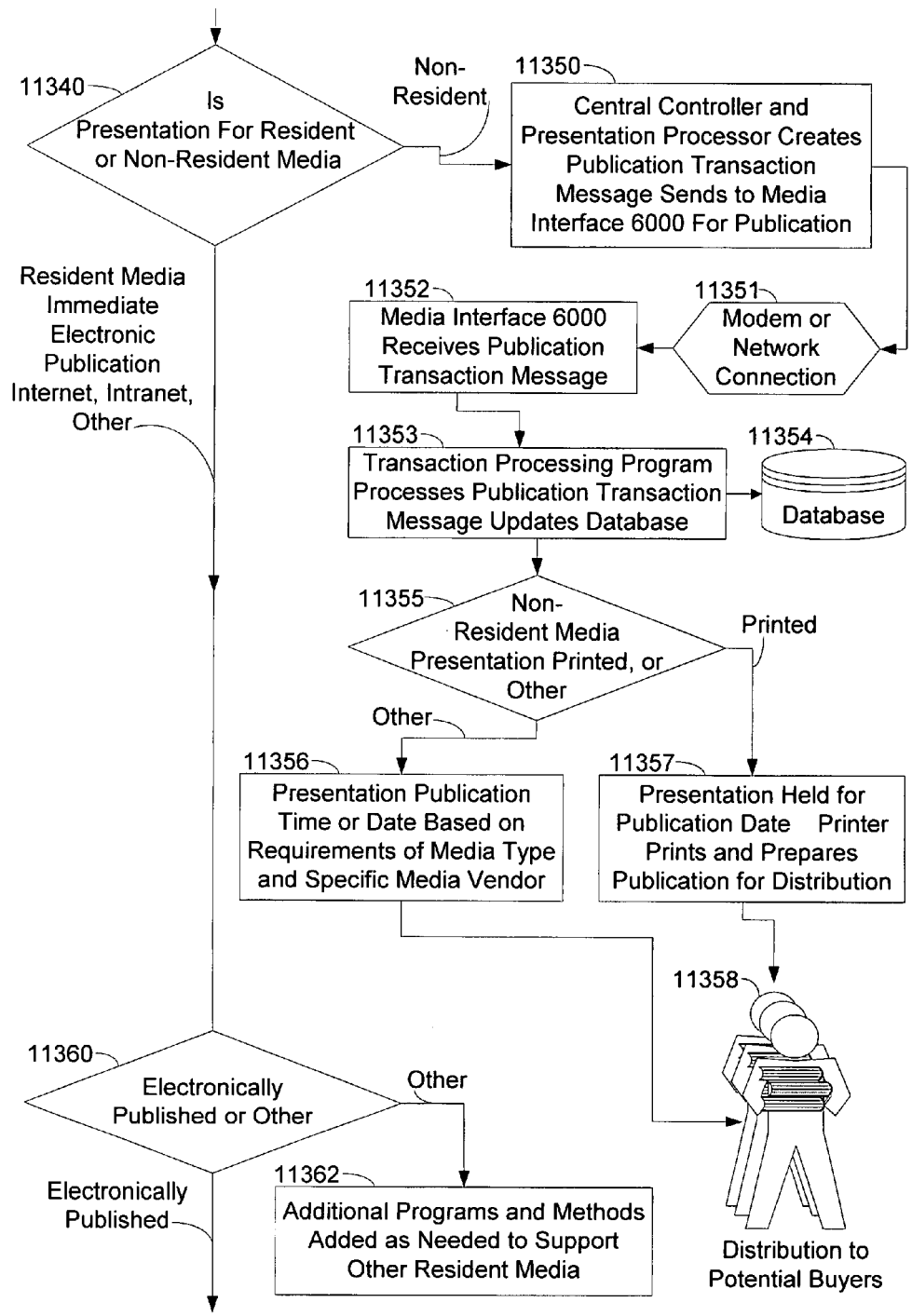
Figure 4G:
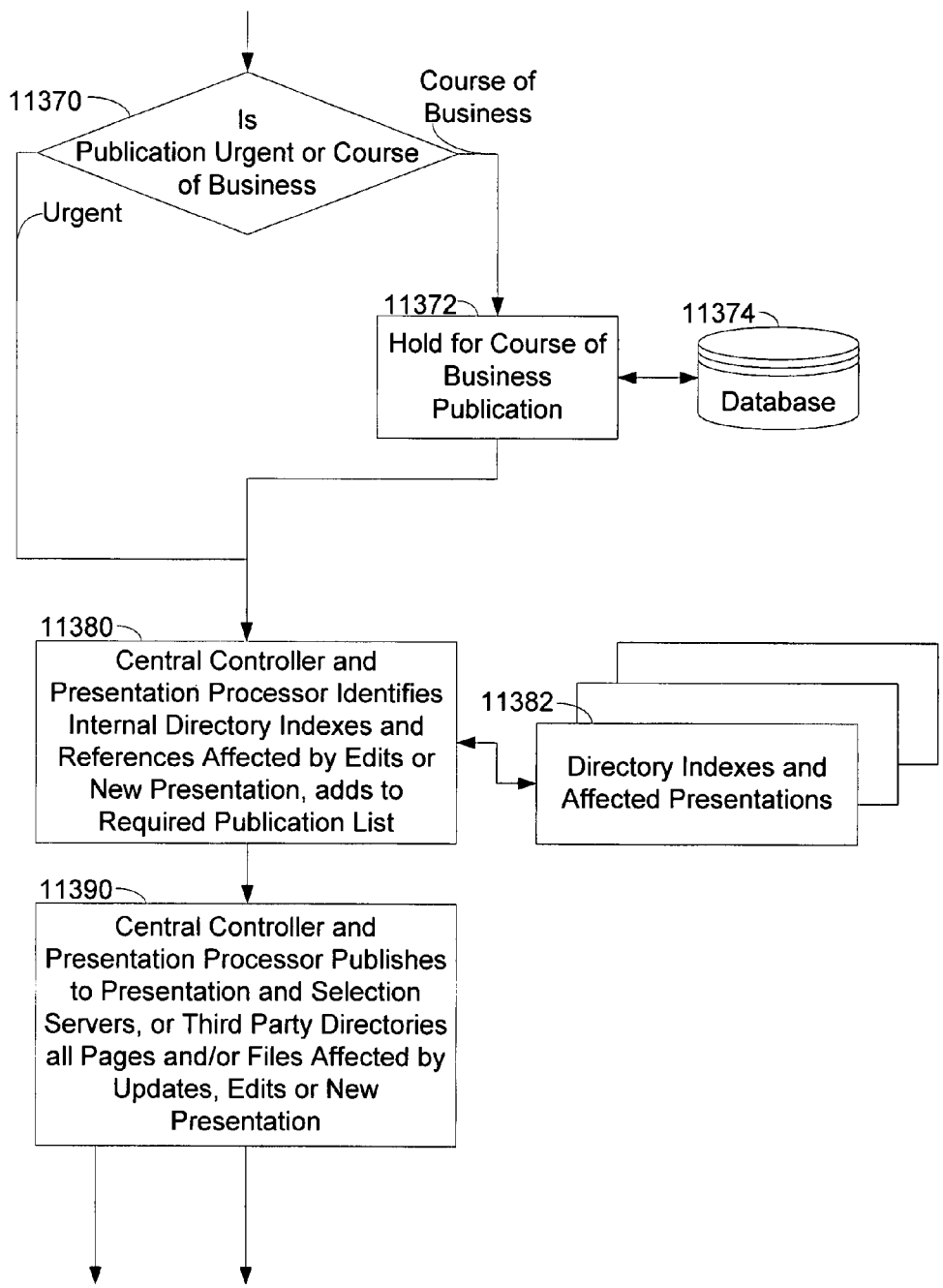
Figure 4H:
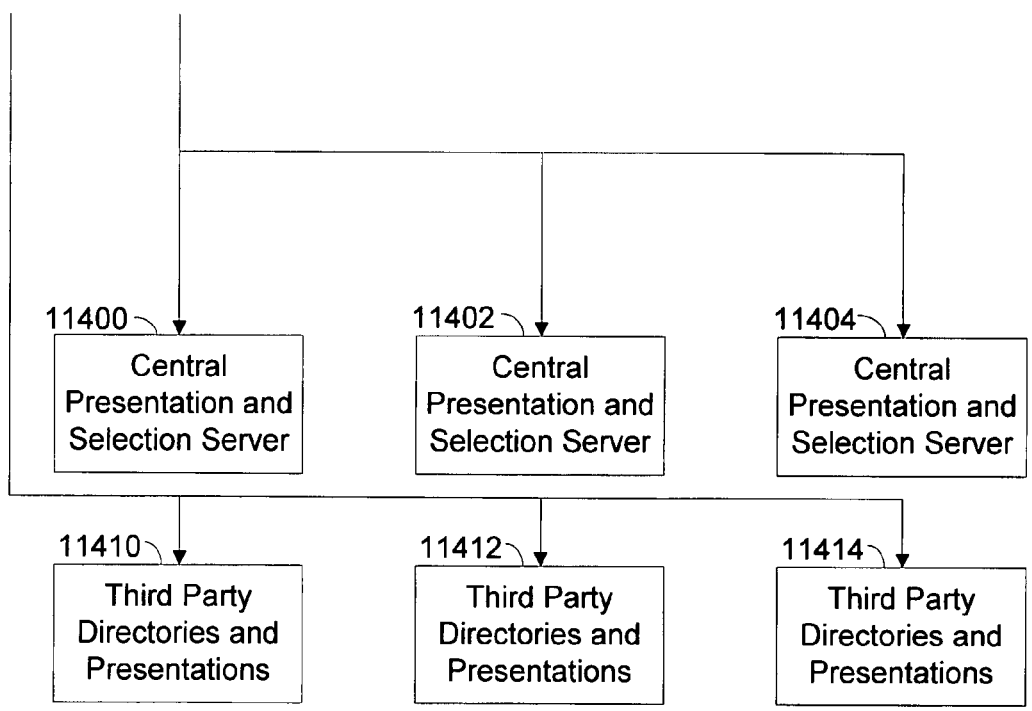

The preferred embodiment of the present invention allows Sellers to have a "self-serve" relationship to the networks, directories, indexes, printed media, and other sales and advertising channels (resident and non-resident media) available to and serviced by the given instance of the present invention. This relationship and process is accomplished through the Presentation and Configuration Program 4715. The Seller obtains the Presentation and Configuration Program 4715 on either a compact disc (CD-ROM), DVD disc, downloaded file, or some other method, then installs the Presentation and Configuration Program 4715 and its associated programs on an either dedicated or shared-use computer (diagrammed block 11102 to 11106 FIG. 4a). This embodiment of this component of the present invention is shown as Seller Interface 4000 FIG. 2c, which shows the relationship between the Presentation Program 4715 and the associated hardware, programs and databases of Seller Interface 4000.

Once installed and configured, the Presentation and Configuration Program 4715 allows the Seller to control access to the program through password protection (block 11120), allowing only authorized personal of the Seller to access the program. This access control is important because the Presentation and Configuration Program 4715 may control substantial portions of the seller's sales, therefore the presentations should only be created or modified by authorized personnel.

Upon accessing the Presentation and Configuration Program 4715, the new Seller/client is presented with a series of forms containing yes/no choices, text entry areas, menu-driven choices, and other data and information entry methods. These forms lead the Seller through his establishment as a client of the given instance of the present invention. This portion of the Presentation and Configuration Program 4715 prompts the Seller for information such as contact numbers, contact address, payment methods, and other Seller/client information for the use of the management of the instance of the present invention in working with and servicing the Seller. This portion of the Presentation and Configuration Program 4715 also presents the service contract for the review and agreement of the Seller. This agreement, complete with the management information, is then transmitted to the Central Controller and Presentation Processor 1000 along with all other Seller/client information upon the first submission of the Seller's presentation information. In the case of an existing Seller/client, the Seller enters his password (block 11120) to access the body of the program for creation and maintenance of his presentations.

Upon entering the information to establish the client relationship, the new Seller/client is presented with the forms that give the choices of presentations, interactive sales presentations, resident and non-resident media that are supported by the given instance of the present invention. These choices are accompanied with descriptions of each choice and the approximate cost of each presentation for all choices of presentations, resident and non-resident media. This information comes from the Presentation Rules Database 4650. Because in many cases the Seller will be receiving transactions and taking orders over the instance of the present invention, the Seller may be given the option of paying for the services by monthly, quarterly, or annual subscriptions; on a per sale or percentage basis; some combination of any of the above; or another payment method. As an example, if the instance of the present invention were configured to support "Sailboats For Sale," the Seller may be given the choice of three Internet Directories that specialize in boating-related goods and services, two printed magazines, and a subscription-based CD-ROM. The Seller could then choose one or two or all of the media/means of communication in which to be represented, with all presentations created by the Presentation and Configuration Program 4715 (blocks 11130, 11132). The Presentation and Configuration Program 4715 would then prompt the Seller for the necessary and optional information to complete the presentations (block 11140, 11142). It should be noted that each presentation might have very different standards for publishing the same information. In those cases, the same questions or at least similar prompts may be presented to the Seller, requiring the entering of virtually the same information in multiple locations on the forms. Although this may seem redundant to the Seller, the differences will become apparent because each separate entry is controlled by the information contained within the Presentation Rules Database 4650. As a simple example, the description in a particular Internet Directory may allow for up to 3000 characters, whereas a printed magazine may allow only 300, depending on the presentations chosen. As the Seller enters information, the Presentation and Configuration Program 4715, using the information contained in the Presentation Rules Database 4650, controls and monitors that entered information to conform to the controlling format and style for each targeted media venue or outlet presentation.

After the Seller has chosen the channels and means of communication and has entered the information necessary to create all the selected presentations, the Presentation and Configuration Program 4715 notifies the Seller of the cost of and payment methods acceptable for those presentations or modifications and prompts the Seller for acceptance of the charges. If the Seller does not accept the charges, then the Presentation and Configuration Program 4715 rolls the information or modifications back and notifies the Seller that the information will not be published or modified (blocks 11150-11156).

The Seller is allowed to print reports for management review or for hard copy records. Those reports include the charges and conditions that have been agreed to by the Seller (blocks 11160, 11162).

The information entered, either as a new presentation or as modifications to an existing presentation, can be sent to the Central Controller and Presentation Processor 1000 immediately or delayed for publication later. The reasons for delay could be that the presentation is geared to a given date or holiday, such as a Valentine's Day getaway offer from a resort, or is a special promotional offer to be used upon reaching a given inventory level (blocks 11170, 11172).

The Communication and Transport Program 4760 performs the transmission of the Seller's presentation information from the Seller Interface 4000 to the Central Controller and Presentation Processor 1000. The Communication and Transport Program 4760 utilizes either the modem or network connections to perform this transmission. The Communication and Transport Program 4760 applies the appropriate level of encryption of data necessary, depending on the method of transmission. In this embodiment of the present invention, the connection used for transmission between the Seller Interface 4000 and the Central Controller and Presentation Processor 1000 is a direct dial-up modem connection. This configuration is more secure than public networks, even with encryption, and, due to the relatively small amount of data transmitted, has sufficient transmission capacity (blocks 11180-11190).

Once the Central Controller and Presentation Processor 1000 receives the presentation message from the Seller Interface 4000 (block 11200), the Presentation Generation Program 1710 determines if the presentation message is information from a new Seller/client or modification to an existing current presentation from an existing Seller/client (block 11210). If it is a presentation message from a new Seller/client, the presentation message is passed to the General Management Program 1730. The General Management Program 1730 sets up the necessary Seller/client control accounts, payment information, contact information, database records, and any other administrative functions necessary to establish the Seller/client within the instance of the present invention and allows the creation of presentations by the Presentation Generation Program 1710 (blocks 11212, 11214). If the presentation message is from an existing Seller/client, the presentation message does not leave the control of the Presentation Generation Program 1710, which confirms the authenticity of the Seller/client presentation message prior to processing the message (block 11220, 11222).

Once the Presentation Generation Program 1710 has either confirmed the authenticity and origin of the presentation message or the message has passed through the General Management Program 1730, the Presentation Generation Program 1710 then analyses the information using the format and style guidelines contained within the Presentation Rules Database 1650 (blocks 11230, 11232). This process parallels the functions performed by the Presentation and Configuration Program 4715 and the Presentation Rules Database 4650. This duplication of function ensures both quality control of content and prevents tampering of the process by either the Seller or any non-authorized entity. This duplication of function also ensures that the latest version of the Presentation Rules Database 1650 has been applied to every presentation. This embodiment of the present invention updates any changes in the Presentation Rules Database 1650 to the Presentation Rules Database 4650 using update messages to the Seller Interface 4000. Although this method should result in the Presentation and Configuration Program 4715 always using the best and most current information that has been updated to the Presentation Rules Database 4650, the integrity of the presentations is critical enough to require the duplication of this function.

During the analysis of the presentation performed by the Presentation Generation Program 1710, the program reviews the information and assigns the presentations into one of three processing categories: pass, fail, and needs review (blocks 11240-11272). A presentation in the "fail" category causes a rollback of data in the Presentation Database 1640, and a message is sent to the Seller notifying them that the presentation failed and the reason why (blocks 11242-11246). Messages are also sent to the management of the instance of the present invention because the synchronization of the Presentation Rules Database 1650 and Presentation Rules Database 2650 should prevent this failure. The management would investigate the reason for the failure and take appropriate action. Those presentations in the "needs review" category are ones which have content that is not recognized as being either allowed or not allowed by the Presentation Generation Program 1710. These presentations are referred to a human operator for review (blocks 11250-11262). The operator will pass, fail, or edit the presentations at this point. Those that fail return to block 11242. Those that are edited are sent back to block 11230. This forces the analysis done by the Presentation Generation Program 1710 to pass every presentation. It is through this process of forcing corrections to be made, examined, and reviewed by management that the information contained within the Presentation Rules Database 1650 and the algorithms which apply that information within the Presentation Generation Program 1710 are refined (block 11272).

Once the presentation has worked through the analysis and review process, the Presentation Generation Program 1710 passes information to the General Management Program 1730 confirming the acceptability of the presentations. The General Management Program 1730 then confirms payment method and amounts, processes credit card payments, updates databases, and performs any other administrative procedures necessary (blocks 11280-11284).

Having passed the presentation information for content and style, the Presentation Generation Program 1710 next determines the directories and presentation indexes in which this information should be published (blocks 11290-11296). In the preferred embodiment of the present invention, each Central Controller and Presentation Processor 1000 may support any number of client outlets, channels, resident media, or non-resident media. These client outlets, channels, resident media, or non-resident media may include Central Presentation and Selection Servers 2000; Independent Presentation 3000; Printed Publications, Periodicals, Directories, CD-ROMs, and other Media Interface 6000 FIG. 2e; and other sales outlets, channels, or advertising methods.

The Presentation Generation Program 1710, using the information contained within the Presentation Rules Database 1650, then formats the presentation information for each client outlet, channel, resident media, or non-resident media (blocks 11300, 11294). New presentations are created in their entirety, while only the portions of existing presentations affected by any modifications are republished. After creating or modifying the presentations, messages confirming any edits or modifications of submissions are created and sent to the Sellers (blocks 11310-11336).

The presentations are then separated by their publication destination: resident or non-resident. The presentations destined for non-resident publication are formatted into media transaction messages and sent to the appropriate Media Interface 6000 for processing and ultimate publication. Upon receiving the media transaction message, the Media Interface 6000 and specifically the Transaction Processing Program 6720 or Media Accounting or Management Program 6000B if available, will process the message and schedule the publication of the presentation depending on media type, venue, available dates or other considerations. It should be noted that the non-resident media category and Media Interface 6000 is designed to provide a nearly seamless, self serve transaction environment that can be configured for an extremely broad spectrum of media vendors, resellers, and representatives. The makeup of these media vendors, resellers, and representatives will be in direct response to the demographics of buyers and sellers of the given instance of the present invention. The configuration of the offerings to the Sellers and also the design and configuration of the Media Interface 6000 are a result of the media vendors, resellers and representatives (blocks 11340-11358).

The presentations that are to be published in resident media are then sorted into those that the Central Controller and Presentation Processor 1000 publishes to directly, supported electronic media such as Internet, Intranet, and other similar electronic presentations and those "other" supported resident media. For any given instance of the present invention there may or may not be other resident media such as printed directories and presentations. Their inclusion is entirely optional (blocks 11360, 11362).

Presentations that the Central Controller and Presentation Processor 1000 will directly publish on media such as the Central Presentation and Selection Servers 2000 may be published either on an "urgent" or "course of business" basis. This designation is set by the Seller at the time that the "original presentation" or "update to a publication" information is sent to the Central Controller and Presentation Processor 1000 thereby allowing the Seller a measure of control if the nature of the presentation or correction warrants it. The "urgent" designation means that the Central Controller and Presentation Processor 1000 will process that presentation as soon as it receives the message. The "course of business" designation allows the Central Controller and Presentation Processor 1000 to place the presentation and any associate files into a queue for processing and publishing at a time when the resources of the network are at their lowest utilization (blocks 11370-11374).

The publications that are directed for resident media and are to be electronically published on the Internet, Intranet, or other electronic presentation channels are matched to the supporting, linking, dependent, reference, attached, or other affected parts or components of the directories, indexes, or presentation structures to which the presentations are published. Once identified, those parts or components are updated to reflect the changes caused by the new and updated presentations and information. As an example of the cascading or domino effect that the publication of a new presentation might have on an instance of the present invention, suppose the Central Controller and Presentation Processor 1000 is supporting a Central Presentation and Selection Server 2000 that is configured to represent lodging. A given directory for lodging may require that the new presentation be indexed by the state and city in which the lodging facility is located. In the interest of giving the best and most useful presentation to potential Buyers of the lodging services, the directory could also index the lodging facility by other categories to make the Buyer's selection easier. Some of the possible logical divisions are by locations such as "Lodging by the Ocean" or "Lodging in the Mountains", by services or specialties such as "Weddings" or "Business Conference and Meeting Facilities", or by promotional offerings such as "Romantic Getaways" or "Corporate Retreats". Each of these additional categories would need indexes and supporting structures that would be updated and changed when the referenced facilities were changed or updated. It should be noted that the prior art generally allowed these indexes or categories to be accessed by the buyer using database searches thereby not allowing or promoting the open access created by the present invention.

This embodiment of the present invention is not configured to support resident media other than the core presentations intended for Internet, Intranet, and interactive electronic presentations. However, depending on the demographics of the Buyers and Sellers, additional resident media can be added by the management of the instance of the present invention (block 11380).

At this point the Presentation Generation Program 1710 contains all the presentations and presentation components that have been created or edited. The Presentation Generation Program 1710 will proceed to publish or place the presentations and any supporting components in their proper locations on the Central Presentation and Selection Servers 2000 and Independent Presentation Directories and Indexes 3000 (block 11390-11414).

Seller Setup and Use of the Resource Saver Protocol

The preferred embodiment of the present invention utilizes the Resource Saver Protocol to reduce the number of messages sent and received by all components of the present invention while maintaining the control and synchronization of any qualified inventory that is offered for sale. With the reductions in the quantity of messages needed to maintain inventory synchronization, there is a corresponding reduction in all other aspects of communications and processing overhead between both collocated and remote components. This savings is especially significant, with magnified results, when more than one Central Presentation and Selection Servers 2000, sales outlets or channels are used in the marketing of the controlled inventory. Although most inventory types can benefit substantially from the utilization of the Resource Saver Protocol, it is most effective when controlling those inventory items that are substitutable but may be limited in availability.

It should be noted that the term inventory is used in a very broad and general sense. The term inventory can apply to goods, products, services, reservations for services, or any other identifiable unit or item to be sold, conveyed, or reserved.

The block diagram of FIG. 5a through 5h is an example of the Seller's setup and use of the Resource Saver Protocol as part of this embodiment of the present invention. In the first example, the instance of the present invention has been configured to represent Hotels and Lodging, and the Seller is a hotel with 312 rooms of the following types: 200 standard rooms, 100 upgrade rooms, and 12 suites.

The setup of the Resource Saver Protocol is accomplished within the Presentation and Configuration Program 4715 of the Seller Interface 4000. The seller divides the inventory into its logical groups for marketing, presentation, and sales to the Buyers. In this case, the groups are standard rooms, upgrade rooms, and penthouse suites (blocks 13100, 13110). Each item in each group of inventory must be substitutable with all the other items within that group. With the example hotel, we will assume that all rooms are identical within their groups without special view or amenities (blocks 13120-13132). If the inventory were not absolutely substitutable to any given Buyer, then the Seller would not use the Resource Saver Protocol with this inventory. That does not mean that all the Inventory items or groups of a Seller must either be or not be controlled by the Resource Saver Protocol. The Seller may have any combination of Inventory items or groups controlled or not controlled by the Resource Saver Protocol.

In the case of the current hotel example, the inventory is considered to be both Limited and Time Sensitive. There are only a limited number of rooms of each type, and they are time sensitive in the fact that the inventory is sold by the "unit night" which, if not sold, can never be used or recovered (block 13150).

Next, the Seller must set the maximum units of inventory that any given Buyer will be allowed to purchase in any given single purchase. In our hotel example, the Seller might set a limit of 4 rooms for any given Buyer to purchase from any Central Presentation and Selection Server 2000 serviced by this instance of the present invention (block 13140). By setting a reasonable maximum number of units of inventory that any given Buyer may purchase, the Seller prevents that rare but possible case of a self-serve Buyer purchasing or reserving more inventory than is available. The Buyer is still allowed to purchase as much as he would like, but the purchase must be transacted in sequential "maximum unit" transactions as opposed to one large transaction.

The explanation for blocks 13152 to 13184, which covers common inventory, follows the next example. The next decision pertaining to the suitability of each inventory group for control by the Resource Saver Protocol must be arrived at by assigning a number for the buffer inventory level. The purpose of this buffer is to allow for a margin of error, based on processing time and communications delays, that prevents the overselling of inventory (overbooking in the hotel example). This number is an estimate intended to be adjusted, based on the Seller's experience over time. The only loss of efficiency associated with setting the buffer number too high is the cost of the communications for the extra units within the buffer category (block 13190). In our hotel example, the management might set the buffer at 8 units (twice the maximum single purchase) as a starting point, to be adjusted later based on experience.

To determine if there is sufficient inventory to realize a savings by utilizing the Resource Saver Protocol, the Seller subtracts the total of maximum single purchase units and buffer units from the total inventory. In our hotel example, the 200 standard rooms minus 4 maximum purchase rooms and minus 8 buffer rooms results in 188 rooms for which the Seller could realize savings. For the upgrade rooms, the management might use the same maximum purchase number and buffer number, resulting in savings for 88 rooms. In the case of the suites, the management might set the maximum purchase at 3 and the buffer at 6, which would only result in savings on 3 units. This "savings" would probably not be worth implementing the Resource Saver Protocol (blocks 13210,13212).

If the savings are sufficient enough to utilize the Resource Saver Protocol, then the Seller must determine the Notification Level. The Notification Level equals the maximum purchase units plus the buffer units. In our hotel example, the Notification Level for the standard rooms and upgrade rooms would be 12, and the suites would not be covered by the Resource Saver Protocol at all due to the limited inventory (blocks 13210-13232).

Once all groups of inventory have been analyzed and any notification levels have been set then the Presentation and Configuration Program 4715 would update its databases and transmit the settings to the Central Controller and Presentation Processor 1000. The Central Controller and Presentation Processor 1000 would update its databases and then forward the information to any Central Presentation and Selection Servers 2000 that are affected (blocks 13260,13262).

It should be noted that the savings generated are more substantial than they appear to be for some Seller types. This is because the typical total sales of inventory in any given period does not reach the level that triggers the notification of Central Presentation and Selection Servers 2000 or other outlets and channels. With our hotel example, the hotel may only operate above the 88 percent occupancy of the standard and upgrade rooms a few days a month, thereby not triggering the communications and processing required above that notification level except for those few days.

The savings become obvious when one looks at the processing of the individual transaction messages as outlined on FIG. 5d. All transactions, from all sources, are entered in such a way as to produce transaction messages that are then processed within the total system (blocks 13270-13284). As the transaction messages are processed by the Seller Interface 4000, more specifically the Transaction Processing Program 4720 or the Seller Accounting or Management Program 4000B. Only those that are not controlled by the Resource Saver Protocol and those that have reached or breached the notification level trigger the sending of transaction messages with the current inventory count to the Central Controller and Presentation Processor 1000. The Central Controller and Presentation Processor 1000 then sends that message on to all Central Presentation and Selection Servers 2000 that are affected. If that Central Controller and Presentation Processor 1000 is controlling 3 Central Presentation and Selection Servers 2000, then each message that is passed to the Central Controller and Presentation Processor 1000 generates 3 additional messages to the Central Presentation and Selection Servers 2000 (blocks 13290-13296). Those transaction messages that are controlled by the Resource Saver Protocol and do not reach or breach the Notification Level would require no messages to be sent to the Central Controller and Presentation Processor 1000 and then on to the Central Presentation and Selection Servers 2000 (blocks 13310-13320).

It would not be unreasonable to expect the hotel in our example to experience a 95 percent saving in transaction communications and the associated overhead by using the Resource Saver Protocol.

Common goods and products experience the most savings within the present invention by utilizing the Transmission Level Method in conjunction with the setting of the Transmission Period.

As an example, consider a Seller of music CDs. The Seller would separate his inventory into titles to be offered. Each CD of a given title is obviously substitutable with any other CD with that same title and is available in an almost unlimited supply. The Seller could order or press more if needed (blocks 13100 to 13130). The inventory is substitutable and almost unlimited in supply, therefore common. The setting of the maximum units of inventory that any given Buyer will be allowed to purchase with common inventory is not as critical to prevent overselling as with Limited or Time-Sensitive inventory; however, this is one of the controlling factors in setting the Transmission Level (block 13140). With a common type inventory, the savings of communications and processing while utilizing the present invention comes from the periodic processing and transmission of all transaction messages based on the setting of Transmission Levels, Transmission Periods, and Transmission Times. The use of these settings is possible with common inventory items because there is no concern for overselling the inventory. The Transmission Level is the total cumulative number of inventory items sold at any given Central Presentation and Selection Server 2000 or outlet that forces a transmission of the transactions messages. The Transmission Level is the maximum units of inventory allocated by the transaction messages saved, stored, or held as a batch by the Central Presentation and Selection Server 2000 or outlet that then forces the transaction messages to be transmitted to the Central Controller and Presentation Processor 1000. The initial setting of this number by the Seller requires the consideration of the availability of inventory and the processing and delivery of the sold inventory. With our CD Seller example, if the Seller were represented on 20 Central Presentation and Selection Servers 2000, the potential sales surge caused by the maximum held units is 20 times the setting of the Transmission Level. It may be unlikely that all Central Presentation and Selection Servers 2000 and outlets would reach maximum held items at the same time, but this volume can be handled with planning. If the CD Seller were to set the Transmission Level at 100, then whenever each Central Presentation and Selection Servers 2000 or outlet was holding that many combined sales, it would trigger the transmission of all transaction messages and the clearing of that number or buffer (blocks 13152-13158). If the Seller utilizes the Transmission Level Method, he must also set the Transmission Period. This prevents the Central Presentation and Selection Servers 2000 or outlet from holding the transactions messages indefinitely when the Transmission Level has not been reached and ensures a reasonable processing flow of transactions. If the Seller does not utilize the Transmission Level Method, he may set the Transmission Period alone to control the sending of transaction messages on a regular basis (block 13146).

The setting of the Transmission Time Control allows the Seller to direct the Central Presentation and Selection Servers 2000 or outlets to transmit their transaction messages at a specific time. The intent of this setting is to allow the Seller to schedule the transmissions to take place when the communications and processor utilization is at the lowest point during the daily business cycle. The Seller is allowed to either set each Central Presentation and Selection Server 2000 or outlets to a specific time for transmission or set a specific time to be used with random offsets that have been set for the Central Presentation and Selection Servers 2000s or outlets. The use of offsets creates a spread or staggering of the times at which the Central Presentation and Selection Servers 2000s or outlets are transmitting their transaction messages, thereby better utilizing all communications and processing resources (blocks 13162-13184).

In the CD Seller example, the major savings experienced utilizing the Resource Saver Protocol would not only be in limiting the number of times messages are transmitted back and forth, but would also be in the utilization of the automatic scheduling of the communications and processing usage times so that transaction messages will be received at times of less usage. This last method of savings is even more powerful when the Seller realizes more accessibility by potential buyers at high usage times when the computers and networks are freed up from transaction messages.

The block diagram of FIG. 5e through 5f is an example of the Resource Saver Protocol as used by an instance of a Central Presentation and Selection Server 2000 as part of the preferred embodiment of the present invention.

Once the Buyer has made his purchase decision and has provided the necessary purchase information, the Central Presentation and Selection Server 2000 and more specifically the Transaction Negotiation Program 2725 processes and creates a transaction message for transmission to the Central Controller and Presentation Processor 1000 (block 13330). If the item of inventory is "common" and the Seller is using the Transmission Level method to control the transmission of the transaction messages, then the transaction messages being processed are placed on hold. If the total of all sold inventory represented by the held transaction messages equals or exceeds the Transmission Level, then all messages are immediately sent to the Central Controller and Presentation Processor (blocks 13342 and 13366). The Transmission Level is set by the Seller to prevent the accumulation of too much sold inventory on any given Central Presentation and Selection Server 2000 or other sales outlet. If the accumulated inventory sales exceed the Transmission Level at any time, then all messages are sent immediately. If the Transmission Level has not been exceeded, then the transaction messages are held until the Transmission Period has elapsed and the Transmission Time has arrived (blocks 13262 through 13366). By setting the Transmission Period, the Seller can require all transaction messages being held to be transmitted on a regular or periodic basis. As an example, the Seller might require the transaction messages to be sent every 24 hours. This setting allows the Seller to set the urgency of the processing of transactions messages and ensures that transaction messages are processed in a timely fashion. Another setting that allows the Seller to control the workflow and processing of transaction messages is the Transmission Offsets, which are specific to each sales outlet. The Transmission Offset is a number of minutes that is assigned to each sales outlet, which is then added to the Transmission Time that has been selected by the Seller. This sets the actual time an outlet is to transmit its accumulated transaction messages. This offset allows the Seller to prevent all Central Presentation and Selection Server 2000 and other sales outlets from attempting to transmit their transaction messages at exactly the same time (blocks 13356-13366). The Seller has the option of not utilizing the Transmission Level, instead setting only the Transmission Period (blocks 13340, 13350). This combination might be used for a Seller that has an unlimited inventory such as the music CDs. If the Seller sells out of current inventory, they can create unlimited additional units.

If the inventory is of a more unique or time-sensitive nature, then the Seller would probably not use the previous two methods, instead favoring the Notification Level method of the Resource Saver Protocol for all but the very unique inventory items (block 13370). With the Notification Level being the controlling method of processing, the criterion is whether the Notification Level as set by the Seller has been reached or breached. If the current status of the Notification Level is such that it has not been reached or breached, then the transaction message is transmitted immediately to the Central Controller and Presentation Processor 1000. If the current Notification Level has been reached or breached then the current sold units of inventory are subtracted from the inventory count and that information is updated to the database and added to the transmission message to be sent to the Central Controller and Presentation Processor 1000. The transmission message is processed and then transmitted from the Central Controller and Presentation Processor 1000 to the Seller Interface 4000 (blocks 13372-13400).

It should be noted that the Seller Interface 4000, and specifically the Transaction Processing Program 4720 or the Seller Accounting or Management Program 4000B, will make the determination for when the Notification Level has been reached or breached (block 13410). As soon as any given transaction, either electronic or otherwise, has reduced the available inventory so that the Notification Level is reached or breached, then either the Transaction Processing Program 4720 or the Seller Accounting or Management Program 4000B sends updates to the Central Controller and Presentation Processor 1000 and any other sales outlets affected. The Central Controller and Presentation Processor 1000 processes the message, updates its databases, and then sends the updates to any Central Presentation and Selection Servers 2000 under its control (blocks 13410-13418). In any given instance of the present invention, once the Central Presentation and Selection Servers 2000 or any other sales outlet has been notified that the Notification Level has been reached or breached and given the current inventory level, then each Central Presentation and Selection Server 2000 or outlet adjusts the available inventory and adds that information to each future transaction message processed (blocks 13372-13376).

The block diagram of FIG. 5g through 5h is an example of the inventory setup and maintenance using the Resource Saver Protocol and Seller Interface 4000 as part of the preferred embodiment of the present invention.

Initial setup or adjustment of the inventory takes place by the Seller when first setting up their account and creating their presentations within the Presentation and Configuration Program 4715. The seller establishes the type of inventory and the settings that are appropriate for the inventory's sale and control (blocks 13500). Replaceable inventory is managed by either the Transaction Processing Program 4720 or by the Seller Accounting or Management Program 4000B setting, adding to, or adjusting the inventory count as appropriate (blocks 13502-13516). Fixed inventory is managed at the Central Presentation and Selection Server 2000 level with the inventory being set into the future at the given level set by the Seller from the Seller Interface 4000 (blocks 13510-13562). The inventory level may vary even with fixed inventory based on Buyers purchasing or canceling the purchase of the inventory. This means that the controls utilized by the Notification Level for a given inventory could be turned on, then off, then back on, several times based on purchases and cancellation of purchases. This on-again off-again tracking of inventory, although appearing confusing, will maintain the synchronization of the inventory and prevent overselling to the Buyer.

If the Resource Saver Protocol is not used to control inventory, then the inventory offered for sale is synchronized by the present invention between all components, Seller Interface 4000, Central Controller and Presentation Processor 1000, and Central Presentation and Selection Server 2000. This synchronization is maintained at all times with the utilization of the transaction messages between all components.

When the Notification Level method of the Resource Saver Protocol is used, then the inventory offered for sale is synchronized by the present invention from the time the Notification Level is reached or breached until all inventory is sold. When all inventory is sold in either case above, then the Transaction Negotiation Program 2725 of the Central Presentation and Selection Server 2000 of an instance of the present invention notifies the buyer that no inventory is available and may offer possible alternatives or substitutes. The adding to or the replacement of inventory increases the inventory count or level. These events are processed as transactions messages that are sent from the Transaction Processing Program 4720 or the Seller Accounting or Management Program 4000B of the Seller Interface 4000 to the Central Controller and Presentation Processor 1000. The data for the inventory increase or replacement is either entered by the operator of the Seller Interface or is automatically updated by the aforementioned programs. The Central Controller and Presentation Processor 1000 then transmits transaction messages to any Central Presentation and Selection Servers 2000 or other outlets that are affected. Those Central Presentation and Selection Servers 2000 or outlets reset their inventory counts or levels and any control settings that are affected.

The invention allows sellers to present their inventory, products, goods and services in a choice of one or a variety of supported media outlets: in print, such as newspapers, magazines, periodicals, guidebooks, catalogs, brochures, fliers, and directories; in electronic form, such as online directories, web sites, bulletin boards, news groups, CD-ROMs, and interactive media and networks; and in other media, such as billboards, skywriters, bus benches, radio, interactive kiosk and any other form of customer outreach or information distribution. When these media choices are made, the present invention prompts the seller for information that is then used in the creation of presentations for the media outlets he has chosen. The Presentation Rules Database 1650 and 4650 holds all the criteria, formatting architecture, and distribution factors for each participating media outlet. The present invention's Presentation Generation Program 1710, along with the Presentation Rules Database 1650 and 4650, then creates a presentation for each and every media outlet the seller has chosen. The Presentation Generation Program 1710 then either transmits the presentation to the appropriate destination or holds it for a publication date to be submitted for a particular deadline or predetermined promotional market.

The seller can then print out a report that shows him each presentation, distribution or media outlet, and the pricing of each media choice for an overall marketing valuation.

The present invention allows the Seller to update, change, control inventory, and automatically process sales either from his in-house or third-party accounting or management software that has a compatible communication component with the present invention or in the present invention. He can accomplish this updating and inventory control to all media outlets simultaneously.

The Presentation Generation Program 1710 creates presentations that can be accessed by the buying public in location/outlet-appropriate formats and availability through the Central Presentation and Selection Server 2000; Independent Presentation Directories and Indexes or Independent standalone Presentations 3000; Printed Publications, Periodicals, Directories, CD-ROMs, and other Media and Presentations 6000; and the Buyers Interface 5000. The present invention allows buyers to review descriptions; specifications; photos; graphics; pricing; and the availability of products, goods, and services, including time- and allocation-critical services. The buyer can access this information and these resources through either a search specific mode or a browsing mode, depending on the advertising channel or media outlet he is using.

The invention allows buyers to hold or commit to the purchase; reservation; or utilization of those products, goods, and services, within the practical limits of the expiration of their utility or availability, on those media outlets supported by a Central Presentation and Selection Server 2000. The buyer can confidently select products, goods, and services with real-time or near real-time purchasing. Once the buyer has committed to a purchase, the commitment is transmitted to the seller and the inventory is updated. With the present invention, inventory control of the suppliers, vendors, service providers, purveyors, and other types of sellers is maintained with transaction and, when necessary, confirmation message units sent between the Central Controller and Presentation Processor 2000 and those same suppliers, vendors, service providers, and purveyors.

Once the buyer makes a purchase or reservation, he can choose a method of confirmation, get a print-out of seller's commitment for delivery, an entry code number or whatever means of confirmation determined by the Seller. As an example, the buyer can even get a complete printout of directions to the facility if the purchase involves him arriving at a place of lodging, restaurant, arena, store, or any other facility. All these methods of confirmation can be near real-time. The buyer does not have to wait for printed tickets, passes, admission documents, reservation confirmations, or other physical substantiation to be mailed or conventionally delivered to him.

Thus, the full implementation of the present invention makes the usual requirement of delivery of tickets, passes, admission confirmations, or reservation confirmations unnecessary. These traditional conveyance forms are replaced or augmented by the buyer's Reservation/Ticket Network ID card or confirmation of biometric ID. The present invention allows buyers of tickets, passes, admission documents, and reserved services to purchase or reserve those tickets, passes, admission documents, or services remotely via electronic network presentations, Internet, Intranet, dial-up self-serve or operator-served systems using standard telephone communications, or other means. The invention allows the buyer to confirm or prove his purchase at the facility, site, business, or venue by means of magnetic, smart, or optical ID cards or by electronic biometric authentication. These means of proof can be issued by the operators of an instance either for exclusive use for that instance of the present invention, for multi-use in conjunction with other entities and the operators of the other instances of the present invention, or through a "piggy-back" method that will allow the issue of Credit Cards, Membership ID Cards, or other ID Cards. For those services or events that require printed tickets, passes, admission documents, reservation confirmations, or other physical substantiation, those means of confirmation can be printed on demand from either automatic or manual vendors upon electronic reading or scanning of the buyer's Network ID card, the buyer entering a code, or by biometric authentication.

The invention's Resource Saver Protocol allows for the coordination and synchronization of the sales and availability of products, goods, and services between interactive electronic presentations and other sales outlets, channels, or sources while reducing the communications and resources necessary to maintain that coordination and synchronization. The present invention does this while both allowing for the purchase or reservation through electronic networks and other diverse channels or outlets and keeping control of inventory to prevent overselling or overbooking. The seller can define his inventory and establish the settings that are appropriate for the sale and control of said inventory. Then communications will be transmitted when the levels he sets are reached or breached, when a notification time has been reached, or when a notification level has been met. If the seller does not have similar or substitutable inventory, then transmissions must be made for each and every sale. However, the seller may have some inventory that can benefit from the Resource Saver Protocol while other inventory is unique. This cost saving device will also allow the seller to schedule transmissions to be made when other uses of the Central Presentation and Selection Servers 2000 is at a low traffic level.

The invention will not only transmit all sales and reservations to the seller's compatible in-house accounting and management program or to an instance of the present invention at his location, but it will also update and control inventory offered on all the media channels and outlets on which that seller has chosen to sell his products, goods, and services.

Example Use of Invention

The following is a hypothetical example for the use of the present Invention in one possible embodiment. Only the major steps are included in this example to give an overview of one possible application or embodiment of the present invention. This example demonstrates some of the possible interface and interactions between operators of the invention, sellers or providers of goods or services, and customers or buyers of those goods or services. It is also meant to give an overview of the transaction flow of information, purchase decisions, and possible consummation of those purchase decisions.

For the purpose of this hypothetical example, we will presume that this instance of the Invention has been established for some time and is managed by the ABC Company that promotes it to Professional Sports Franchises and Venues.

Example Clients Are:
Seller:
XYZ is a corporation that owns the XYZ professional basketball team and wishes to promote that team and sell its tickets as efficiently as possible.
Media:
DEF is a basketball oriented web site owned by the DEF Corporation with content and discussion groups about the sport of basketball. Its demographics are centered on young male basketball enthusiasts.
GHI is an all sports oriented web site owned by the GHI Corporation with content and discussion groups covering all sports. Its demographics are largely young male.
JKL is a national sports magazine, published by the JKL Corporation monthly with subscription and retail rack sales. Its demographics are centered on an all sports audience.
MNO is a sports newsletter, published by the MNO Corporation with a circulation that is primarily within the geographic area of the home stadium of the XYZ basketball team.
PQR is a broad-based chain of newspapers published across the country by the PQR Holding Corporation. Their circulation is a general one with a sports section daily and a special sports insert on weekends.

STU is a chain of music and video stores that have displays within their stores allowing sports and event information and ticket sales. Their stores are located within urban malls and their customer base primarily is mixed gender between 15 and 25 years of age with good disposable income and leisure time. STU has also installed the biometric readers necessary to do the initial entry of buyers into the ticket and reservation network, which is part of the ABC instance of the invention.

Buyer:
John Q. Public is a basketball enthusiast.

Media Participation:
The DEF Corporation was approached by the ABC Company and agrees to be represented on the ABC instance of the invention.

1) The DEF Corporation decides that it will promote one of the five Internet Web Sites that it publishes on the ABC instance of the invention. DEF will promote its basketball site because it matches well with the focus and demographics of the ABC instance of the invention.
2) ABC sends DEF the necessary software to be installed on their computer.
3) A computer operator at DEF installs the software on their computer that then is configured as Media Interface 6000 FIG. 2e.
4) After installation and setup the DEF operator does basic information input as prompted by the Media Interface 6000 FIG. 2e of the present Invention.
5) After the input of basic information by the operator, the Media Interface 6000 prompts the operator for input that describes and sets the standards for the presentations that Seller Clients of ABC will use (by way of the invention to publish presentations) on the DEF Web Site. The inputs set the upper and lower limits of quantities such as amounts of text and size of images, restrictions of language and reference, standards of style and presentation, choices of type fonts and colors, as well as the cost of presentations and demographics of the DEF subscribers or viewers. Any disclaimers and contracts or agreements are added to be delivered and acknowledge electronically concurrent with the submission of presentations.
6) DEF has also chosen to offer interactive sales of appropriate products and services through its web site as managed by the ABC Central Presentation and Selection Server.
7) At any point during the input of information the operator may test the presentations that will be created using the standards set within the Media Interface 6000 FIG. 2e. This allows the operator and DEF's management to insure that those presentations received for publication from the ABC Seller Clients will indeed meet the standards for DEF publication.
8) The other Media GHI, JKL, MNO, PQR, and STU have gone through a similar process to establish their Media offerings on the ABC instance of the invention.
9) The following steps pick up from the Sellers Participation below at step number 18. That Seller's action effects the following media.
10) The DEF Sports Web receives electronically the Seller information, agreements, payment information, web pages to be displayed and banner advertising to be placed on their web site. DEF also receives the web interface for the sale of the XYZ tickets.
11) The KLM Newspaper Chain receives electronically the Seller information, agreements, payment information, a requested schedule of ad placement and publishing, and the formatted ads. Because KLM also maintains the associated web site it also receives the web interface for the sale of the XYZ tickets.
12) The HIJ Basketball Magazine receives electronically the Seller information, agreements, payment information, a requested schedule of ad placement and publishing, and the formatted ads to be placed in their magazine.
13) The STU music stores receive electronically the Seller information, agreements, payment information, and the interface for the sale of the XYZ tickets on its in-store displays.
14) Once the Ads and Presentations are received by the Media, any changes or updating are either allowed or denied by the Seller Interface 4000 FIG. 2c based on the restrictions entered by the Media during their setup.

Seller Participation:
1) The XYZ Corporation makes the decision to use ABC's services to promote its Basketball team.
2) ABC sends XYZ the necessary software to be installed on their computer.
3) A computer operator at XYZ installs the software on their computer that then is configured as Seller Interface 4000 FIG. 2c.
4) After installation and setup the XYZ operator does basic information input as prompted by the Seller Interface 4000 FIG. 2c of the present Invention.
5) After the input of basic information by the operator, the Seller Interface 4000 presents available media venues and associated information for review by the XYZ Corporation management.
6) ABC currently represents 15 different Media venues within its instance of the present invention. Information such as distribution, users or viewers, price, content restrictions, etc. about each Media venue is available for review by the XYZ management.
7) XYZ management reviews available media and chooses The DEF Sports Web, The HIJ Basket Ball Magazine, and The KLM Newspaper Chain to advertise their schedule of games. With the KLM Newspaper there is also the associated KLM Web Site on which KLM offers information as well as sales of products and services as advertised within the KLM Chain of newspapers. STU music stores are also chosen strictly for the distribution and sales of tickets.
8) The Seller Interface 4000 then presents the publication dates, any specific disclaimers, and the charges for review and approval by the XYZ management.
9) Upon approval of those items, the Seller Interface 4000 prompts the operator for the necessary text, graphics, and any other information as required by the three chosen media to create and format the individual ads for the chosen media.
10) XYZ management has also elected to offer tickets to their basketball games held within the XYZ stadium. They have installed the necessary software that synchronizes the XYZ ticket sales and accounting software with the sales and inventory control provided by the ABC instance of the invention within the Central Presentation and Selection Server 2000. XYZ chooses to offer ticket sales on the DEF Sports Web, the KLM Newspaper associated site that offers interactive electronic sales, and the STU music and video stores in store electronic ticket sales displays.
11) Due to the large number of seats within the stadium and similarity of pricing and desirability among each class of seat, XYZ management has also elected to use the Resource Saver Protocol to allow for better customer service between the various sales outlets.

12) The XYZ management sets the various seat and ticket restrictions, standards and pricing. This information will be available to the Buyer when purchasing through the ABC Central Presentation and Selection Server. Each seat or ticket class is assigned a maximum single purchase number and a buffer number, the total of those two numbers become the notification level. It is the notification level that controls the flow of the communications involving the sale of tickets for XYZ.

13) In order to take full advantage of the services offered by the ABC Central Presentation and Selection Server XYZ elects to install new automatic ticket vendors using the existing ID cards and biometric methods supported by the ABC Central Presentation and Selection Server.

14) At any point during the content input phase, the operator may view the final formatted presentation products based on each Media venue's restructuring of the information to create specific Media presentations.

15) When the XYZ management is satisfied with the results, as presented by the Seller Interface 4000, they indicate their approval of the presentations and charges and then transmits the information to the ABC Central Controller and Presentation Processor 1000. In addition to the presentation information, the game dates, ticket prices, and information that synchronize current sold and available tickets are transmitted also.

16) When the ABC Central Controller and Presentation Processor 1000 receives the presentation information it establishes an account for XYZ, reviews and analyzes the presentation information submitted, and then notifies XYZ as to the acceptance, editing or rejection of the material and any adjusted publishing dates.

17) The ABC Central Controller and Presentation Processor 1000 then transmits the appropriate formatted presentations to each media that was selected by XYZ.

18) The flow of information transfers to the Media Participation section above at step 9.

Buyer Use:

For this example we will follow John Q. Public (our example buyer) as he uses the invention.

John is an avid basketball fan and subscribes to the JKL sports magazine, receives the local PQR newspaper, and frequents the DEF web site to participate in the free discussion groups centering on basketball that are hosted there. John has seen the ads within the PQR newspaper promoting the teams winning record and giving dates of upcoming games. Within the ads it was stated that tickets could be obtained from the PQR web site.

(1) Unexpectedly one of John's friends called, stated that he would be in town the next night and would it be possible to go to the basketball game. John said that he would find out and call back. John remembered that the PQR newspaper ad for the XYZ team stated that one could buy tickets at the PQR web site.

(2) John uses his computer and navigates to the PQR web site. Once there he finds the XYZ ticket purchase section, chooses the seats he wants, and asks for availability.

(3) With availability confirmed John enters his payment information and is then asked how he wants the tickets delivered to him. This presents a dilemma for John because he must work tomorrow and will not have time to go to the stadium to pickup the tickets. He could pick them up at a "will call" station when he and his friend go to the game, but there is always a long line and John does not want to wait.

(4) Another option that is presented to John is that of using one of several forms of ID (either credit cards, ID cards, or biometric) as the identification method in lieu of advanced ticket delivery to him. John recognizes that he has one of the accepted brands of Credit Card and chooses to use the system using that Credit Card as his personal ID. He enters the card number as his ID, the system accepts the ID and gives John instructions as to the systems use when they arrive at the stadium.

(5) John calls his friend back and they agree to meet just before the game.

(6) When John and his friend meet at the stadium they are late and the game is about to start. There is a long line at the "will call" booth and John is glad to avoid that line. John goes to the Automatic Ticket Vending Machine, swipes his credit card, and the Automatic Ticket Vending Machine prints the tickets with the seat location and dispenses them to John.

(7) John and his friend enter the stadium to watch the game.

(8) During the game John notices within the free program a notice that he can have his thumbprint taken at the "Will Call" both and then that will become his identification method when he next attends an event at the XYZ stadium. As John is leaving the game, he stops and has his thumb print scanned to serve as his future identification.

SUMMARY

In the simplest scenario when the chosen section or ticket category was not near a sell out (reaching notification level), the sales location that John was purchasing from simply assigned a set of tickets for that section and confirms the sale. The sales location then transmits all data to the Central Presentation and Selection Server 1000 that transmits the information to the XYZ Seller Interface 4000 that then passes the information to the XYZ in-house Accounting and Ticket Sales software.

Whenever sales in any given section reaches the notification level then all sales sites are notified that the quantity of available tickets is limited and that all sales must be confirmed with the Seller prior to releasing confirmation of the sale to the buyer.

With the Biometric scan (thumbprint) that John had done as he was leaving the stadium he can now reserve seats at any of the events featured on the ABC instance of the current invention and will be able to use his thumbprint as his ID for access to the event or facility instead of or in addition to his existing Credit Card.

Presentation Generation Program:

This component of the present invention relates to the creation and placement of presentations of commercial information with the purpose of informing buyers as to available products, goods, and services. The invention's purpose is to allow the seller the ability to influence the buyer and induce said buyer to purchase those products, goods, and services while specifically allowing for the advanced purchase or reservation of those products, good, and services when appropriate.

The invention allows sellers to create presentations on their computers that are automatically transmitted to be published and viewed on a variety of traditional and electronic media networks. The present invention partially resides on the sellers' computers, controls and edits the presentation, and then automatically transmits that information and data for publication on traditional media and electronic networks.

The invention allows for the automatic publishing or updating of presentations within a simple environment that does not require lower-level coding or formatting of the presentation material. The present invention employs a text-only entry of information and data, thereby not requiring the seller to have knowledge of presentation computer codes or low-level formatting.

The invention will provide substantial savings in this area of commerce because the seller can choose the media or outlet for sale of his products, goods, or services. His instance of the present invention can then create presentations that conform to each and every media outlet he chooses, submit the presentation, and prepare a report of the cost for such publication choices. The present invention allows sellers to offer their inventory, products, goods, and services for sale in a choice of one or a variety of supported media outlets: in print, such as newspapers, magazines, periodicals, guidebooks, catalogs, brochures, fliers and directories; in electronic form, such as online directories, web sites, bulletin boards, news groups, CD-ROMS, and interactive media and networks; and in other media, such as billboards, skywriters, bus benches, radio, interactive kiosk, and any other form of customer outreach or information distribution.

After the seller makes these media choices, the present invention prompts him for information, based on the criteria set forth by each media outlet and held in The Presentation Rules Database 1650 and 4650, that is then used in the creation of presentations. The Presentation Rules Database 1650 and 4650 holds all the criteria, formatting architecture, distribution factors, and prices for each participating media outlet.

The present invention's Presentation Generation Program 1710, along with the Presentation Rules Database 1650 and 4650, not only creates a presentation designed to conform to the requirements set forth by each media, but it also "dynamically generates" both static presentations which can be accessed by traditional search methods of the buyer and dynamic presentations which respond to the buyer. This function creates two very distinctively different presentations in a labor-saving database method so the seller can save time and resources while creating presentations that incorporate the best of both "dynamic" and "static" type of presentations. {Note: static presentations are easily indexed and accessed by search engine and search modes. These are the best formats for accessibility in electronic media. Dynamic presentations are database-driven and respond to the queries of the viewer (buyer) with current and real-time inventory changes, updates, and control}. An Internet or Intranet presentation that utilizes both methods for delivering information is far superior to any other presentation online today.

The Presentation Generation Program allows for the creation of traditional and electronic sales and information by minimally trained personnel who merely have to input information into the program, aided by prompting from the present invention.

Once the present invention generates the presentation, it either automatically publishes the presentation to the appropriate electronic destination or holds the presentation for a scheduled publication date to be submitted for a particular deadline or predetermined promotional market. These presentations can be updated for either presentation content or inventory control in near real time by either manual or automatic means via electronic message units from third-party management or inventory control software. This means the seller can update or control his inventory in every media with just one in-house updating function.

The presentations created by the present invention allow for the sale of the products, goods, or services and for the making of payments by buyers on those interactive sites that support electronic sales. Inventory adjustments for production, sales, and other reasons are made in near real time, allowing for an accurate presentation of availability of inventory to buyers in all supported media. The present invention, when used in both electronic and traditional media, also allows for lower cost to both the seller and the media management by creating a self-serve, automated billing environment for the seller's creation and publishing of the presentations. The present invention provides substantial savings in the area of commerce because it allows for transactions to occur instantly at "point of sale" or, to use an appropriately faster term, "point of decision".

Interactive Sale and Reservations:

On the buyer's side of the process, the present invention provides consistent, vendor-appropriate information in all forms of media for products, goods, and services offered for sale. Prior art, in regards to online presentations, often does not give the buyer current information because that inventory must be manually updated, so real-time or near real-time transaction becomes an inaccurate phrase. The information the buyer gets from one media outlet, electronic mall, or directory may be in conflict from another media outlet, electronic mall, or directory. This conflicting information may contribute to a Buyer's potential dissatisfaction of the Seller and the whole online presentation and sales process.

As previously stated, the present invention's electronic presentations are created to give the buyer products, goods, and services that are easily accessible and that dynamically produce the latest, current information, pricing, and availability. Because the seller can automatically update all media outlets from his in-house management or accounting software or an instance of the present invention, the buyer can feel confident in getting current information and inventory. The Buyer has the choice to either conduct a search for the desired products, goods, or services using the on-site search capabilities or browse the presentations much the same way one would browse the aisles of books at a library.

Once the Buyer has made a selection on those supported interactive outlets, he can purchase, reserve, or hold products, goods, or services. The present invention will then tell him that his request is available and ask him to reaffirm his choice.

If his selection is not available, the present invention may give him the opportunity to choose something else, change his purchase request, or provide him with optional choices from the Referral Database 2670. The Referral Database is an option that Sellers can use to recommend other Sellers of similar products, goods, and services. In the case of lodging facilities, often Sellers will refer their overflow to other lodging facilities in their immediate area. In the preferred embodiment of the present invention, Sellers will input referral to other Sellers into their instance of the present invention.

Once the Buyer has been assured that his choice of a product, goods, or service is available, the present invention will then prompt him to enter the information required by the Seller. The Buyer Database 2610 maintains data on buyers who make interactive purchases or reservations of the products, goods, and services offered by the Seller over the Central Presentation and Selection Server 2000 or Independent Presentations 3000. Data fields may contain Buyer's name, network or delivery ID, physical address, phone, email address, credit card information, and any other information deemed necessary to support the Buyer and the Seller's required buyer information. If the Buyer has previously made a purchase through the same instance of the present invention, most or all the information needed may already be in the Buyer Database 2610. In this case, the information required by the Seller will come up on the screen and the Buyer will be prompted to update any information that may have changed or needs to be added.

Once the buyer has committed to a purchase and has completed all the transaction data required, the commitment is transmitted to the seller and the inventory is updated. With the present invention, inventory control of the suppliers, vendors, service providers, purveyors, and other types of sellers is maintained with a transaction and confirmation message unit sent between the Central Presentation and Selection Servers 2000, Central Controller and Presentation Processor 1000, and those suppliers, vendors, service providers and purveyors.

The present invention will then ask the Buyer to choose a confirmation method. Choices of confirmation may be by phone, fax, email, confirmation number, or any requirements the Seller may select for proof of purchase. Once the Buyer chooses a method of confirmation, he can get a print-out of the Seller's commitment for delivery, a confirmation number, or whatever means of confirmation determined by the Seller. As an example, he can even get a complete print-out of directions to the facility if the purchase involves him arriving at a place of lodging, restaurant, arena, store, or any other facility.

Network ID Card:

This component of the present invention relates to the verification and substantiation of the purchase of access or admission to those services or events that traditionally have controlled access by means of tickets, passes, admission documents, reservations, reservation confirmations, or other substantiation at the facility, site, business, or venue.

The full implementation of the present invention makes the usual requirement of delivery of tickets, passes, admission confirmations, or reservation confirmations unnecessary. These traditional conveyance forms are replaced or augmented by the buyer's Reservation/Ticket Network ID card or confirmation of biometric ID. The present invention allows buyers of tickets, passes, admission documents, and reserved services to purchase or reserve those tickets, passes, admission documents, or services remotely.

The present invention allows the buyer to confirm or prove his purchase at the facility, site, business, or venue by means of his existing magnetic, smart, or optical ID card; by entry code; or by electronic biometric authentication. These means of proof can be approved by the operators of an instance either for exclusive use for that instance of the present invention, for multi-use in conjunction with other entities and the operators of the other instances of the present invention, or by a "piggyback" method that will allow the issue or use of new or existing Credit Cards, Membership ID Cards, or other ID Cards.

For those services or events that require printed tickets, passes, admission documents, reservation confirmations, or other physical substantiation, those means of confirmation can be printed on demand from either automatic or manual vendors upon electronic reading or scanning of the buyer's ID card, entry of a code, or biometric authentication. Network or Delivery ID cards may be approved by either one operator of an instance of the present invention or a group of operators of different instances of the present invention with cross-use allowed. Network or Delivery IDs may be Single-use or Multi-use cards that are also access cards to the Network or Delivery ID.

Resource Saver Protocol:

This component of the present invention provides a method and apparatus to control, coordinate, and synchronize the sales and availability of either common, unique, or time-sensitive products, goods, and services. The present invention does this while allowing for the purchase or reservation of these products, goods, and services through electronic networks and other diverse channels or outlets and keeping control of inventory to prevent overselling or overbooking. The preferred embodiment of the present invention utilizes the Resource Saver Protocol to reduce the number of messages sent and received by all components of the present invention while maintaining the control and synchronization of any qualified inventory that is interactively offered for sale. With the reductions in the quantity of messages needed to maintain inventory synchronization, there is a corresponding reduction in all other aspects of communications and processing overhead between the remote components and sales outlets.

The invention automatically updates all components of the present invention on multiple sites or media channels in a time-sensitive and time-appropriate basis. The automatic two-way network communications method of the present invention provides the necessary coordination of inventory and sales. With the added dimension of the Resource Saver Protocol, the Seller can divide his inventory into logical groups for marketing, presentation, and sales to the Buyer. Using a hotel as an example, the instance of the present invention is configured to represent Hotels and Lodging, and the Seller is a hotel with 312 rooms of the following types: 200 standard rooms, 100 upgrade rooms, and 12 suites.

The setup of the Resource Saver Protocol is accomplished within the Presentation and Configuration Program 4715 or the Seller Interface 4000. The Seller divides the inventory into its logical groups for marketing, presentation, and sales to the Buyer. In this case, the groups are standard rooms, upgrade rooms, and suites. Each item in each group of items must be substitutable with all the other items within that group.

If the inventory were not absolutely substitutable to any given Buyer, then the Seller would not use the Resource Saver Protocol in this inventory. That does not mean that all the Inventory items or groups of a Seller must either be or not be controlled by the Resource Saver Protocol. The Seller may have any combination of Inventory items or groups controlled or not controlled by the Resource Saver Protocol.

In the case of the current hotel example, the inventory is considered to be both Limited and Time Sensitive. There are only a limited number of rooms of each type, and they are time sensitive in the fact that the inventory is sold by the "unit night" which, if not sold and utilized by that night, can never be used or recovered.

The Seller must then set the maximum units of inventory that any given Buyer will be allowed to purchase in any given single transaction. In the hotel example, the Seller might set a limit of 5 rooms for any given Buyer to purchase from any Central Presentation and Selection Server 2000 or other outlets serviced by this instance of the present invention. By setting a reasonable maximum number of units of inventory that a Buyer may purchase, the Seller prevents that rare but possible case of a self-serve Buyer purchasing or reserving more inventories than is available. The Buyer is still allowed to purchase or reserve as much inventory as he likes, but the purchase must be transacted in sequential "maximum unit" transactions as opposed to one large transaction.

Next, the Seller sets a buffer number for each of the groups of items to be offered to the Buyer. The purpose of this buffer is to allow for a margin of error, based on processing time and communication delays, to prevent the overselling of inventory (overbooking in the hotel example). This number is an estimate intended to be adjusted, based on the Seller's experience over time. In the hotel example, the management might set the buffer number at 10 units (twice the maximum single purchase) as a starting point, to be adjusted later based on the Sellers experience.

Then the Seller must determine the Notification Level. This level equals the maximum purchase units a Buyer can make at one time plus the buffer number. For instance, if the Seller is a hotel, it has for purchase 200 units of the same type of room, the maximum purchase units are 5 rooms, and the buffer number is 10 rooms, then his Notification Level would be 15. This means that the Seller would receive transmissions from all of his outlets when a purchase is made. However, he would not have to communicate back to those outlets (via one transmission message to the Central Processor and Control Server 1000) until his remaining units reached or breached the available inventory level of 15 units. If the level were reached or breached, transmissions for units within the unit group would be communicated back and forth for each purchase from the available inventory level of 15 until all units are sold for that period of time.

A demonstration of the transmission savings for the example hotel would be as follows. There are 100 rooms available at the example hotel and 5 sale outlets or channels are used. Without the use of the Resource Protocol, 320 (80 messages each to 4 outlets) inventory update messages would have to be sent in order to accomplish the total individual booking of 80 rooms. Each outlet or channel would maintain the availability count for the rooms, and one update message for the booking of each room would be sent to each of the sale outlets or channels that did not originate a given sale. With presale verification of available inventory for each transaction, our same example hotel would receive and send a combination of 240 queries, responses, and updates (80 each) to reach the 80 rooms booked. The actual number could be much more because the 240 number assumes that each query results in a booking, whereas in actual practice, the experience would be that many queries did not result in booking. In addition, the buyer would be required to wait for the amount of time that it took for the transaction verification process to take place. That amount of time may or may not be significant, depending on several factors such as the current network use, network connection speeds, etc.

With the present invention, each sales outlet, channel, or other source of unique or time-sensitive products queries availability only after receiving notice of a predetermined inventory level or count. This means that with our example hotel, only 80 booking messages would be sent if the management sets the notification level (predetermined available inventory count) at 15 units remaining. This would cause a 66% to 80% savings of communications and computer resources. For our example hotel to reach 100% occupancy, the total message load would be 160 messages (100 booking plus 60 update to four outlets or channels). With verification being required, the total message load would be 190 (100 booking plus 60 update plus 30 queries and responses). This compares with a total of 500 messages without verification and 700 messages with verification (100 booking, plus 400 inventory update message, plus 200 queries and responses for verification), showing savings of 68% to 73%, depending on the method used after the notification level is reached or breached.

It should be noted that the savings generated are more substantial than they appear to be for some Seller types. This is because the typical total sales of inventory in any given period does not reach the level that triggers the notification of the Central Presentation and Selection Servers 2000 or other outlets and channels.

For more common or commodity-like products, goods, or services, there is little concern of overselling. In order to conserve on communication and other resources, the Resource Saver Protocol allows the electronic networks and traditional sales outlets, channels, or other sources of sales to batch or hold the sales transaction messages. These messages are then transmitted once a certain quantity has been sold, once a specified time period has passed, or a combination of both bases. The operator of a given instance of the present invention has the option of settings for transmission levels or transmission periods and specific transmission times, or general transmission times plus specific outlet offsets.

As an example, a Seller of music CDs who has sufficient inventory might set the transmission level at 35, the transmission period at 24 hours, and the transmission time at 01:00 AM plus any offset. This would then set the electronic networks and traditional sales outlets, channels, or other sources to either transmit transaction messages any time they are holding 35 transactions or more, transmit transaction messages at least every 24 hours, and/or transmit any remaining transactions at 01:00 AM plus any offset. The instruction for transmitting any remaining transactions at a specific time plus offset allows the Seller to set each outlet's specific transactions so that the transmissions are spread over some time frame. The Seller can then choose a time for transmission so he can take advantage of low processing and communications loads. The potential savings by using the present invention in connection with controlling the inventory and sales of common products, goods, or services are obvious but widely varied, based on the Seller's settings and goals.

Operators of the present invention may provide additional transaction certainty and verification in the form of "confirmation of the transaction" messages or "inventory count" and/or "sequence numbers" data fields with each transaction message. All of these methods are optional at the discretion of the operators of the instance of the present invention, based on their experience or concerns.

With the "confirmation of the transaction" method, a confirmation message is sent back to the originating outlet, repeating or confirming each transaction message that has been sent. Although this doubles the message units passed between Sellers and outlets, these "confirmation of the transaction" messages can be sent at times of low processing and communications loads, thereby reducing the impact of their use. The use of these confirmation messages virtually reduces transmission errors to zero. This method can be used during initial periods to build operator confidence in the present invention more than as a method that is used all the time.

The "inventory count" is a field that is passed on all transaction messages where a total inventory has been established and each outlet is comparing and subtracting each sales transaction from that inventory. The establishment of total inventory or noticed inventory is based on whether or not the Seller is using the Notification Level method of monitoring and controlling inventory. If the Seller is not using that method, then the total inventory is known by the outlets and is used as the "inventory count" to be passed. If the Seller is using the Notification Level method, then the "inventory count" field is only included after the Notification Level has been reached or breached at the Seller's location and the Notification Level messages have been sent to the outlets. This "inventory count" is used by the present invention to verify that each component (Seller's location and all sales outlets) is synchronized as to the inventory level that all are working off of.

Although the embodiments of the present invention have been described in detail herein, it is to be understood that these descriptions are merely illustrative. The inventive system may be modified in a variety of ways and equivalents in order to suite a particular purpose while still employing the unique concepts set forth.

What is claimed is:

1. An electronic advertising system that automatically facilitates the creation and publication of customized advertising presentations to multiple electronic media venues, the electronic advertising system owned or controlled by an entity other than a seller, each electronic media venue having criteria regarding the customized advertising presentations, the system comprising:
   a media venue interface program through which multiple media venues provide criteria that control the customized advertising presentations published to the multiple electronic media venues; and
   a central controller that receives raw advertising information regarding a seller's product or service and also receives the criteria, and selects electronic media venues, the central controller including:
      one or more databases that store a list of the multiple electronic media venues, the criteria, and the raw advertising information; and
      an ad creation engine that retrieves the raw advertising information and the criteria for the selected electronic media venues from the databases, and customizes the raw advertising information specifically for each of the selected electronic media venues in compliance with the criteria of each of the selected electronic media venues to create a customized advertising presentation for each of the selected electronic media venues,
   wherein the central controller automatically publishes each customized advertising presentation to the selected electronic media venue for which the customized advertising presentation was specifically customized, to make the customized advertising presentation accessible to one or more users of that selected electronic media venue in accordance with the criteria of that electronic media venue.

2. The electronic advertising system of claim 1, further comprising a seller interface program through which the seller enters information identifying the seller.

3. The electronic advertising system of claim 2, wherein the databases store a list of sellers.

4. The electronic advertising system of claim 2, wherein the seller information comprises information for establishing a seller account with the electronic advertising system.

5. The electronic advertising system of claim 1, further comprising an interface program through which a seller enters the raw advertising information.

6. The electronic advertising system of claim 5, wherein the seller interface program prompts the seller for the raw advertising information or components of the raw advertising information.

7. The electronic advertising system of claim 6, wherein the seller interface program also prompts the seller for a choice of presentation types in which the seller will allow the seller's raw advertising information to be published as a customized advertising presentation.

8. The electronic advertising system of claim 7, wherein the choice of advertising presentation types includes text advertising presentation types.

9. The electronic advertising system of claim 8, wherein the choice of text advertising presentation types include HTML text advertising presentation file formats.

10. The electronic advertising system of claim 8, wherein the choice of text advertising presentation types include TXT text advertising presentation file formats.

11. The electronic advertising system of claim 7, wherein the choice of advertising presentation types includes image advertising presentation types.

12. The electronic advertising system of claim 11, wherein the choice of image advertising presentation types include GIF image advertising presentation file formats.

13. The electronic advertising system of claim 11, wherein the choice of image advertising presentation types include JPEG image advertising presentation file formats.

14. The electronic advertising system of claim 11, wherein the choice of image advertising presentation types include GIF89 image advertising presentation file formats.

15. The electronic advertising system of claim 7, wherein the choice of advertising presentation types includes interactive advertising presentation types.

16. The electronic advertising system of claim 15, wherein the choice of interactive advertising presentation types include HTML interactive advertising presentation file formats.

17. The electronic advertising system of claim 6, wherein the raw advertising information or components of the raw advertising information is entered only once.

18. The electronic advertising system of claim 17, wherein two or more customized advertising presentations are created by the ad creation engine customizing the raw advertising information or components of the raw advertising information for each of two or more selected electronic media venues.

19. The electronic advertising system of claim 18, wherein two or more of the customized advertising presentations are unique.

20. The electronic advertising system of claim 18, wherein some of the two or more customized advertising presentations are unique.

21. The electronic advertising system of claim 6, wherein the raw advertising information or components of the raw advertising information are different than the created customized advertising presentation.

22. The electronic, advertising system of claim 6, wherein the raw advertising information or components of the raw advertising information do not comply with the criteria.

23. The electronic advertising system of claim 5, wherein the seller interface program prompts the seller for targeting information regarding one or more electronic media venues where the seller desires the customized advertising presentations created from the seller's raw advertising information to be published.

24. The electronic advertising system of claim 23, wherein the central controller selects one or more of the electronic media venues based at least in part on the targeting information received from the seller interface program.

25. The electronic advertising system of claim 23, wherein the targeting information targets one or more advertising channels.

26. The electronic advertising system of claim 25, wherein the advertising channel comprises two or more electronic media venues that share at least one characteristic.

27. The electronic advertising system of claim 26, wherein the electronic media venues that comprise the advertising channel are web pages.

28. The electronic advertising system of claim 27, wherein the web pages comprise the electronic media venue and content of the web page.

29. The electronic advertising system of claim 27, wherein at least one characteristic shared by the electronic media venues comprises similar content of the associated web pages.

30. The electronic advertising system of claim 29, wherein the targeting information targets the advertising channel based on the similarity of the content of the associated web pages compared to the goods or services that are the subject of the customized advertising presentation.

31. The electronic advertising system of claim 26, wherein the Characteristic shared by the two or more electronic media venues is similar demographics.

32. The electronic advertising system of claim 26, wherein the seller has no knowledge of which electronic media venues comprise the advertising channel.

33. The electronic advertising system of claim 23, wherein the targeting information input by the seller targets one or more electronic media venues by the characteristic of demographics of the electronic media venues' users.

34. The electronic advertising system of claim 23, wherein the targeting information input by the seller targets one or more electronic media venues by the characteristic of a price charged for publishing presentations.

35. The electronic advertising system of claim 34, wherein the targeting information input by the seller targets one or more electronic media venues by the highest price that the seller is willing to pay to have the seller's customized advertising presentations published to each electronic media venue.

36. The electronic advertising system of claim 34, wherein the targeting information input by the seller targets one or more electronic media venues by the total amount that the seller is willing to pay to have the seller's customized advertising presentations published.

37. The electronic advertising system of claim 23, wherein the targeting information includes identification of individual electronic media venues.

38. The electronic advertising system of claim 37, wherein the seller is presented with a list of electronic media venues which the seller can target.

39. The electronic advertising system of claim 23, wherein the electronic media venues further comprise electronic media venues associated with a controlled content server.

40. The electronic advertising system of claim 5, further comprising a presentation program associated with the seller interface program that simulates the creation of customized advertising presentations to thereby allow the seller to preview customized advertising presentations similar to those to be created by the central controller.

41. The electronic advertising system of claim 5, wherein the interface program through which a seller enters the raw advertising information or components of the raw advertising information further comprises a conflicting advertising information data input interface program which prompts the seller multiple times for the entry of similar raw advertising information or components of the raw advertising information in order to meet conflicting requirements of multiple electronic media venues.

42. The electronic advertising system of claim 41, wherein the conflicting requirements include standards for the number of words allowed in the customized advertising presentation.

43. The electronic advertising system of claim 41, wherein the conflicting requirements include standards for the number of characters allowed in the customized advertising presentation.

44. The electronic advertising system of claim 1, wherein the electronic advertising system comprises a network of computers.

45. The electronic advertising system of claim 1, wherein the central controller comprises a network of computers.

46. The electronic advertising system of claim 1, wherein the central controller selects one or more electronic media venues by selecting one or more advertising channels.

47. The electronic advertising system of claim 46, wherein the central controller selects the advertising channels based on the characteristics shared by the electronic media venues that comprise the advertising channels.

48. The electronic advertising system of claim 47, wherein the electronic media venues that comprise the advertising channel are web pages.

49. The electronic advertising system of claim 48, wherein the web pages comprise the electronic media venue and content of the web page.

50. The electronic advertising system of claim 49, wherein the characteristic shared by the electronic media venues comprises similar content of the web pages.

51. The electronic advertising system of claim 50, wherein the central controller selects the advertising channel based on the similarity of the content of the web pages compared to the goods or services that are the subject of the customized advertising presentation.

52. The electronic advertising system of claim 47 wherein the characteristic shared by the electronic media venues is similar demographics.

53. The electronic advertising system of claim 46, wherein the electronic media venues further comprise electronic media venues associated with a controlled content server.

54. The electronic advertising system of claim 1, wherein the central controller selects one or more electronic media venues based on demographics of electronic media venues' users.

55. The electronic advertising system of claim 54, wherein the electronic media venues further comprise electronic media venues associated with a controlled content server.

56. The electronic advertising system of claim 1, wherein the central controller selects one or more electronic media venues based on a price charged for publishing presentations.

57. The electronic advertising system of claim 56, wherein the central controller selects one or more electronic media venues by the targeting information input by the seller indicating the highest price that the seller is willing to pay to have the customized advertising presentations published to the desired electronic media venues.

58. The electronic advertising system of claim 56, wherein the central controller selects one or more electronic media venues by the targeting information input by the seller indicating the total amount that the seller is willing to pay to have the customized advertising presentations published to the desired electronic media venues.

59. The electronic advertising system of claim 56, wherein the electronic media venues further comprise electronic media venues associated with a controlled content server.

60. The electronic advertising system of claim 1, wherein the criteria include one or more of the following: guidelines, rules, standards, restrictions, specifications, and requirements.

61. The electronic advertising system of claim 1, wherein the electronic media venue is a website comprising one or more web pages.

62. The electronic advertising system of claim 61, wherein the web pages are displayed on a user's browser.

63. The electronic advertising system of claim 61, wherein the publishing of the customized advertising presentation comprises displaying the customized advertising presentation on a user's browser.

64. The electronic advertising system of claim 61, wherein the electronic media venues further comprise electronic media venues associated with a controlled content server.

65. The electronic advertising system of claim 1, wherein the electronic media venue comprises one or more virtual locations.

66. The electronic advertising system of claim 65, wherein the virtual locations include a transient display of the customized advertising presentation.

67. The electronic advertising system of claim 66, wherein the virtual locations include a display of the customized advertising presentation on a computer.

68. The electronic advertising system of claim 67, wherein the virtual locations are accessed over the Internet.

69. The electronic advertising system of claim 65, wherein the virtual locations include a display of the customized advertising presentation on a computer.

70. The electronic advertising system of claim 65, wherein the virtual locations are accessed over the Internet.

71. The electronic advertising system of claim 65, wherein the virtual locations include electronic sites for the display of the customized advertising presentation.

72. The electronic advertising system of claim 65, wherein the virtual locations are viewed on electronic networks.

73. The electronic advertising system of claim 65, wherein the electronic media venues further comprise electronic media venues associated with a controlled content server.

74. The electronic advertising system of claim 1, wherein the media venue interface program prompts the media venue to enter the criteria that control the customized advertising presentations published to the electronic media venues.

75. The electronic advertising system of claim 1, wherein the media venue interface program prompts the media venue for a choice of advertising presentation types to be published to the electronic media venues.

76. The electronic advertising system of claim 75, wherein the choice of advertising presentation types includes a text advertising presentation type.

77. The electronic advertising system of claim 76, wherein the choice of text advertising presentation types include the HTML text advertising presentation file formats.

78. The electronic advertising system of claim 75, wherein the choice of advertising presentation types includes an image advertising presentation type.

79. The electronic advertising system of claim 78, wherein the choice of image advertising presentation types include GIF image advertising presentation file formats.

80. The electronic advertising system of claim 78, wherein the choice of image advertising presentation types include JPEG image advertising presentation file formats.

81. The electronic advertising system of claim 78, wherein the choice of image advertising presentation types include GIF89 image advertising presentation file formats.

82. The electronic advertising system of claim 75, wherein the choice of advertising presentation types includes an interactive advertising presentation type.

83. The electronic advertising system of claim 82, wherein the choice of interactive advertising presentation types include HTML text advertising presentation file formats.

84. The electronic advertising system of claim 1, wherein the criteria include style criteria.

85. The electronic advertising system of claim 84, wherein the style criteria include style standards.

86. The electronic advertising system of claim 84, wherein the style criteria include presentation standards.

87. The electronic advertising system of claim 84, wherein the style criteria include choice of fonts.

88. The electronic advertising system of claim 84, wherein the style criteria include choice of colors.

89. The electronic advertising system of claim 84, wherein the style criteria include look and feel.

90. The electronic advertising system of claim 1, wherein the criteria include content criteria.

91. The electronic advertising system of claim 90, wherein the content criteria include content standards.

92. The electronic advertising system of claim 90, wherein the content criteria include blocked words.

93. The electronic advertising system of claim 90, wherein the content criteria include blocked phrases.

94. The electronic advertising system of claim 90, wherein the content criteria include blocked references.

95. The electronic advertising system of claim 90, wherein the content criteria include blocked uniform resource locators (URLs).

96. The electronic advertising system of claim 1, wherein the criteria include editorial criteria.

97. The electronic advertising system of claim 96, wherein the editorial criteria include grammar guidelines.

98. The electronic advertising system of claim 96, wherein the editorial criteria include spelling dictionaries.

99. The electronic advertising system of claim 1, wherein the criteria include design criteria.

100. The electronic advertising system of claim 99, wherein the design criteria include choice of presentation types.

101. The electronic advertising system of claim 99, wherein the design criteria include presentation templates.

102. The electronic advertising system of claim 99, wherein the design criteria include presentation formatting.

103. The electronic advertising system of claim 99, wherein the design criteria include amounts of text.

104. The electronic advertising system of claim 1, wherein each of the multiple media venues further provides distribution factors that control the publication of customized advertising presentations to at least some of the multiple electronic media venues.

105. The electronic advertising system of claim 104, further comprising one or more databases that store the distribution factors.

106. The electronic advertising system of claim 105, wherein the central controller retrieves the distribution factors from the databases, and uses the distribution factors as part of selecting electronic media venues.

107. The electronic advertising system of claim 106, wherein the distribution factors include blocked words.

108. The electronic advertising system of claim 106, wherein the distribution factors include blocked phrases.

109. The electronic advertising system of claim 106, wherein the distribution factors include blocked references.

110. The electronic advertising system of claim 106, wherein the distribution factors include blocked uniform resource locators (URLs).

111. The electronic advertising system of claim 106, wherein the distribution factors include publication dates and deadlines.

112. The electronic advertising system of claim 106, wherein the distribution factors include language restrictions.

113. The electronic advertising system of claim 106, wherein the distribution factors include demographic specifications.

114. The electronic advertising system of claim 1, wherein each of the multiple media venues further provides electronic media venue layout specifications.

115. The electronic advertising system of claim 114, further comprising one or more databases that store the electronic media venue layout specifications.

116. The electronic advertising system of claim 115, wherein the ad creation engine further retrieves the electronic media venue layout specifications for the selected electronic media venues from the databases, and customizes the raw advertising information specifically for each of the selected electronic media venues in compliance with the criteria and the electronic media venue layout specifications of each of the selected electronic media venues to create the customized advertising presentation for each of the selected electronic media venues.

117. The electronic advertising system of claim 116, wherein the electronic media venue layout specifications controls presentation size.

118. The electronic advertising system of claim 116, wherein the electronic media venue layout specifications control image specifications.

119. The electronic advertising system of claim 118, wherein the image specifications include image size rules.

120. The electronic advertising system of claim 118, wherein the image specifications include image file format rules.

121. The electronic advertising system of claim 120, wherein the image file format rules include CHF image file format rules.

122. The electronic advertising system of claim 120, wherein the image file format rules include JPEG image file format rules.

123. The electronic advertising system of claim 118, wherein the image specifications include image file compression rules.

124. The electronic advertising system of claim 1, wherein each of the multiple media venues further provides pricing information for the publication of customized advertising presentations to the electronic media venues.

125. The electronic advertising system of claim 124, further comprising one or more databases that store the pricing information.

126. The electronic advertising system of claim 124, wherein the electronic media venues further comprise electronic media venues associated with a controlled content server.

127. The electronic advertising system of claim 1, further comprising an additional interface program through which a seller may transmit pre-created advertising presentations to a second central controller to be published to selected electronic media venues selected by the second central controller.

128. The electronic advertising system of claim 127, wherein the additional interface program comprises one or more databases for storing the pre-created advertising presentations.

129. The electronic advertising system of claim 127, wherein the second central controller further comprises one or more databases for storing the pre-created advertising presentations.

130. The electronic advertising system of claim 127, wherein the second central controller further comprises one or more databases for storing pre-created customized advertising presentations.

131. The electronic advertising system of claim 127, wherein the second central controller further comprises a pre-created advertising presentation publishing program that receives the pre-created advertising presentations and selects electronic media venues, and wherein the second central controller automatically publishes each pre-created advertising presentation to the selected electronic media venues to make the pre-created advertising presentation accessible to one or more users of the selected electronic media venue.

132. The electronic advertising system of claim 131, wherein the second central controller selects the electronic media venues based, at least in part, on the targeting information.

133. The electronic advertising system of claim 131, wherein the second central controller further comprises a pre-created advertising presentation screening program that blocks the pre-created advertising presentations from being published to specific electronic media venues based, at least in part, on information provided by the media venues.

134. The electronic advertising system of claim 133, wherein the information comprises content criteria.

135. The electronic advertising system of claim 133, wherein the information comprises distribution factors.

136. The electronic advertising system of claim 127, wherein the second central controller further comprises a pre-created customized advertising presentation publishing program that receives pre-created customized advertising presentations and selects electronic media venues, and wherein the second central controller automatically publishes each pre-created customized advertising presentation to selected electronic media venues to make the pre-created customized advertising presentation accessible to one or more users.

137. The electronic advertising system of claim 136, wherein the second central controller selects the electronic media venues based, at least in part, on the targeting information.

138. The electronic advertising system of claim 136, wherein the second central controller further comprises a pre-created customized advertising presentation screening program that blocks the pre-created customized advertising presentations from being published to specific electronic media venues based, at least in part, on information provided by the media venues.

139. The electronic advertising system of claim 138, wherein the information comprises content criteria.

140. The electronic advertising system of claim 138, wherein the information comprises distribution factors.

141. The electronic advertising system of claim 127, wherein the additional interface program prompts the seller for the pre-created advertising presentation created outside the electronic advertising system.

142. The electronic advertising system of claim 141, wherein the seller creates the pre-created advertising presentations on a computer other than the computer operating the additional interface program.

143. The electronic advertising system of claim 141, wherein the seller has knowledge of any prerequisites required of the pre-created advertising presentation prior to the creation of the pre-created advertising presentations.

144. The electronic advertising system of claim 143, wherein the seller has knowledge of the prerequisites of each electronic media venue prior to the creation of the pre-created advertising presentations.

145. The electronic advertising system of claim 144, wherein the seller creates each pre-created advertising presentation according to the prerequisites of each electronic media venue.

146. The electronic advertising system of claim 144, wherein the prerequisites of each electronic media venue comprise criteria.

147. The electronic advertising system of claim 144, wherein the prerequisites of each electronic media venue comprises distribution factors.

148. The electronic advertising system of claim 144, wherein the prerequisites of each electronic media venue comprise layout prerequisites.

149. The electronic advertising system of claim 141, wherein the pre-created advertising presentations are manually uploaded into the additional interface program by the seller.

150. The electronic advertising system of claim 149 wherein the pre-created advertising presentations are complete and ready to be published prior to being manually uploaded.

151. The electronic advertising system of claim 149, wherein the pre-created advertising presentations are combined with additional information prior to being published.

152. The electronic advertising system of claim 151, wherein the additional interface program prompts the seller for the additional information that is combined with the pre-created advertising presentations prior to being published.

153. The electronic advertising system of claim 152, wherein the additional interface program further comprises a pre-created advertising presentation processing program that automatically combines the additional information and the pre-created advertising presentation.

154. The electronic advertising system of claim 152, wherein the additional information that is combined to the pre-created advertising presentations comprises an Alt Text.

155. The electronic advertising system of claim 152, wherein the additional information that is combined to the pre-created advertising presentations comprises a URL.

156. The electronic advertising system of claim 149 further providing a presentation type conversion program which performs a conversion process to change the pre-created advertising presentations file format to another pre-created advertising presentation file format.

157. The electronic advertising system of claim 156, wherein the conversion process changes a pre-created image advertising presentation file format to another pre-created image advertising presentation file format.

158. The electronic advertising system of claim 157, wherein the conversion process changes a GIF image advertising presentation file format to a JPG image advertising presentation file format.

159. The electronic advertising system of claim 127, wherein the additional interface program may transmit pre-created customized advertising presentations to the second central controller to be published to selected electronic media venues selected by the second central controller.

160. The electronic advertising system of claim 159, wherein the additional interface program creates the pre-created customized advertising presentations.

161. The electronic advertising system of claim 160, wherein the additional interface program prompts the seller for raw advertising information or components of the raw advertising information.

162. The electronic advertising system of claim 161, wherein the additional interface program through which a seller enters the raw advertising information or components of the raw advertising information further comprises a conflicting advertising information data input interface program which prompts the seller multiple times for the entry of similar raw advertising information or components of the raw advertising information in order to meet conflicting requirements of multiple electronic media venues.

163. The electronic advertising system of claim 162, wherein the conflicting requirements include standards for the number of words allowed in the pre-created customized advertising presentation.

164. The electronic advertising system of claim 162, wherein the conflicting requirements include standards for the number of characters allowed in the pre-created customized advertising presentation.

165. The electronic advertising system of claim 161, wherein the additional interface program prompts the seller for a choice of advertising presentation types which the seller wishes the pre-created customized advertising presentations to be published as.

166. The electronic advertising system of claim 165, wherein the choice of pre-created advertising presentation types includes a text advertising presentation type.

167. The electronic advertising system of claim 166, wherein the choice of text advertising presentation types include HTML text advertising presentation file formats.

168. The electronic advertising system of claim 165, wherein the choice of pre-created advertising presentation types includes an image advertising presentation type.

169. The electronic advertising system of claim 168, wherein the choice of image advertising presentation types include GIF image advertising presentation file formats.

170. The electronic advertising system of claim 168, wherein the choice of image advertising presentation types include JPEG image advertising presentation file formats.

171. The electronic advertising system of claim 168, wherein the choice of image advertising presentation types include GIF89 image advertising presentation file format.

172. The electronic advertising system of claim 165, wherein the choice of pre-created advertising presentation types includes an interactive advertising presentation type.

173. The electronic advertising system of claim 172, wherein the choice of interactive advertising presentation types include HTML interactive advertising presentation file format.

174. The electronic advertising system of claim 161, wherein the additional interface program creates the pre-created customized advertising presentations, and wherein the pre-created customized advertising presentations are customized for a specific electronic media venue.

175. The electronic advertising system of claim 174, wherein the additional interface program creates only one of the pre-created customized advertising presentations using the raw advertising information or components of the raw advertising information input by the seller.

176. The electronic advertising system of claim 174, wherein the additional interface program creates two or more of the pre-created customized advertising presentations using the raw advertising information or components of the raw advertising information input by the seller.

177. The electronic advertising system of claim 127, wherein the additional interface program prompts the seller for targeting information regarding one or more electronic media venues where the seller desires the pre-created advertising presentations and/or pre-created customized advertising presentations to be published.

178. The electronic advertising system of claim 177, wherein the second central controller selects one or more of the electronic media venues based at least in part on the targeting information received from the additional interface program.

179. The electronic advertising system of claim 178, wherein the targeting information targets one or more advertising channels.

180. The electronic advertising system of claim 179, wherein the advertising channel comprises two or more electronic media venues that share at least one characteristic.

181. The electronic advertising system of claim 180, wherein the electronic media venues that comprise the advertising channel are web sites comprising one or more web pages.

182. The electronic advertising system of claim 181, wherein the web pages comprise the electronic media venue and content of the web page.

183. The electronic advertising system of claim 181, wherein at least one characteristic shared by the electronic media venues comprises similar content of the web pages.

184. The electronic advertising system of claim 183, wherein the targeting information targets the advertising channel based on the similarity of the content of the web pages compared to the goods or services that are the subject of the pre-created customized advertising presentation.

185. The electronic advertising system of claim 180, wherein the characteristic shared by the two or more electronic media venues is similar demographics.

186. The electronic advertising system of claim 180, wherein the seller has no knowledge of which electronic media venues comprise the advertising channel.

187. The electronic advertising system of claim 178, wherein the targeting information input by the seller targets one or more electronic media venues by the characteristic of demographics of the electronic media venues' users.

188. The electronic advertising system of claim 178, wherein the targeting information input by the seller targets one or more electronic media venues by the characteristic of price charged for publishing presentations.

189. The electronic advertising system of claim 178, wherein the targeting information input by the seller targets one or more electronic media venues by the highest price that the seller is willing to pay to have the pre-created advertising presentations published to each electronic media venue.

190. The electronic advertising system of claim 178, wherein the targeting information input by the seller targets one or more electronic media venues by the highest price that the seller is willing to pay to have the pre-created customized advertising presentations published.

191. The electronic advertising system of claim 178, wherein the targeting information input by the seller targets one or more electronic media venues by the total amount that the seller is willing to pay to have the pre-created advertising presentations published.

192. The electronic advertising system of claim 178, wherein the targeting information input by the seller targets one or more electronic media venues by the total amount that the seller is willing to pay to have the seller's pre-created customized advertising presentations published.

193. The electronic advertising system of claim 178, wherein the targeting information includes identification of individual electronic media venues.

194. The electronic advertising system of claim 193, wherein the seller is presented with a list of electronic media venues which the seller can target.

195. The electronic advertising system of claim 127, further comprising an operator pre-created review interface program to allow a human editor to manually review the pre-created advertising presentation and the pre-created customized advertising presentation.

196. The electronic advertising system of claim 195, wherein the operator pre-created review interface program allows a human editor to manually review the pre-created advertising presentation and the pre-created customized advertising presentation that have been automatically rejected from the automated processing of the electronic advertising system because of noncompliance.

197. The electronic advertising system of claim 1 further providing a raw advertising information conversion program which may perform a conversion process to change a component of raw advertising information from one file format to another file format.

198. The electronic advertising system of claim 197, wherein an image component of raw advertising information is converted from one image file format to another image file format.

199. The electronic advertising system of claim 198, wherein the image component is converted from a GIF file format to a JPG file format.

200. The electronic advertising system of claim 1, wherein the electronic media venue is a web page comprising one or more customized advertising presentations.

201. The electronic advertising system of claim 200, wherein one or more customized advertising presentations are displayed on the web page.

202. The electronic advertising system of claim 201, wherein the web page is displayed on a user's browser.

203. The electronic advertising system of claim 202, wherein the user's browser program is running on the user's computer.

204. The electronic advertising system of claim 201, wherein the publishing of the customized advertising presentation comprises displaying the customized advertising presentation on a user's browser.

205. The electronic advertising system of claim 201, wherein the web pages comprise the electronic media venue and content of the web page.

206. The electronic advertising system of claim 127, wherein the second central controller comprises a network of computers.

207. The electronic advertising system of claim 127, wherein the second central controller selects one or more electronic media venues by selecting one or more advertising channels.

208. The electronic advertising system of claim 127, wherein the second central controller selects one or more electronic media venues based on demographics of electronic media venues' users.

209. The electronic advertising system of claim 127, wherein the second central controller selects one or more electronic media venues based on price charged for publishing presentations.

210. The electronic advertising system of claim 127, wherein the electronic media venues further comprise electronic media venues associated with a controlled content server.

211. The electronic advertising system of claim 1, wherein the customized advertising presentation is automatically created and automatically published to the selected electronic media venues without human interaction.

212. The electronic advertising system of claim 211, wherein the electronic media venues further comprise electronic media venues associated with a controlled content server.

213. The electronic advertising system of claim 1, wherein the customized advertising presentation is automatically created without human interaction.

214. The electronic advertising system of claim 1, wherein the customized advertising presentation is automatically published to the selected electronic media venues without human interaction.

215. The electronic advertising system of claim 214, wherein the electronic media venues further comprise electronic media venues associated with a controlled content server.

216. The electronic advertising system of claim 1, further comprising an operator review interface program to allow a human editor to manually review the raw advertising information, components of the raw advertising information or the customized advertising presentation.

217. The electronic advertising system of claim 216, wherein the operator review interface program allows a human editor to manually review raw advertising information, components of the raw advertising information or the customized advertising presentation that have been automatically rejected from the automated processing of the electronic advertising system because of noncompliance.

218. The electronic advertising system of claim 217, wherein the operator review interface program automatically rejects the raw advertising information, components of the raw advertising information or the customized advertising presentation based, at least in part, on noncompliance with the criteria.

219. The electronic advertising system of claim 1, further comprising a server placement program which transmits the customized advertising presentation to a server that further publishes the customized advertising presentation to one or more electronic, media venues.

220. The electronic advertising system of claim 219, wherein the server is a web server.

221. The electronic advertising system of claim 220, wherein the web server is operated by the operator of the electronic advertising system.

222. The electronic advertising system of claim 220, wherein the web server is operated by the owner of one or more electronic media venues.

223. The electronic advertising system of claim 219, wherein the electronic media venues further comprise electronic media venues associated with a controlled content server.

224. The electronic advertising system of claim 1, wherein the central controller further comprises a customized advertising presentation screening program that blocks customized advertising presentations from being published to specific electronic media venues based, at least in part, on information provided by the media venues.

225. The electronic advertising system of claim 224, wherein the information comprises content criteria.

226. The electronic advertising system of claim 224, wherein the information comprises distribution factors.

227. The electronic advertising system of claim 224, wherein the electronic media venues further comprise electronic media venues associated with a controlled content server.

228. The electronic advertising system of claim 1, further comprising one or more controlled content servers that are wholly owned or controlled by the management or operators of the electronic advertising system.

229. The electronic advertising system of claim 228, wherein the controlled content servers are web servers.

230. The electronic advertising system of claim 229, wherein each of the web servers host one or more web sites.

231. The electronic advertising system of claim 230, wherein each of the web sites contain one or more web pages.

232. The electronic advertising system of claim 231, wherein each of the web pages contains content and/or one or more electronic media venues associated with a controlled content server.

233. The electronic advertising system of claim 228, wherein the electronic media venues further comprise electronic media venues associated with the controlled content servers.

234. The electronic advertising system of claim 233, wherein the electronic media venues associated with the controlled content servers are web pages.

235. The electronic advertising system of claim 234, wherein the web pages comprise the electronic media venues associated with the controlled content servers and content of the web pages.

236. The electronic advertising system of claim 233, wherein the criteria further comprise criteria for the electronic media venues associated with the controlled content servers.

237. The electronic advertising system of claim 1, wherein the media venue is a person inputting data.

238. An electronic advertising system that automatically facilitates the creation and publication of customized advertising presentations to multiple electronic media venues, the electronic advertising system owned or controlled by an entity other than a seller, each electronic media venue having style criteria regarding the customized advertising presentations, the system comprising:

a media venue interface program through which multiple media venues provide style criteria that control the customized advertising presentations published to the electronic media venues; and a central controller that receives raw advertising information regarding a seller's product or service and also receives the style criteria, and selects electronic media venues, the central controller including:

one or more databases that store a list of the multiple electronic media venues, the style criteria, and the raw advertising information; and an ad creation engine that retrieves the raw advertising information and the style criteria for the selected electronic media venues from the databases, and customizes the raw advertising information specifically for each of the selected electronic media venues in compliance with the style criteria of each of the selected electronic media venues to create a customized advertising presentation for each of the selected electronic media venues, wherein the central controller automatically publishes each customized advertising presentation to the selected electronic media venue for which the customized advertising presentation was specifically customized, to make the customized advertising presentation accessible to one or more users of that selected electronic media venue in accordance with the style criteria of that electronic media venue.

239. The electronic advertising system of claim 238, further comprising a seller interface program through which the seller enters information identifying the seller.

240. The electronic advertising system of claim 239, wherein the databases store a list of sellers.

241. The electronic advertising system of claim 239, wherein the seller information comprises information for establishing a seller account with the electronic advertising system.

242. The electronic advertising system of claim 238, further comprising an interface program through which a seller enters the raw advertising information.

243. The electronic advertising system of claim 242, wherein the seller interface program prompts the seller for the raw advertising information or components of the raw advertising information.

244. The electronic advertising system of claim 243, wherein the seller interface program also prompts the seller for a choice of advertising presentation types in which the seller will allow the seller's raw advertising information to be published as a customized advertising presentation.

245. The electronic advertising system of claim 244, wherein the choice of advertising presentation types includes a text advertising presentation type.

246. The electronic advertising system of claim 244, wherein the choice of advertising presentation types includes an image advertising presentation type.

247. The electronic advertising system of claim 246, wherein the choice of image advertising presentation types include GIF image advertising presentation file formats.

248. The electronic advertising system of claim 245, wherein the choice of text advertising presentation types include HTML text advertising presentation file formats.

249. The electronic advertising system of claim 246, wherein the choice of image advertising presentation types include JPEG image advertising presentation file formats.

250. The electronic advertising system of claim 246, wherein the choice of image advertising presentation types include GIF89 image advertising presentation file formats.

251. The electronic advertising system of claim 244, wherein the choice of advertising presentation types includes an interactive advertising presentation type.

252. The electronic advertising system of claim 251, wherein the choice of interactive advertising presentation types include HTML advertising presentation file formats.

253. The electronic advertising system of claim 243, wherein the raw advertising information or components of the raw advertising information is entered only once.

254. The electronic advertising system of claim 253, wherein two or more customized advertising presentations are created by the ad creation engine customizing the raw advertising information or components of the raw advertising information for each of two or more selected electronic media venues.

255. The electronic advertising system of claim 254, wherein two or more customized advertising presentations are unique.

256. The electronic advertising system of claim 254, wherein some of the two or more customized advertising presentations are unique.

257. The electronic advertising system of claim 243, wherein the raw advertising information or components of the raw advertising information are different than the created customized advertising presentation.

258. The electronic advertising system of claim 243, wherein the raw advertising information or components of the raw advertising information do not comply with the style criteria.

259. The electronic advertising system of claim 242, wherein the seller interface program prompts the seller for targeting information regarding one or more electronic media venues where the seller desires the customized advertising presentations created from the seller's raw advertising information to be published.

260. The electronic advertising system of claim 259, wherein the central controller selects one or more of the electronic media venues based at least in part on the targeting information received from the seller interface program.

261. The electronic advertising system of claim 259, wherein the targeting information targets one or more advertising channels.

262. The electronic advertising system of claim 261, wherein the advertising channel comprises two or more electronic media venues that share at least one characteristic.

263. The electronic advertising system of claim 262, wherein the electronic media venues that comprise the advertising channel are web pages.

264. The electronic advertising system of claim 263, wherein the web pages comprise the electronic media venue and content of the web page.

265. The electronic advertising system of claim 263, wherein at least one characteristic shared by the electronic media venues comprises similar content of the web pages.

266. The electronic advertising system of claim 265, wherein the targeting information targets the advertising channel based on the similarity of the content of the web pages compared to the goods or services that are the subject of the customized advertising presentation.

267. The electronic advertising system of claim 262, wherein the characteristic shared by the two or more electronic media venues is similar demographics.

268. The electronic advertising system of claim 262, wherein the seller has no knowledge of which electronic media venues comprise the advertising channel.

269. The electronic advertising system of claim 259, wherein the targeting information input by the seller targets one or more electronic media venues by the characteristic of demographics of the electronic media venues' users.

270. The electronic advertising system of claim 269, wherein the electronic media venues further comprise electronic media venues associated with a controlled content server.

271. The electronic advertising system of claim 259, wherein the targeting information input by the seller targets one or more electronic media venues by the characteristic of a price charged for publishing presentations.

272. The electronic advertising system of claim 259, wherein the targeting information includes identification of individual electronic media venues.

273. The electronic advertising system of claim 272, wherein the seller is presented with a list of electronic media venues which the seller can target.

274. The electronic advertising system of claim 259, wherein the targeting information input by the seller targets one or more electronic media venues by the highest price that the seller is willing to pay to have the seller's customized advertising presentations published to each electronic media venue.

275. The electronic advertising system of claim 259, wherein the targeting information input by the seller targets one or more electronic media venues by the total amount that the seller is willing to pay to have the seller's customized advertising presentations published.

276. The electronic advertising system of claim 259, wherein the electronic media venues further comprise electronic media venues associated with a controlled content server.

277. The electronic advertising system of claim 242, further comprising a presentation program associated with the seller interface program that simulates the creation of customized advertising presentations to thereby allow the seller to preview customized advertising presentations similar to those to he created by the central controller.

278. The electronic advertising system of claim 242, wherein the interface program through which a seller enters the raw advertising information further comprises a conflicting advertising information data input interface program which prompts the seller multiple times for the entry of similar raw advertising information or components of the raw advertising information in order to meet conflicting requirements of multiple electronic media venues.

279. The electronic advertising system of claim 278, wherein the conflicting requirements include standards for the number of words allowed in the customized advertising presentation.

280. The electronic advertising system of claim 278, wherein the conflicting requirements include standards for the number of characters allowed in the customized advertising presentation.

281. The electronic advertising system of claim 238, wherein the electronic advertising system comprises a network of computers.

282. The electronic advertising system of claim 238, wherein the central controller comprises a network of computers.

283. The electronic advertising system of claim 238, wherein the central controller selects one or more electronic media venues by selecting one or more advertising channels.

284. The electronic advertising system of claim 283, wherein the central controller selects the advertising channels based on the characteristics shared by the electronic media venues that comprise the advertising channels.

285. The electronic advertising system of claim 284, wherein the electronic media venues that comprise the advertising channel are web pages.

286. The electronic advertising system of claim 285, wherein the characteristic shared by the electronic media venues comprises similar content of the web pages.

287. The electronic advertising system of claim 286, wherein the central controller selects the advertising channel based on the similarity of the content of the web pages compared to the goods or services that are the subject of the customized advertising presentation.

288. The electronic advertising system of claim 284, wherein the characteristic shared by the electronic media venues is similar demographics.

289. The electronic advertising system of claim 283, wherein the electronic media venues further comprise electronic media venues associated with a controlled content server.

290. The electronic advertising system of claim 238, wherein the central controller selects one or more electronic media venues based on demographics of electronic media venues' users.

291. The electronic advertising system of claim 238, wherein the central controller selects one or more electronic media venues based on a price charged for publishing presentations.

292. The electronic advertising system of claim 291, wherein the central controller selects one or more electronic media venues by the targeting information input by the seller indicating the highest price that the seller is willing to pay to have the seller's customized advertising presentations published.

293. The electronic advertising system of claim 291, wherein the central controller selects one or more electronic media venues by the targeting information input by the seller indicating the total amount that the seller is willing to pay to have the seller's customized advertising presentations published.

294. The electronic advertising system of claim 291, wherein the electronic media venues further comprise electronic media venues associated with a controlled content server.

295. The electronic advertising system of claim 238, wherein the style criteria include one or more of the following: guidelines, rules, standards, restrictions, specifications, and requirements.

296. The electronic advertising system of claim 238, wherein the electronic media venue is a website comprising one or more web pages.

297. The electronic advertising system of claim 296, wherein the web pages are displayed on a user's browser.

298. The electronic advertising system of claim 296, wherein the publishing of the customized advertising presentation comprises displaying the customized advertising presentation on a user's browser.

299. The electronic advertising system of claim 296, wherein the electronic media venues further comprise electronic media venues associated with a controlled content server.

300. The electronic advertising system of claim 238, wherein the electronic media venue comprises one or more virtual locations.

301. The electronic advertising system of claim 300, wherein the virtual locations include a transient display of the customized advertising presentation.

302. The electronic advertising system of claim 301, wherein the virtual locations include a display of the customized advertising presentation on a computer.

303. The electronic advertising system of claim 302, wherein the virtual locations are accessed over the Internet.

304. The electronic advertising system of claim 300, wherein the virtual locations include a display of the customized advertising presentation on a computer.

305. The electronic advertising system of claim 300, wherein the virtual locations are accessed over the Internet.

306. The electronic advertising system of claim 300, wherein the virtual locations include electronic sites for the display of the customized advertising presentation.

307. The electronic advertising system of claim 300, wherein the virtual locations are viewed on electronic networks.

308. The electronic advertising system of claim 300, wherein the electronic media venues further comprise electronic media venues associated with a controlled content server.

309. The electronic advertising system of claim 238, wherein the media venue interface program prompts the media venue to enter the criteria that control the customized advertising presentations published to the electronic media venues.

310. The electronic advertising system of claim 238, wherein the media venue interface program prompts the media venue for a choice of advertising presentation types to be published to the electronic media venues.

311. The electronic advertising system of claim 310, wherein the choice of advertising presentation types includes a text advertising presentation type.

312. The electronic advertising system of claim 311, wherein the choice of text advertising presentation types include the HTML text advertising presentation file formats.

313. The electronic advertising system of claim 310, wherein the choice of advertising presentation types includes an image advertising presentation type.

314. The electronic advertising system of claim 313, wherein the choice of image advertising presentation types include GIF image advertising presentation file formats.

315. The electronic advertising system of claim 313, wherein the choice of image advertising presentation types include JPEG image advertising presentation file formats.

316. The electronic advertising system of claim 313, wherein the choice of image advertising presentation types include GIF89 image advertising presentation file formats.

317. The electronic advertising system of claim 310, wherein the choice of advertising presentation types includes an interactive advertising presentation type.

318. The electronic advertising system of claim 317, wherein the choice of interactive advertising presentation types include HTML interactive, advertising presentation file formats.

319. The electronic advertising system of claim 238, wherein the style criteria include style standards.

320. The electronic advertising system of claim 238, wherein the style criteria include presentation standards.

321. The electronic advertising system of claim 238, wherein the style criteria include choice of fonts.

322. The electronic advertising system of claim 238, wherein the style criteria include choice of colors.

323. The electronic advertising system of claim 238, wherein the style criteria include look and feel.

324. The electronic advertising system of claim 238, wherein each of the multiple media venues further provides content criteria that control the creation of customized advertising presentations to be published to at least some of the multiple electronic media venues.

325. The electronic advertising system of claim 324, further comprising one or more databases that store the content criteria.

326. The electronic advertising system of claim 325, wherein the ad creation engine further retrieves the electronic media venue content criteria for the selected electronic media venues from the databases, and customizes the raw advertising information specifically for each of the selected electronic media venues in compliance with the style criteria and content criteria of each of the selected electronic media venues to create the customized advertising presentation for each of the selected electronic media venues in accordance with the style criteria and the content criteria of that electronic media venue.

327. The electronic advertising system of claim 326, wherein the content criteria include content standards.

328. The electronic advertising system of claim 326, wherein the content criteria include blocked words.

329. The electronic advertising system of claim 326, wherein the content criteria include blocked phrases.

330. The electronic advertising system of claim 326, wherein the content criteria include blocked references.

331. The electronic advertising system of claim 326, wherein the content criteria include blocked uniform resource locators (URLs).

332. The electronic advertising system of claim 238, wherein each of the multiple media venues further provides editorial criteria that control the creation of customized advertising presentations to be published to at least some of the multiple electronic media venues.

333. The electronic advertising system of claim 332, further comprising one or more databases that store the editorial criteria.

334. The electronic advertising system of claim 333, wherein the ad creation engine further retrieves the electronic media venue editorial criteria for the selected electronic media venues from the databases, and customizes the raw advertising information specifically for each of the selected electronic media venues in compliance with the style criteria and editorial criteria of each of the selected electronic media venues to create the customized advertising presentation for each of the selected electronic media venues in accordance with the style criteria and the editorial criteria of that electronic media venue.

335. The electronic advertising system of claim 334, wherein the editorial criteria include grammar guidelines.

336. The electronic advertising system of claim 334, wherein the editorial criteria include spelling dictionaries.

337. The electronic advertising system of claim 238, wherein each of the multiple media venues further provides design criteria that control the creation of customized advertising presentations to be published to at least some of the multiple electronic media venues.

338. The electronic advertising system of claim 337, further comprising one or more databases that store the design criteria.

339. The electronic advertising system of claim 338, wherein the ad creation engine further retrieves the design criteria for the selected electronic media venues from the databases, and customizes the raw advertising information specifically for each of the selected electronic media venues in compliance with the style criteria and design criteria of each of the selected electronic media venues to create the customized advertising presentation for each of the selected electronic media venues in accordance with the style criteria and the design criteria of that electronic media venue.

340. The electronic advertising system of claim 339, wherein the design criteria include choice of presentation types.

341. The electronic advertising system of claim 339, wherein the design criteria include presentation templates.

342. The electronic advertising system of claim 339, wherein the design criteria include presentation formatting.

343. The electronic advertising system of claim 339, wherein the design criteria include amounts of text.

344. The electronic advertising system of claim 238, wherein each of the multiple media venues further provides distribution factors that control the publication of customized advertising presentations to at least some of the multiple electronic media venues.

345. The electronic advertising system of claim 344, further comprising one or more databases that store the distribution factors.

346. The electronic advertising system of claim 345, wherein the central controller retrieves the distribution factors from the databases, and uses the distribution factors as part of selecting electronic media venues.

347. The electronic advertising system of claim 346, wherein the distribution factors include blocked words.

348. The electronic advertising system of claim 346, wherein the distribution factors include hocked phrases.

349. The electronic advertising system of claim 346, wherein the distribution factors include blocked references.

350. The electronic advertising system of claim 346, wherein the distribution factors include blocked uniform resource locators (URLs).

351. The electronic advertising system of claim 346, wherein the distribution factors include publication dates and deadlines.

352. The electronic advertising system of claim 346, wherein the distribution factors include language restrictions.

353. The electronic advertising system of claim 346, wherein the distribution factors include demographic specifications.

354. The electronic advertising system of claim 238, wherein each of the multiple media venues further provides electronic media venue layout specifications that control the creation of customized advertising presentations to be published to at least some of the multiple electronic media venues.

355. The electronic advertising system of claim 354, further comprising one or more databases that store the electronic media venue layout specifications.

356. The electronic advertising system of claim 355, wherein the ad creation engine further retrieves the electronic media venue layout specifications for the selected electronic media venues from the databases, and customizes the raw advertising information specifically for each of the selected electronic media venues in compliance with the style criteria and the electronic media venue layout specifications of each of the selected electronic media venues to create the customized advertising presentation for each of the selected electronic media venues.

357. The electronic advertising system of claim 356, further comprising one or more databases that store the electronic media venue layout specifications.

358. The electronic advertising system of claim 356, wherein the electronic media venue layout specifications controls presentation size.

359. The electronic advertising system of claim 356, wherein the electronic media venue layout specifications controls image specifications.

360. The electronic advertising system of claim 359, wherein the image specifications include image size rules.

361. The electronic advertising system of claim 359, wherein the image specifications include image file format rules.

362. The electronic advertising system of claim 361, wherein the image file format rules include GIF image file format rules.

363. The electronic advertising system of claim 361, wherein the image file format rules include JPEG image file format rules.

364. The electronic advertising system of claim 359, wherein the image specifications include image file compression rules.

365. The electronic advertising system of claim 238, wherein each of the multiple media venues further provides pricing information for the publication of customized advertising presentations to the electronic media venues.

366. The electronic advertising system of claim 365, further comprising one or more databases that store the pricing information.

367. The electronic advertising system of claim 365, wherein the electronic media venues further comprise electronic media venues associated with a controlled content server.

368. The electronic advertising system of claim 238 further providing a raw advertising information conversion program which may perform a conversion process to change a component of raw advertising information from one file format to another file format.

369. The electronic advertising system of claim 368, wherein an image component of raw advertising information is converted from one file format to another file format.

370. The electronic advertising system of claim 369, wherein the image component is converted from a GIF file format to a JPG file format.

371. The electronic advertising system of claim 238, wherein the electronic media venue is a web page comprising one or more customized advertising presentations.

372. The electronic advertising system of claim 371, wherein one or more customized advertising presentations are displayed on the web page.

373. The electronic advertising system of claim 372, wherein the web page is displayed on a user's browser.

374. The electronic advertising system of claim 373, wherein the user's browser program is running on the user's computer.

375. The electronic advertising system of claim 372, wherein the publishing of the customized advertising presentation comprises displaying the customized advertising presentation on a user's browser.

376. The electronic advertising system of claim 372, wherein the web pages comprise the electronic media venue and content of the web page.

377. The electronic advertising system of claim 238, wherein the customized advertising presentation is automatically created and automatically published to the selected electronic media venues without human interaction.

378. The electronic advertising system of claim 377, wherein the electronic media venues further comprise electronic media venues associated with a controlled content server.

379. The electronic advertising system of claim 238, wherein the customized advertising presentation is automatically created without human interaction.

380. The electronic advertising system of claim 238, wherein the customized advertising presentation is automatically published to the selected electronic media venues without human interaction.

381. The electronic advertising system of claim 380, wherein the electronic media venues further comprise electronic media venues associated with a controlled content server.

382. The electronic advertising system of claim 238, further comprising an operator review interface program to allow a human editor to manually review the raw advertising information, components of the raw advertising information or the customized advertising presentation.

383. The electronic advertising system of claim 382, wherein the operator review interface program allows a human editor to manually review raw advertising information, components of the raw advertising information or the customized advertising presentation that have been automatically rejected from the automated processing of the electronic advertising system because of noncompliance.

384. The electronic advertising system of claim 383, wherein the operator review interface automatically rejects the raw advertising information, components of the raw advertising information or the customized advertising presentation based, at least in part, on noncompliance with the style criteria.

385. The electronic advertising system of claim 238, further comprising a server placement program which transmits the customized advertising presentation to a server that further publishes the customized advertising presentation to one or more electronic media venue.

386. The electronic advertising system of claim 385, wherein the server is a web server.

387. The electronic advertising system of claim 386, wherein the web server is operated by the operator of the electronic advertising system.

388. The electronic advertising system of claim 386, wherein the web server is operated by the owner of one or more electronic media venues.

389. The electronic advertising system of claim 385, wherein the electronic media venues further comprise electronic media venues associated with a controlled content server.

390. The electronic advertising system of claim 238, wherein the central controller further comprises a customized advertising presentation screening program that blocks customized advertising presentations from being published to specific electronic media venues based, at least in part, on information provided by the media venues.

391. The electronic advertising system of claim 390, wherein the information comprises content criteria.

392. The electronic advertising system of claim 390, wherein the information comprises distribution factors.

393. The electronic advertising system of claim 390, wherein the electronic media venues further comprise electronic media venues associated with a controlled content server.

394. The electronic advertising system of claim 238, further comprising one or more controlled content servers that are wholly owned or controlled by the management or operators of the electronic advertising system.

395. The electronic advertising system of claim 394, wherein the controlled content servers are web servers.

396. The electronic advertising system of claim 395, wherein each of the web servers host one or more web sites.

397. The electronic advertising system of claim 396, wherein each of the web sites contain one or more web pages.

398. The electronic advertising system of claim 397, wherein each of the web pages contains content and/or one or more electronic media venues associated with a controlled content server.

399. The electronic advertising system of claim 394, wherein the electronic media venues further comprise electronic media venues associated with the controlled content servers.

400. The electronic advertising system of claim 399, wherein the electronic media venues associated with the controlled content servers are web pages.

401. The electronic advertising system of claim 400, wherein the web pages comprise the electronic media venues associated with the controlled content servers and content of the web pages.

402. The electronic advertising system of claim 399, wherein the style criteria further comprise style criteria for the electronic media venues associated with the controlled content servers.

403. The electronic advertising system of claim 238, wherein the media venue is a person inputting data.

404. An electronic advertising method that automatically facilitates the creation and publication of customized advertising presentations to multiple electronic media venues, the advertising method implemented by an entity other than a seller, each electronic media venue having criteria regarding the customized advertising presentations, the method comprising:

receiving criteria from multiple media venues, wherein the criteria controls the customized advertising presentations published to each of the multiple electronic media venues;

receiving raw advertising information regarding a seller's product or service;

selecting electronic media venues; and automatically publishing each customized advertising presentation to the selected electronic media venue for which the customized advertising presentation was specifically customized, thereby making the customized advertising presentation accessible to one or more users of that selected electronic media venue in accordance with the criteria of that media venue, wherein automatically publishing each customized advertising presentation uses:

one or more databases that store a list of the multiple electronic media venues, the criteria received from the multiple media venues, and the raw advertising information; and an ad creation engine that retrieves the raw advertising information and the criteria received from the selected electronic media venues from the databases, and customizes the raw advertising information specifically for each of the selected electronic media venues in compliance with the criteria of each of the selected electronic media venues to create the customized advertising presentation for each of the selected electronic media venues.

\* \* \* \* \*